US008359877B2

(12) United States Patent
Kamen et al.

(10) Patent No.: US 8,359,877 B2
(45) Date of Patent: Jan. 29, 2013

(54) WATER VENDING APPARATUS

(75) Inventors: Dean Kamen, Bedford, NH (US); Christopher C. Langenfeld, Nashua, NH (US); Ryan K. LaRocque, Pepperell, MA (US); Andrew A. Schnellinger, Merrimack, NH (US); Prashant Bhat, Manchester, NH (US); Stanley B. Smith, III, Raymond, NH (US); Otis L. Clapp, Epping, NH (US); Jeremy M. Swerdlow, Vienna, VA (US)

(73) Assignee: DEKA Products Limited Partnership, Manchester, NH (US)

( * ) Notice: Subject to any disclaimer, the term of this patent is extended or adjusted under 35 U.S.C. 154(b) by 278 days.

(21) Appl. No.: 12/541,625

(22) Filed: Aug. 14, 2009

(65) Prior Publication Data

US 2011/0147194 A1 Jun. 23, 2011

Related U.S. Application Data

(60) Provisional application No. 61/089,295, filed on Aug. 15, 2008.

(51) Int. Cl.
*F25D 21/14* (2006.01)

(52) U.S. Cl. ..................................... 62/285; 62/291 CD

(58) Field of Classification Search .................... 62/285, 62/288, 291, 274, 426, 434, 264; 261/140.1, 261/140.2, 142; 202/176, 181, 242
See application file for complete search history.

(56) References Cited

U.S. PATENT DOCUMENTS

| | | | |
|---|---|---|---|
| 120,222 | A | 10/1871 | Van Emon |
| 124,805 | A | 3/1872 | Fryer |
| 321,313 | A | 6/1885 | Pinkham |
| 327,875 | A | 10/1885 | Hall |
| 388,654 | A | 8/1888 | Erwood |
| 488,373 | A | 12/1892 | Touch |
| 646,406 | A | 4/1900 | Anderson et al. |
| 1,089,651 | A | 3/1914 | Kovalavich |
| 1,179,097 | A | 4/1916 | Hartog |
| 1,324,515 | A | 12/1919 | Otti |
| 1,386,020 | A | 8/1921 | Perkins |
| 1,413,521 | A | 4/1922 | Davis |
| 1,658,063 | A | 2/1928 | Stancliffe |
| 1,668,532 | A | 5/1928 | Stewart |
| 1,866,702 | A | 4/1930 | Gehres |
| 1,831,574 | A | 5/1930 | Norton |
| 1,769,375 | A | 7/1930 | Leary |
| 1,840,389 | A | 1/1932 | Eubank |

(Continued)

FOREIGN PATENT DOCUMENTS

| | | |
|---|---|---|
| DE | 445 033 | 5/1927 |
| DE | 912 263 C | 6/1954 |

(Continued)

OTHER PUBLICATIONS

International Search Report with Written Opinion, dated Nov. 26, 2008, received in international patent application No. PCT/US2008/066198.

(Continued)

*Primary Examiner* — Mohammad Ali

(74) *Attorney, Agent, or Firm* — Michelle Saquet Temple

(57) ABSTRACT

A water vending apparatus is disclosed. The water vending system includes a water vapor distillation apparatus and a dispensing device. The dispensing device is in fluid communication with the fluid vapor distillation apparatus and the product water from the fluid vapor distillation apparatus is dispensed by the dispensing device.

22 Claims, 209 Drawing Sheets

U.S. PATENT DOCUMENTS

| | | | |
|---|---|---|---|
| 1,877,106 | A | 9/1932 | Williams |
| 2,067,049 | A | 1/1937 | Goldberg |
| 2,132,150 | A | 10/1938 | Fenske |
| 2,142,747 | A | 1/1939 | Fisher |
| 2,155,278 | A | 4/1939 | Mautsch |
| 2,170,099 | A | 8/1939 | Stubings |
| 2,176,657 | A | 10/1939 | Finch |
| 2,289,984 | A | 4/1942 | Mourmotseff |
| 2,337,294 | A | 12/1943 | Cooper |
| 2,390,436 | A | 12/1945 | Gunter |
| 2,419,234 | A | 4/1947 | Holihan |
| 2,449,587 | A | 9/1948 | Chambers |
| 2,453,375 | A | 11/1948 | Kollsman |
| 2,532,267 | A | 11/1950 | Chase |
| 2,564,100 | A | 8/1951 | DuPre |
| 2,595,457 | A | 5/1952 | Holm et al. |
| 2,644,308 | A | 7/1953 | Downs |
| 2,688,228 | A | 9/1954 | DeBrey et al. |
| 2,791,891 | A | 5/1957 | Lance |
| 2,830,832 | A | 4/1958 | Moorman et al. |
| 2,966,382 | A | 12/1960 | Olsen |
| 3,059,418 | A | 10/1962 | Johnston |
| 3,092,091 | A | 6/1963 | Bosley |
| 3,097,896 | A | 7/1963 | Wasley |
| 3,243,359 | A | 3/1966 | Schmidt |
| 3,266,566 | A | 8/1966 | Huet |
| 3,293,480 | A | 12/1966 | Green et al. |
| 3,366,314 | A | 1/1968 | Schroder |
| 3,431,788 | A | 3/1969 | DePre et al. |
| 3,455,791 | A | 7/1969 | Nash et al. |
| 3,456,952 | A | 7/1969 | Prasse et al. |
| 3,477,226 | A | 11/1969 | Percival |
| 3,572,379 | A | 3/1971 | Popa et al. |
| 3,583,830 | A | 6/1971 | Bailey |
| 3,603,082 | A | 9/1971 | Sneeden et al. |
| 3,607,636 | A | 9/1971 | Nageler |
| 3,635,283 | A | 1/1972 | Satchwell |
| 3,687,817 | A | 8/1972 | Jimerson et al. |
| 3,724,523 | A | 4/1973 | Mattern |
| 3,742,578 | A | 7/1973 | Dirne et al. |
| 3,753,335 | A | 8/1973 | Morris |
| 3,775,973 | A | 12/1973 | Hudson |
| 3,782,457 | A | 1/1974 | Troy |
| 3,789,617 | A | 2/1974 | Rannow |
| 3,807,912 | A | 4/1974 | Keller |
| 3,846,254 | A | 11/1974 | Sephton |
| 3,849,101 | A | 11/1974 | Wythe et al. |
| 3,859,794 | A | 1/1975 | Hakansson |
| 3,860,384 | A | 1/1975 | Vulliet et al. |
| 3,861,223 | A | 1/1975 | Braun |
| 3,891,496 | A | 6/1975 | Erwin |
| 3,911,694 | A | 10/1975 | Doerner |
| 3,913,314 | A | 10/1975 | Yannone et al. |
| 3,924,477 | A | 12/1975 | Portelance |
| 3,940,932 | A | 3/1976 | Ambrose et al. |
| 3,940,933 | A | 3/1976 | Nystrom |
| 3,950,216 | A | 4/1976 | Bruns |
| 3,956,072 | A | 5/1976 | Huse |
| 3,956,892 | A | 5/1976 | Nystrom |
| 3,991,586 | A | 11/1976 | Acord |
| 3,996,314 | A | 12/1976 | Lakmaker |
| 3,997,408 | A | 12/1976 | Barba et al. |
| 4,002,538 | A | 1/1977 | Pottharst, Jr. |
| 4,008,039 | A | 2/1977 | Compton et al. |
| 4,020,635 | A | 5/1977 | Joynes et al. |
| 4,028,179 | A | 6/1977 | Colgate |
| 4,030,985 | A | 6/1977 | Barba et al. |
| 4,032,391 | A | 6/1977 | Moked et al. |
| 4,041,592 | A | 8/1977 | Kelm |
| 4,045,293 | A | 8/1977 | Cooksley |
| 4,057,034 | A | 11/1977 | Farquhar et al. |
| 4,067,191 | A | 1/1978 | Gronvall et al. |
| 4,069,670 | A | 1/1978 | Bratt et al. |
| 4,070,871 | A | 1/1978 | De Cachard et al. |
| 4,085,588 | A | 4/1978 | Reams et al. |
| 4,106,560 | A | 8/1978 | Lauro |
| 4,134,939 | A | 1/1979 | Zardi et al. |
| 4,148,211 | A | 4/1979 | Sawa et al. |
| 4,154,642 | A | 5/1979 | Mattern et al. |
| 4,159,227 | A | 6/1979 | Sunquist |
| 4,168,211 | A | 9/1979 | Pottharst, Jr. |
| 4,169,692 | A | 10/1979 | McDonough et al. |
| 4,172,363 | A | 10/1979 | Bex |
| 4,179,891 | A | 12/1979 | Gronvall |
| 4,191,241 | A | 3/1980 | Brennan |
| 4,199,537 | A | 4/1980 | Zardi et al. |
| 4,231,222 | A | 11/1980 | Fenton |
| 4,232,734 | A | 11/1980 | Hatje et al. |
| 4,248,296 | A | 2/1981 | Jezek |
| 4,255,122 | A | 3/1981 | Alpkvist et al. |
| 4,255,929 | A | 3/1981 | McDougal et al. |
| 4,259,160 | A | 3/1981 | McClure |
| 4,260,461 | A | 4/1981 | Pottharst, Jr. |
| 4,265,263 | A | 5/1981 | Hobbs |
| 4,305,457 | A | 12/1981 | Cozzolino |
| 4,307,572 | A | 12/1981 | Brinkerhoff |
| 4,309,243 | A | 1/1982 | Sundquist |
| 4,313,080 | A | 1/1982 | Park |
| 4,313,305 | A | 2/1982 | Egosi |
| 4,316,774 | A | 2/1982 | Trusch |
| 4,317,786 | A | 3/1982 | Lagana |
| 4,317,787 | A | 3/1982 | Lagana |
| 4,327,550 | A | 5/1982 | Knoos |
| 4,330,260 | A | 5/1982 | Jorgensen et al. |
| 4,330,992 | A | 5/1982 | Senfit |
| 4,343,350 | A | 8/1982 | Campbell et al. |
| 4,358,268 | A | 11/1982 | Neville |
| 4,364,724 | A | 12/1982 | Alpkvist |
| 4,381,648 | A | 5/1983 | Balas, Jr. |
| 4,384,457 | A | 5/1983 | Harvey |
| 4,384,672 | A | 5/1983 | Kutzner et al. |
| 4,387,568 | A | 6/1983 | Dineen |
| 4,410,302 | A | 10/1983 | Chiba et al. |
| 4,413,475 | A | 11/1983 | Moscrip |
| 4,416,114 | A | 11/1983 | Martini |
| 4,423,766 | A | 1/1984 | Bernhardt et al. |
| 4,428,630 | A | 1/1984 | Folger et al. |
| 4,433,846 | A | 2/1984 | Romero et al. |
| 4,434,617 | A | 3/1984 | Walsh |
| 4,437,933 | A | 3/1984 | Kikkawa et al. |
| 4,442,670 | A | 4/1984 | Goldman |
| 4,444,675 | A | 4/1984 | Goeldner |
| 4,445,570 | A | 5/1984 | Retallick |
| 4,448,461 | A | 5/1984 | Otto |
| 4,450,754 | A | 5/1984 | Liljequist |
| 4,470,449 | A | 9/1984 | Ziebold |
| 4,489,242 | A | 12/1984 | Worst |
| 4,509,464 | A | 4/1985 | Hansen |
| 4,511,436 | A | 4/1985 | el Din Nasser |
| 4,511,805 | A | 4/1985 | Boy-Marcotte et al. |
| 4,520,868 | A | 6/1985 | Grawey |
| 4,521,161 | A | 6/1985 | Olsen et al. |
| 4,522,030 | A | 6/1985 | Corey |
| 4,527,394 | A | 7/1985 | Corey |
| 4,532,765 | A | 8/1985 | Corey |
| 4,532,985 | A | 8/1985 | Cutler |
| 4,533,265 | A | 8/1985 | Woodbridge |
| 4,536,258 | A | 8/1985 | Huhta-Koivisto |
| 4,537,039 | A | 8/1985 | Fearon |
| 4,538,573 | A | 9/1985 | Merrick |
| 4,538,677 | A | 9/1985 | Bodas et al. |
| 4,539,076 | A | 9/1985 | Swain |
| 4,551,070 | A | 11/1985 | Olsen et al. |
| 4,561,940 | A | 12/1985 | Meier |
| 4,565,177 | A | 1/1986 | Roettgen et al. |
| 4,572,287 | A | 2/1986 | Allo et al. |
| 4,573,320 | A | 3/1986 | Kralick |
| 4,577,604 | A | 3/1986 | Hara et al. |
| 4,585,523 | A | 4/1986 | Giddings |
| 4,586,985 | A | 5/1986 | Ciocca et al. |
| 4,597,835 | A | 7/1986 | Moss |
| 4,633,667 | A | 1/1987 | Watanabe et al. |
| 4,636,283 | A | 1/1987 | Nasser |
| 4,638,633 | A | 1/1987 | Otters |
| 4,642,547 | A | 2/1987 | Redlich |
| 4,662,176 | A | 5/1987 | Fujiwara et al. |
| 4,671,856 | A | 6/1987 | Sears |

| | | | |
|---|---|---|---|
| 4,676,202 | A | 6/1987 | Johnson |
| 4,686,009 | A | 8/1987 | McCabe |
| 4,695,062 | A | 9/1987 | Dreschmann et al. |
| 4,707,220 | A | 11/1987 | Feres |
| 4,731,159 | A | 3/1988 | Porter et al. |
| 4,734,167 | A | 3/1988 | Goeldner |
| 4,736,586 | A | 4/1988 | Kawajiri et al. |
| 4,747,752 | A | 5/1988 | Somarakis |
| 4,751,819 | A | 6/1988 | Eder |
| 4,756,797 | A | 7/1988 | Elmore et al. |
| 4,768,341 | A | 9/1988 | Nozaki et al. |
| 4,776,171 | A | 10/1988 | Perry et al. |
| 4,779,421 | A | 10/1988 | Fellows |
| 4,799,542 | A | 1/1989 | Sladky |
| 4,809,804 | A | 3/1989 | Houston et al. |
| 4,822,455 | A | 4/1989 | Olrik |
| 4,824,149 | A | 4/1989 | Reuchlein |
| 4,830,757 | A | 5/1989 | Lynch et al. |
| H658 | H | 8/1989 | Breckenridge et al. |
| 4,857,144 | A | 8/1989 | Casparian |
| 4,869,067 | A | 9/1989 | Sears |
| 4,877,489 | A | 10/1989 | Lloyd |
| 4,881,372 | A | 11/1989 | Naito |
| 4,898,041 | A | 2/1990 | Islas |
| 4,901,790 | A | 2/1990 | Meijer |
| 4,925,526 | A | 5/1990 | Havukainen |
| 4,940,406 | A | 7/1990 | Kee |
| 4,946,349 | A | 8/1990 | Manabe et al. |
| 4,948,514 | A | 8/1990 | MacGregor et al. |
| 4,977,742 | A | 12/1990 | Meijer |
| 4,984,432 | A | 1/1991 | Corey |
| 4,994,097 | A | 2/1991 | Brouwers |
| 4,996,841 | A | 3/1991 | Meijer et al. |
| 5,003,777 | A | 4/1991 | Berchowitz |
| 5,005,349 | A | 4/1991 | Momose et al. |
| 5,037,955 | A | 8/1991 | Dighton et al. |
| 5,045,155 | A | 9/1991 | Ramsland |
| 5,046,331 | A | 9/1991 | O'Neal et al. |
| 5,046,554 | A | 9/1991 | Iwasaki et al. |
| 5,053,110 | A | 10/1991 | Deutsch |
| 5,054,547 | A | 10/1991 | Shipley |
| 5,061,376 | A | 10/1991 | MacGregor |
| 5,065,579 | A | 11/1991 | Monahan |
| 5,069,272 | A | 12/1991 | Chagnot |
| 5,073,177 | A | 12/1991 | Brouwers |
| 5,074,114 | A | 12/1991 | Meijer et al. |
| 5,074,998 | A | 12/1991 | De Baat Doclman |
| 5,095,701 | A | 3/1992 | Nakano |
| 5,100,300 | A | 3/1992 | Haavik |
| 5,101,791 | A | 4/1992 | Kuettner et al. |
| 5,102,503 | A | 4/1992 | Silinski et al. |
| 5,108,548 | A | 4/1992 | Keane et al. |
| 5,111,899 | A | 5/1992 | Reimann |
| 5,148,066 | A | 9/1992 | Beale et al. |
| 5,161,374 | A | 11/1992 | Schiessl |
| 5,168,947 | A | 12/1992 | Rodenborn |
| 5,169,502 | A | 12/1992 | Mugele |
| 5,171,431 | A | 12/1992 | Schulte |
| 5,172,784 | A | 12/1992 | Varela, Jr. |
| 5,174,117 | A | 12/1992 | Naito et al. |
| 5,177,968 | A | 1/1993 | Fellows |
| 5,185,501 | A | 2/1993 | Oha |
| 5,197,863 | A | 3/1993 | Dardis et al. |
| 5,199,722 | A | 4/1993 | Wada et al. |
| 5,203,170 | A | 4/1993 | Naito |
| 5,217,065 | A | 6/1993 | Green et al. |
| 5,217,352 | A | 6/1993 | Haavik |
| 5,222,869 | A | 6/1993 | Wunner et al. |
| 5,228,293 | A | 7/1993 | Vitale |
| 5,236,555 | A | 8/1993 | Yuan |
| 5,246,541 | A | 9/1993 | Ryham |
| 5,251,593 | A | 10/1993 | Pedersen |
| 5,271,454 | A | 12/1993 | Leidinger |
| 5,293,853 | A | 3/1994 | Burger et al. |
| 5,294,303 | A | 3/1994 | Robbins |
| 5,295,794 | A | 3/1994 | Haavik |
| 5,317,882 | A | 6/1994 | Ritenour |
| 5,340,443 | A | 8/1994 | Heinio et al. |
| 5,366,036 | A | 11/1994 | Perry |
| 5,370,502 | A | 12/1994 | Haavik et al. |
| 5,395,215 | A | 3/1995 | Dardis et al. |
| 5,409,576 | A | 4/1995 | Tleimat |
| 5,411,640 | A | 5/1995 | Ramsland |
| 5,415,223 | A | 5/1995 | Reavis et al. |
| 5,441,401 | A | 8/1995 | Yamaguro et al. |
| 5,459,812 | A | 10/1995 | Taylor |
| 5,472,738 | A | 12/1995 | Novak |
| 5,494,135 | A | 2/1996 | Brackett |
| 5,496,448 | A | 3/1996 | Vuong |
| 5,507,625 | A | 4/1996 | Dudeck |
| 5,513,697 | A | 5/1996 | Gudmundsson |
| 5,514,283 | A | 5/1996 | Stefanini |
| 5,516,706 | A | 5/1996 | Kusakabe |
| 5,522,214 | A | 6/1996 | Beckett et al. |
| 5,534,118 | A | 7/1996 | McCutchen |
| 5,544,963 | A | 8/1996 | Kajihara et al. |
| 5,558,687 | A | 9/1996 | Cain |
| 5,580,448 | A | 12/1996 | Brandreth, III |
| 5,587,054 | A | 12/1996 | Keith |
| 5,590,526 | A | 1/1997 | Cho |
| 5,590,528 | A | 1/1997 | Viteri |
| 5,590,626 | A | 1/1997 | Hitomi et al. |
| 5,591,317 | A | 1/1997 | Pitts, Jr. |
| 5,596,262 | A | 1/1997 | Boll |
| 5,597,453 | A | 1/1997 | Sears |
| 5,599,429 | A | 2/1997 | Martin et al. |
| 5,606,723 | A | 2/1997 | Morse et al. |
| 5,614,086 | A | 3/1997 | Hill et al. |
| 5,642,618 | A | 7/1997 | Pennswick |
| 5,645,124 | A | 7/1997 | Hartfield et al. |
| 5,645,694 | A | 7/1997 | Stewart et al. |
| 5,653,582 | A | 8/1997 | Harvey et al. |
| 5,667,543 | A | 9/1997 | Brouwers |
| 5,667,683 | A | 9/1997 | Benian |
| 5,670,041 | A | 9/1997 | Cho et al. |
| 5,673,721 | A | 10/1997 | Alcocer |
| 5,675,974 | A | 10/1997 | Heidkrodt et al. |
| 5,682,845 | A | 11/1997 | Woody |
| 5,683,579 | A | 11/1997 | Lopes |
| 5,683,586 | A | 11/1997 | Harcourt et al. |
| 5,697,430 | A | 12/1997 | Thors et al. |
| 5,701,965 | A | 12/1997 | Kamen et al. |
| 5,710,536 | A | 1/1998 | Fastman |
| 5,722,255 | A | 3/1998 | Brasz |
| 5,725,778 | A | 3/1998 | Cho et al. |
| 5,729,987 | A | 3/1998 | Miller |
| 5,735,681 | A | 4/1998 | Cheng |
| 5,738,766 | A | 4/1998 | Jefferson |
| 5,740,834 | A | 4/1998 | Sherowski |
| 5,743,091 | A | 4/1998 | Penswick et al. |
| 5,755,100 | A | 5/1998 | Lamos |
| 5,755,970 | A | 5/1998 | Fourqurean et al. |
| 5,761,903 | A | 6/1998 | Straka |
| 5,761,985 | A | 6/1998 | Stoll |
| 5,771,694 | A | 6/1998 | Houtman et al. |
| 5,772,850 | A | 6/1998 | Morris |
| 5,776,334 | A | 7/1998 | Cho |
| 5,786,640 | A | 7/1998 | Sakai et al. |
| 5,791,425 | A | 8/1998 | Kamen et al. |
| 5,795,446 | A | 8/1998 | Kirschmann |
| 5,804,947 | A | 9/1998 | Nii et al. |
| 5,808,277 | A | 9/1998 | Dosani et al. |
| 5,810,975 | A | 9/1998 | Bourdel |
| 5,810,976 | A | 9/1998 | Keith |
| 5,814,192 | A | 9/1998 | Pittmon et al. |
| 5,817,224 | A | 10/1998 | Pitts, Jr. |
| 5,834,784 | A | 11/1998 | Morgan et al. |
| 5,846,414 | A | 12/1998 | Cho |
| 5,858,177 | A | 1/1999 | Morris |
| 5,859,482 | A | 1/1999 | Crowell et al. |
| 5,864,770 | A | 1/1999 | Ziph et al. |
| 5,875,863 | A | 3/1999 | Jarvis et al. |
| 5,878,570 | A | 3/1999 | Reithofer |
| 5,881,800 | A | 3/1999 | Chung |
| 5,893,411 | A | 4/1999 | Nir |
| 5,899,071 | A | 5/1999 | Stone et al. |
| 5,901,568 | A | 5/1999 | Haga |
| 5,916,490 | A | 6/1999 | Cho |

5,920,133 A 7/1999 Penswick et al.
5,921,764 A 7/1999 Marchionna et al.
5,929,538 A 7/1999 O'Sullivan et al.
5,945,808 A 8/1999 Kikuchi et al.
5,951,856 A 9/1999 Cho
5,952,813 A 9/1999 Ochiai
5,954,039 A 9/1999 Doering et al.
5,961,295 A 10/1999 Haavik et al.
5,968,321 A 10/1999 Sears
5,971,061 A 10/1999 Li
5,971,091 A 10/1999 Kamen et al.
5,973,481 A 10/1999 Thompson et al.
5,975,225 A 11/1999 Kamen et al.
5,975,840 A 11/1999 Angle et al.
5,976,227 A 11/1999 Lorey
5,987,886 A 11/1999 Sekiya et al.
6,024,071 A 2/2000 Heimberg et al.
6,039,261 A 3/2000 Pavese
6,050,092 A 4/2000 Genstler et al.
6,062,023 A 5/2000 Kerwin et al.
6,062,305 A 5/2000 Persson
6,063,267 A 5/2000 Crewson et al.
6,089,313 A 7/2000 Levy et al.
6,094,912 A 8/2000 Williford
6,108,685 A 8/2000 Kutzik et al.
6,113,744 A 9/2000 Munro
6,141,977 A * 11/2000 Zugibe ............................ 62/149
6,142,221 A 11/2000 Johansson
6,161,381 A 12/2000 Lohrmann
6,161,610 A 12/2000 Azar
6,202,776 B1 3/2001 Masberg et al.
6,238,524 B1 5/2001 Zebuhr
6,247,310 B1 6/2001 Norris et al.
6,253,550 B1 7/2001 Langenfeld et al.
6,254,734 B1 7/2001 Sephton
6,261,419 B1 7/2001 Zebuhr
6,286,588 B1 9/2001 Uehara
6,291,708 B1 9/2001 Cockrem
6,293,101 B1 9/2001 Conrad
6,319,408 B1 11/2001 Zebuhr
6,328,536 B1 12/2001 Zebuhr
6,336,326 B1 1/2002 Conrad
6,347,453 B1 2/2002 Mitchell
6,375,893 B1 4/2002 Raschke et al.
6,380,637 B1 4/2002 Hsu et al.
6,381,958 B1 5/2002 Kamen et al.
6,381,962 B1 5/2002 Ohshita et al.
6,397,636 B1 6/2002 DiGiovanni et al.
6,401,669 B1 6/2002 Macgowan et al.
6,408,227 B1 6/2002 Singhvi
6,423,187 B1 7/2002 Zebuhr
6,435,293 B1 8/2002 Williams
6,457,462 B2 10/2002 Moren
6,497,555 B2 12/2002 Kraner
6,508,915 B1 1/2003 Osuda et al.
6,536,207 B1 3/2003 Kamen et al.
6,543,215 B2 4/2003 Langenfeld et al.
6,568,416 B2 5/2003 Tucker et al.
6,591,609 B2 7/2003 Kamen et al.
6,592,338 B2 7/2003 Zebuhr
6,602,060 B2 8/2003 Zebuhr
6,610,193 B2 8/2003 Schmitman
6,689,251 B2 2/2004 Zebuhr
6,694,731 B2 2/2004 Kamen et al.
6,698,353 B2 3/2004 Chou et al.
6,705,081 B2 3/2004 Kamen et al.
6,802,941 B2 10/2004 Zebuhr
6,830,661 B1 * 12/2004 Land ............................... 202/83
6,846,387 B1 1/2005 Zebuhr
6,862,883 B2 3/2005 Kamen et al.
6,877,713 B1 4/2005 Gray et al.
6,891,478 B2 5/2005 Gardner
6,908,533 B2 6/2005 Zebuhr
6,926,808 B2 * 8/2005 Shen ............................. 202/205
6,954,701 B2 10/2005 Wolfe
6,966,182 B2 11/2005 Kamen et al.
7,036,314 B2 5/2006 Hoffjann et al.
7,044,205 B2 5/2006 Higashiyama
7,111,460 B2 9/2006 Jensen et al.
7,309,929 B2 12/2007 Donnelly et al.
7,310,945 B2 12/2007 Gurski et al.
7,313,916 B2 1/2008 Pellizzari
7,319,921 B2 1/2008 Underwood et al.
7,325,399 B2 2/2008 Strimling et al.
7,340,879 B2 3/2008 Kamen et al.
7,955,476 B2 * 6/2011 Mansur ......................... 202/160
2001/0042373 A1 11/2001 Bliesner et al.
2002/0092757 A1 7/2002 Zebuhr
2002/0092758 A1 7/2002 Zebuhr
2002/0092762 A1 7/2002 Zebuhr
2003/0024387 A1 2/2003 Langenfeld et al.
2003/0097763 A1 * 5/2003 Morgan et al. .................. 34/468
2003/0132096 A1 7/2003 Zebuhr
2003/0177777 A1 * 9/2003 Brumett .......................... 62/264
2003/0230440 A1 12/2003 Kamen et al.
2004/0074757 A1 4/2004 Owens
2004/0099521 A1 5/2004 Demers et al.
2004/0134645 A1 7/2004 Higashiyama
2004/0222079 A1 11/2004 Zebuhr
2005/0008272 A1 1/2005 Bhat et al.
2005/0016828 A1 1/2005 Bednarek et al.
2005/0112007 A1 5/2005 Demers et al.
2005/0121302 A1 6/2005 Zebruhr
2005/0154499 A1 7/2005 Aldridge et al.
2005/0183832 A1 8/2005 Owens
2005/0188745 A1 9/2005 Staphanos et al.
2005/0194048 A1 9/2005 Duggan et al.
2005/0238499 A1 10/2005 Demers et al.
2005/0250062 A1 11/2005 Kornbluth et al.
2005/0279620 A1 12/2005 Zebuhr
2006/0101848 A1 5/2006 Taras et al.
2007/0017192 A1 1/2007 Bednarek et al.
2007/0028612 A1 2/2007 Jensen et al.
2007/0112530 A1 5/2007 Kamen et al.
2008/0092536 A1 4/2008 Strimling et al.
2008/0105403 A1 5/2008 Kamen et al.
2008/0105530 A1 5/2008 Bednarek et al.
2008/0105532 A1 5/2008 Demers et al.
2008/0105533 A1 5/2008 Bednarek et al.
2008/0105610 A1 5/2008 Bednarek et al.
2008/0133181 A1 6/2008 Kamen et al.

FOREIGN PATENT DOCUMENTS

DE 10 15 691 9/1957
DE 15 28 714 3/1977
DE 31 03 529 A1 8/1982
DE 31 51 867 C1 5/1983
DE 35 00 124 A 7/1986
DE 84 11 960 7/1988
DE 37 23 950 A 8/1988
DE 37 21 143 1/1989
DE 37 34 009 A1 4/1989
DE 39 24 747 6/1990
DE 41 02 306 A1 1/1991
DE 39 34 545 A1 5/1991
DE 40 18 943 A1 12/1991
DE 42 05 283 A1 8/1993
DE 42 19 583 A1 12/1993
DE 43 08 888 A 9/1994
DE 43 36 982 A 5/1995
DE 44 09 338 A1 6/1995
DE 295 20 864 U 5/1996
DE 197 45 167 A1 5/1998
DE 198 20 192 A1 11/1998
DE 10325230 12/2004
EP 0 013 038 7/1980
EP 0 457 303 11/1991
EP 0 457 399 A2 11/1991
EP 0 458 115 A 11/1991
EP 0 607 154 B1 7/1992
EP 0 627 249 A1 12/1994
EP 0 697 230 A1 2/1996
EP 0 900 584 A1 3/1999
EP 1 202 594 A2 5/2002
EP 1 202 594 A3 5/2002
EP 0 900 328 B1 11/2002
EP 1 306 544 A1 5/2003
EP 1 342 951 9/2003

| | | | |
|---|---|---|---|
| EP | 1 424 476 | A | 6/2004 |
| FR | 809791 | | 6/1937 |
| FR | 1 063 612 | A | 5/1954 |
| FR | 2 067 119 | | 8/1971 |
| FR | 2 609 154 | | 7/1988 |
| FR | 2 721 982 | | 6/1994 |
| FR | 2 794 521 | | 12/2000 |
| GB | 395 374 | | 7/1933 |
| GB | 399665 | | 10/1933 |
| GB | 422 823 | A | 1/1935 |
| GB | 675161 | | 8/1945 |
| GB | 607 290 | A | 8/1948 |
| GB | 689 484 | | 8/1949 |
| GB | 704002 | | 2/1950 |
| GB | 892962 | | 12/1957 |
| GB | 860 689 | A | 2/1961 |
| GB | 917 278 | A | 1/1963 |
| GB | 919 897 | A | 2/1963 |
| GB | 1 086 012 | A | 10/1967 |
| GB | 1114626 | | 5/1968 |
| GB | 1 211 236 | A | 11/1970 |
| GB | 1 331 398 | | 9/1973 |
| GB | 1 528 714 | A | 10/1978 |
| GB | 84119608 | | 8/1988 |
| GB | 2 205 934 | | 12/1988 |
| IT | 500313 | | 3/1953 |
| JP | 55-037540 | | 3/1980 |
| JP | 56-133597 | | 10/1981 |
| JP | 58-117995 | | 7/1983 |
| JP | M-247 | | 10/1983 |
| JP | 61 128014 | | 6/1986 |
| JP | 61 128024 | | 6/1986 |
| JP | M-530 | | 10/1986 |
| JP | 63 068759 | A | 3/1988 |
| JP | 02 021123 | | 1/1990 |
| JP | 02 091463 | A | 3/1990 |
| JP | M-0956 | | 3/1990 |
| JP | M-0989 | | 6/1990 |
| JP | 02 256856 | | 10/1990 |
| JP | 03 009058 | A | 1/1991 |
| JP | M-1066 | | 1/1991 |
| JP | 117 | | 3/1991 |
| JP | 04 347410 | | 12/1992 |
| JP | 206 | | 4/1993 |
| JP | 07-151402 | | 6/1995 |
| JP | 09 | | 10/1995 |
| JP | 07 293334 | A | 11/1995 |
| JP | 03 | | 3/1996 |
| JP | 09 015197 | | 1/1997 |
| JP | 05 | | 5/1997 |
| JP | 11 257154 | | 9/1999 |
| JP | 14 | | 12/1999 |
| JP | 2003 113732 | | 4/2003 |
| NL | 675161 | | 7/1952 |
| NL | 689484 | | 3/1953 |
| NL | 704002 | | 2/1954 |
| NL | 892962 | | 4/1962 |
| WO | WO 89/12170 | | 12/1989 |
| WO | WO 90/05887 | | 5/1990 |
| WO | WO 90/08891 | | 8/1990 |
| WO | WO 91/05949 | | 5/1991 |
| WO | WO 92/03203 | | 3/1992 |
| WO | WO 98/26246 | | 6/1998 |
| WO | WO 98/45647 | A | 10/1998 |
| WO | WO 99/40309 | | 8/1999 |
| WO | WO 00/35551 | A1 | 6/2000 |
| WO | WO 00/79114 | A1 | 12/2000 |
| WO | WO 01/58814 | A1 | 8/2001 |
| WO | WO 01/65100 | A2 | 9/2001 |
| WO | WO 02/02202 | A3 | 1/2002 |
| WO | WO 03/056680 | A2 | 7/2003 |
| WO | WO 03/056680 | A3 | 7/2003 |
| WO | WO 03/062730 | A2 | 7/2003 |
| WO | WO2004043566 | | 5/2004 |

OTHER PUBLICATIONS

International Search Report, Application No. PCT/US03/24966 dated Dec. 9, 2003.

International Search Report, Application No. PCT/US03/36540 dated Jun. 24, 2004.

International Search Report, Application No. PCT/US03/37531 dated Sep. 22, 2004.

International Search Report, Application No. PCT/US2004/024335 dated Dec. 17, 2004.

International Search Report, Application No. PCT/US98/14559 filed on Jul. 14, 1998.

International Search Report, Application No. PCT/US98/14586 dated Oct. 6, 1998.

International Search Report, Application No. PCT/US02/19142 dated Sep. 2, 2002.

International Search Report, Application No. PCT/US01/40201 dated Jul. 13, 2001.

International Search Report, Application No. PCT/US01/06733 dated Nov. 2, 2001.

International Search Report, Application No. PCT/US01/40200 dated Nov. 5, 2001.

International Search Report, Application No. PCT/US01/40200 dated Nov. 8, 2001.

International Search Report, Application No. PCT/US02/09360 dated Jun. 21, 2002.

International Search Report, Application No. PCT/US02/18467 dated Aug. 21, 2002.

International Search Report, Application No. PCT/US02/19440 dated Aug. 26, 2002.

International Search Report, Application No. PCT/US02/14771 dated Nov. 13, 2002.

International Search Report, Application No. PCT/US2004/001421 dated Jun. 14, 2004.

International Search Report, dated Aug. 18, 2004.

International Search Report, Application No. PCT/US2004/026901 dated Jul. 4, 2005.

International Search Report, Application No. PCT/US2005/015721 dated Sep. 20, 2005.

International Search Report, Application No. PCT/US2006/008144 dated Feb. 6, 2007.

Examination Report, Application No. 03 768 953.6-2113 dated May 22, 2007; received on May 29, 2007.

Anderson, et al., *The Effects of APU Cliameteristics on the Design of Hybrid Control Strategies for Hybrid Electric Vehicles*, published during the SAE International Congress and Exposition, Detroit, MI, Feb. 27-Mar. 2, 1995, Paper No. 950493.

Bartolini et al., *A New Small Stirling Engine Prototype for Auxiliary Employments Abroad*, IECEC Paper No. SC-38, ASME 1995, pp. 317-321.

Chen et al., *Hardware Development and Initial Subassembly Tests of a Gas-Fired Stirling Engine/Refrigerant Compressor Assembly*, published in The 25$^{th}$ Intersociety Energy Conversion Engineering Conference, vol. 5, Aug. 12-17, 1990.

Daripa, Prabir, *Pointed Taylor Bubble Revisited*, published in Journal of Computational Physics, 123, 226-230 (1996), Article No. 0018.

Dickinson, et al., *Performance, Management and Testing Requirements for Hybrid Electric Vehicle Batteries*, published during the SAE Future Transportation Technology Conference and Exposition, Costa Mesa, CA, Aug. 11-13, 1998, Paper 981905.

Eder, F., *Apparatus for Heat Transfer at Elevated Temperature to the Working Medium of a Regenerative Thermal Engine* (*or "energy engine"*).

Fleming, et al., *Rapid Recharge Capability of Valve Regulated Lead Acid Batteries for EV & HEV Applications*, published in the Journal of Power Sources, vol. 78 (1999), p. 237-243.

Hargreaves, *The Philips Stirling Engine*, pp. 214-215, 1991.

Hobbs, et al, *Development of Optimized Fast Charge Algorithm for Lead Acid Batteries*, published during the SAE International Congress And Exposition, Detroit, MI, Mar. 1-4, 1999, Paper 1999-01-1157.

Hochgraf, et al., *Engine Control Strategy for a Series Hybrid Electric Vehicle Incorporating Load-Leveling and Computer Controlled Energy Management*published during the SAE International Congress And Exposition, Detroit, MI. Feb. 26-29, 1996, Paper No. 960230.

Lane et al., *A Biomass-Fired 1 kWe Stirling Engine Generator and Its Applications in South Africa*, 9TH International Stirling Engine Conference, South Africa, Jun. 2-4, 1999 availiable at http://www.sunpower.com/tech_papers/pub76/isec99.html.
Lee, P. C., et al., *Nucleate Boiling Heat Transfer in Silicon-based Micro-channels*, E-International Symposium on Nanotechnology and Energy, Hsinchu, Taiwan, ROC Apr. 24, 2004.
Moeller, F.H., *Prime Movers for Series of Hybrid Vehicles*, published in Electric and Hybrid Vehicles Design Studies, Society of Automotive Engineers, Inc.
Oman, H., *New Energy Management Technology Gives Hybrid Cars Long Battery Life*, published during the SAE 34 Intersociety Energy Conversion Engineering Conference, Vancouver, BC, Aug. 2-5, 1999, Paper. 1999-01-2468.
*Product Selection Guide*, published by Aavid Thermal Technologies, Inc., Jan. 1996.
Riethmuller, M.L., *Bubble Dynamics and Slug Flows*, available at http://euroturbo.org/research/themes/annualsurvey/2002/bubble_dynamics_ca1003v1.pdf.
Wadear, Vishwas, *Compact Exchangers for Phase Change*, available at http://docenti.ing.unipi.it/exh.ft5/wadekar.pdf.
Wiegman, et al., *Battery State Control Techniques for Charges Sustaining Applications*, published during the SAE International Congress and Exposition, Detroit, Ml. Feb. 23-26, 1998, Paper No. 981129.
http://en.wilipedia.org/widi/Pitot_tube, Apr. 24, 2006.
International Search Report with Written Opinion, dated Apr. 23, 2010. received in international application No. PCT/US2009/053898, 12 pages.

* cited by examiner

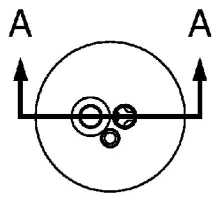
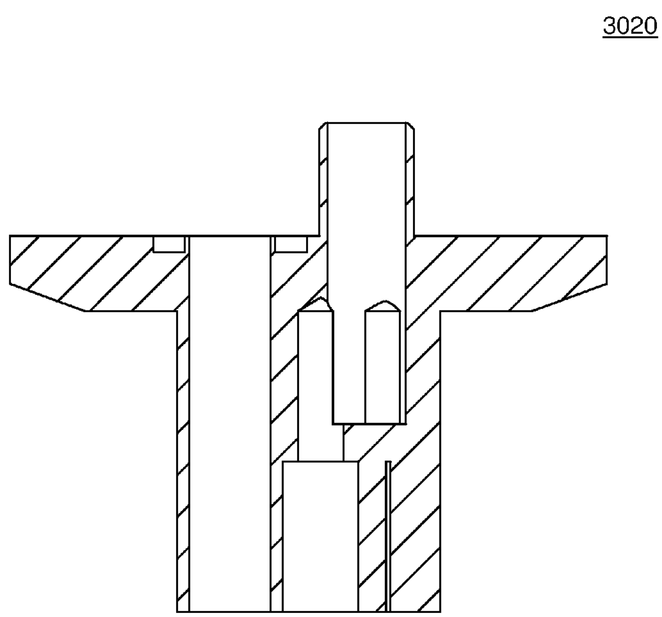
FIG. 33E

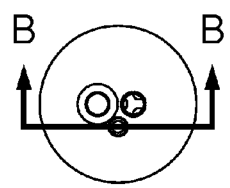
3020
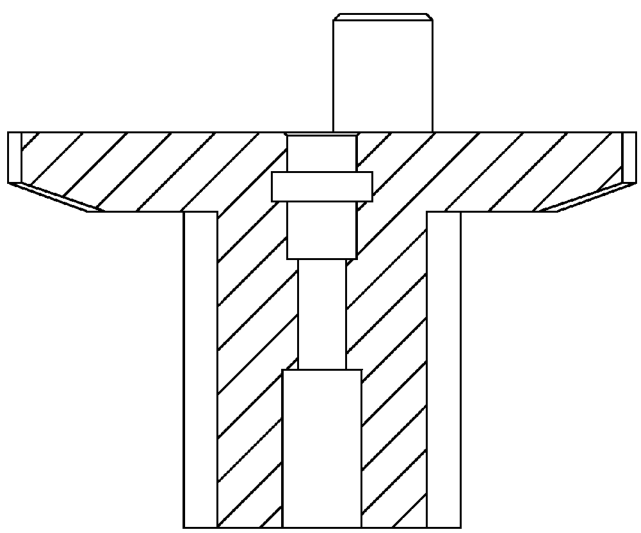
FIG. 33F

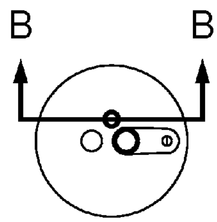
3100
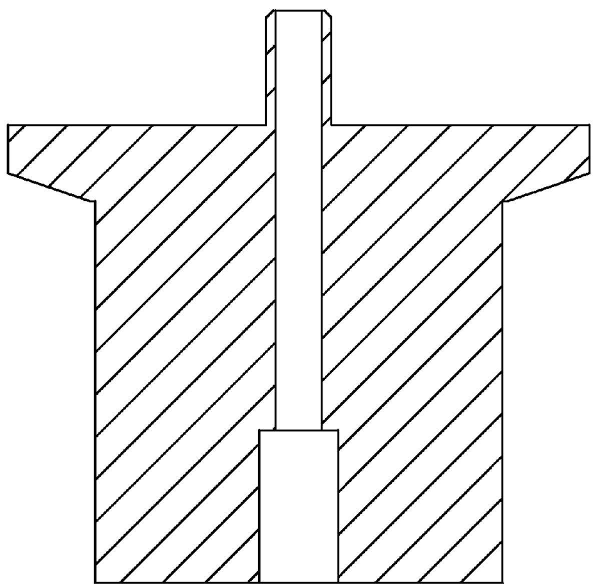
FIG. 33J

8000

11000

14000

15000

15020

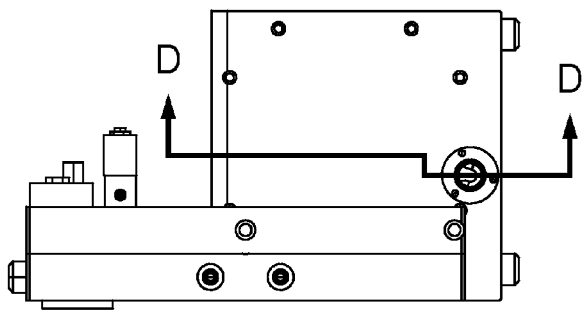
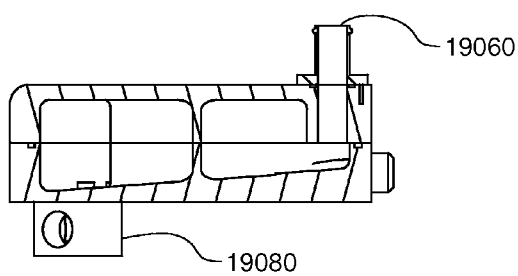
FIG. 47B

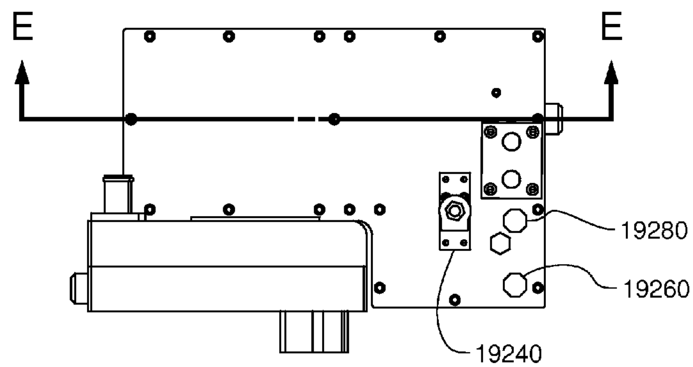
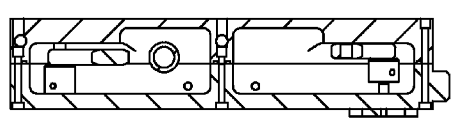
FIG. 47C

READY FOR START OF COMPRESSION STROKE

END OF COMPRESSION STROKE

READY FOR START OF EXPANSION STROKE

END OF EXPANSION STROKE

51300

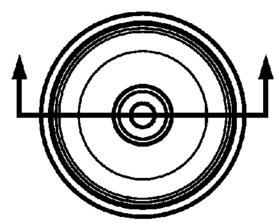
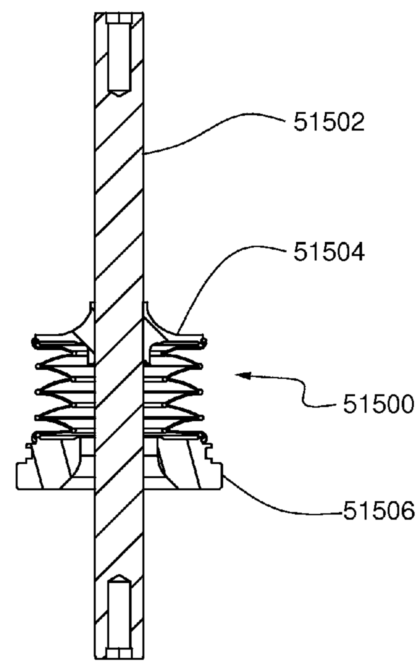
FIG. 76A

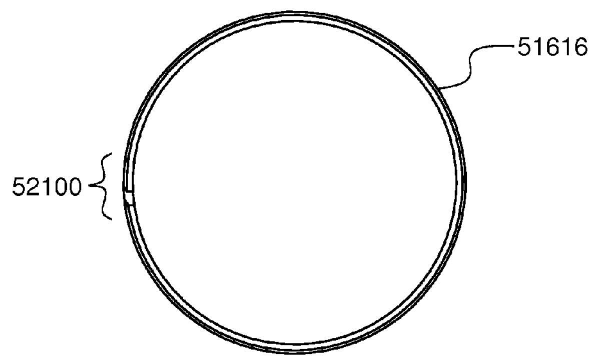
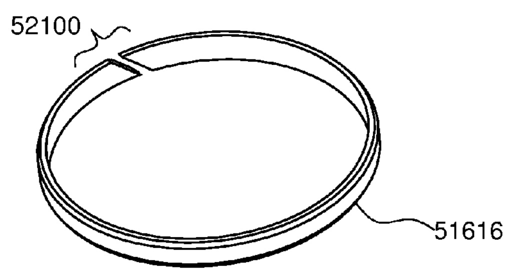
FIG. 82

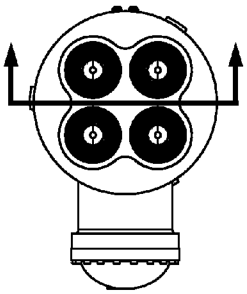
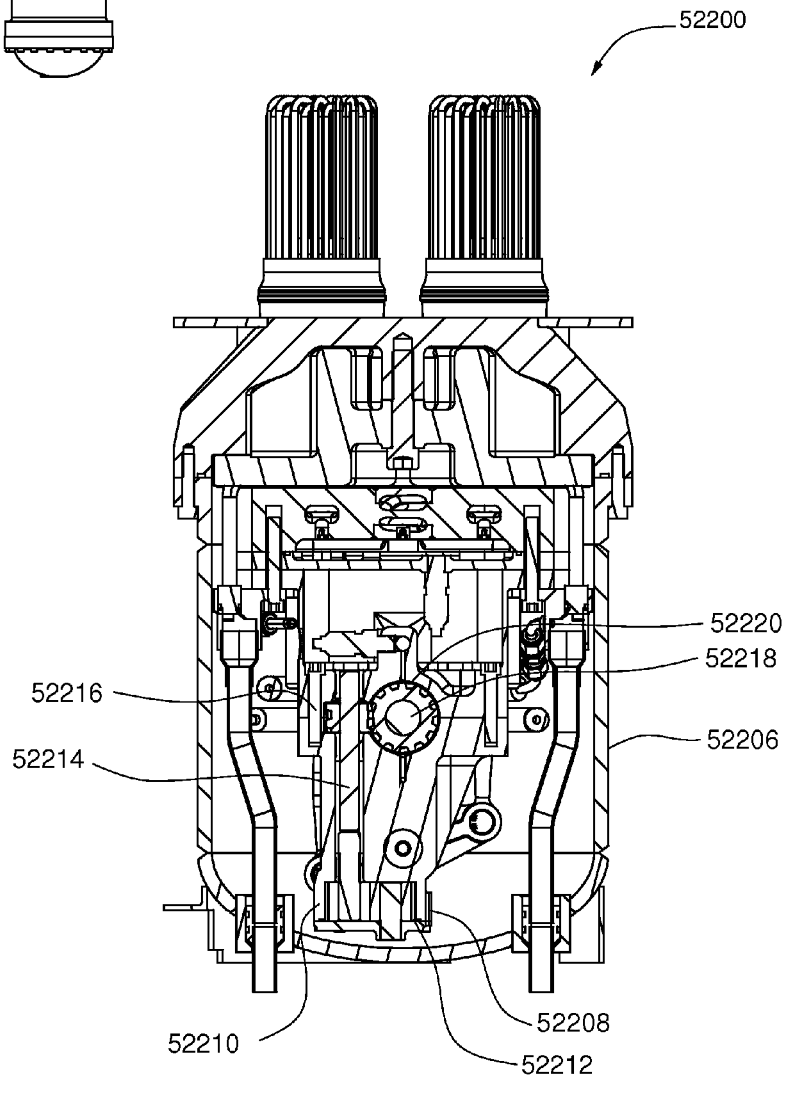
FIG. 84A

WATER VENDING APPARATUS

CROSS REFERENCE TO RELATED APPLICATIONS

The present application is a Non-provisional application which claims priority from U.S. Provisional Patent Application Ser. No. 61/089,295, filed Aug. 15, 2008 and entitled Water Vending Apparatus Having Water Vapor Distillation Purification System which is incorporated herein by reference in its entirety.

TECHNICAL FIELD

The present invention relates to vending purified water and more particularly, to a water vending apparatus.

BACKGROUND INFORMATION

There is a large, poorly satisfied global need for readily available, adequate tasting, safe, affordable and convenient drinking water. The ability to serve this global need is limited by many factors, one being the economics of the centralized bottling model. Traditionally, less affluent consumers are not well served by branded water as price increases with respect to water quality and trustworthiness. Distributed purification alternatives, such as chemical treatment and carbon filtration, have limited impact on water safety and have significant limitations for consumers, retailers, bottlers, and brand owners.

Water kiosks, i.e., locations, providing containers of water which are typically filled at an off-site location and transported to the kiosk, are prevalent in cities with poor municipal water supplies, and are an inefficient and expensive solution to providing safe drinking water to the masses. Kiosks typically sell water by the jug, and the cost of transport, bottling, and distribution are all passed to the consumer. Environmentally, transport of kiosk-related water jugs increases pollution and traffic congestion.

Additionally, the volume of water capable of being stored at a kiosk in jug-form is finite. In locations such as Mexico City, for example, reducing the number of jugs required to adequately meet the demand for purified water may help resolve the serious logistical problems of the water kiosk. Accordingly, there is a need for an efficient, more reliable, and less expensive means of distributing safe and adequate tasting drinking water.

SUMMARY

In accordance with one aspect of the present invention, a water vending system is disclosed. The water vending system includes a water vapor distillation apparatus and a dispensing device. The dispensing device is in fluid communication with the fluid vapor distillation apparatus and the product water from the fluid vapor distillation apparatus is dispensed by the dispensing device.

Some embodiments of this aspect of the present invention include where the water vapor distillation apparatus includes a source fluid input and an evaporator condenser. The evaporator condenser includes a substantially cylindrical housing and a plurality of tubes in the housing. The source water input is fluidly connected to the evaporator condenser and the evaporator condenser transforms source water into steam and transforms compressed steam into product water. The water vapor distillation apparatus also includes a heat exchanger fluidly connected to said source water input and a product water output. The heat exchanger includes an outer tube and at least one inner tube. The water vapor distillation apparatus also includes a regenerative blower fluidly connected to the evaporator condenser. The regenerative blower compresses steam, and whereby the compressed steam flows to the evaporative condenser where compressed steam is transformed into product water.

Some embodiments of this aspect of the present invention may include one or more of the following: where the water vending system includes a programmable logic controller, where the water vending system includes a primary tank and a secondary tank; where the water vending system includes a fill pump wherein the fill pump pumps water from the primary tank to the secondary tank; where the where the water vending system includes a diffuser in the secondary tank; where the where the water vending system includes at least one sensor; where the where the where the water vending system includes a minimum volume sensor in the primary tank whereby the minimum volume sensor determines whether the primary tank is holding a minimum volume to fill the secondary tank; where the water vending system includes a maximum volume sensor in the primary tank whereby the maximum volume sensor determines whether the primary tank is full; where the water vending system includes an air flow conduit between the primary tank and the secondary tank; where the where the water vending system includes an ultraviolet sterilizer coupled to a fluid path between the primary tank and the secondary tank; where the water vending system includes a nozzle assembly downstream from the secondary tank; and/or where the water vending system includes an ultraviolet sterilizer coupled to a fluid path between the secondary tank and the nozzle assembly.

In accordance with one aspect of the present invention a water vending system is disclosed. The water vending system includes a water vapor distillation apparatus and a dispensing device, wherein the dispensing device is in fluid communication with the water vapor distillation apparatus and whereby product water from the water vapor distillation apparatus is dispensed by the dispensing device. The water vapor distillation apparatus also includes a programmable logic controller for controlling the dispensing device and the water vapor distillation apparatus.

Some embodiments of this aspect of the present invention may include one or more of the following: a multi-purpose interface comprising at least one conductivity sensor; and/or a proximity sensor, the proximity sensor sends a signal to the programmable logic controller to dispense water. Some embodiments of this aspect of the present invention may include where the water vapor distillation apparatus includes a source fluid input and an evaporator condenser. The evaporator condenser includes a substantially cylindrical housing and a plurality of tubes in the housing. The source water input is fluidly connected to the evaporator condenser and the evaporator condenser transforms source water into steam and transforms compressed steam into product water. The water vapor distillation apparatus also includes a heat exchanger fluidly connected to said source water input and a product water output. The heat exchanger includes an outer tube and at least one inner tube. The water vapor distillation apparatus also includes a regenerative blower fluidly connected to the evaporator condenser. The regenerative blower compresses steam, and whereby the compressed steam flows to the evaporative condenser where compressed steam is transformed into product water.

In accordance with one aspect of the present invention, a water vending apparatus having a purification system includes a dispensing system and water vapor distillation apparatus. The dispensing system is fluidly coupled to the water vapor distillation apparatus such that purified water may be distributed to a vendee-supplied vessel positioned at a filling station. A filling operation, or transfer of purified water to a vessel, is initiated through use of a control panel located on the external housing of the vending apparatus. The control panel may send a fill request signal to dispensing control circuitry, which, upon analysis of other various electrical signals, may allow purified water to flow through a predetermined network of conduits and into a vessel.

Some embodiments of this aspect of the present invention may include one or more of the following. Multiple fill stations from which a vendee may conveniently fill an array of varying vessel sizes. A multipurpose interface may be included. A multipurpose interface is capable of distributing chilled water to drinking glass-sized vessels, as well as, providing vendees or prospective vendees a means of testing the purity level of local or vending apparatus water; a molding apparatus may be incorporated into the vending apparatus system. With this configuration, water bottles are manufactured within the molding apparatus from preformed parison, filled with purified water, and dispensed. Additives may be mixed into purified water to further enhance the taste and/or purpose of the water or beverage. Use of additives may require integration of mixing and storage components into the exemplary water vending apparatus. Logic instructions associated with choosing and controlling additives may also be added to control circuitry. The water vending apparatus may be operated upon input of currency to a currency receiving module.

Some embodiments of this aspect of the present invention may include one or more of the following. The water vending may be scalable. In differing markets, demand for a water vending apparatus may vary, giving rise to a larger or smaller apparatus performing essentially the same functions. A scaled down water vending apparatus may include scaled down dispensing and purification system components to accommodate a lesser production rate, for example. A scaled up water vending apparatus may include scaled up dispensing and purification components, or utilization of more than one purification system. The water vending apparatus may be divided into separate portions such that one or more portions may be operated remotely with respect to one or more other portions. Remote operation may necessitate extended conduits and control leads, greater pump head pressure, and/or integration of wireless communication components and protocols. The water vending apparatus may include a scale indicator to aid in preventing sedimentary buildup on surfaces exposed to hard water. The water vending apparatus may incorporate an extension hose and corresponding fill control apparatus. A filling hose may be beneficial in extending operable filling radius and general filling capability.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein:

FIG. 33E is a cross-section view of the exemplary embodiment for the first connector;

FIG. 33F is a cross-section view of the exemplary embodiment for the first connector;

FIG. 33J is a cross-section view of the exemplary embodiment for the second connector;

FIG. 42D is a cross-section view of the exemplary embodiment of the steam chest;

FIG. 42E is a cross-section view of the exemplary embodiment of the steam chest;

FIG. 42F is a top view of the exemplary embodiment of the steam chest;

FIG. 43 is a perspective view of the evaporator/condenser;

FIG. 44 is an isometric view of the mist eliminator assembly;

FIG. 44A is an isometric view of the outside of the cap for the mist eliminator;

FIG. 44B is an isometric view of the inside of the cap for the mist eliminator;

FIG. 44C is a cross-section view of the mist eliminator assembly;

FIG. 44D is a cross-section view of the mist eliminator assembly;

FIG. 45 is assembly view of the exemplary embodiment of a regenerative blower;

FIG. 45A is bottom view of the exemplary embodiment of the regenerative blower assembly;

FIG. 45B is a top view of the exemplary embodiment of the regenerative blower assembly;

Figure 45:
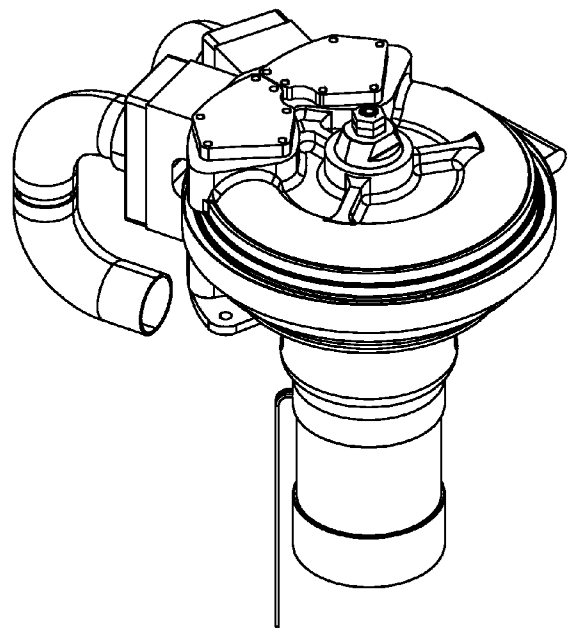
Figure 45A:
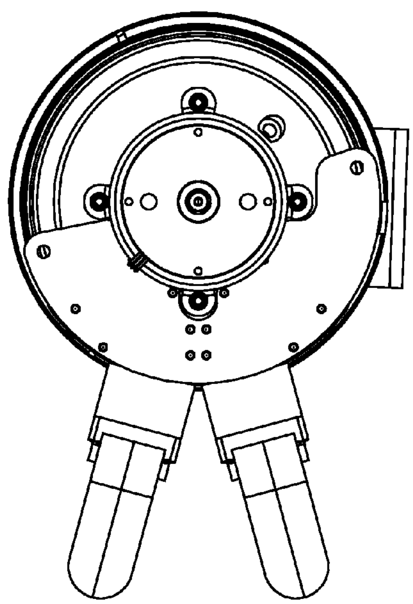
Figure 45B:
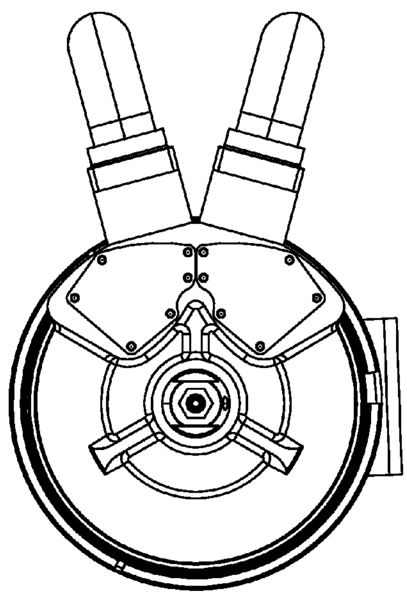
Figure 45C:
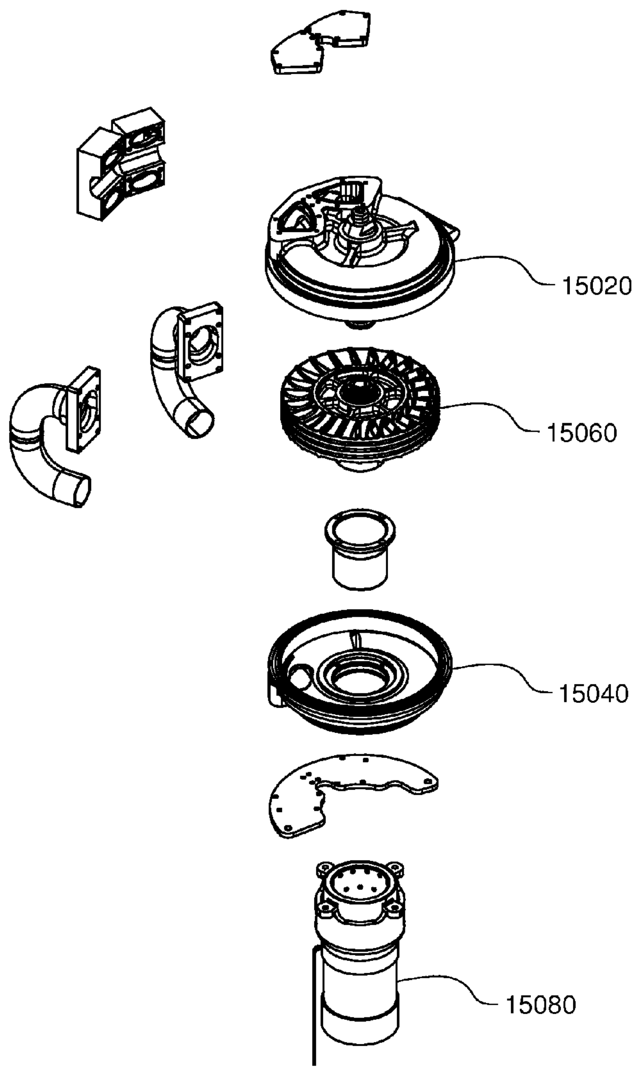
Figure 45D:
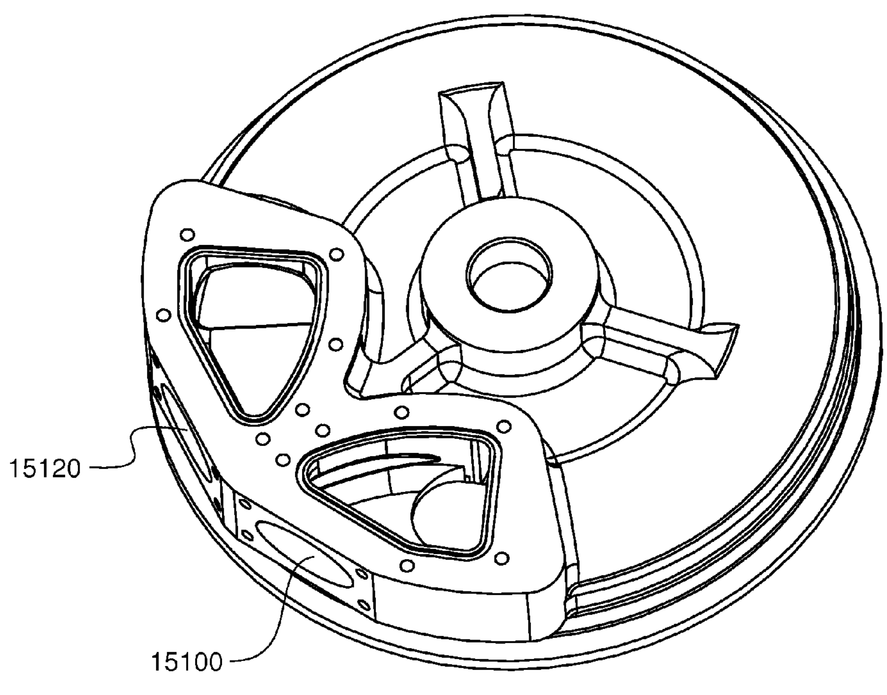
Figure 45E:
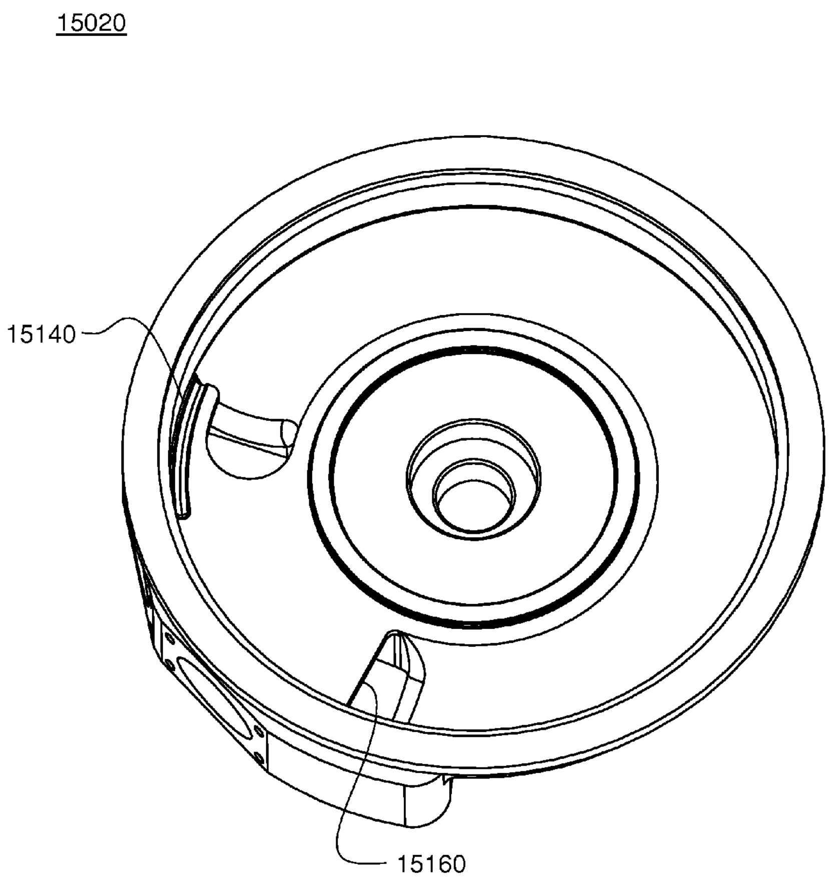
Figure 45F:
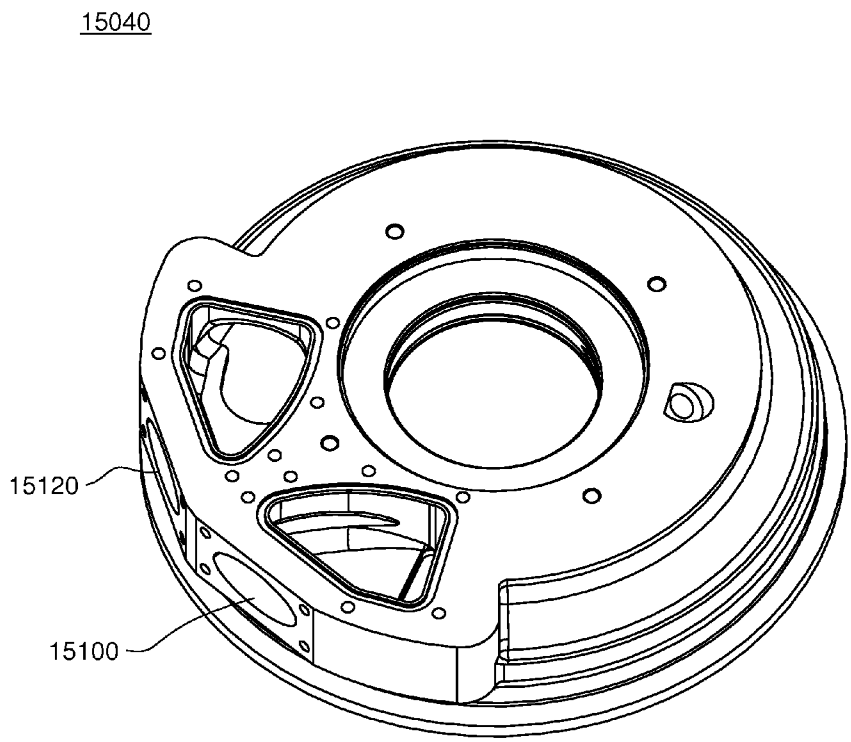
Figure 45G:
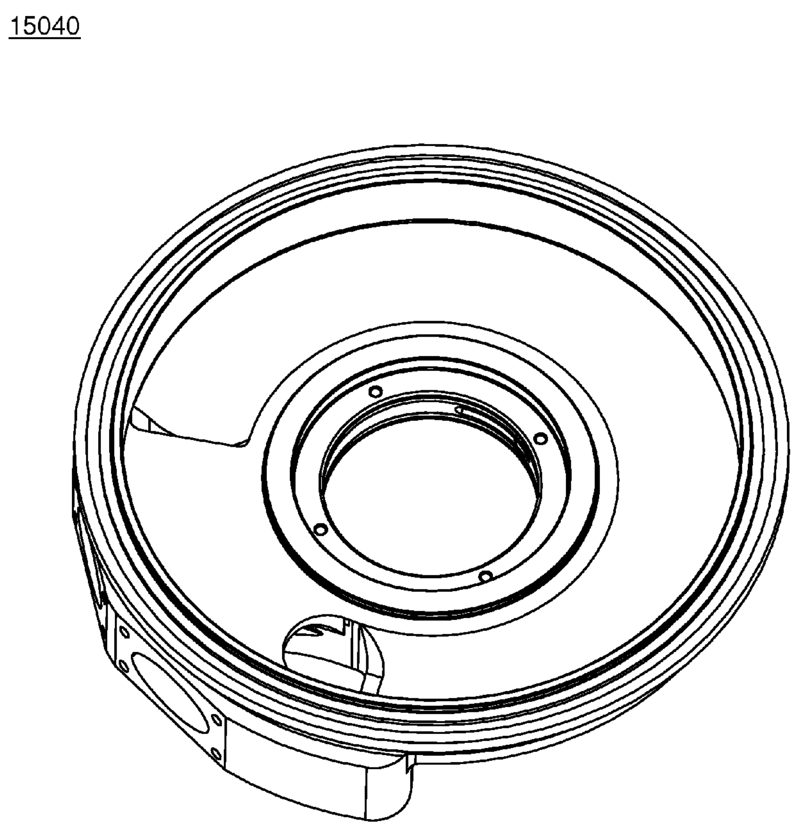
Figure 45H:
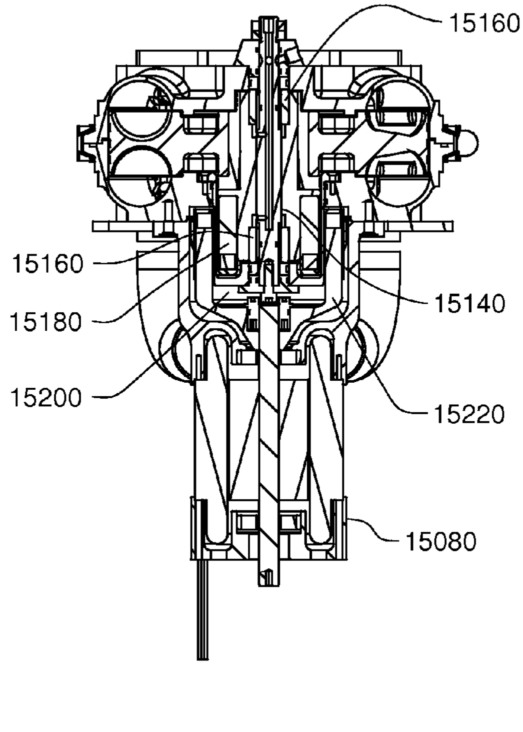
Figure 45I:
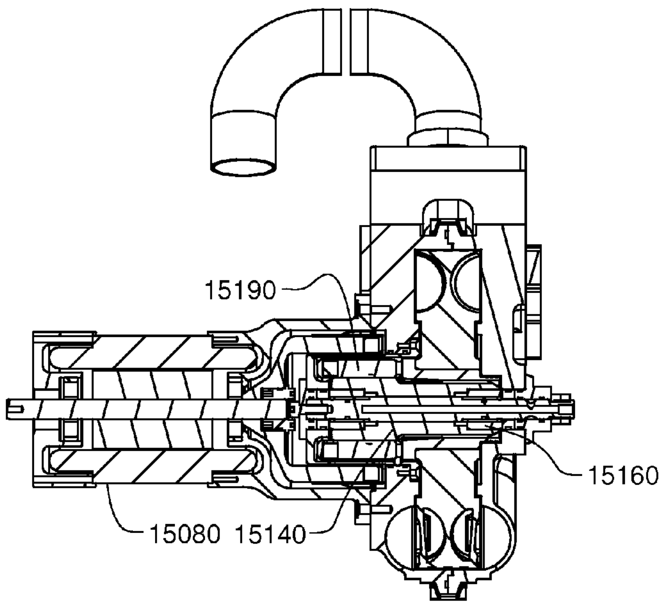
Figure 45J:
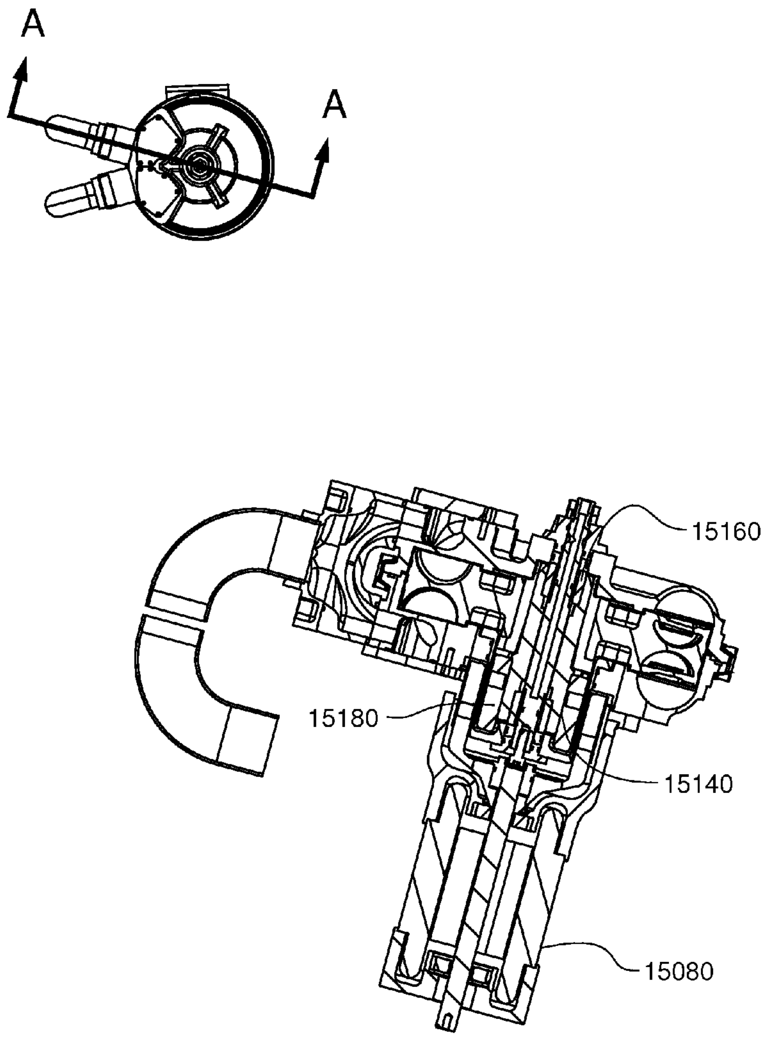
Figure 45K:
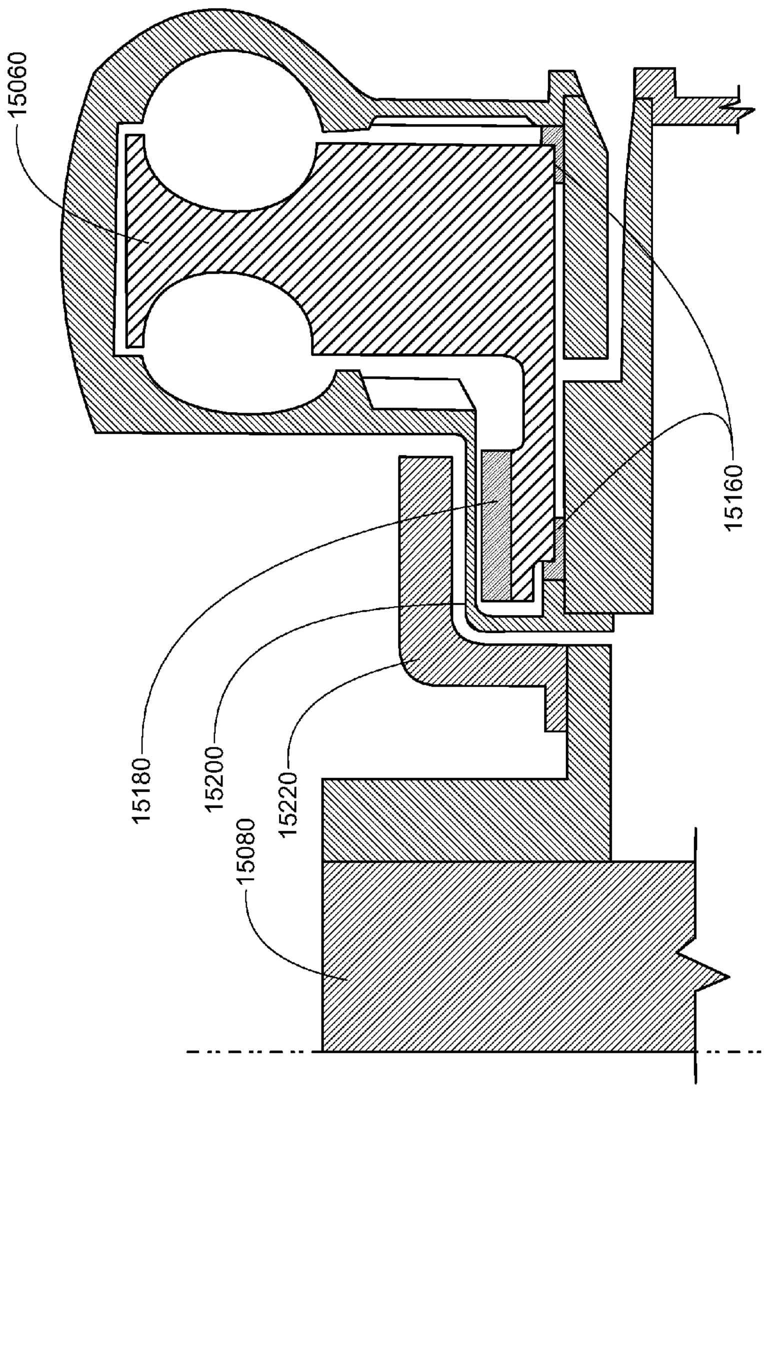
Figure 45L:
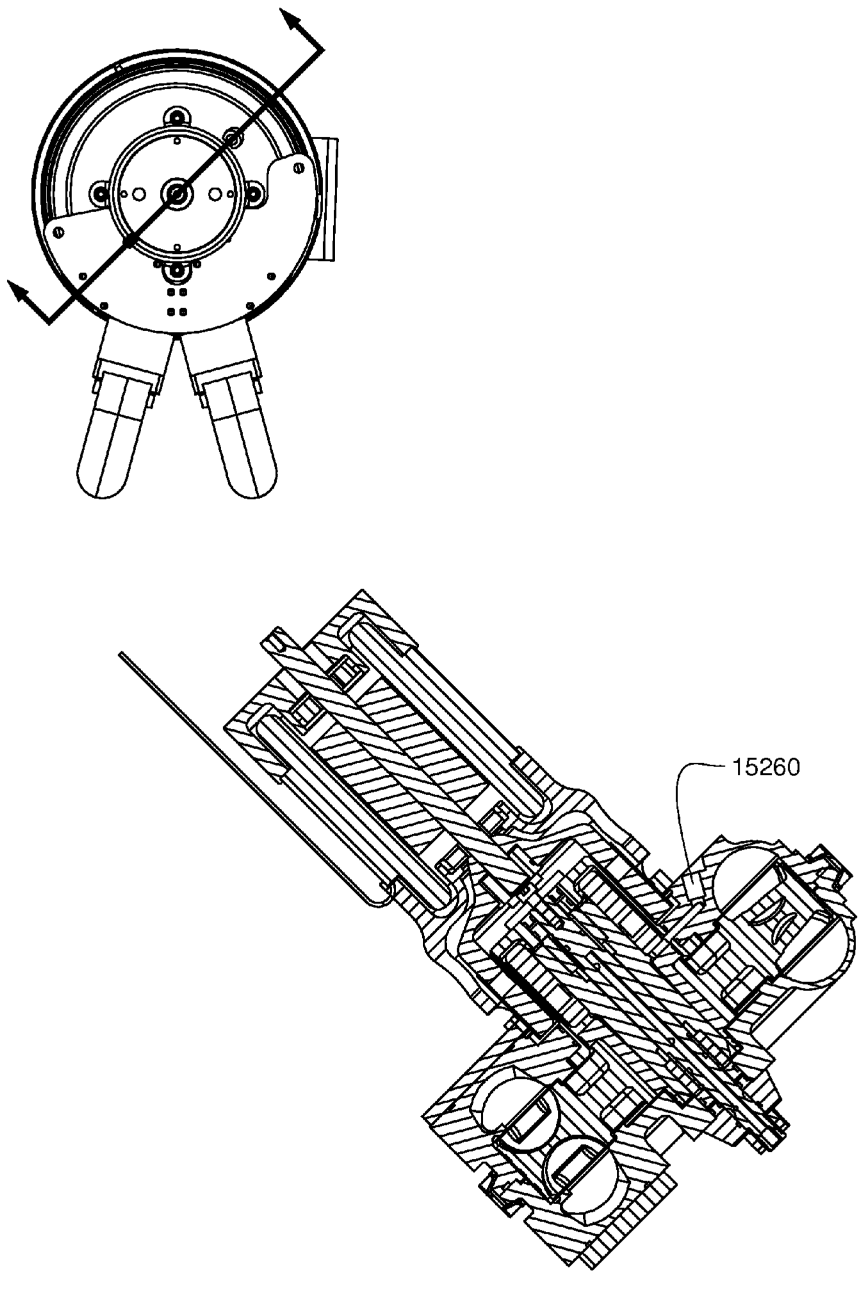
Figure 46:
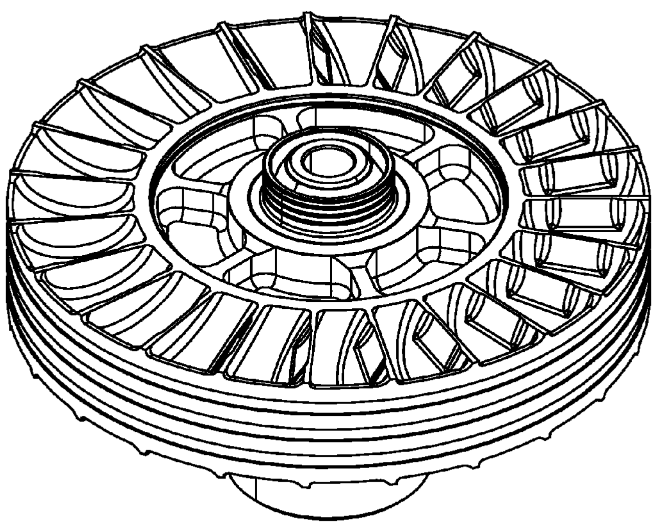
Figure 46A:
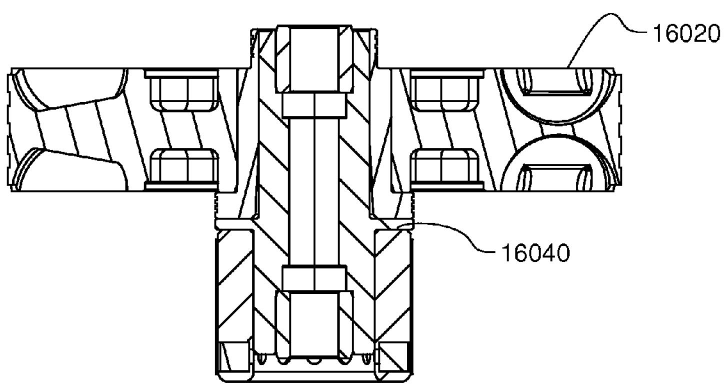
Figure 47:
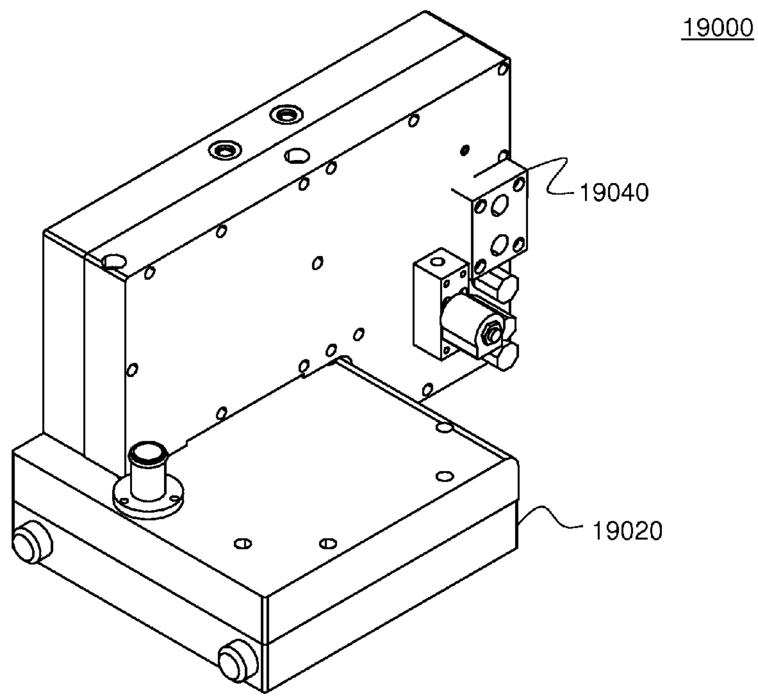
Figure 47A:
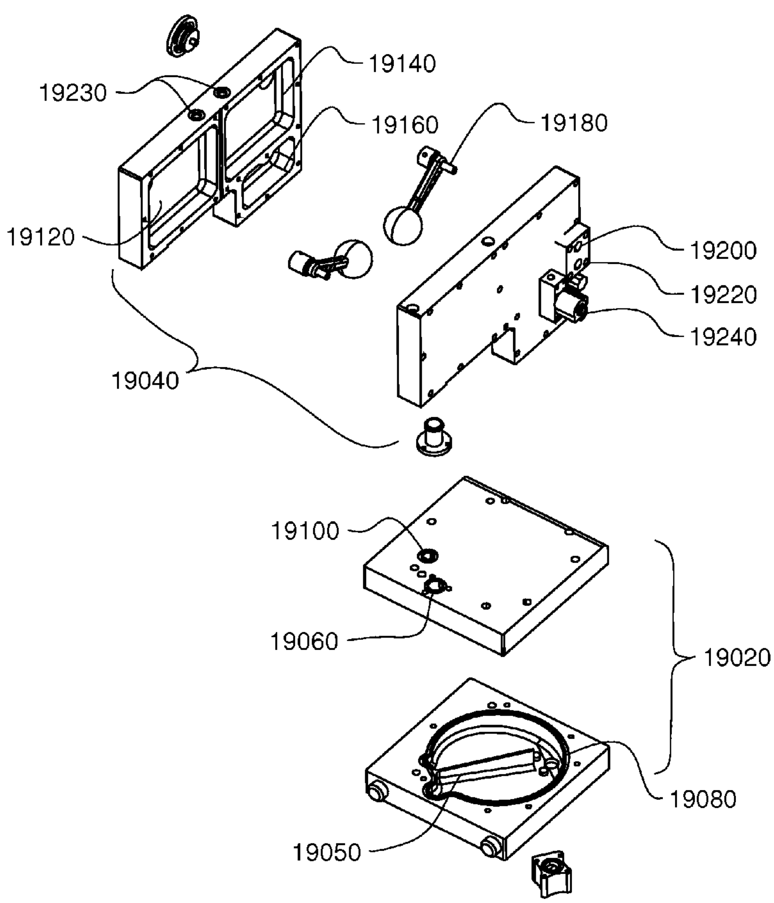
Figure 48:
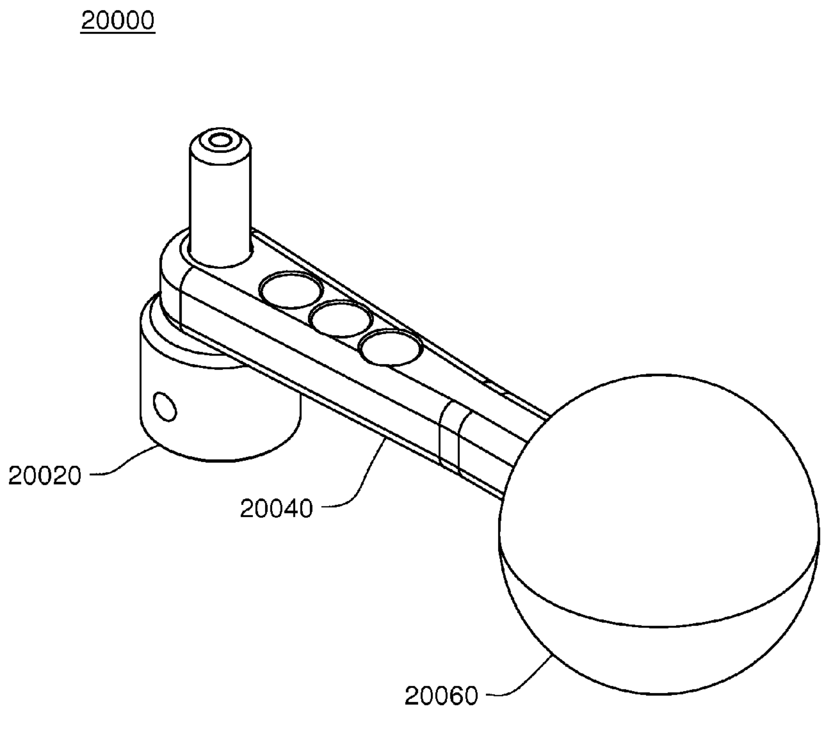
Figure 48A:
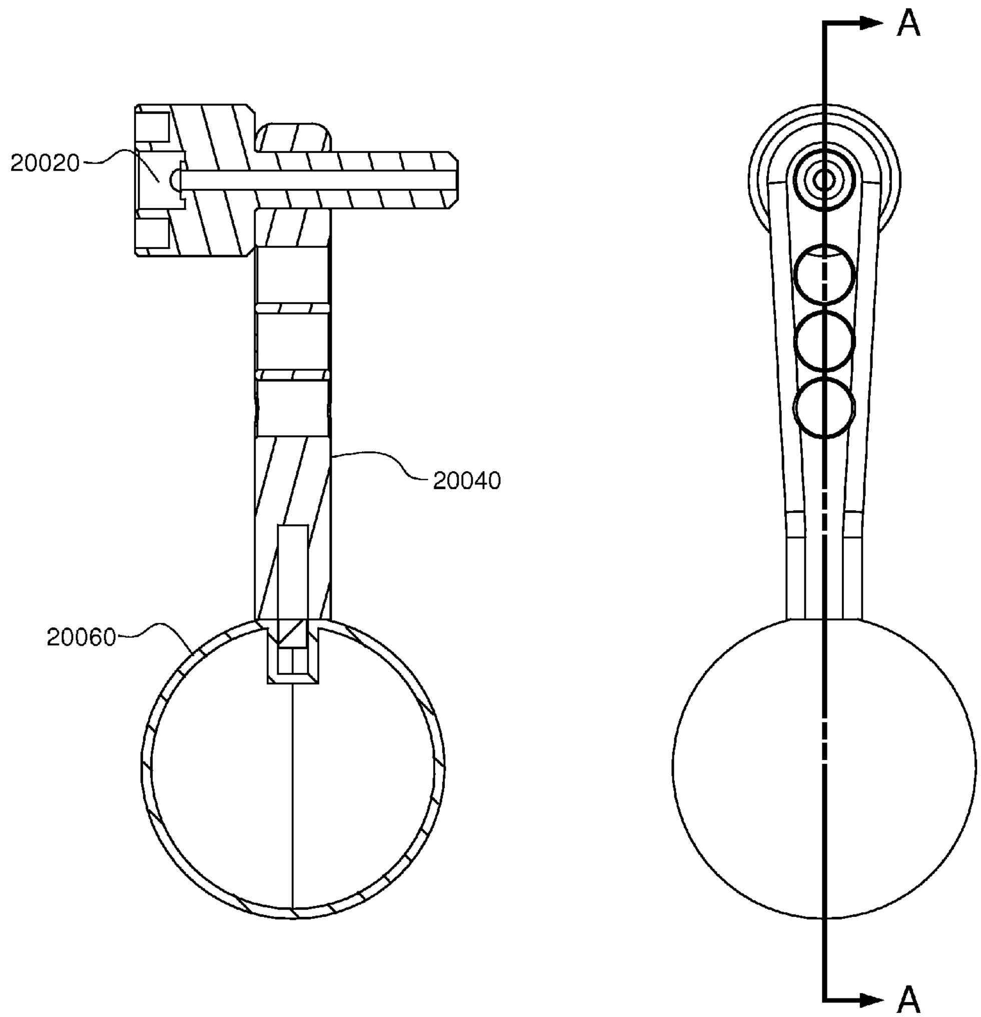
Figure 49A:
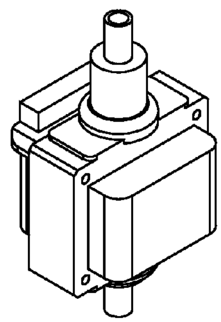
Figure 49:
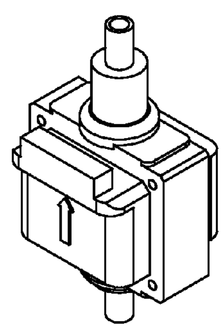
Figure 50:
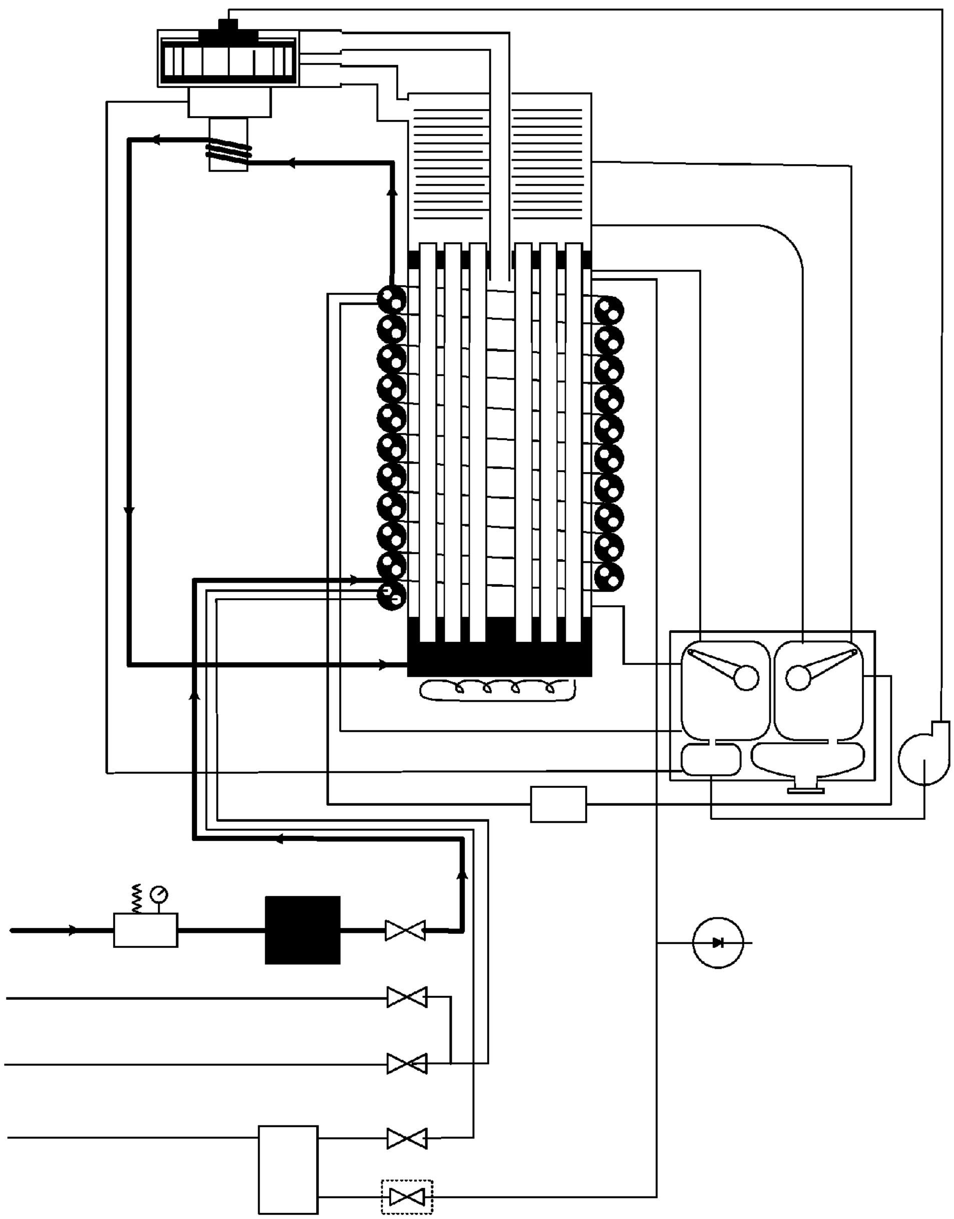
Figure 50A:
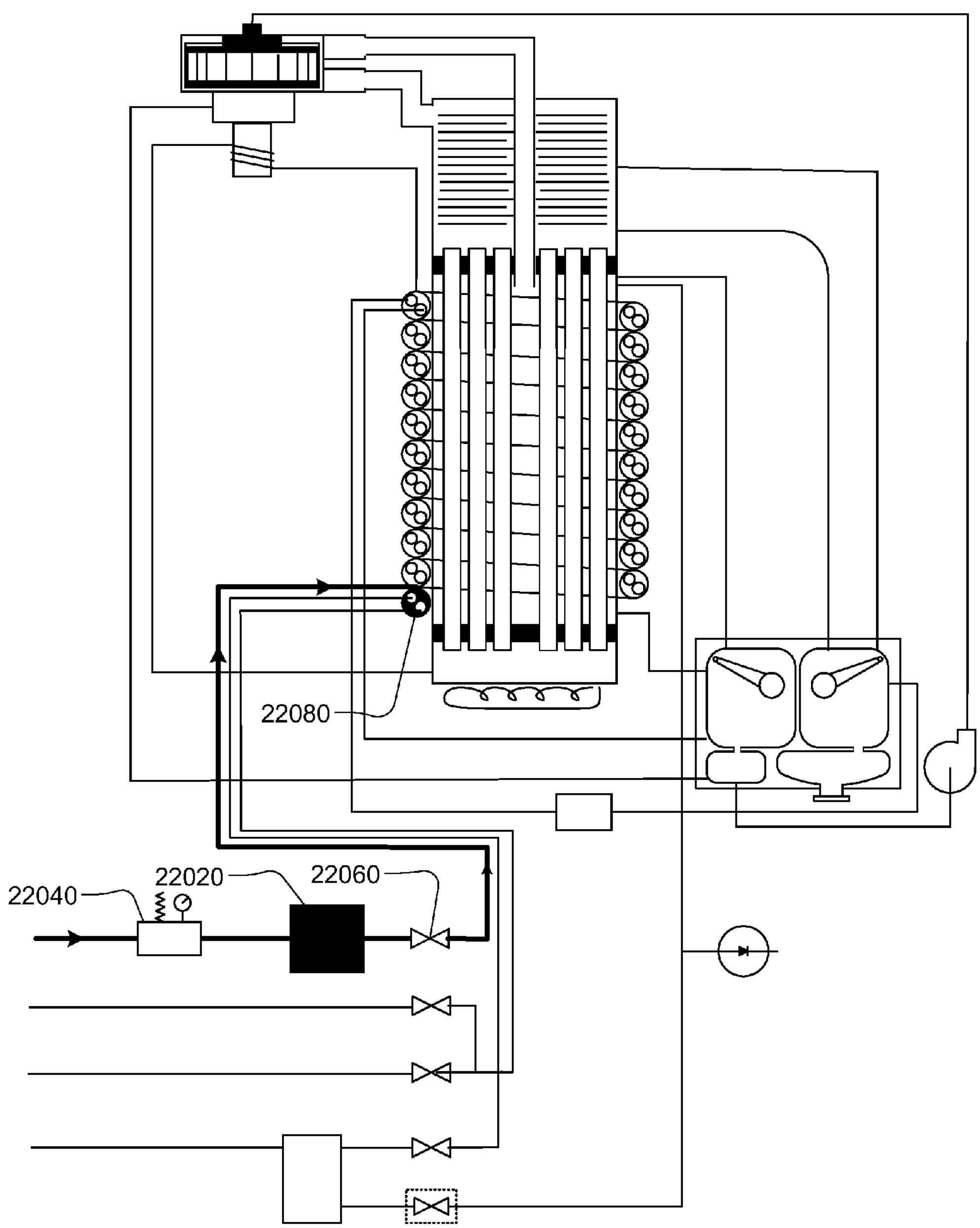
Figure 50B:
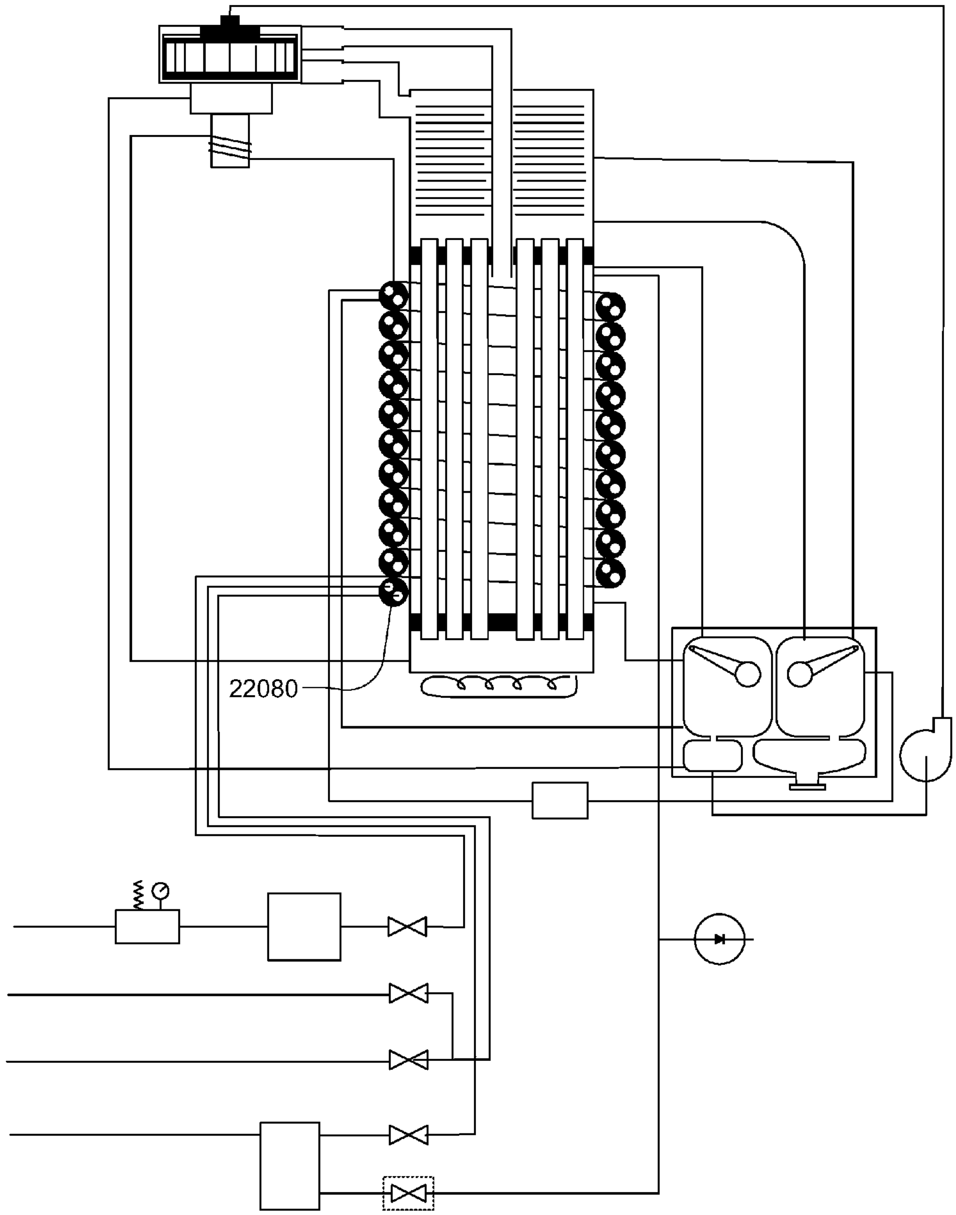
Figure 50C:
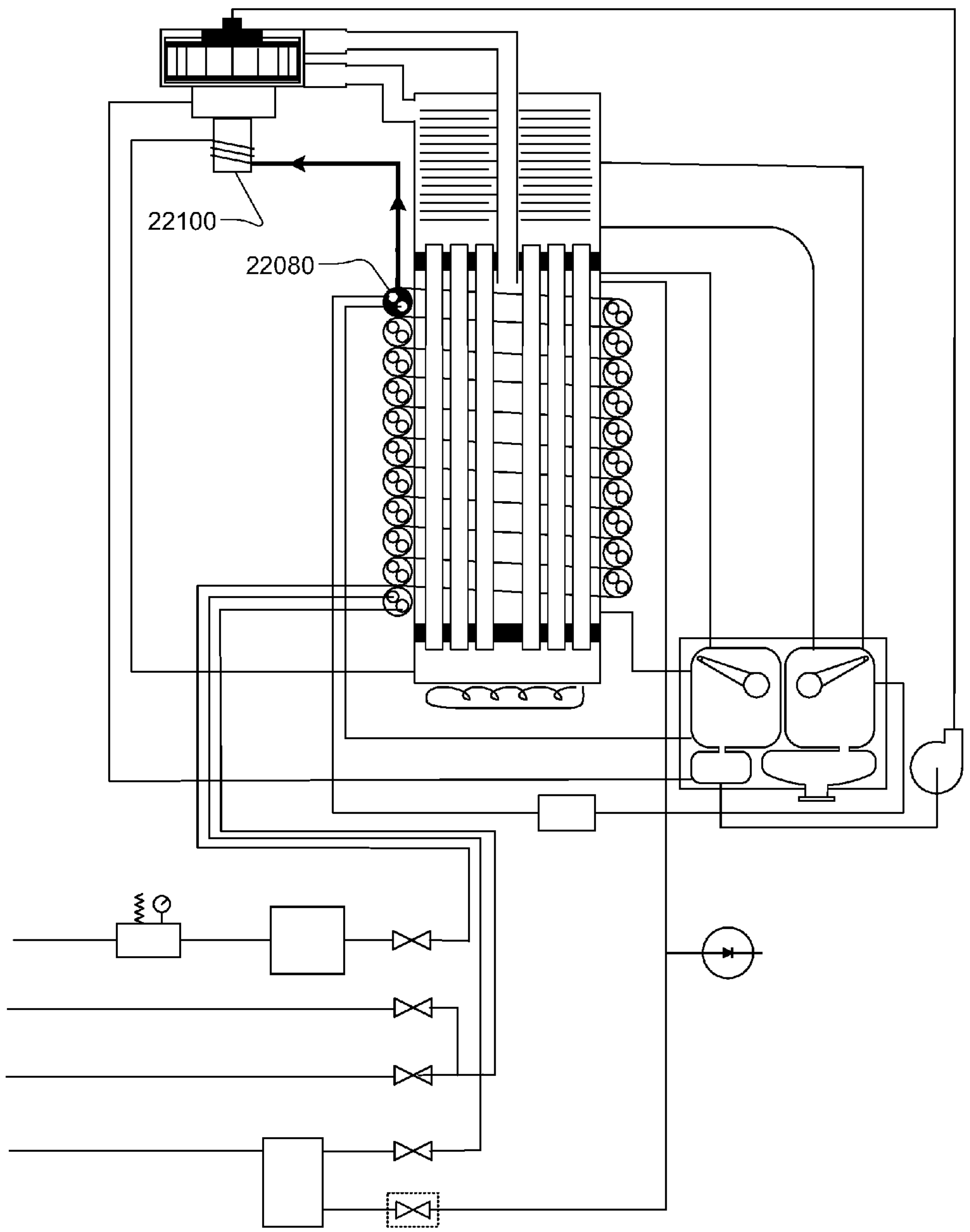
Figure 50D:
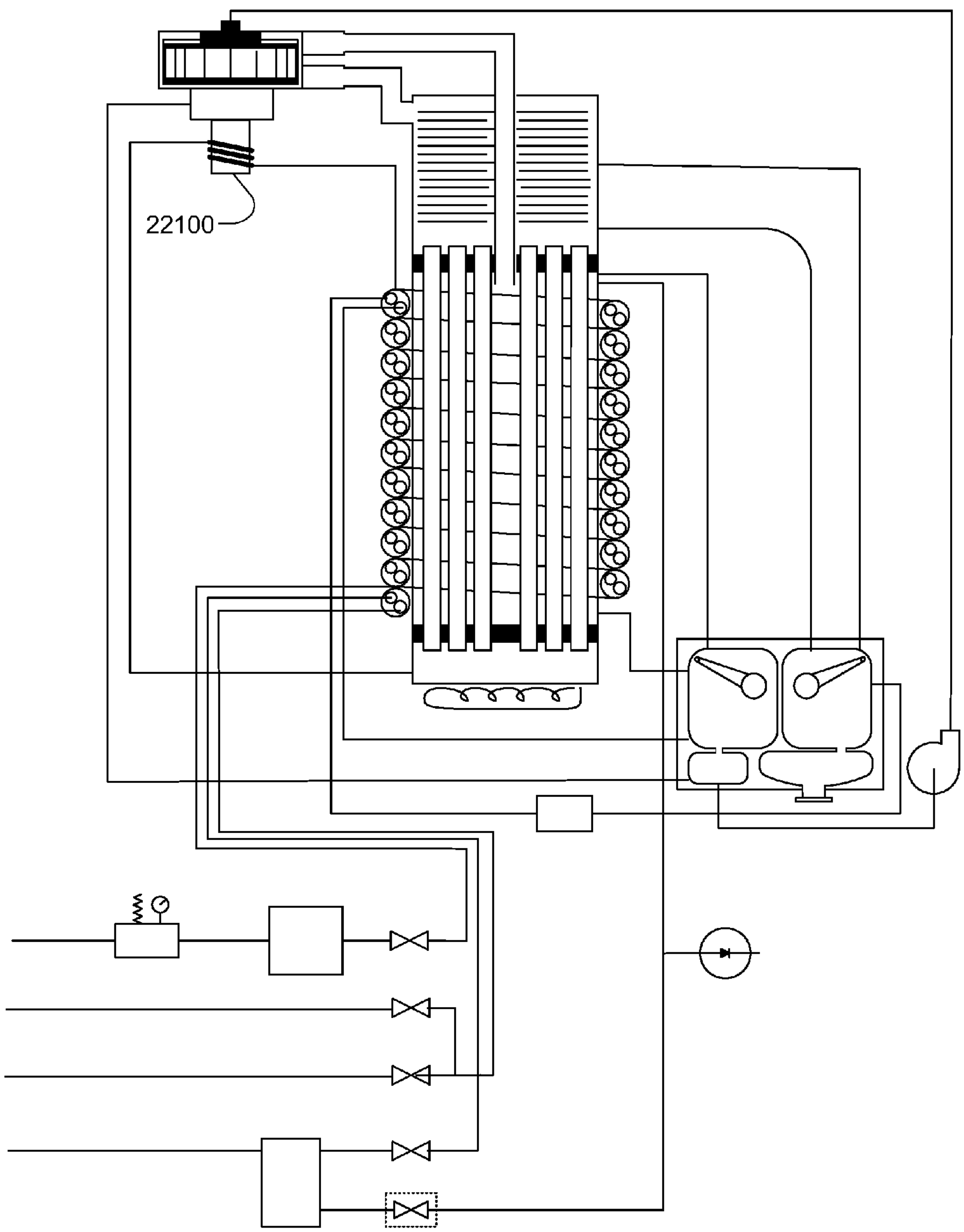
Figure 50E:
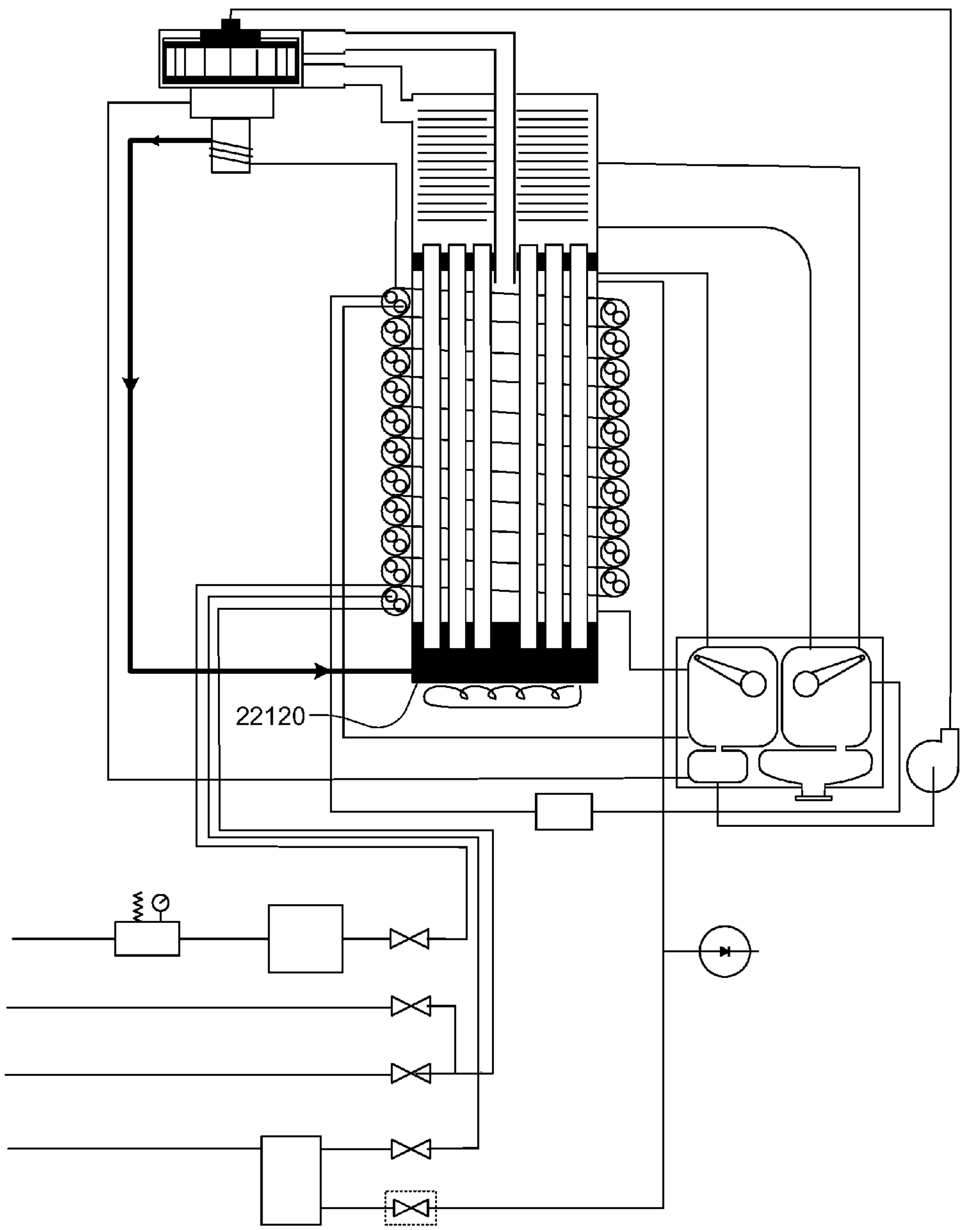
Figure 51:
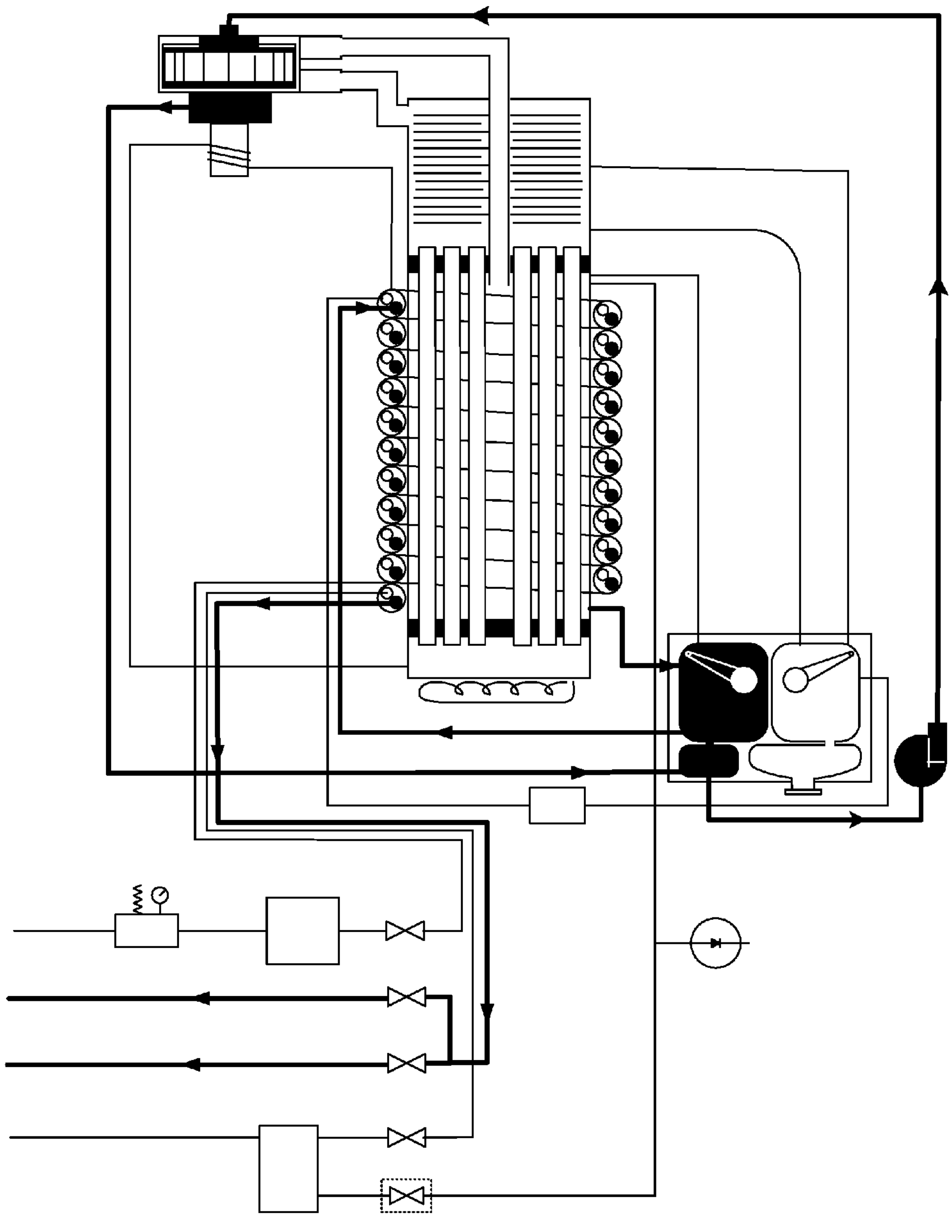
Figure 51A:
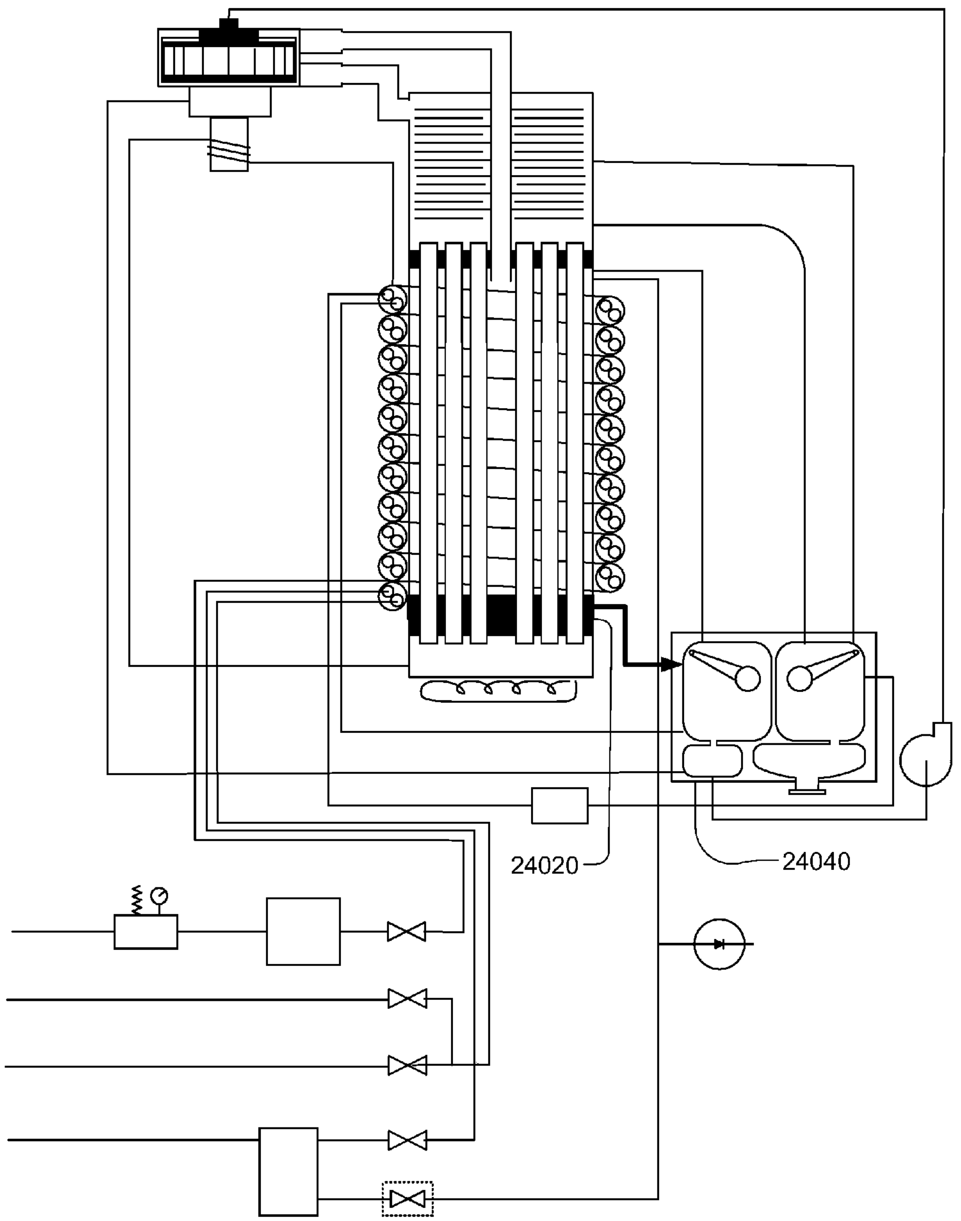
Figure 51B:
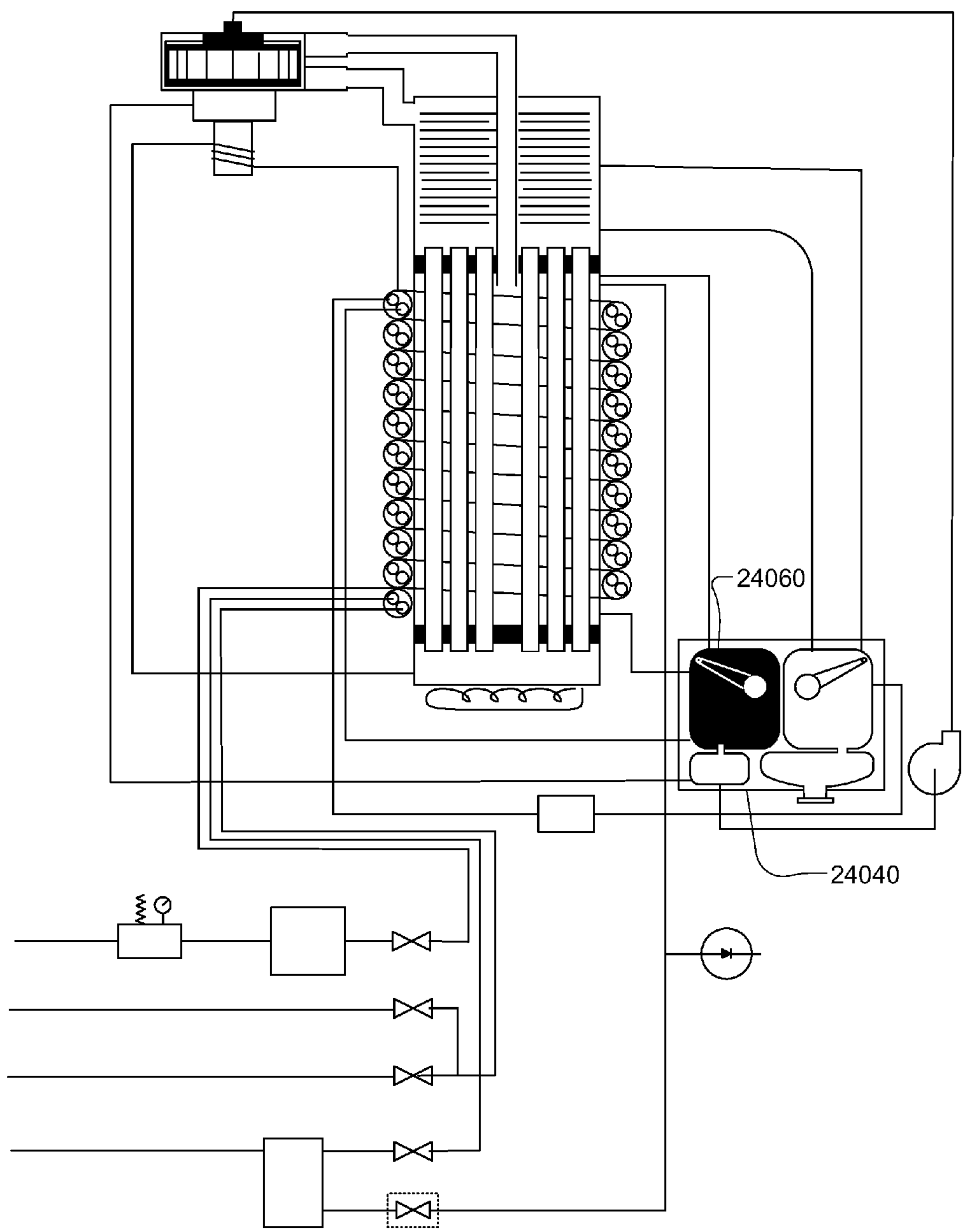
Figure 51C:
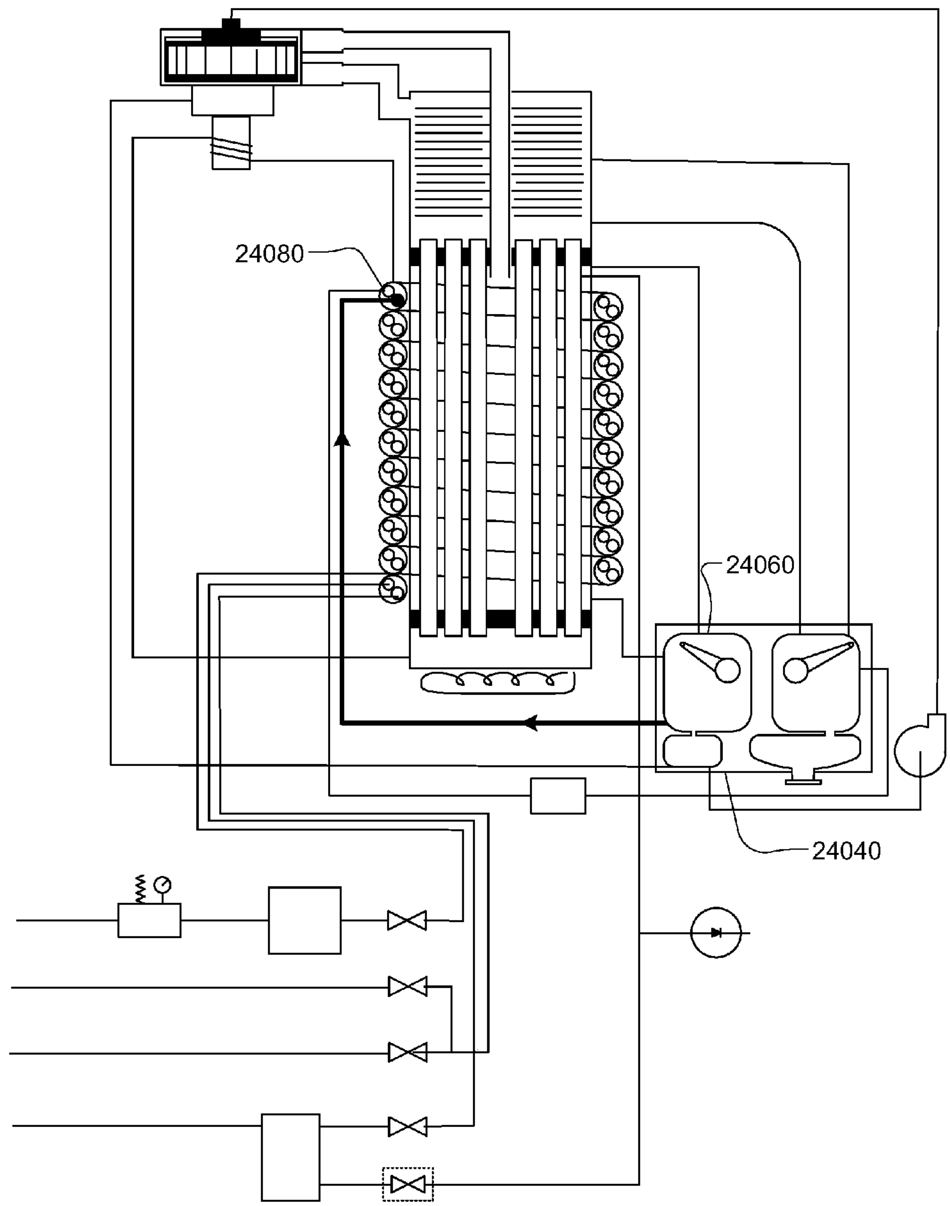
Figure 51D:
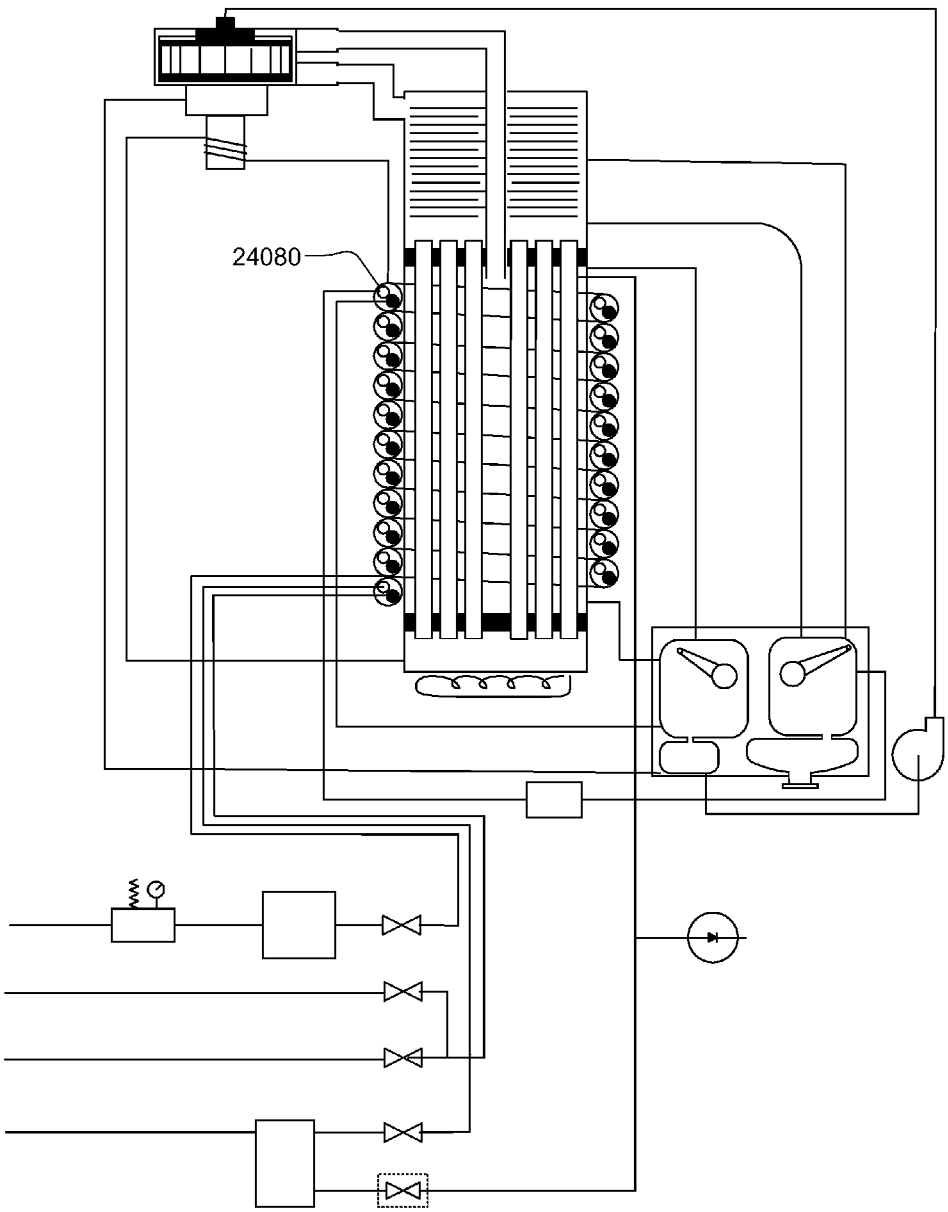
Figure 51E:
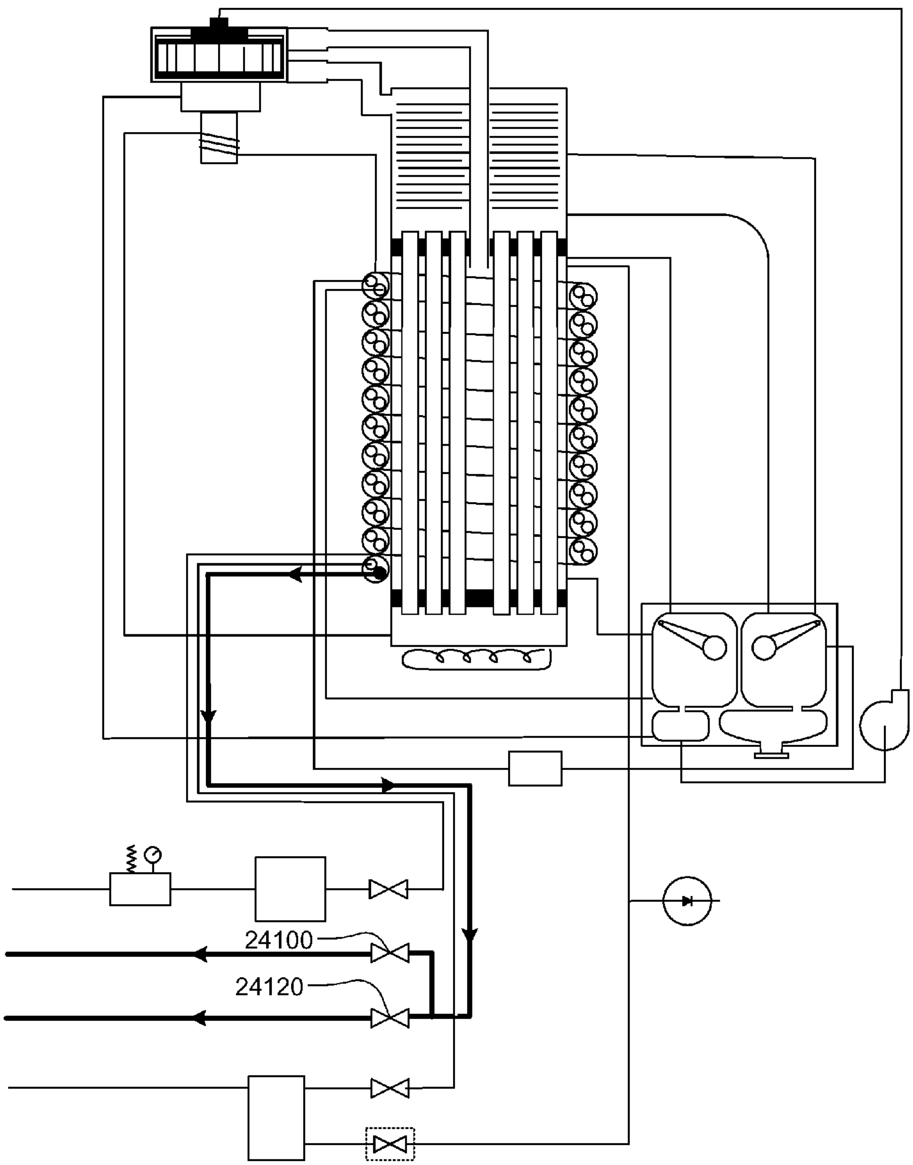
Figure 51F:
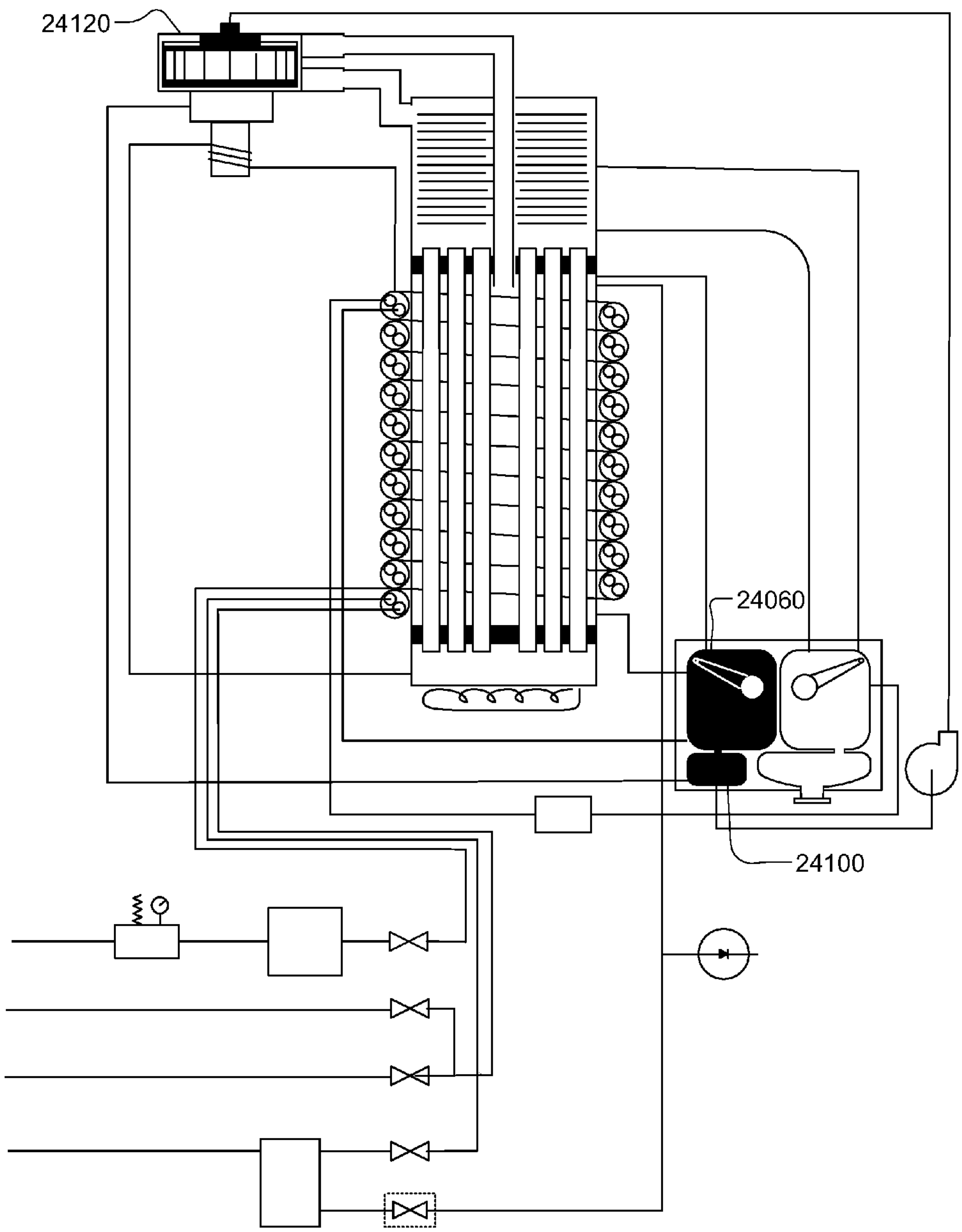
Figure 51G:
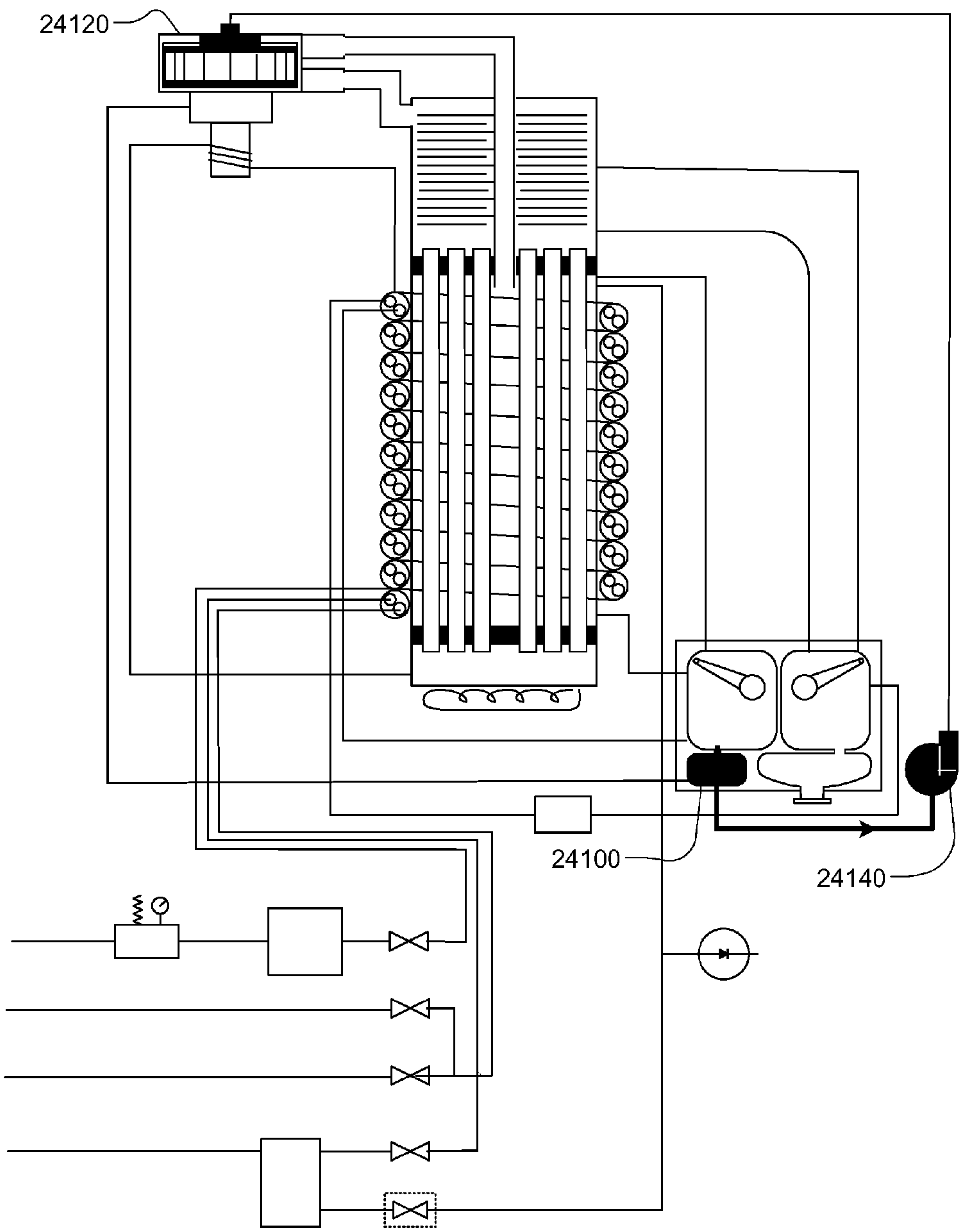
Figure 51H:
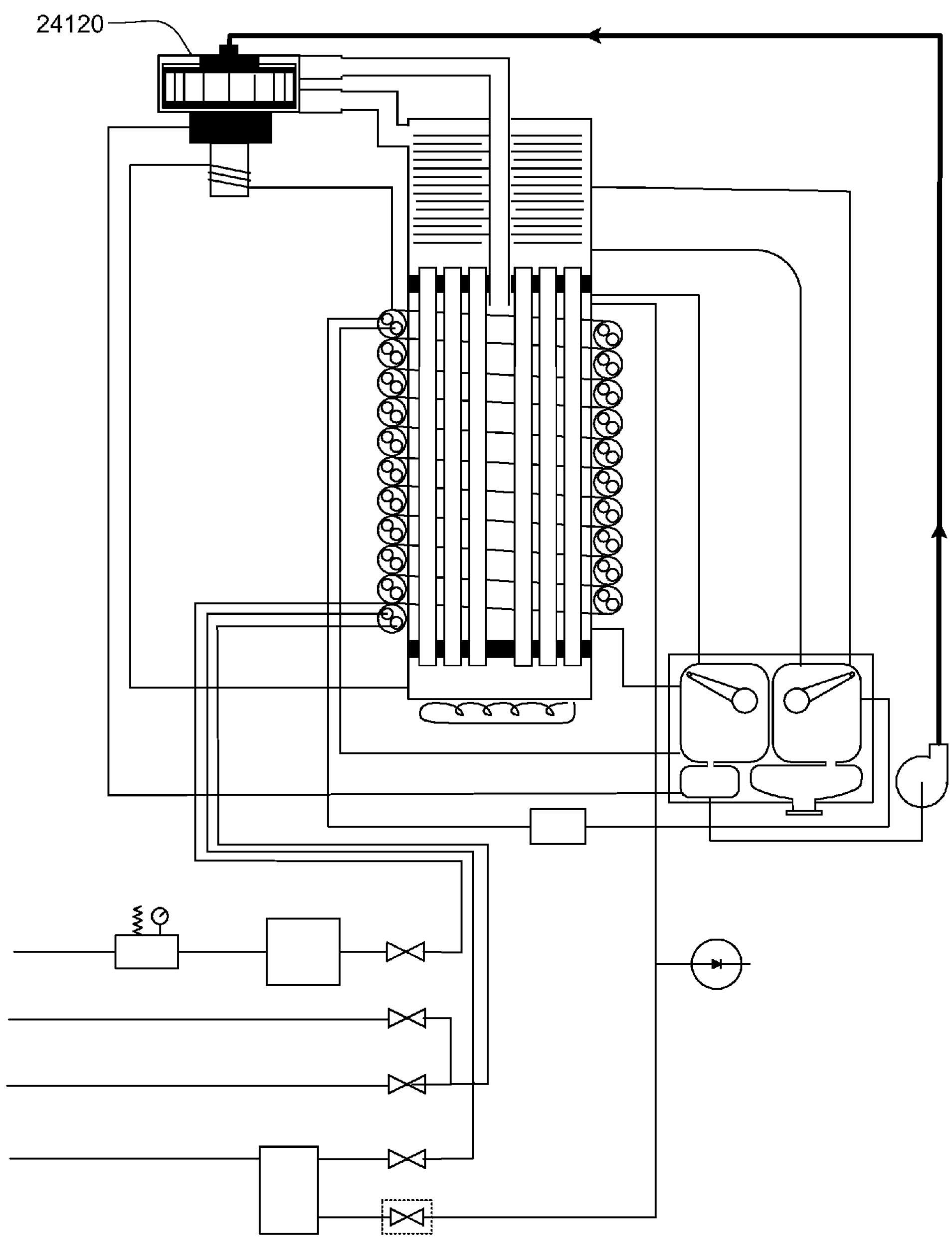
Figure 51I:
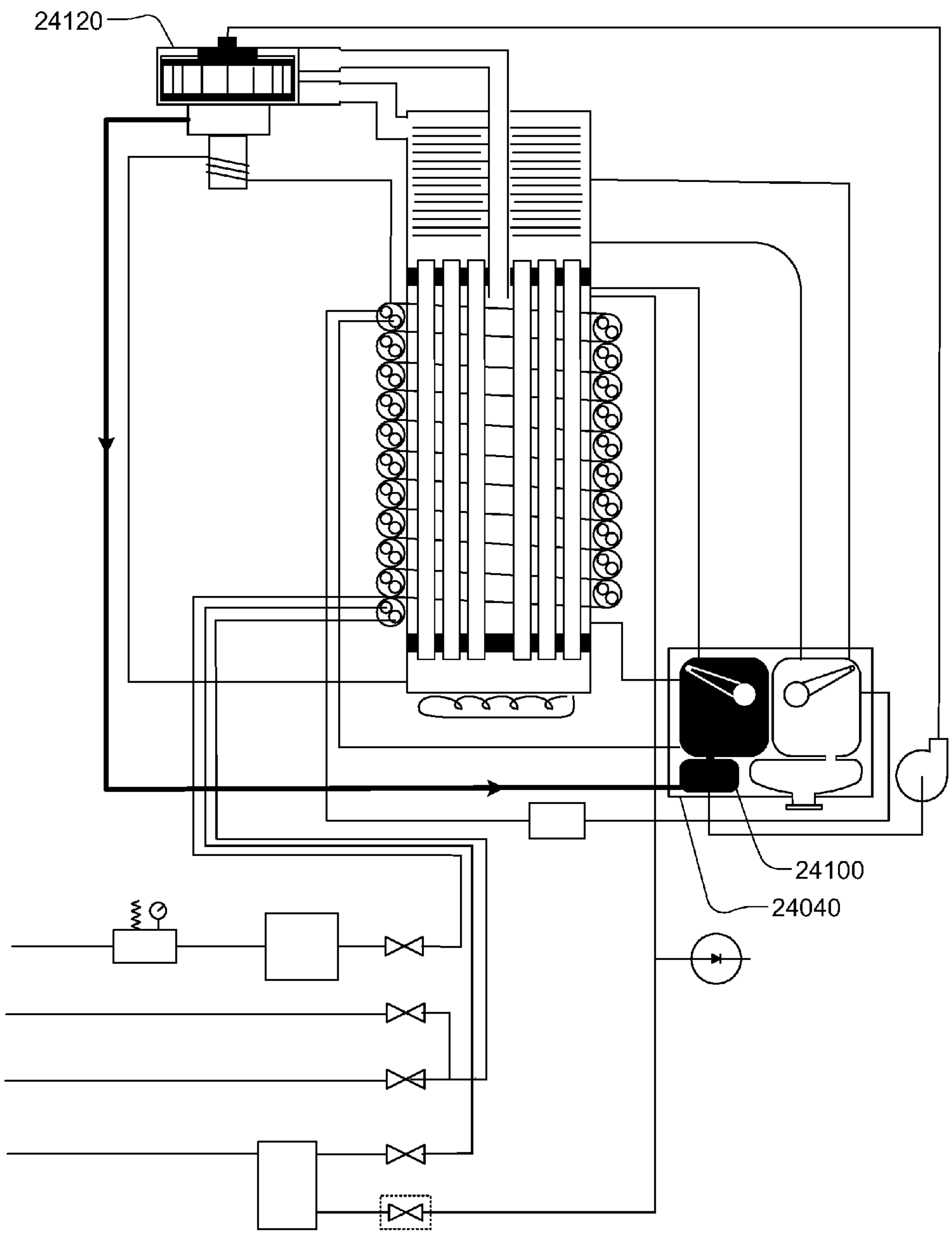
Figure 52:
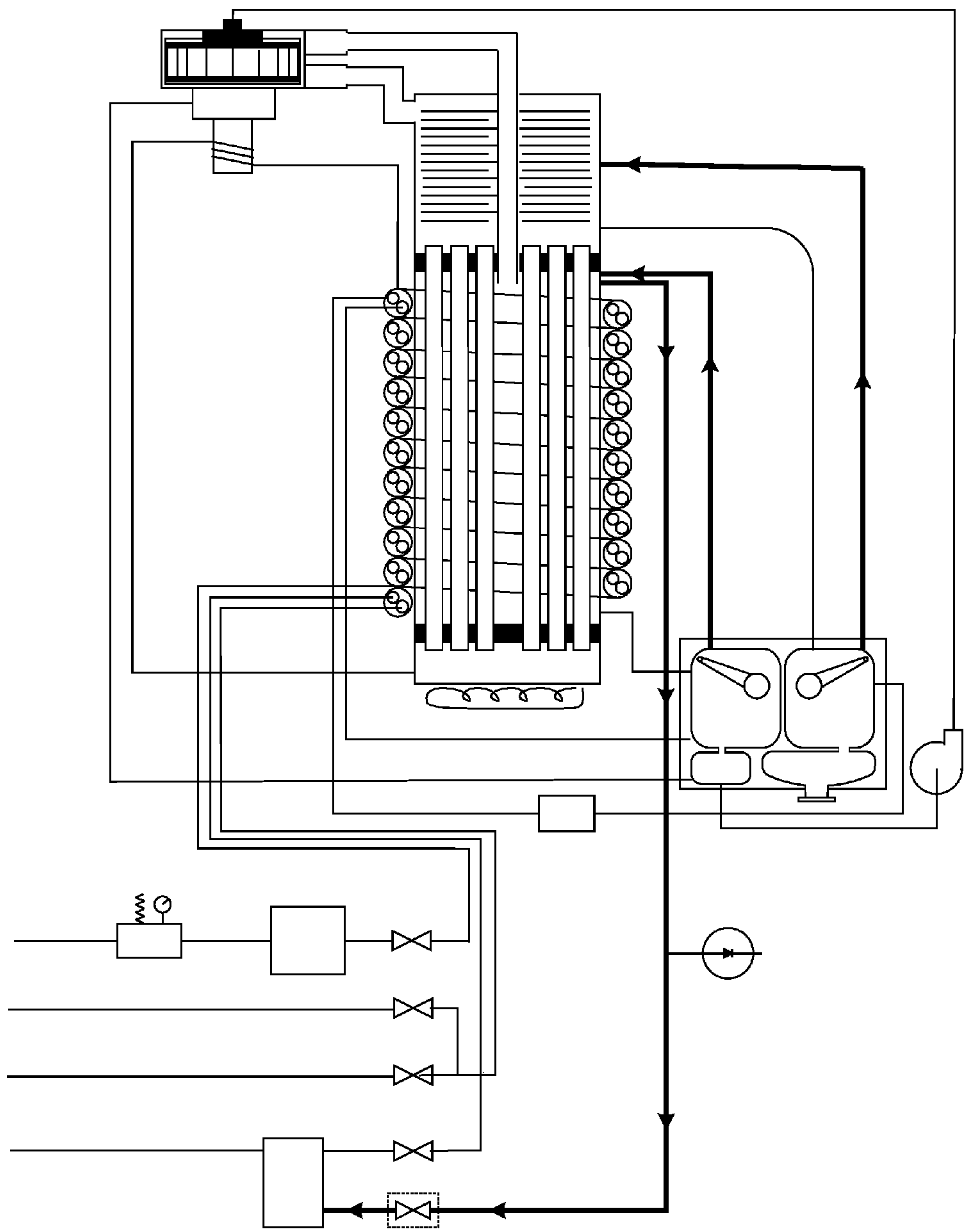
Figure 52A:
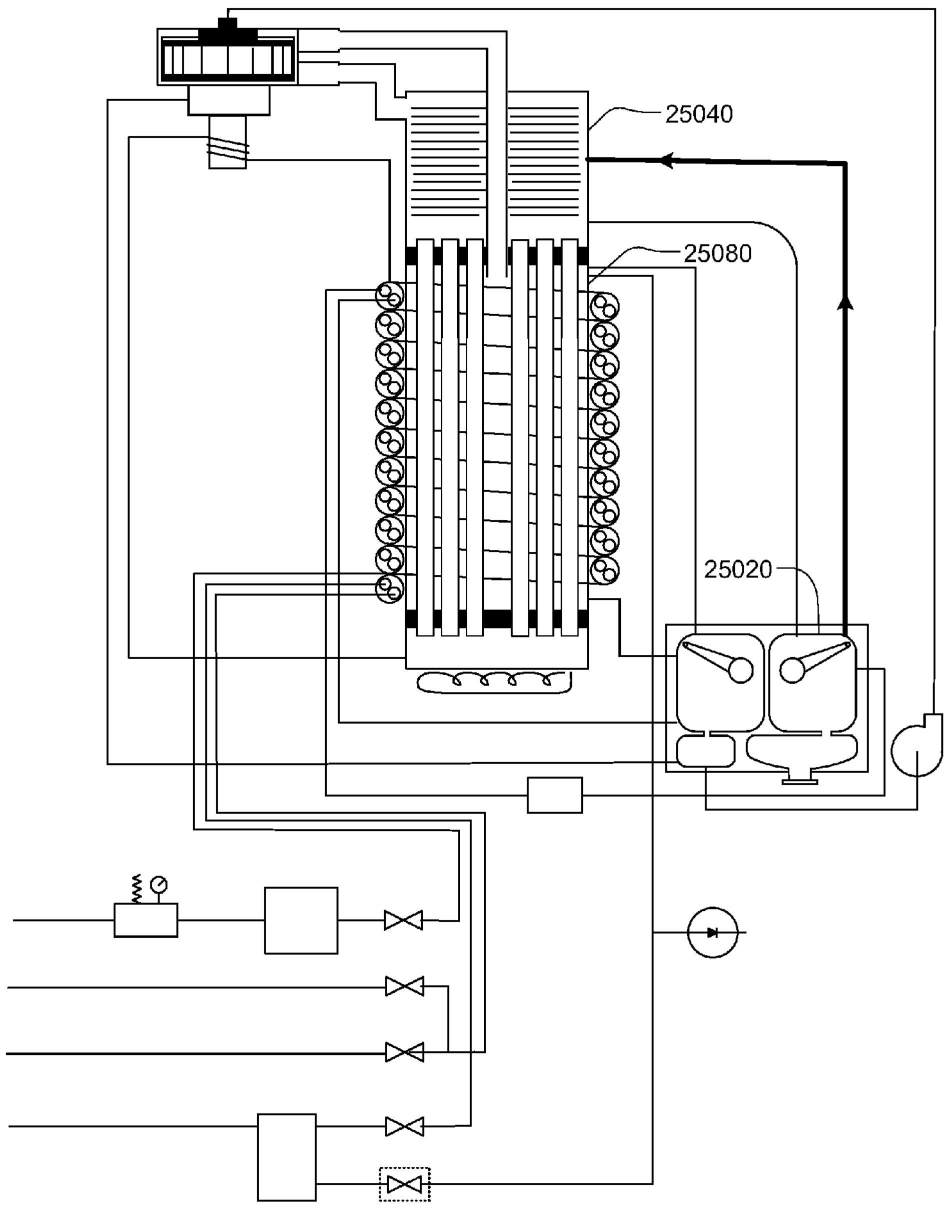
Figure 52B:
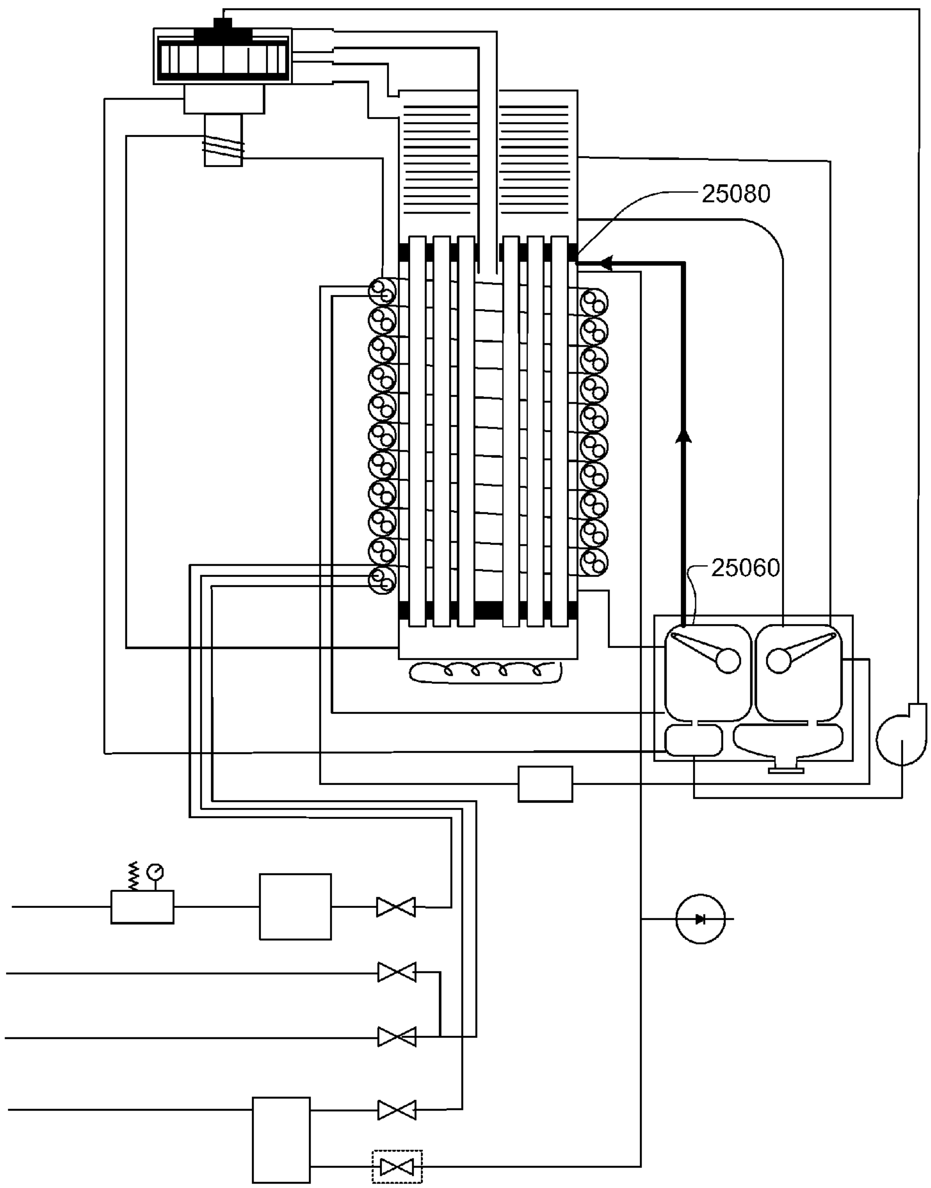
Figure 52C:
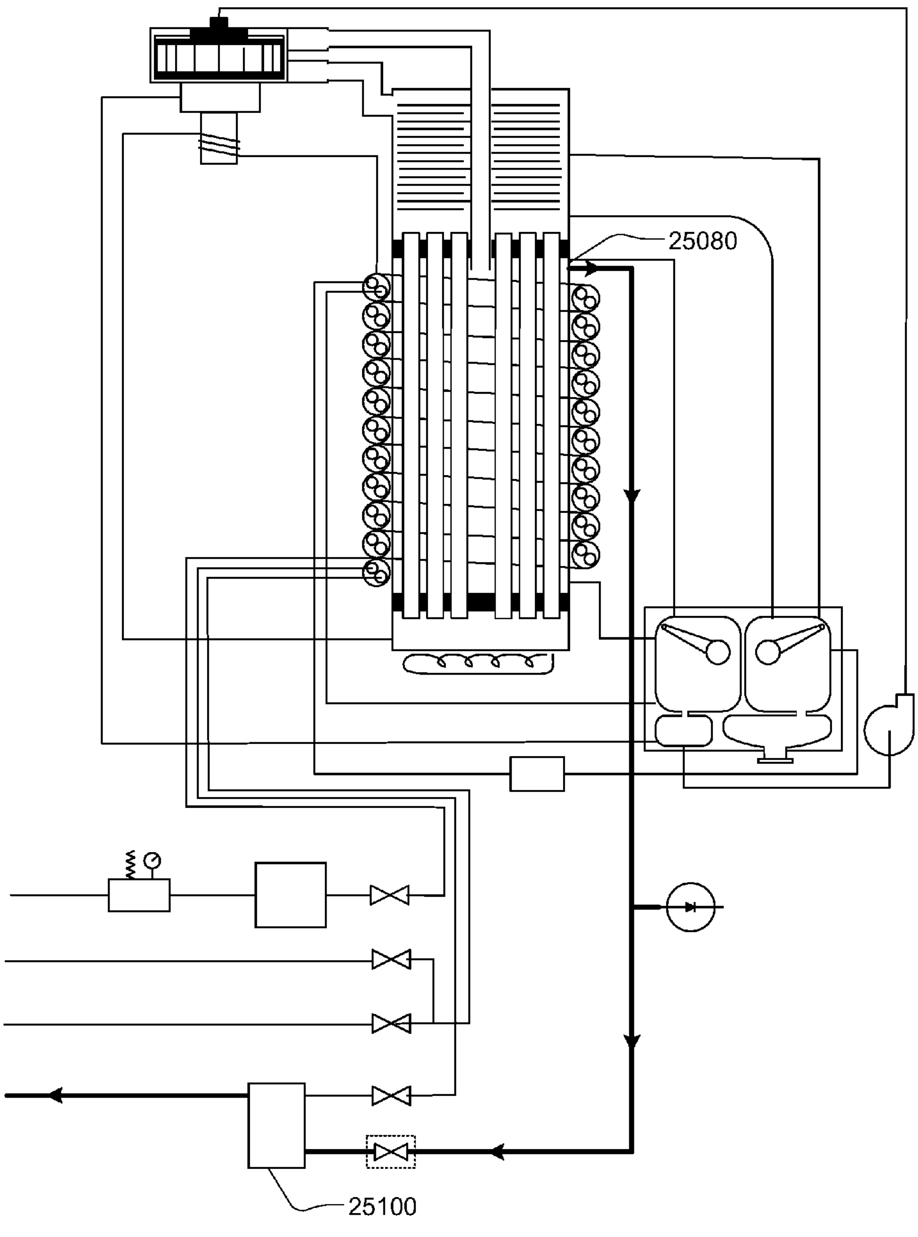
Figure 53:
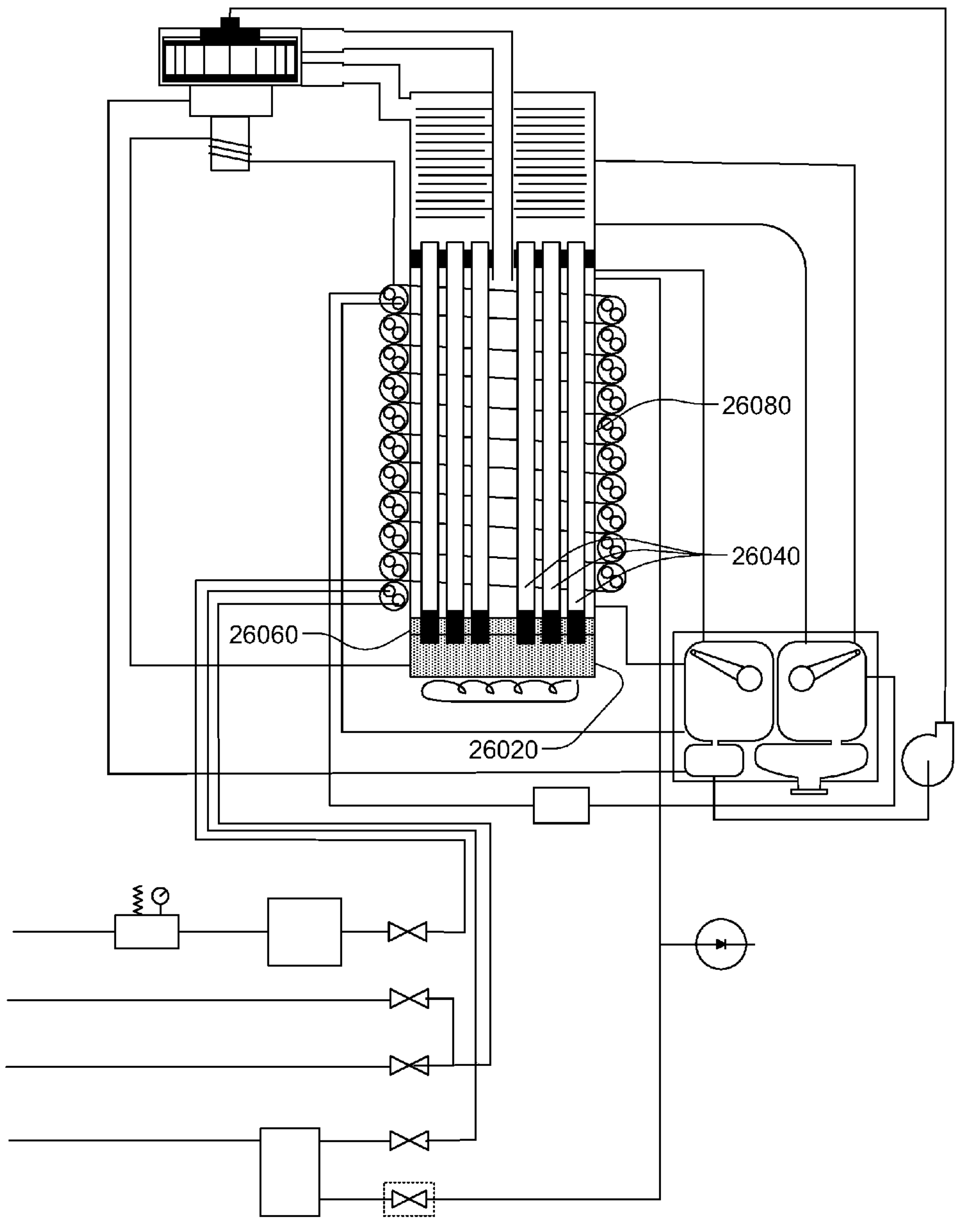
Figure 54:
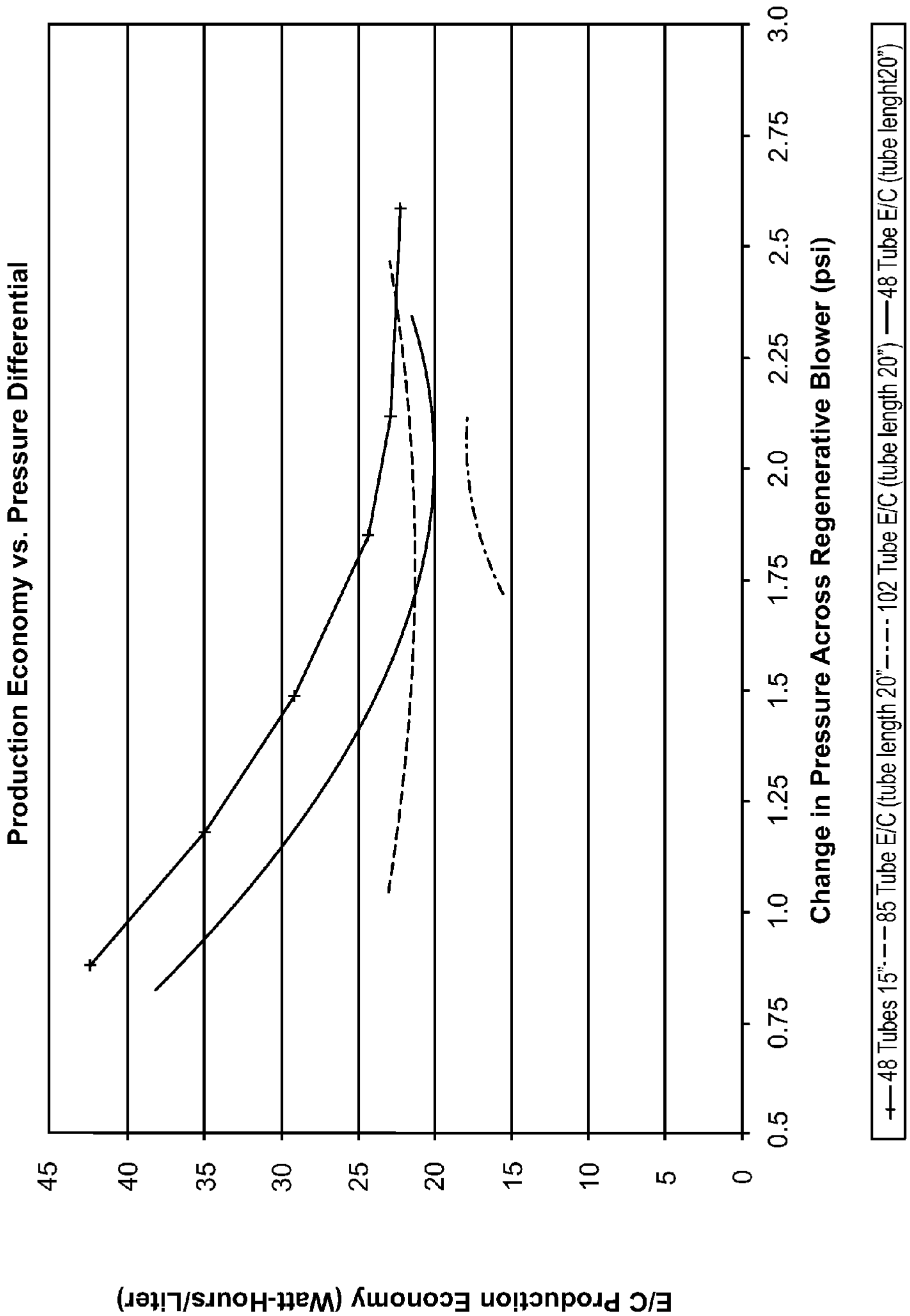
Figure 55:
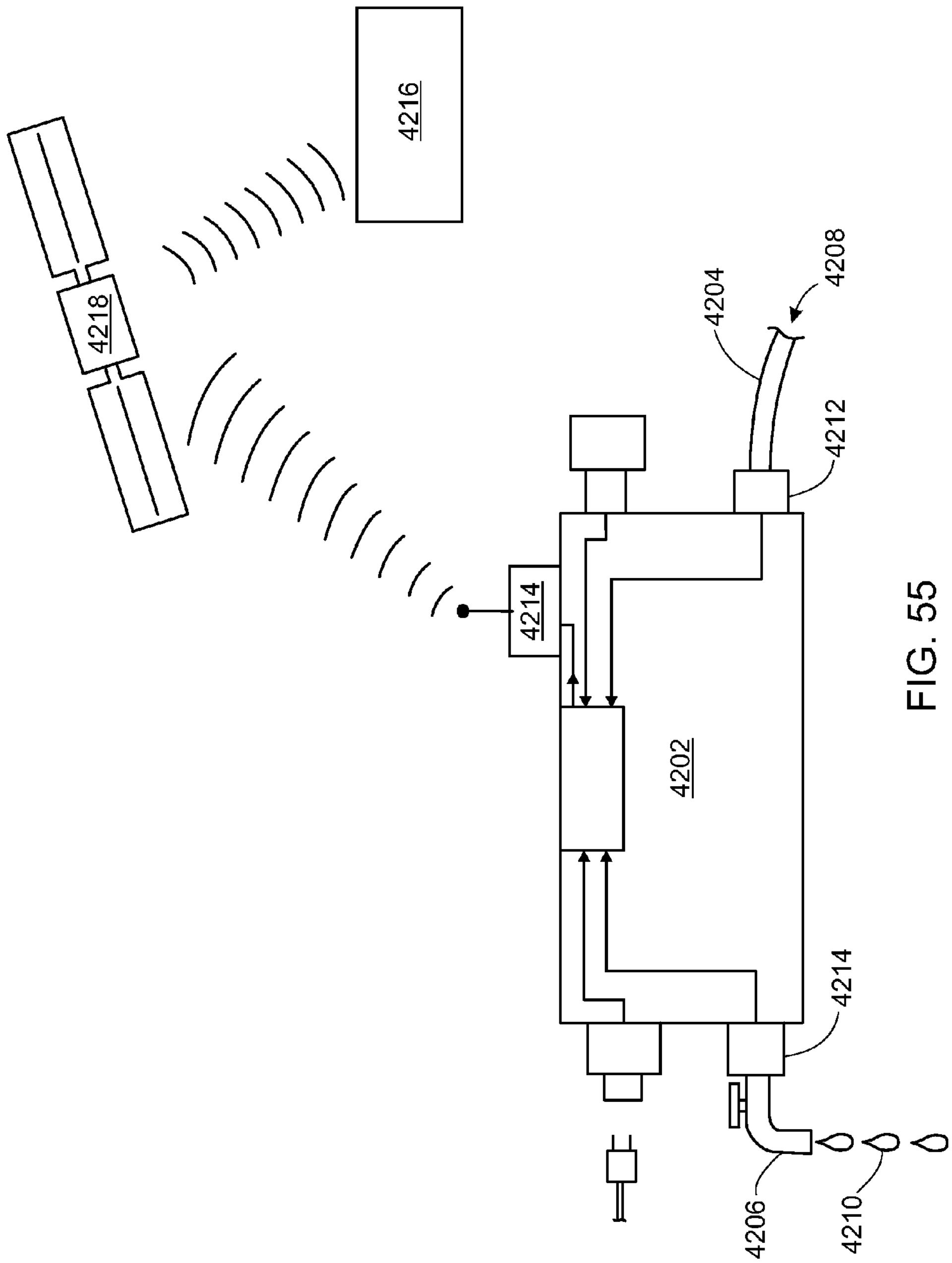
Figure 56:
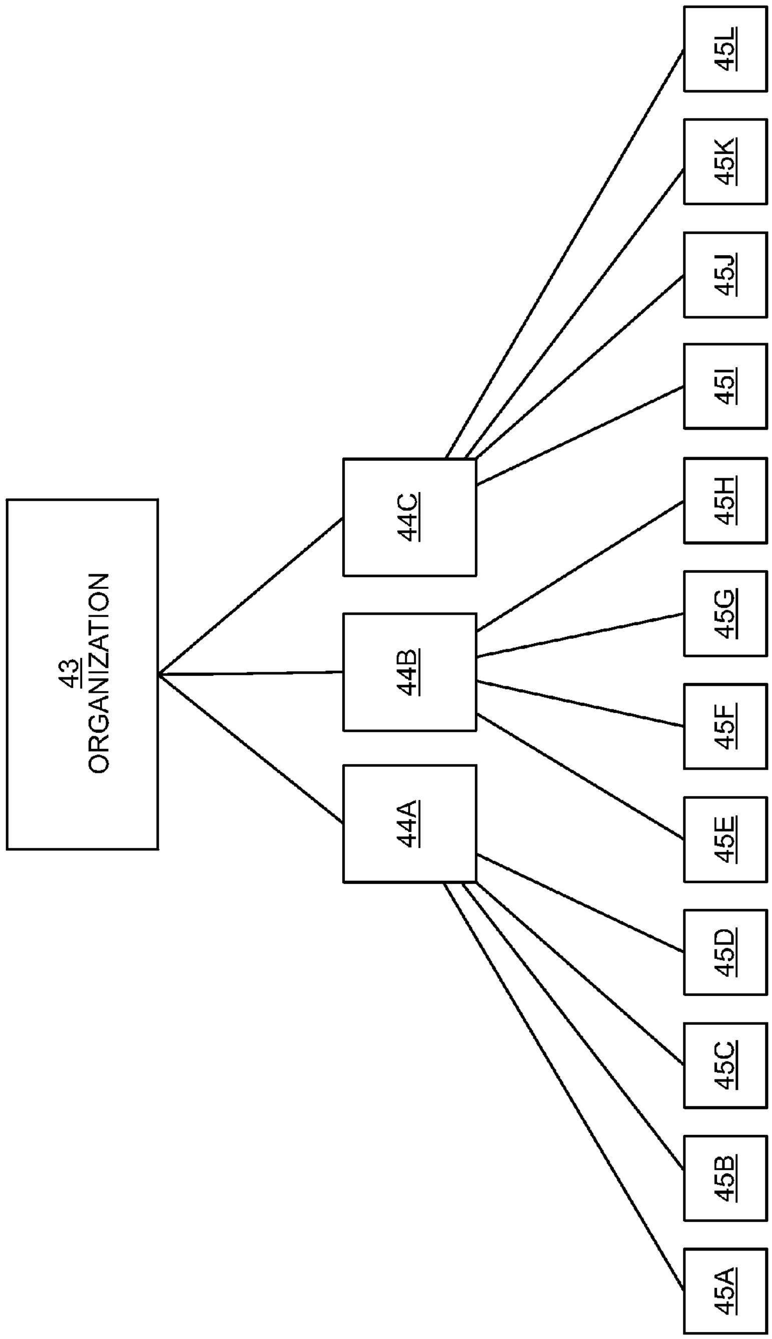
Figure 57:
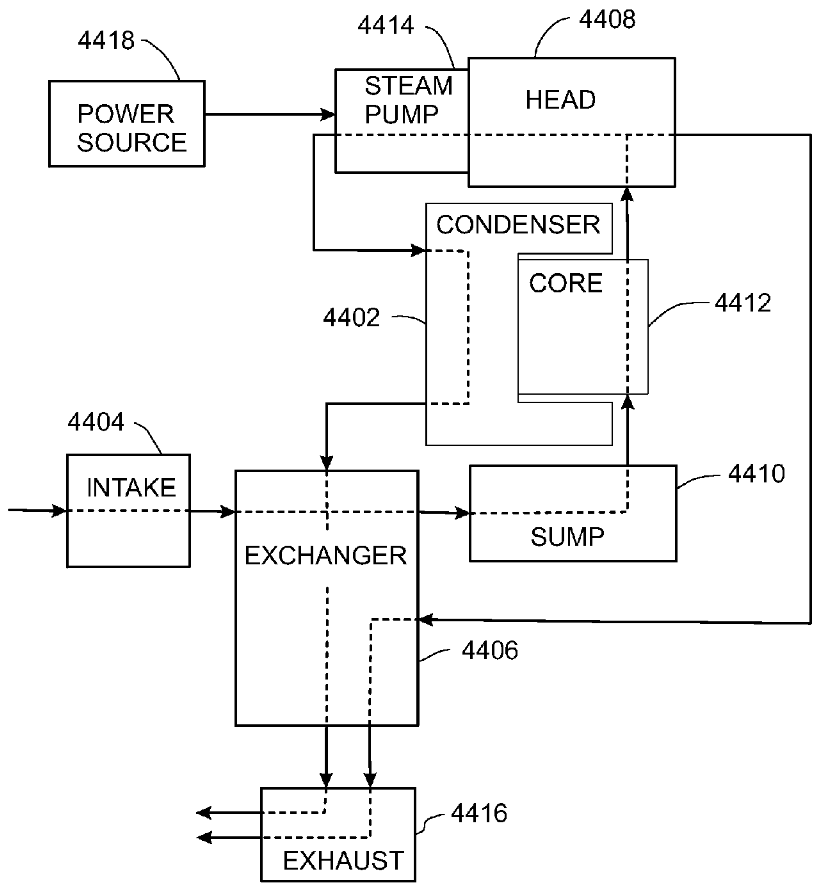
Figure 57A:
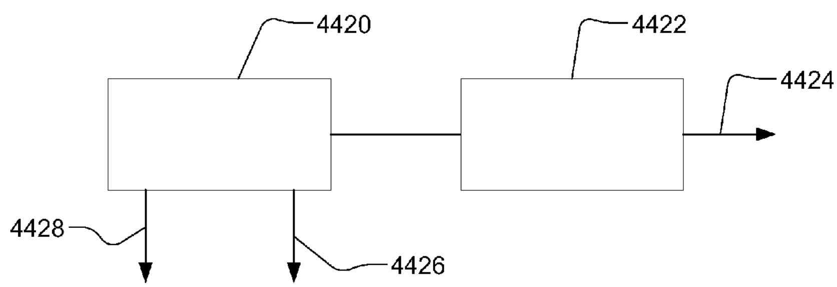
Figure 59:
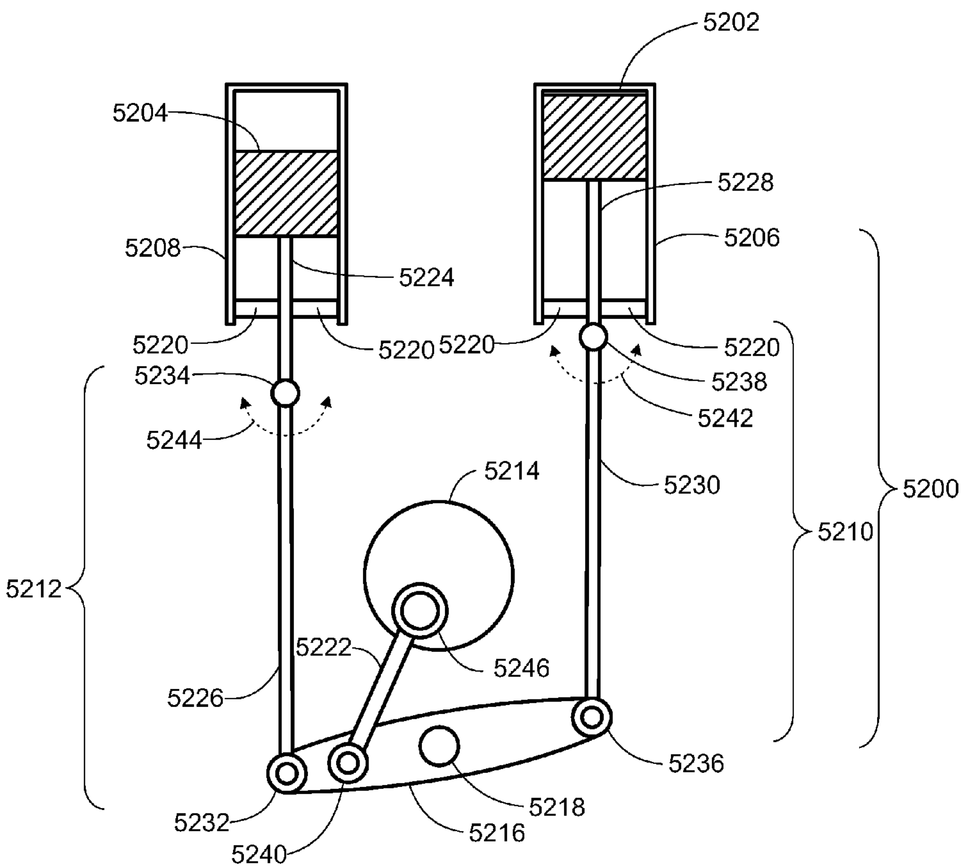
Figure 60:
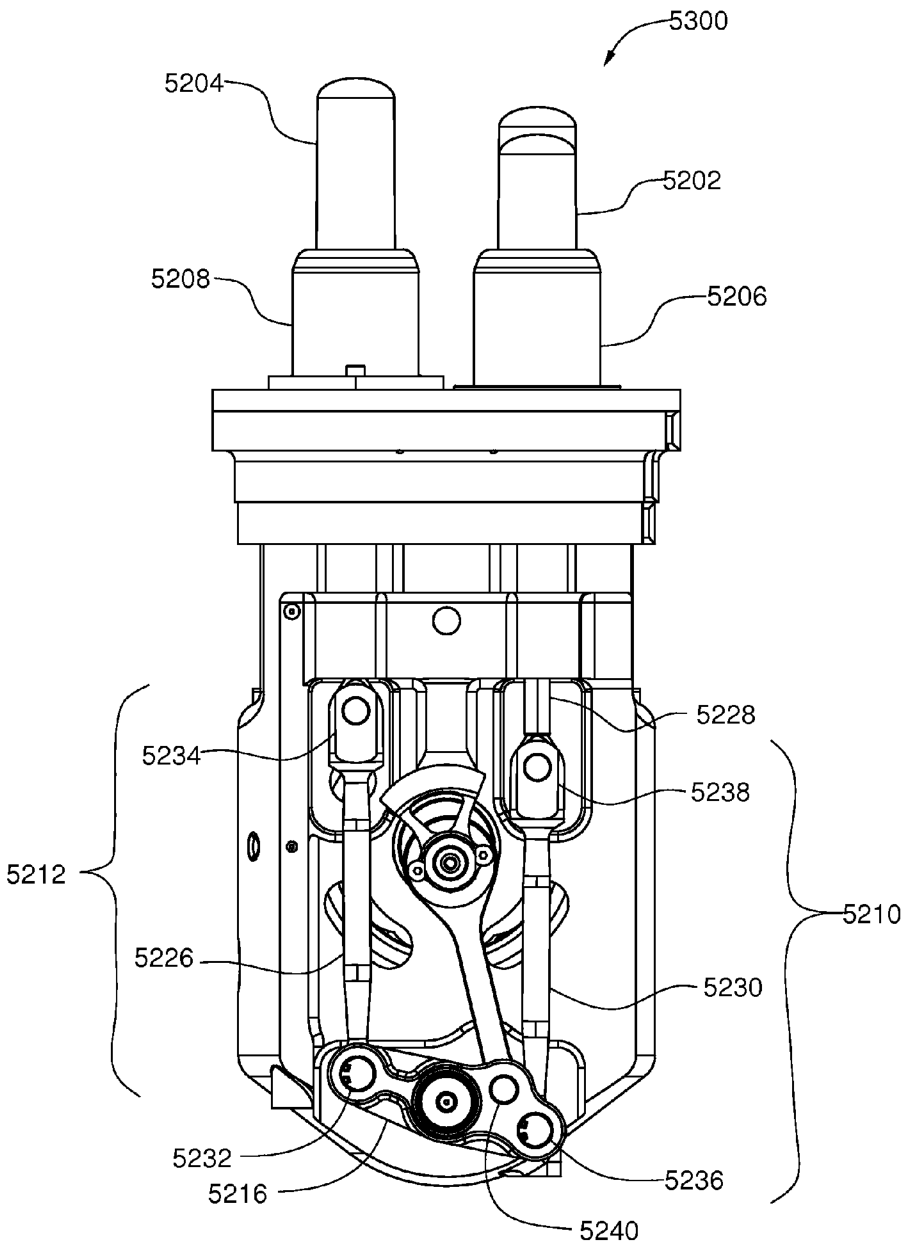
Figure 61:
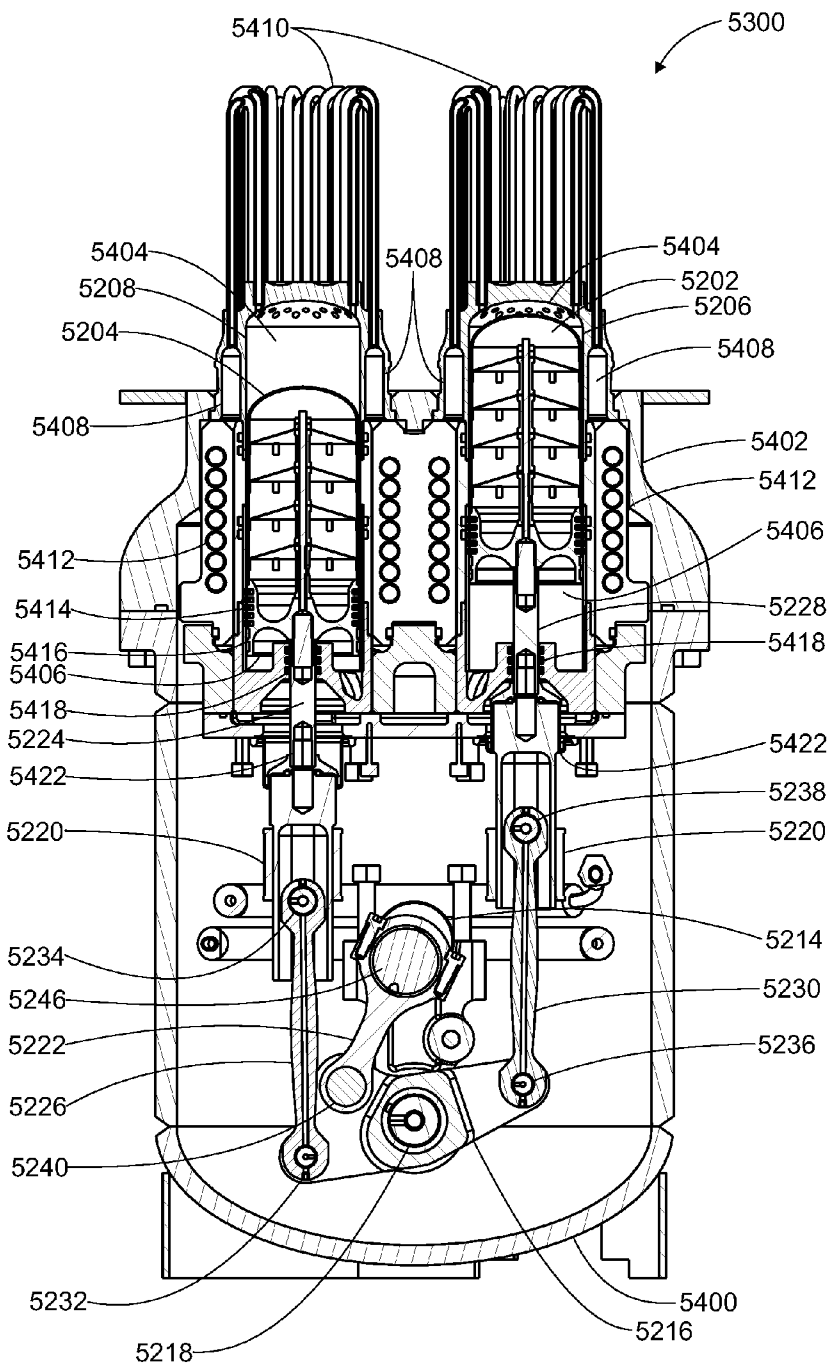
Figure 63:
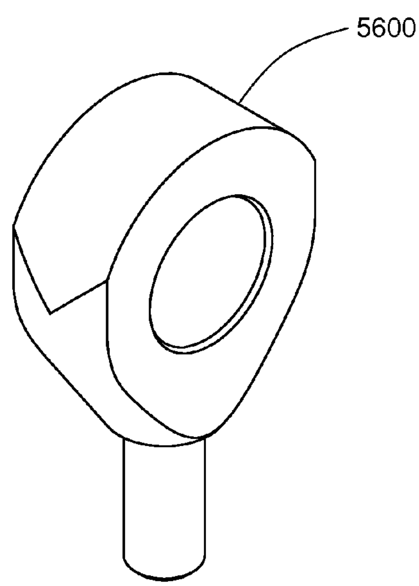
Figure 64A:
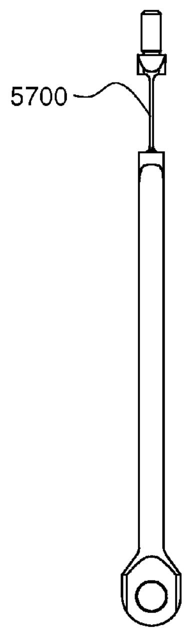
Figure 64B:
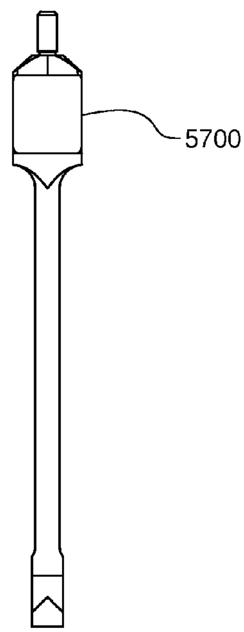
Figure 65:
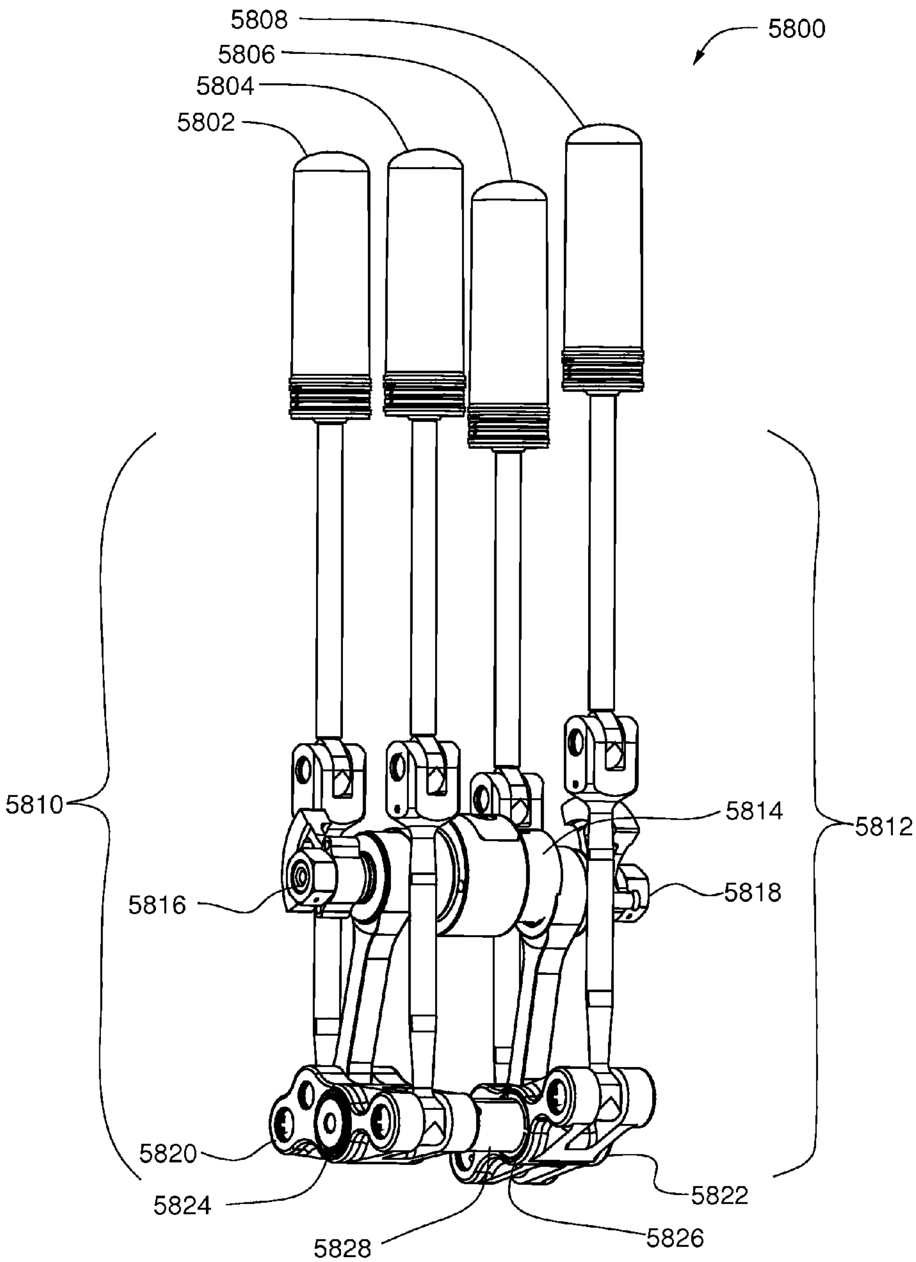
Figure 66:
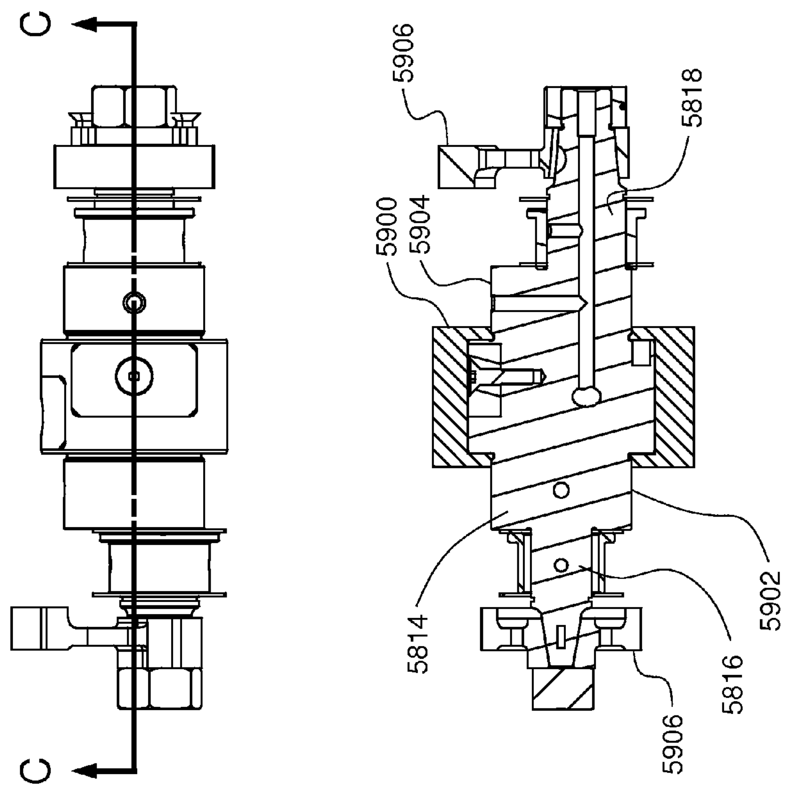
Figure 67:
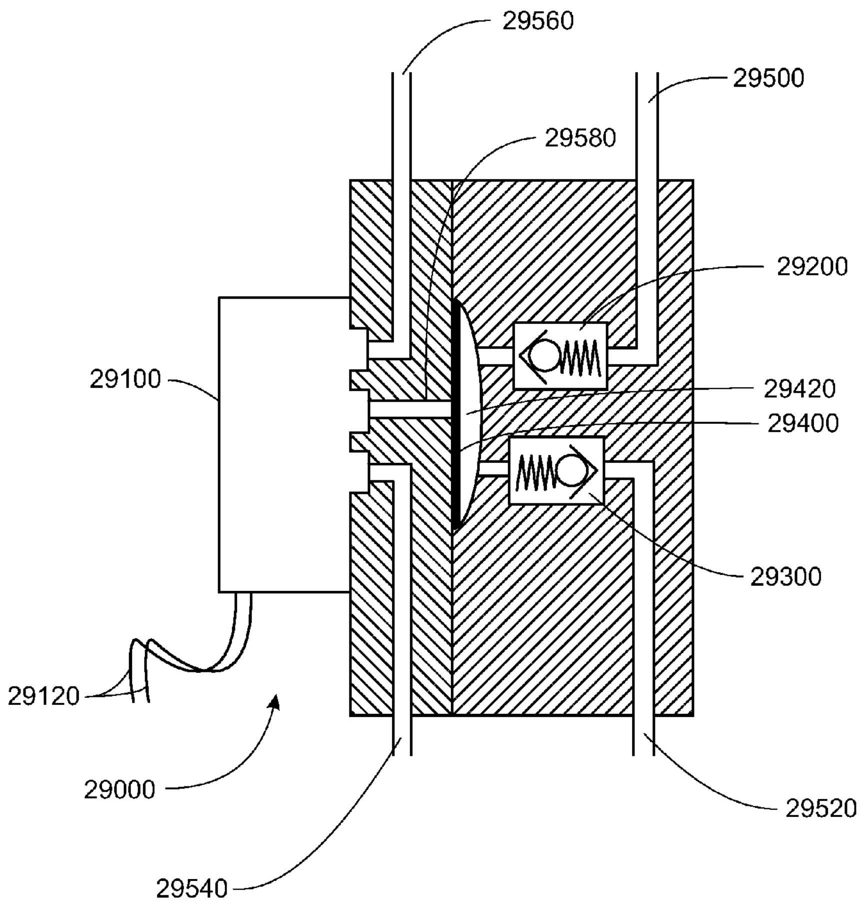
Figure 68:
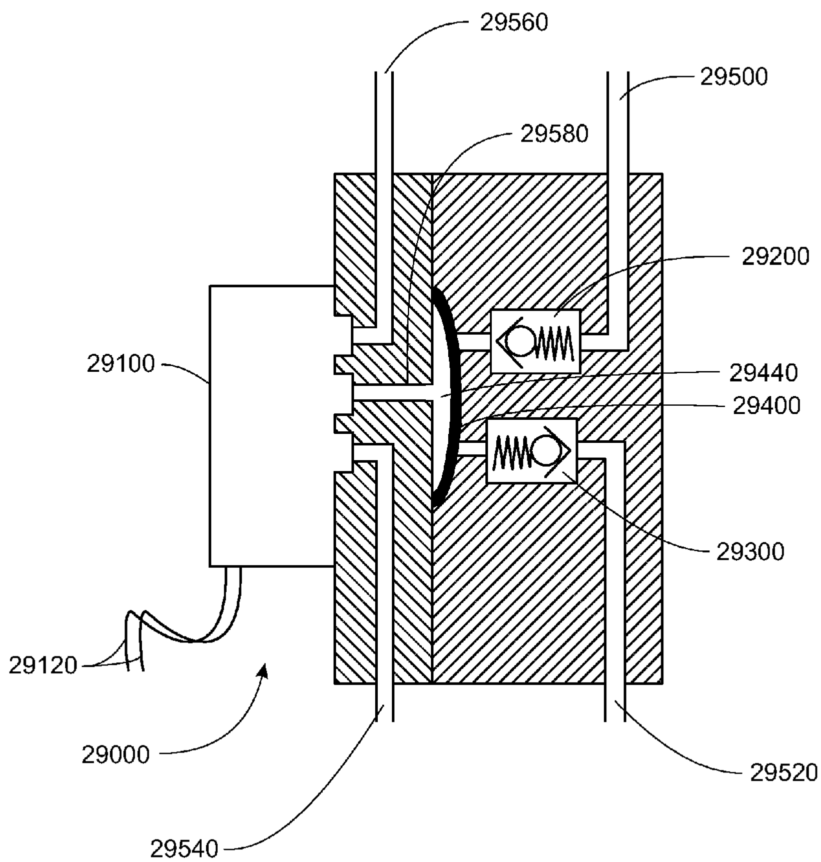
Figure 69:
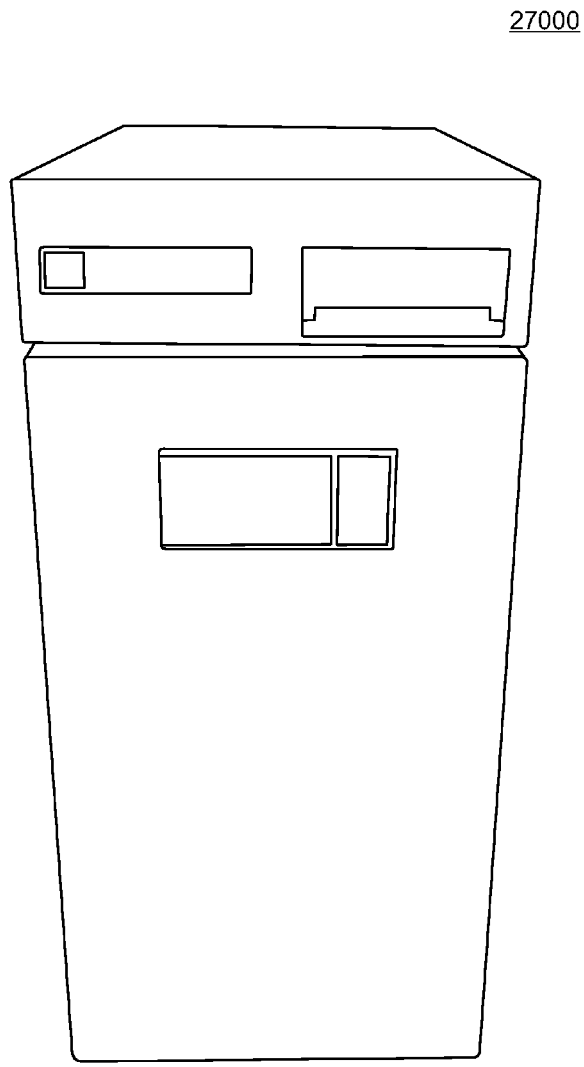
Figure 70:
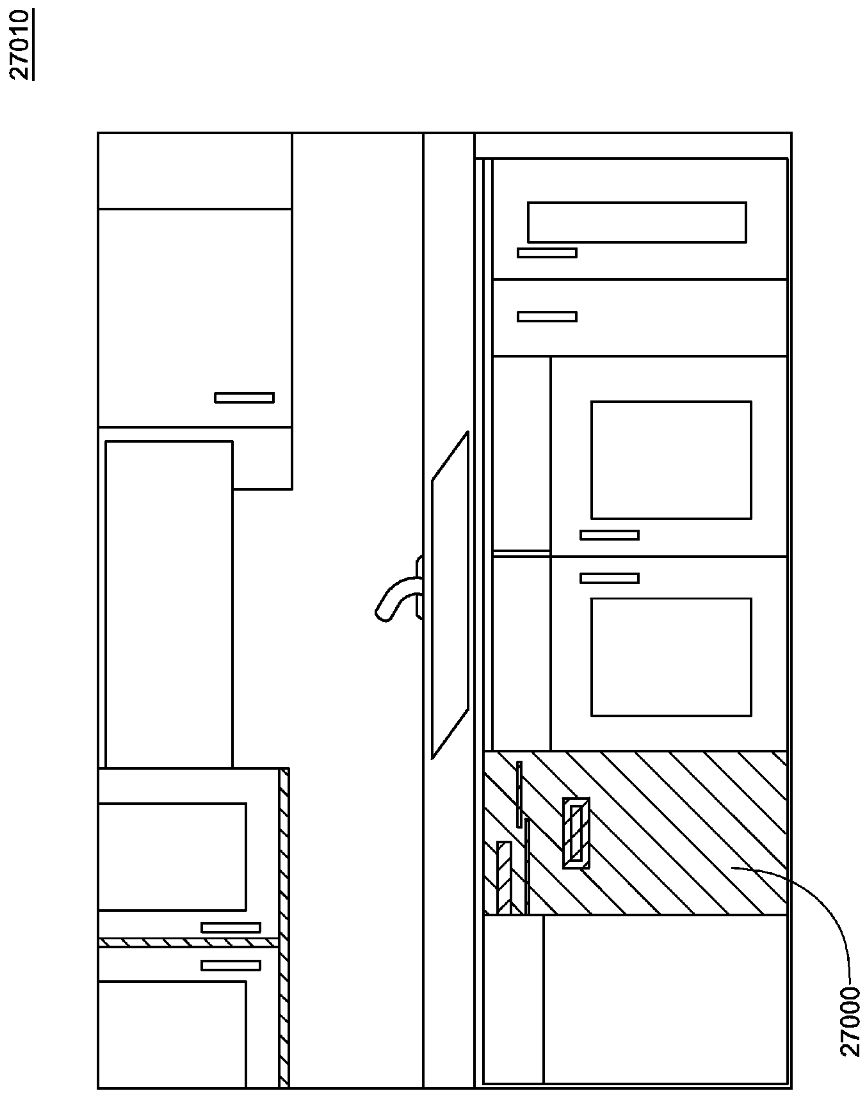
Figure 71A:
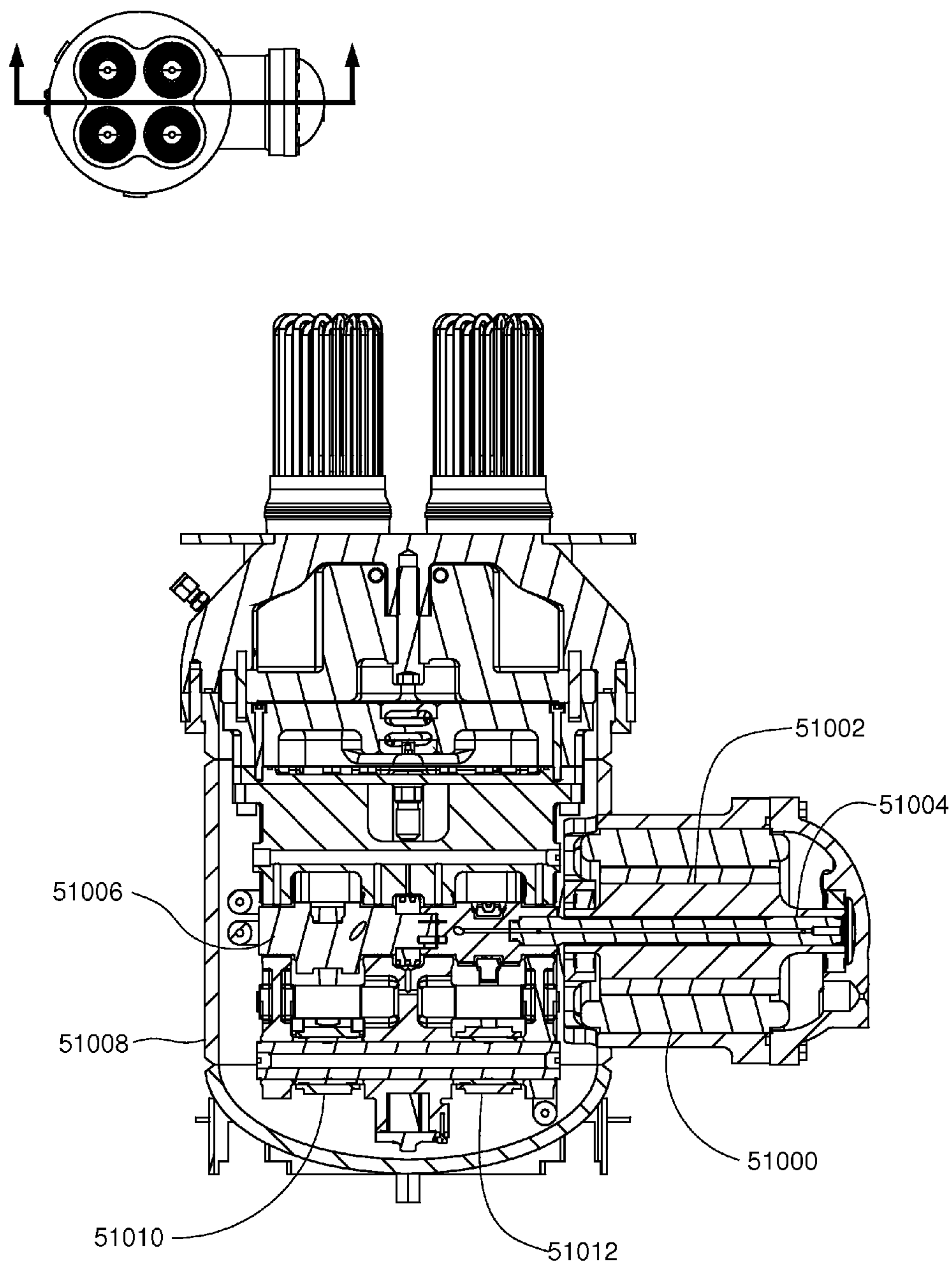
Figure 71B:
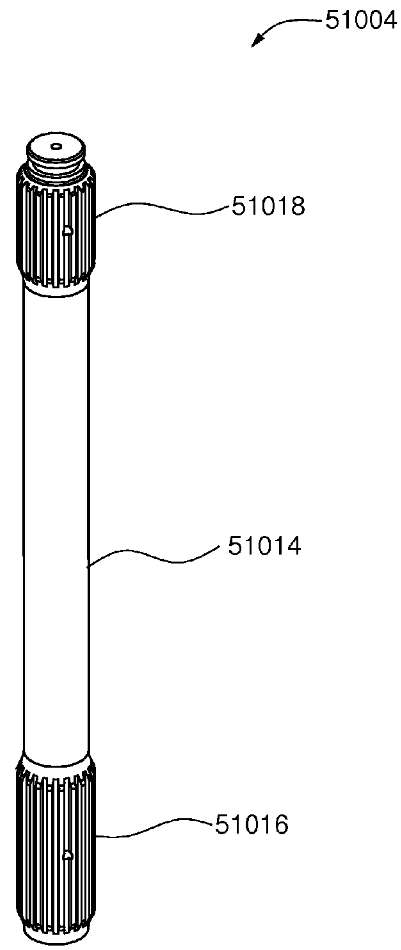
Figure 71C:
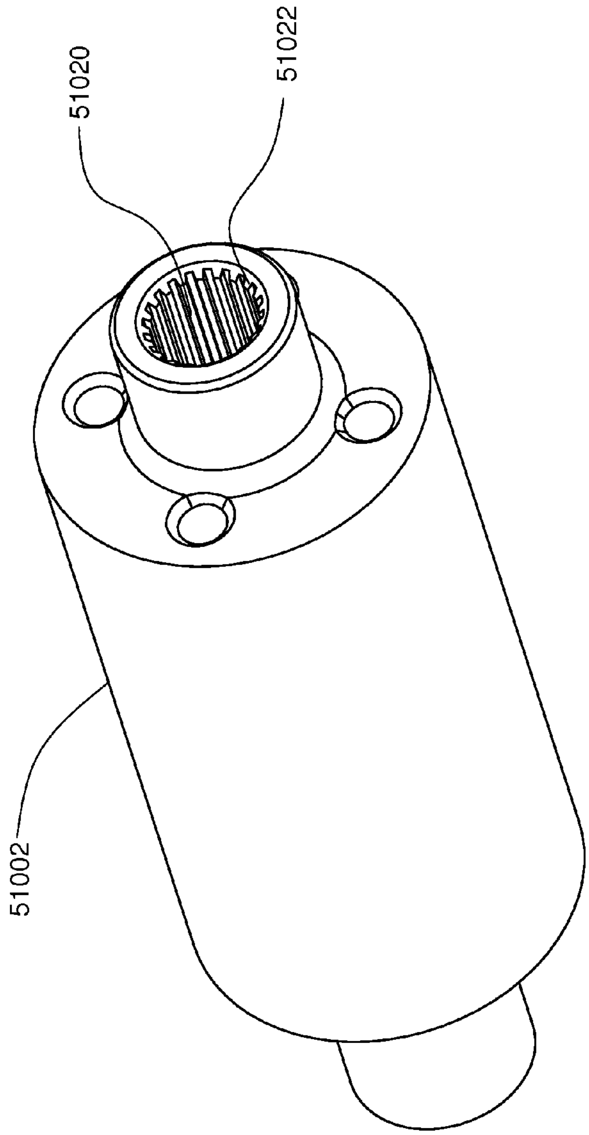
Figure 71D:
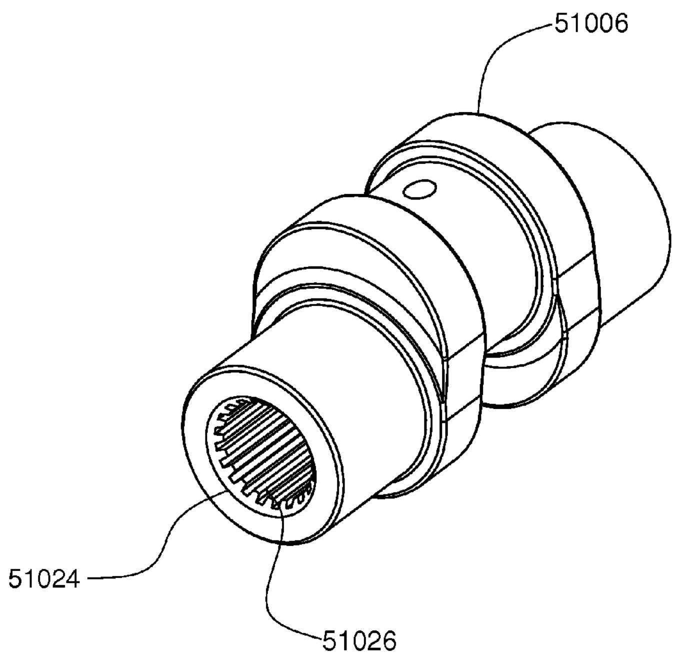
Figure 71F:
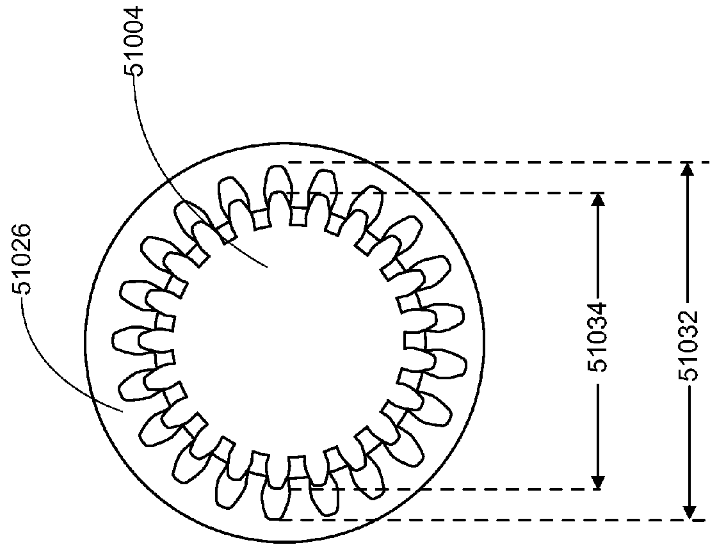
Figure 71E:
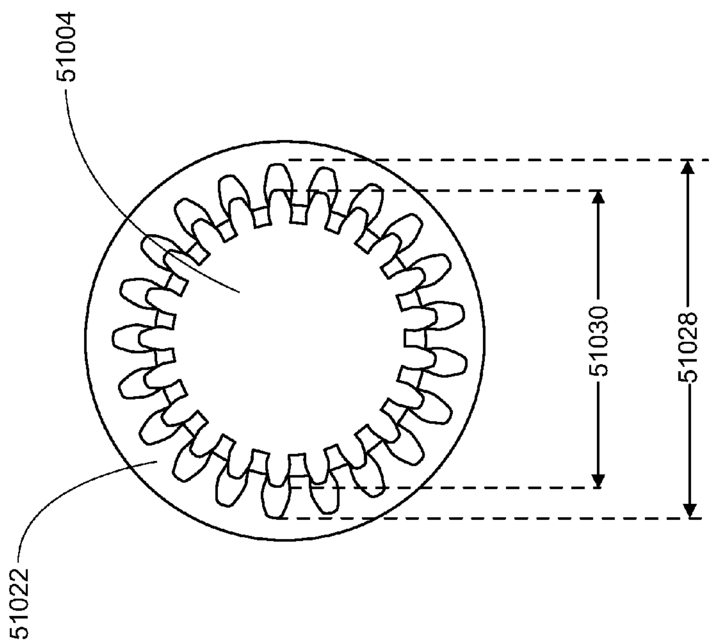
Figure 71G:
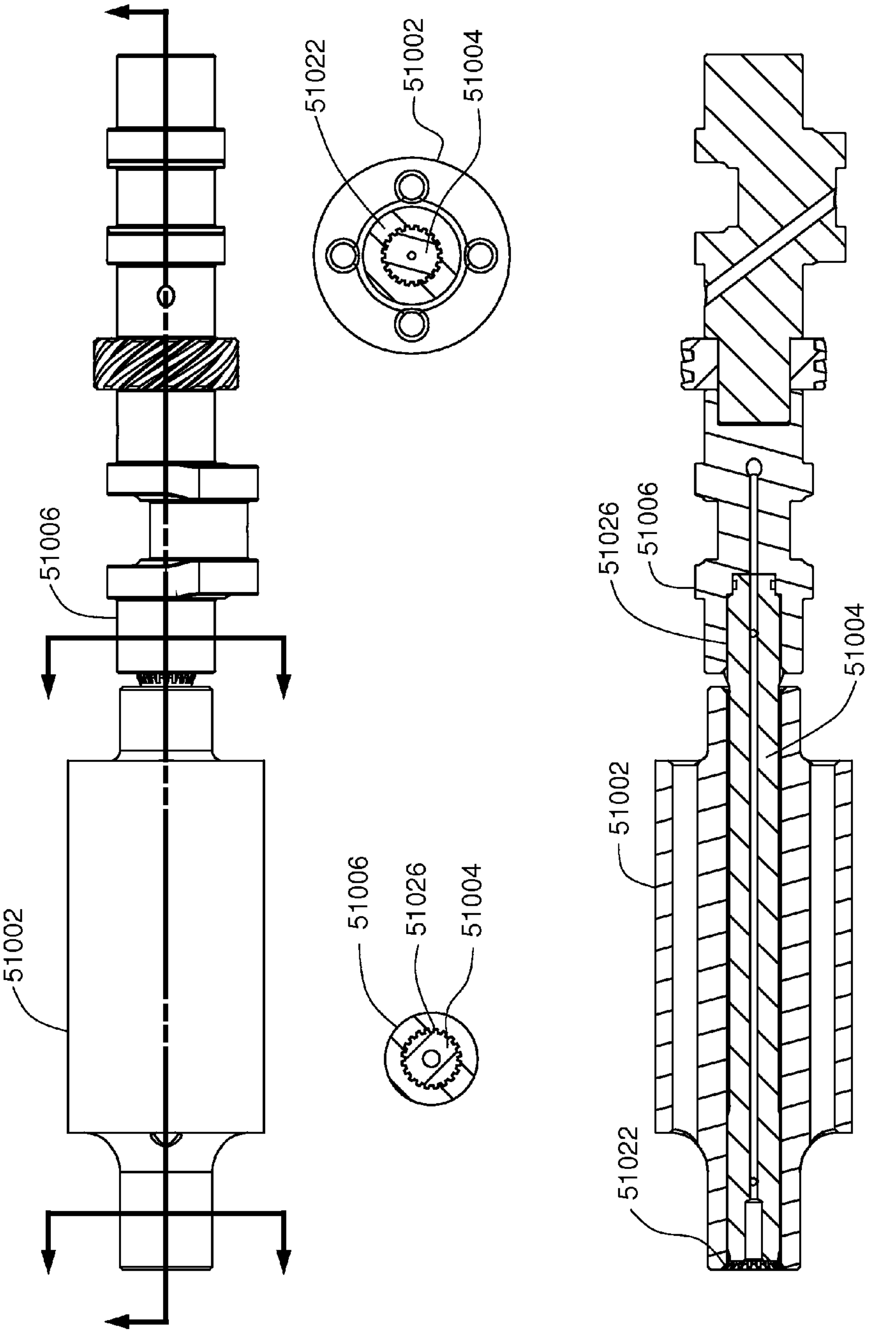
Figure 72:
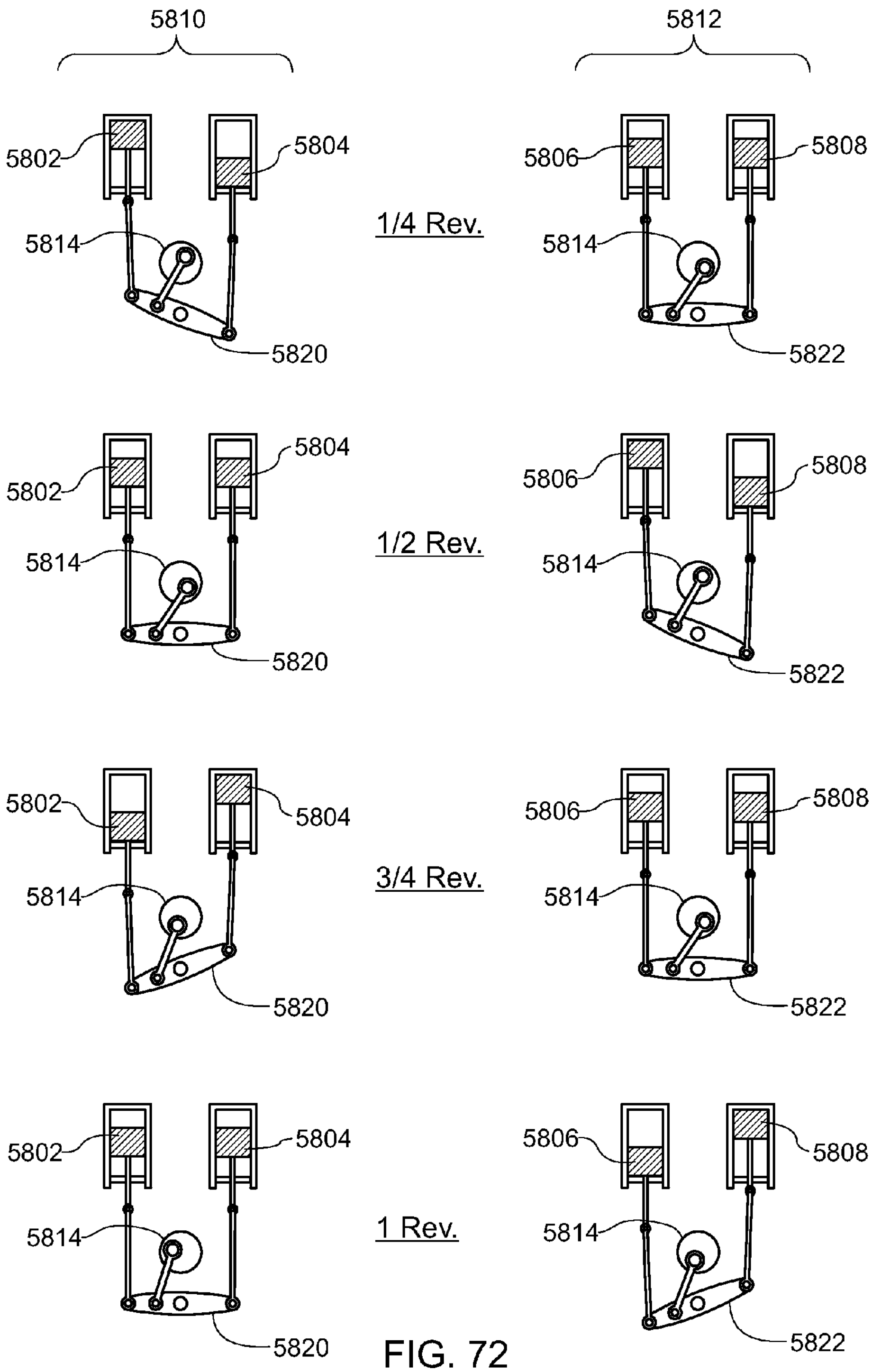
Figure 73A:
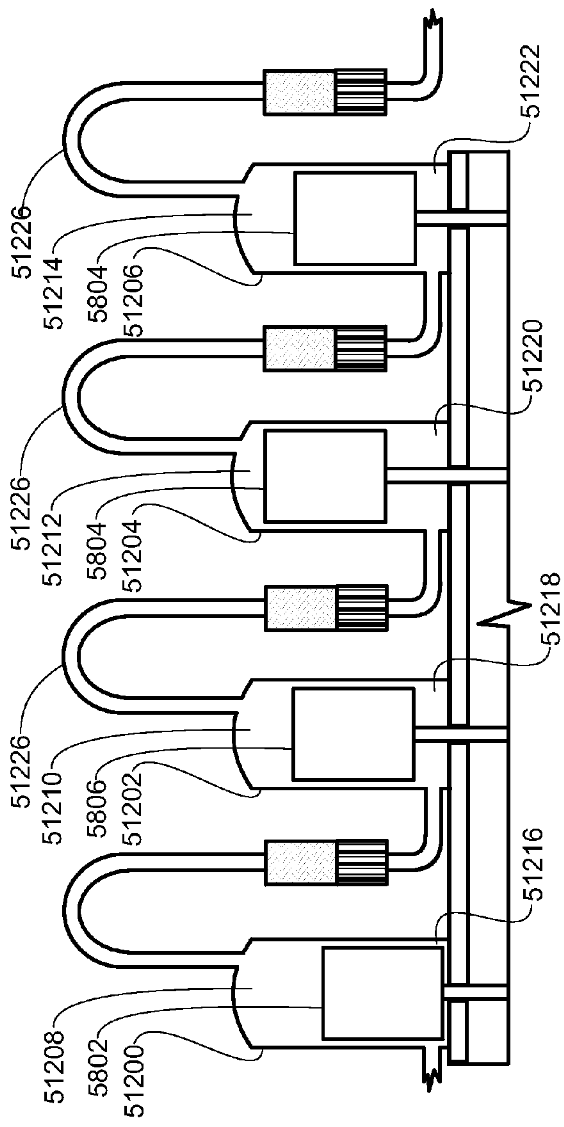
Figure 73B:
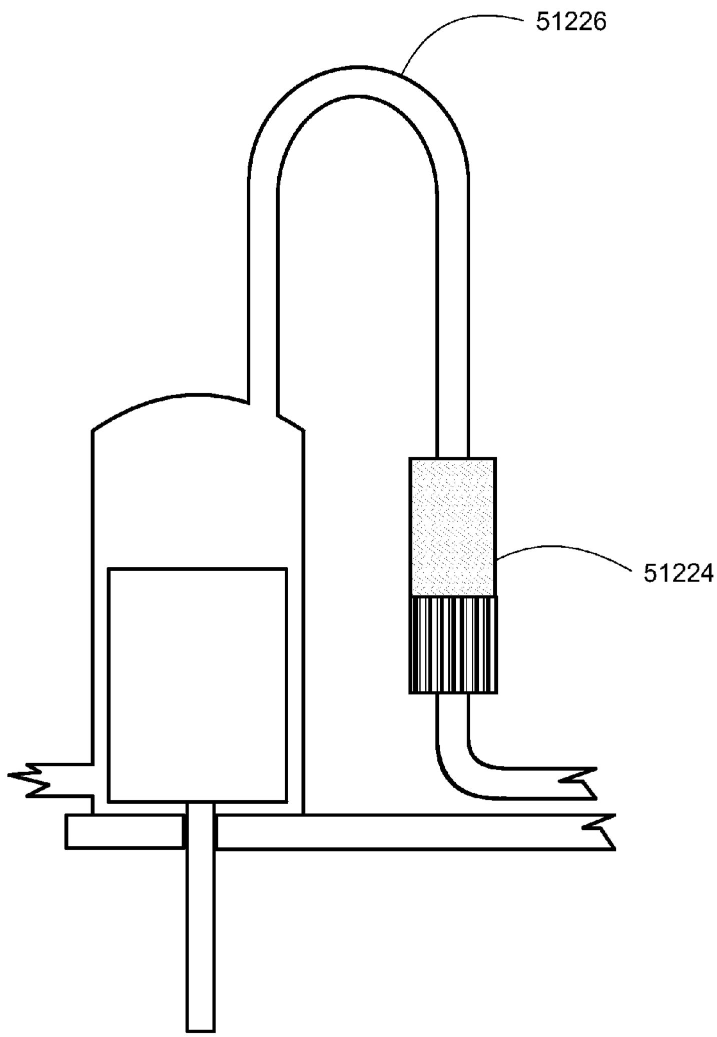
Figure 73C:
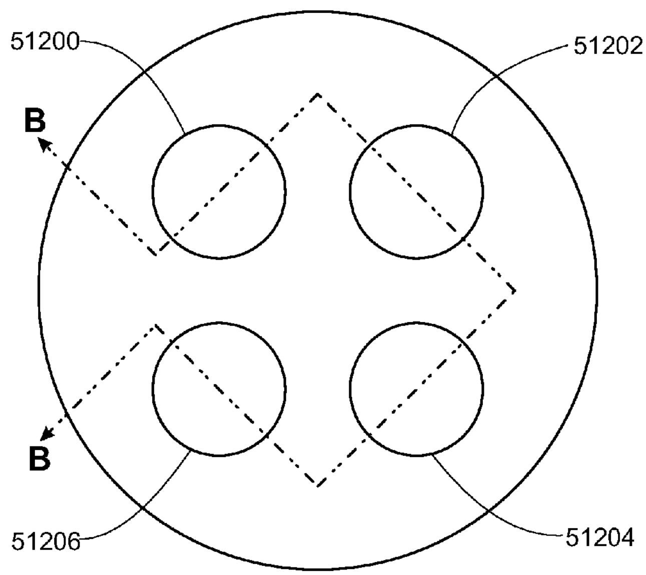
Figure 74A:
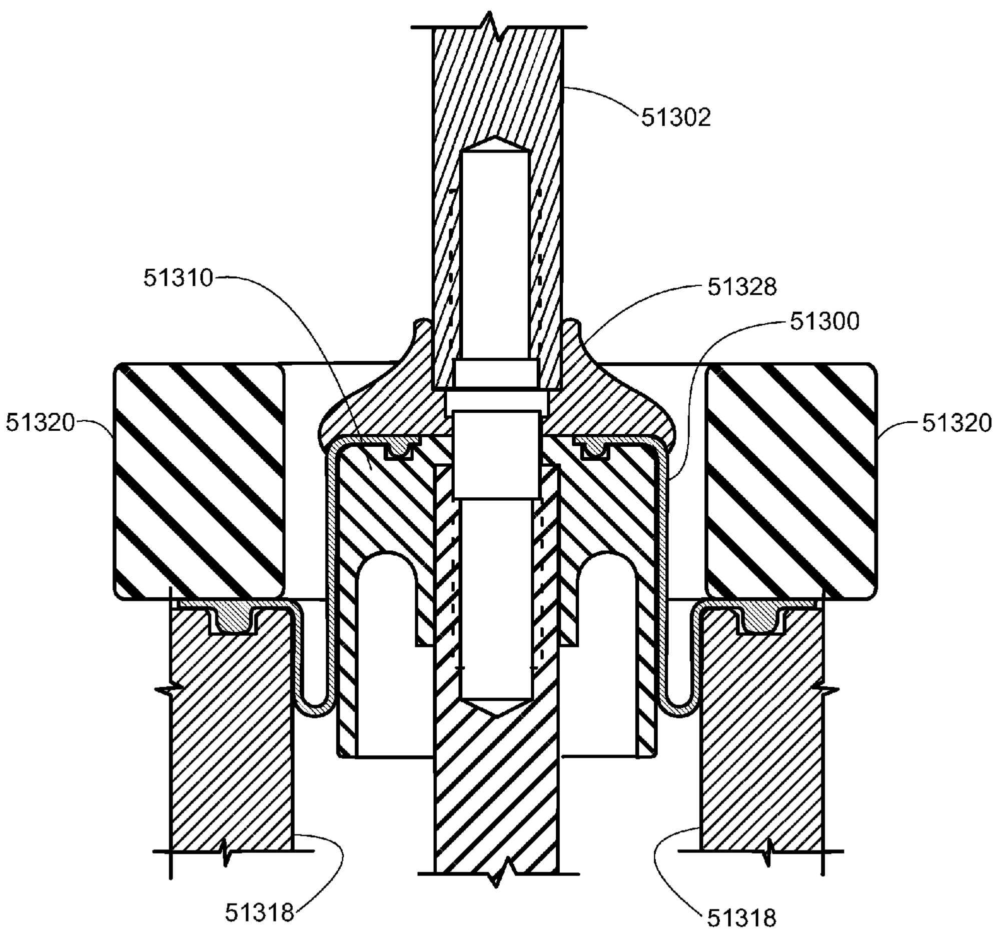
Figure 74B:
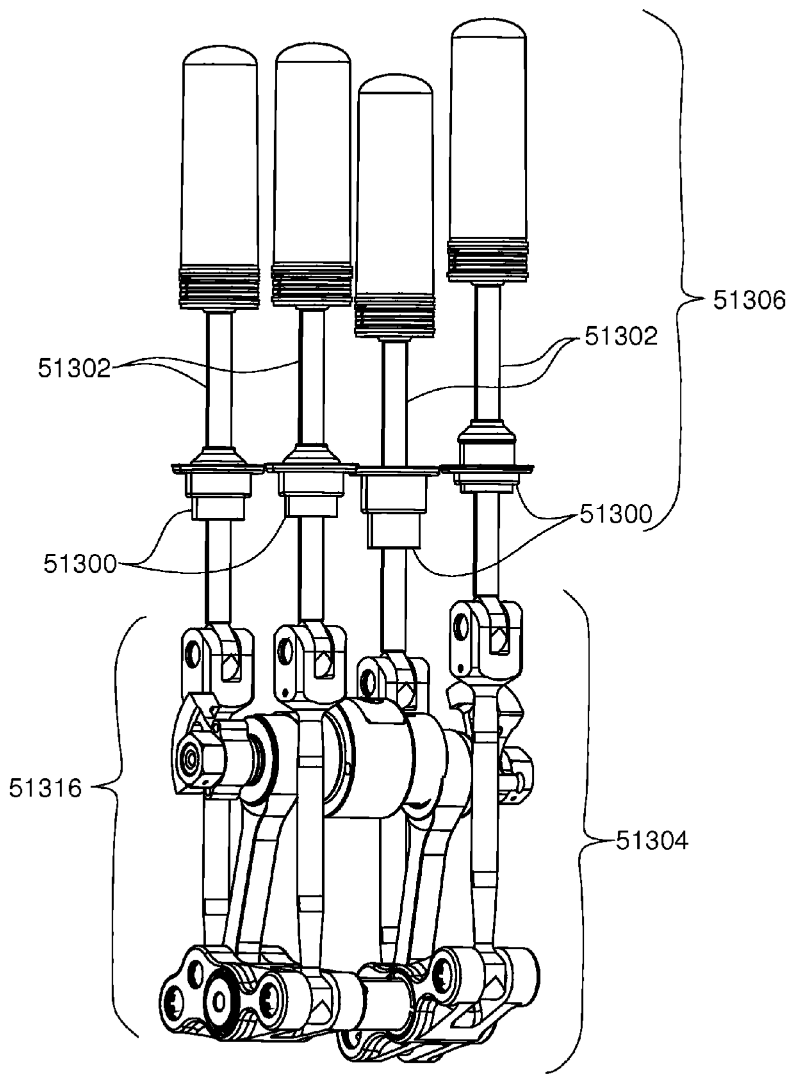
Figure 74C:
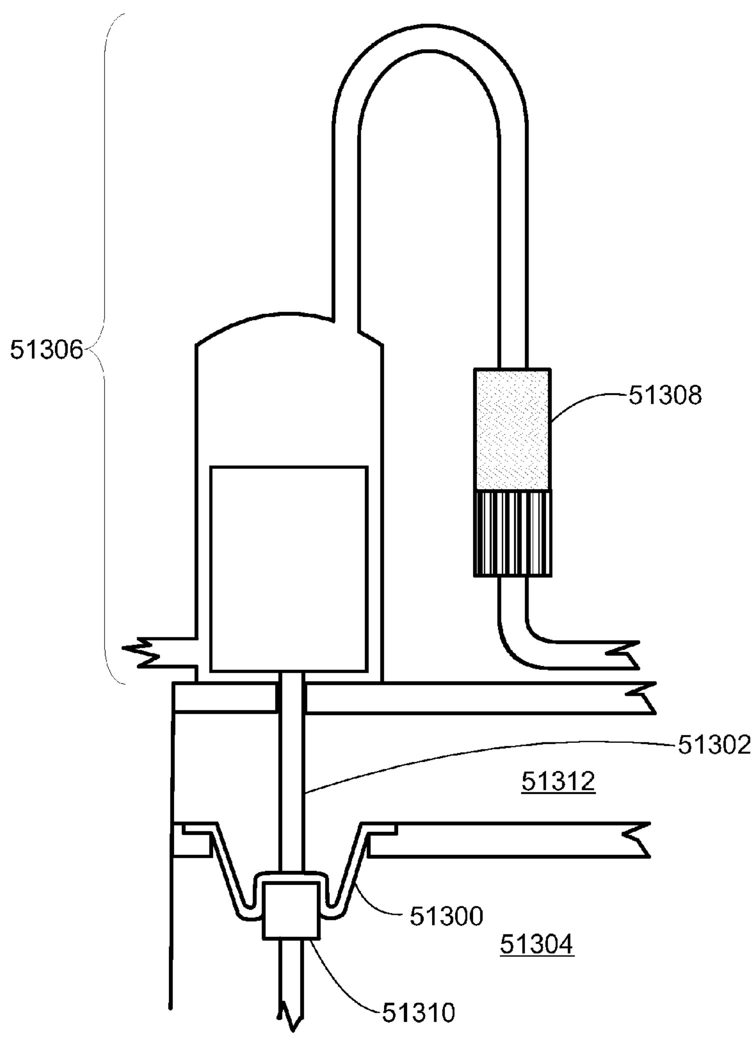
Figure 74D:
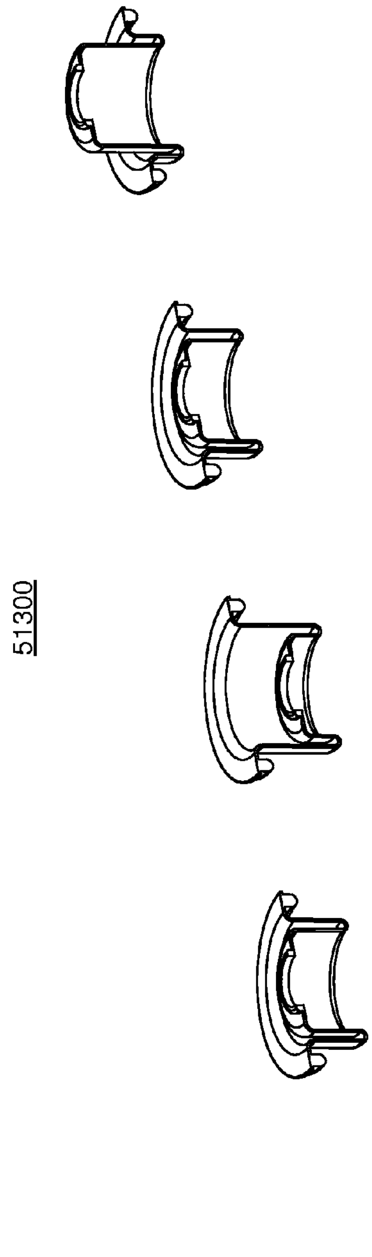
Figure 74E:
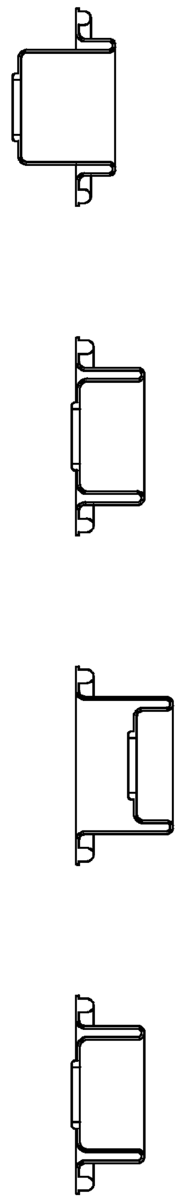
Figure 74F:
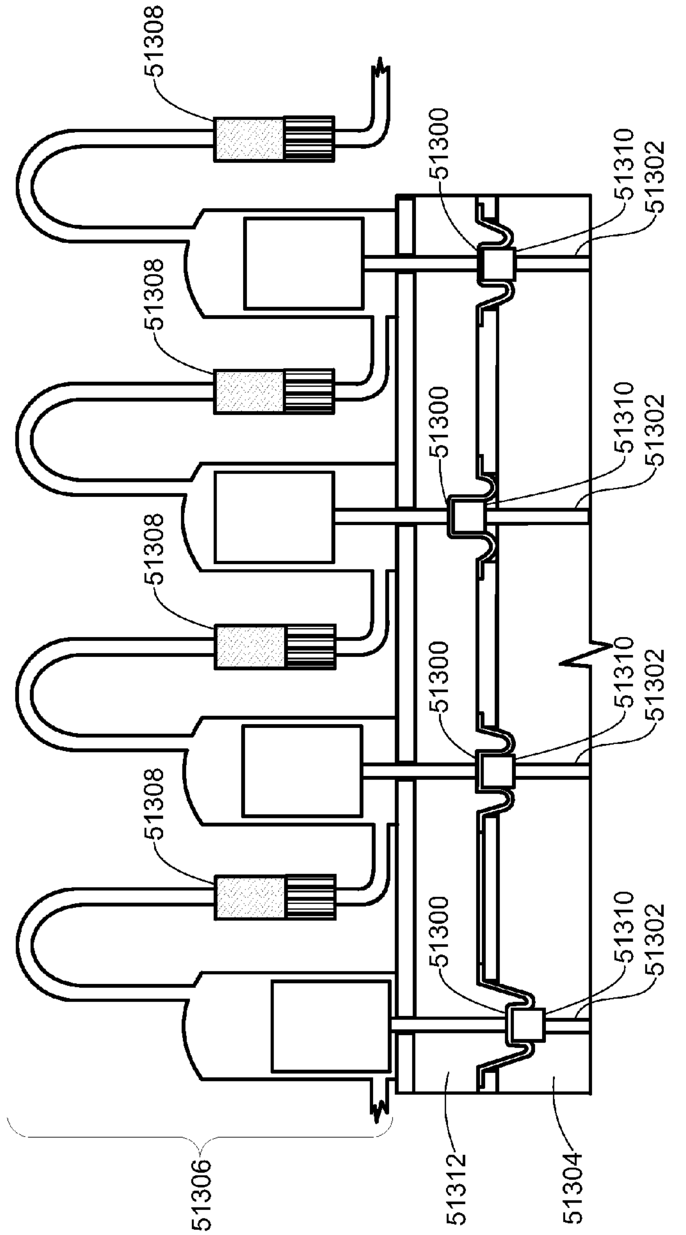
Figure 74G:
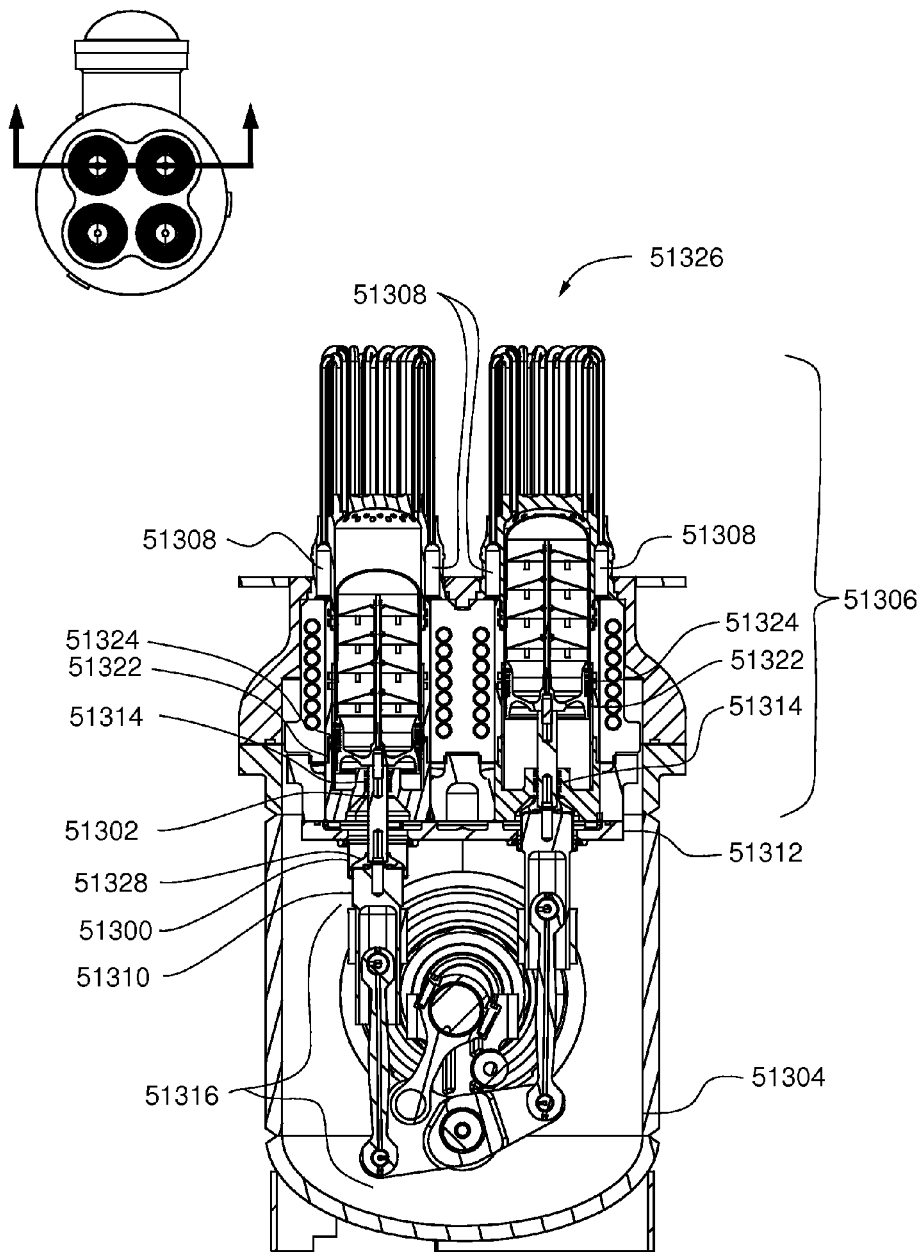
Figure 76E:
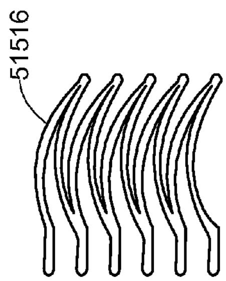
Figure 76F:
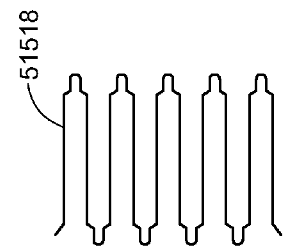
Figure 76G:
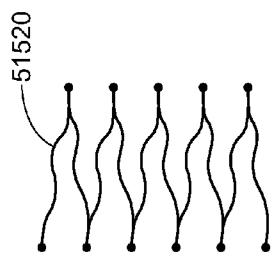
Figure 76B:
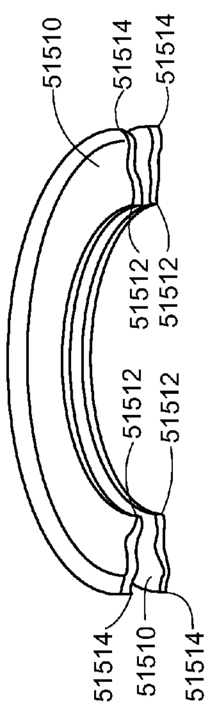
Figure 76C:
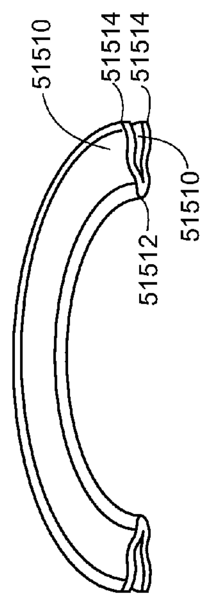
Figure 76D:
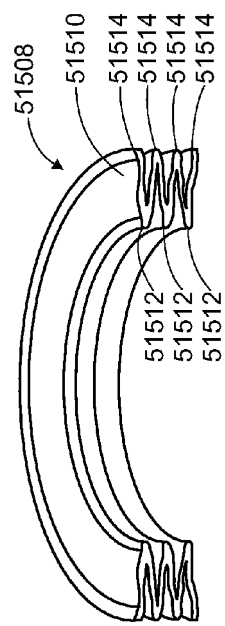
Figure 76H:
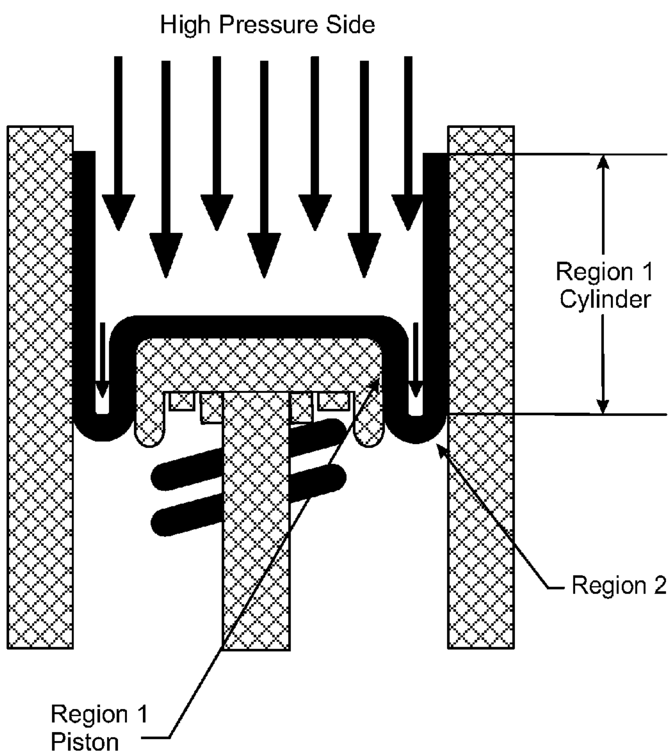
Figure 77:
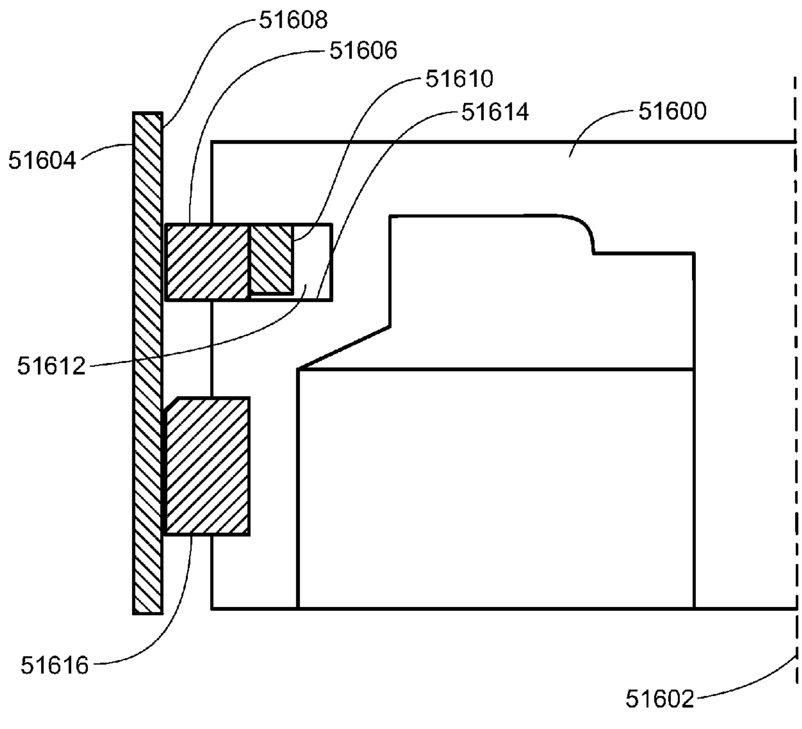
Figure 78:
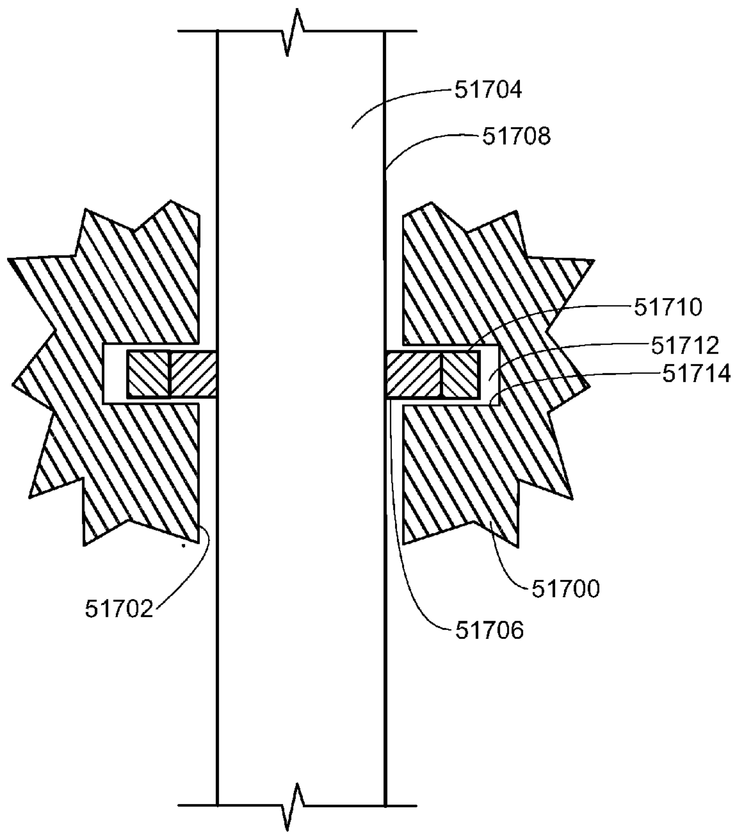
Figure 79A:
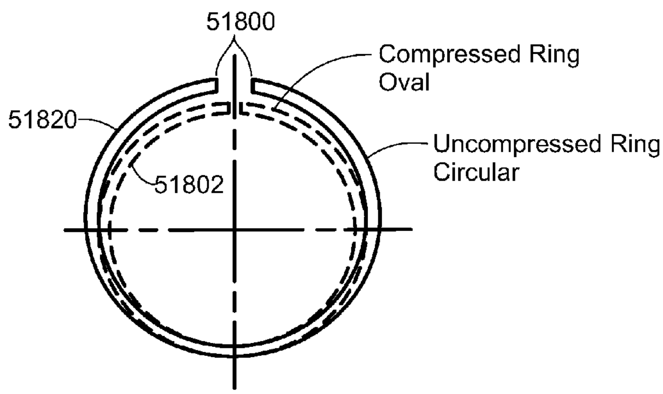
Figure 79B:
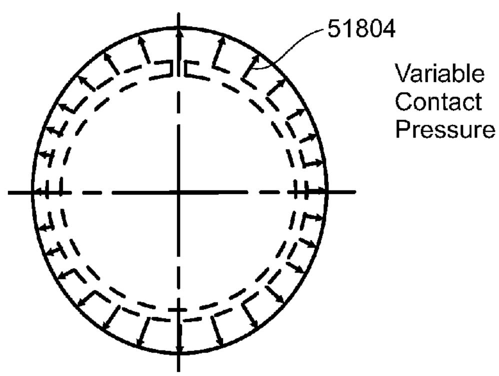
Figure 79C:
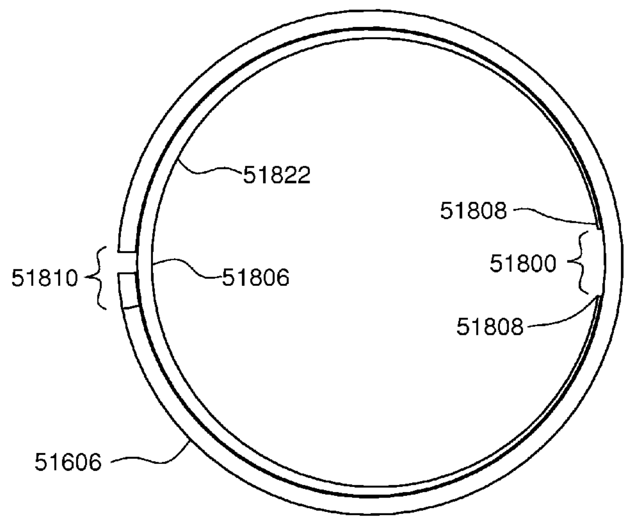
Figure 79D:
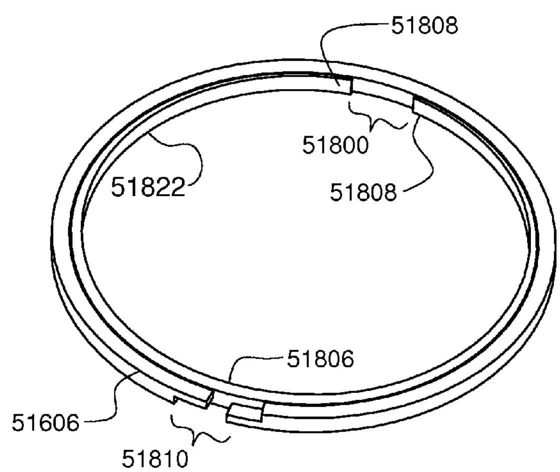
Figure 79E:
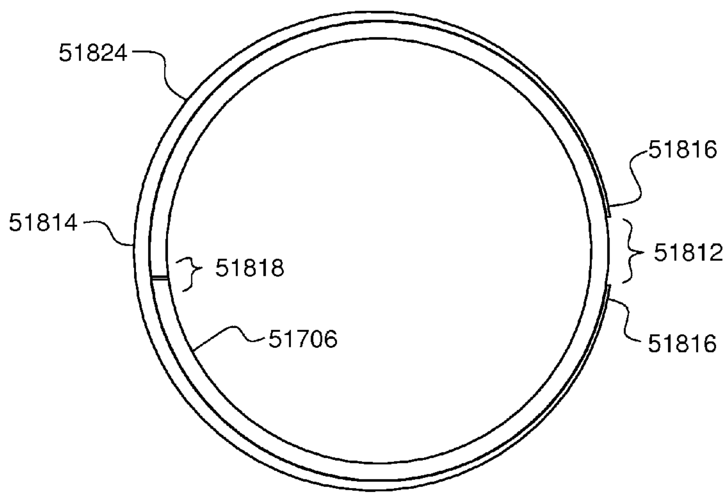
Figure 79F:
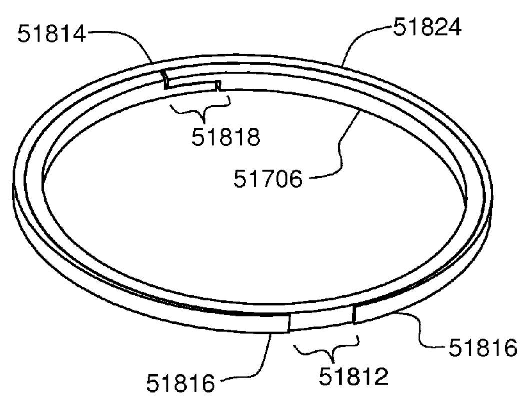
Figure 80A:
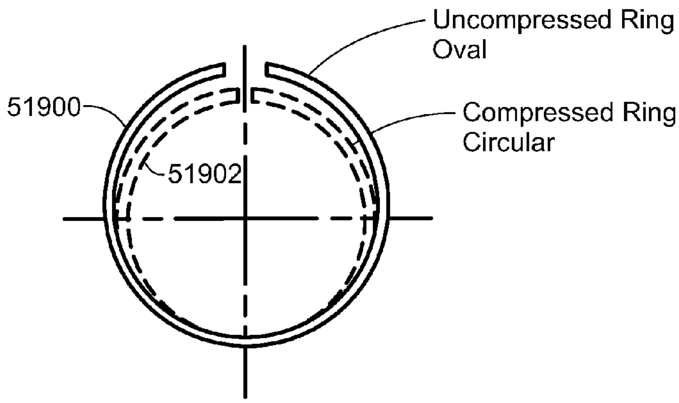
Figure 80B:
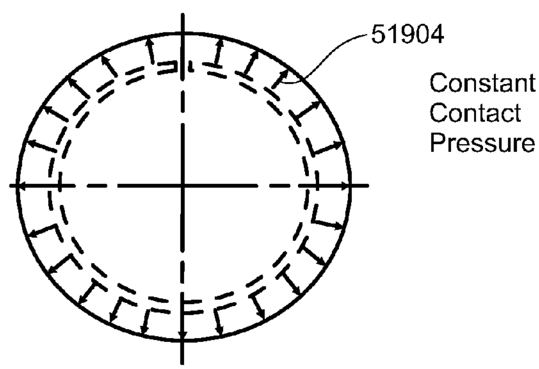
Figure 81A:
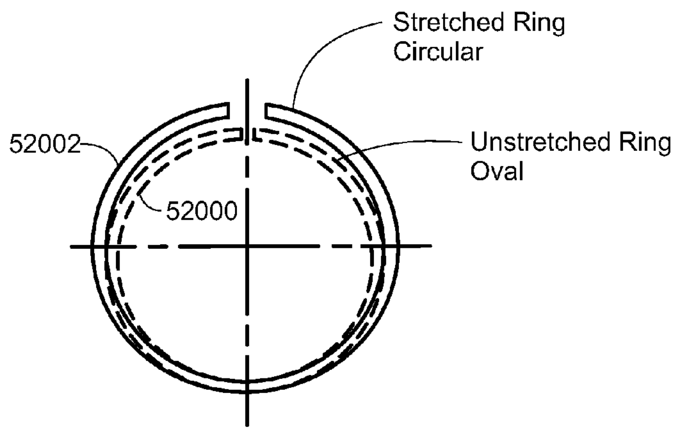
Figure 81B:
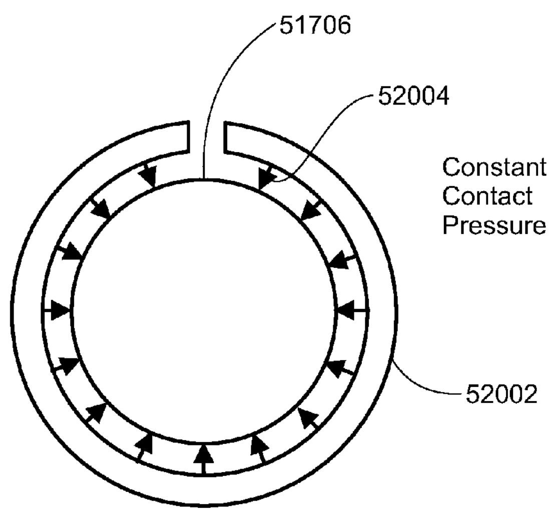
Figure 83:
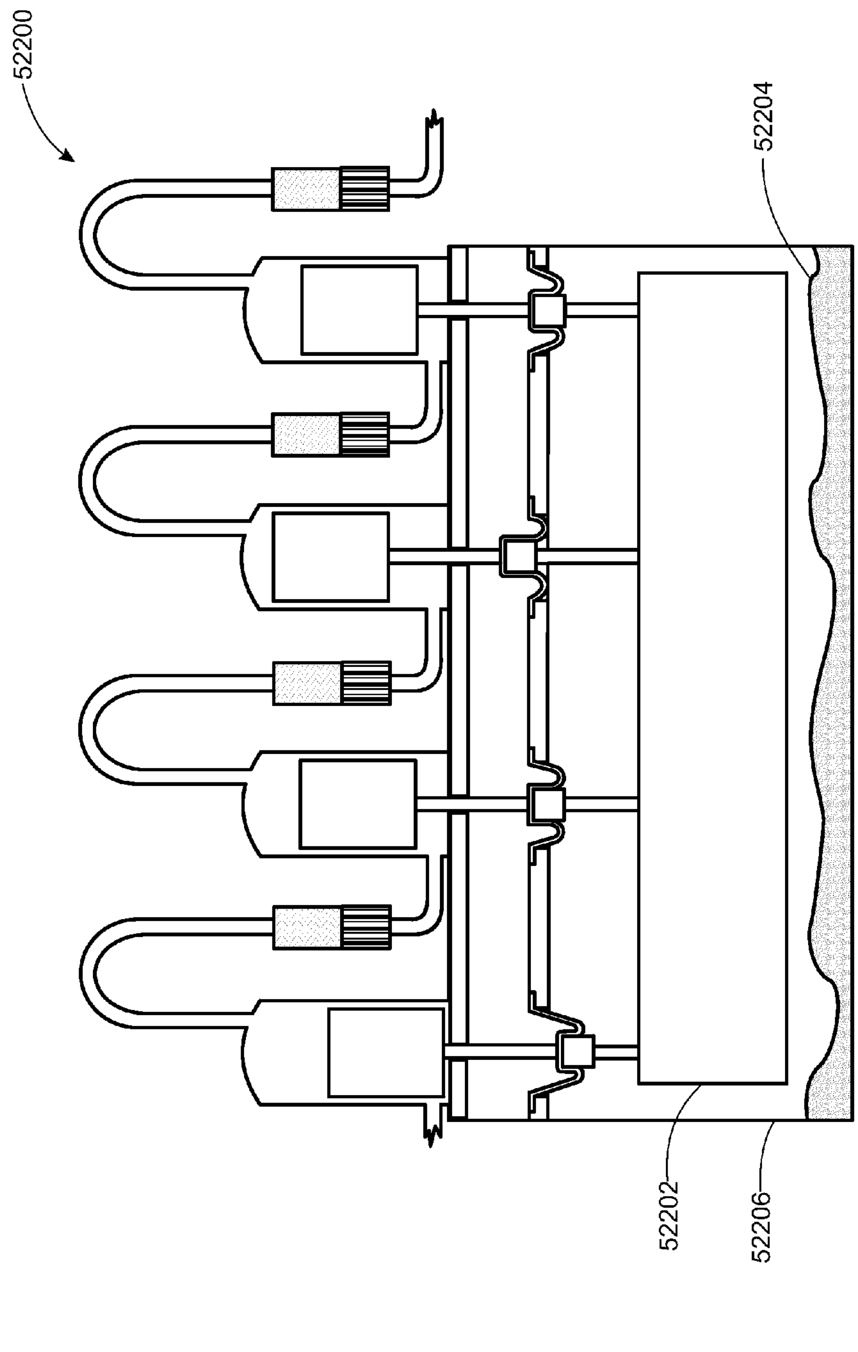
Figure 84B:
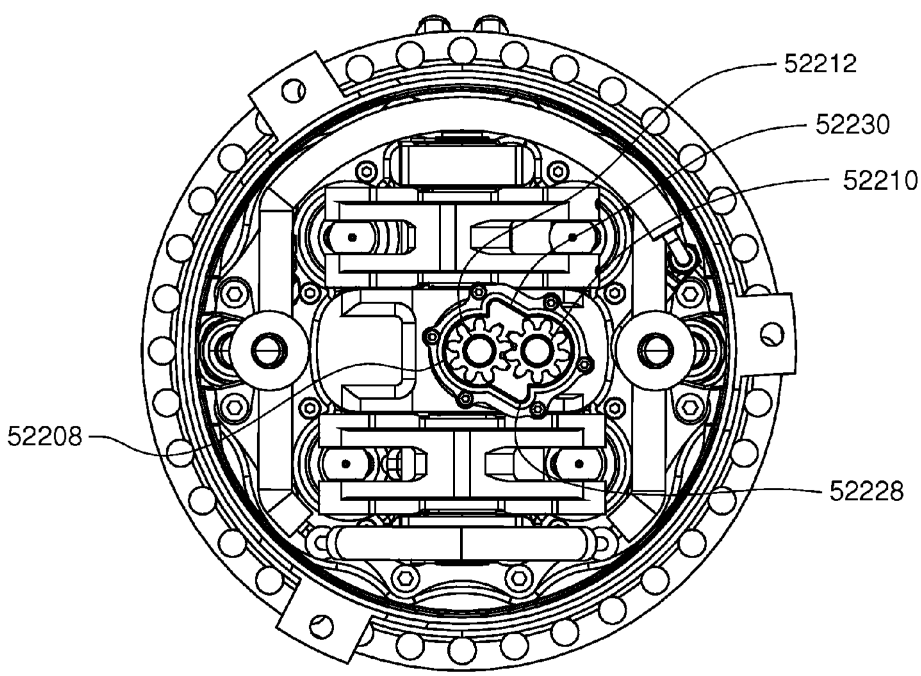
Figure 85:
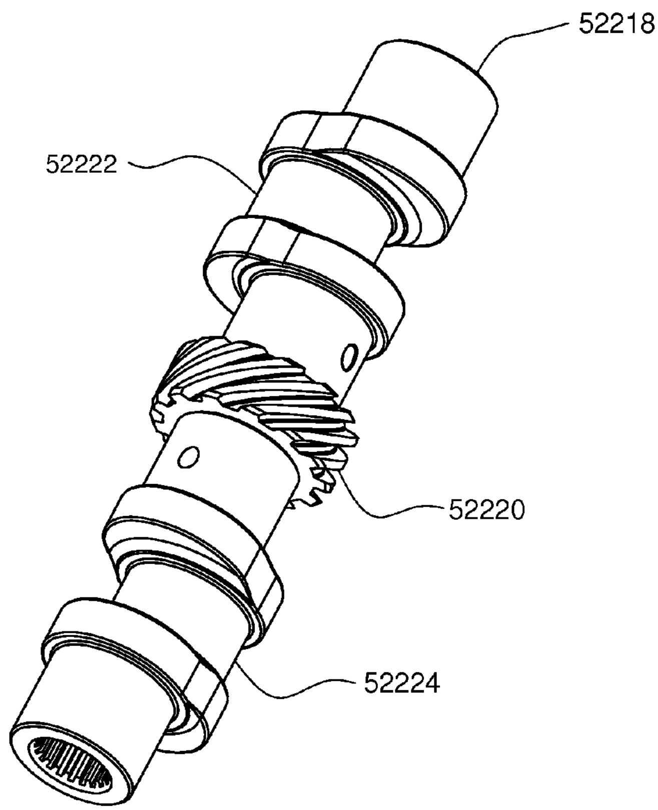
Figure 86A:
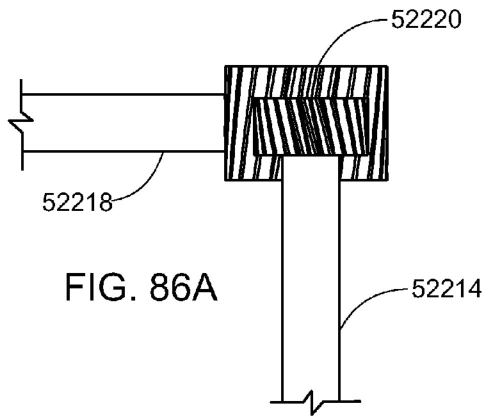
Figure 86B:
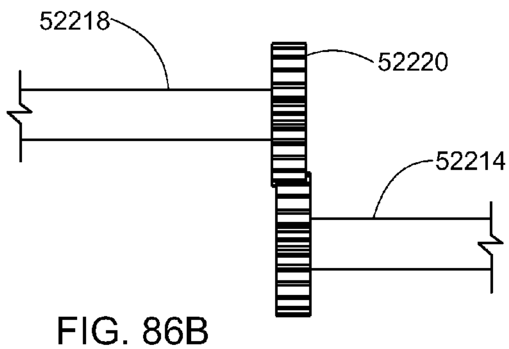
Figure 86C:
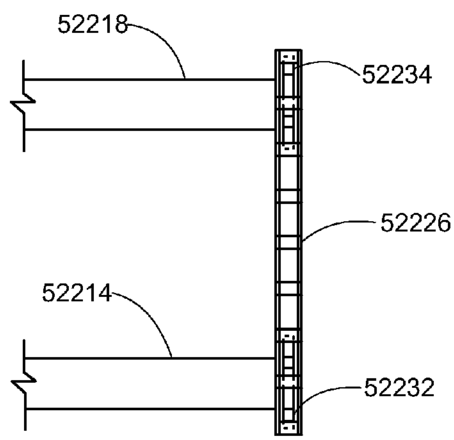
Figure 87A:
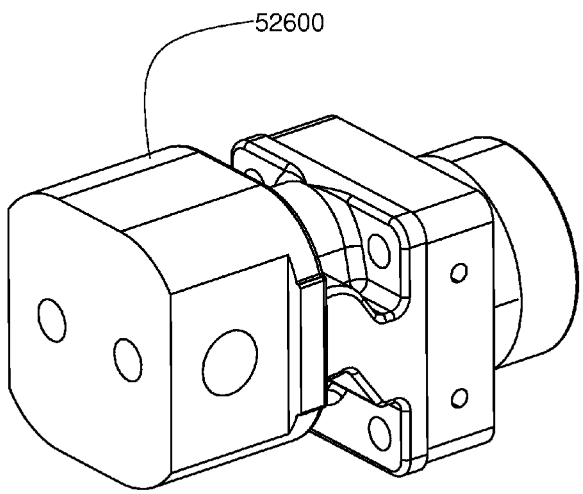
Figure 87B:
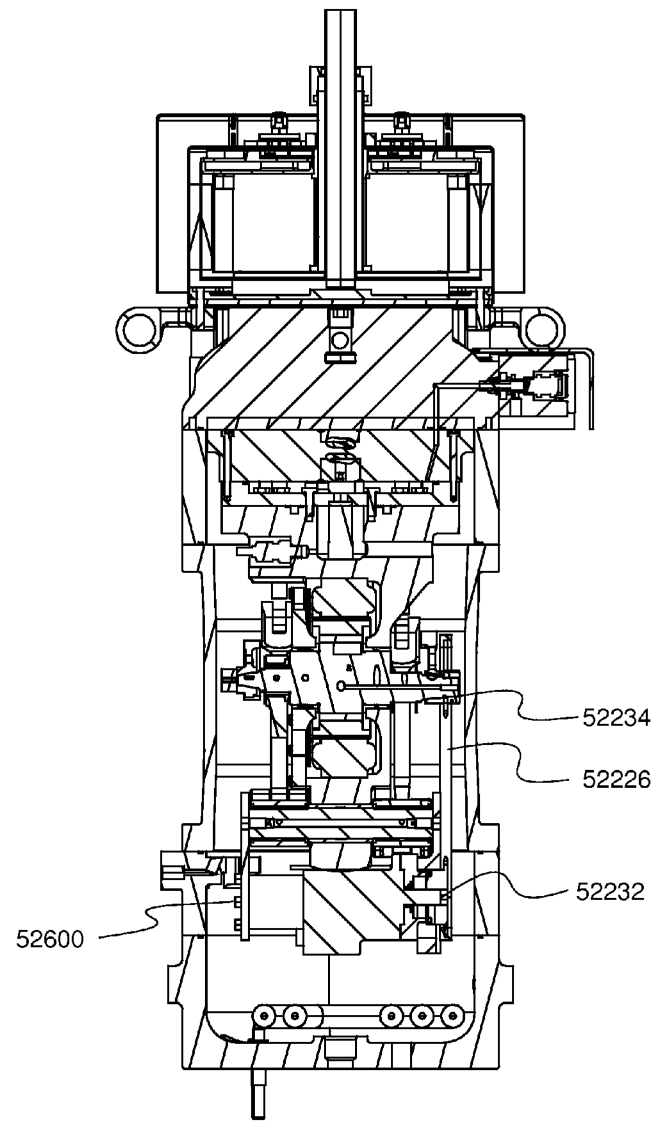
Figure 88A:
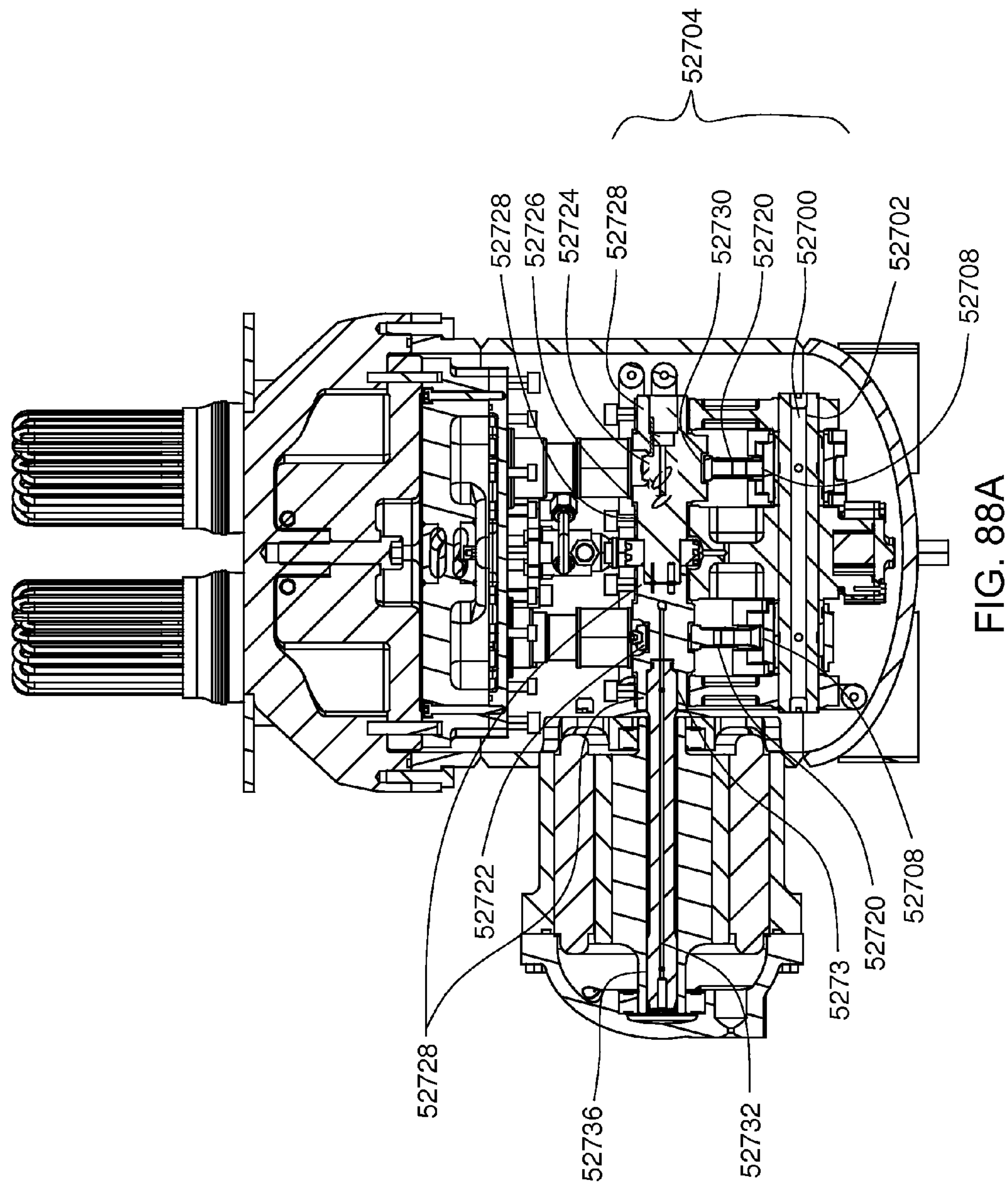
Figure 88B:
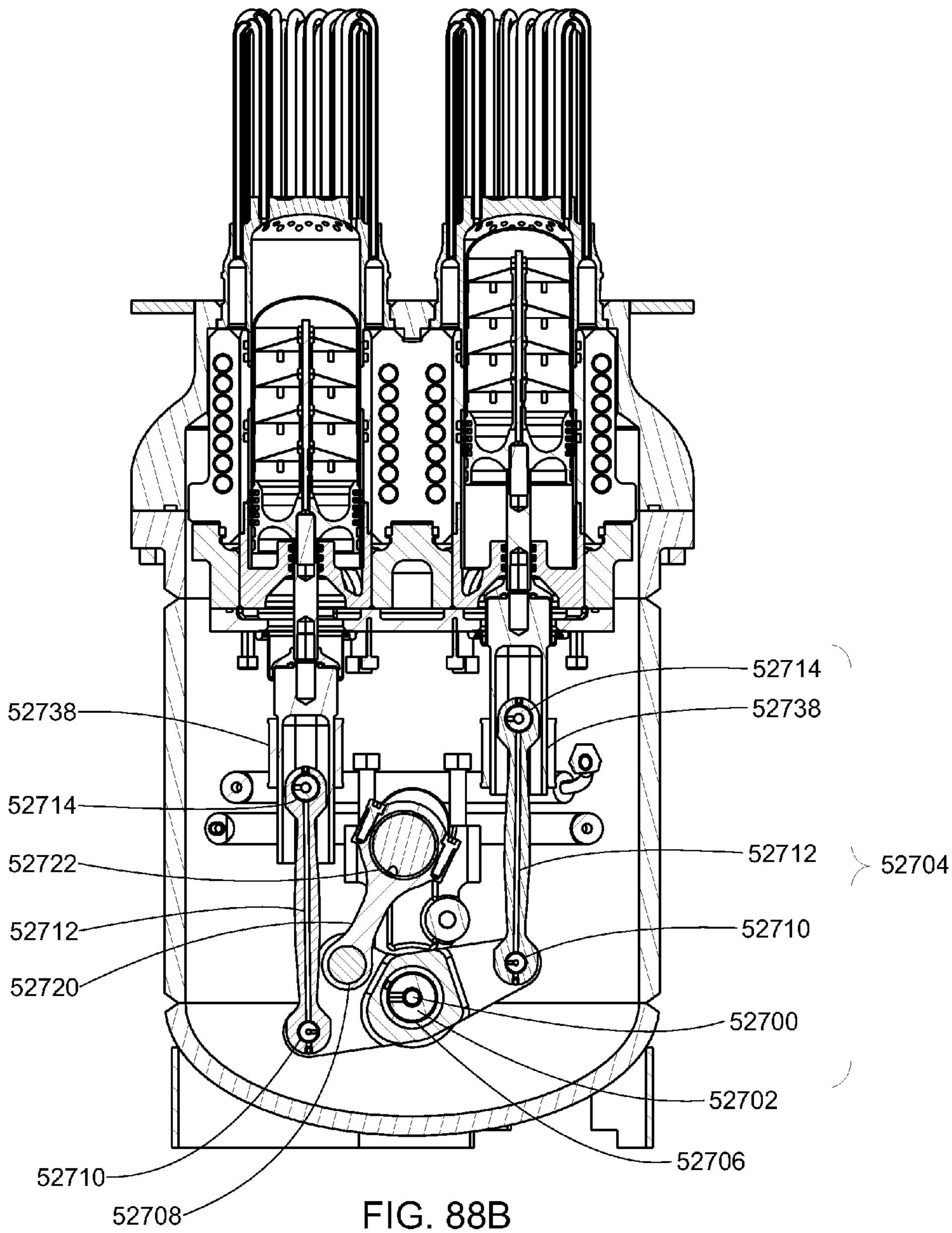
Figure 88C:
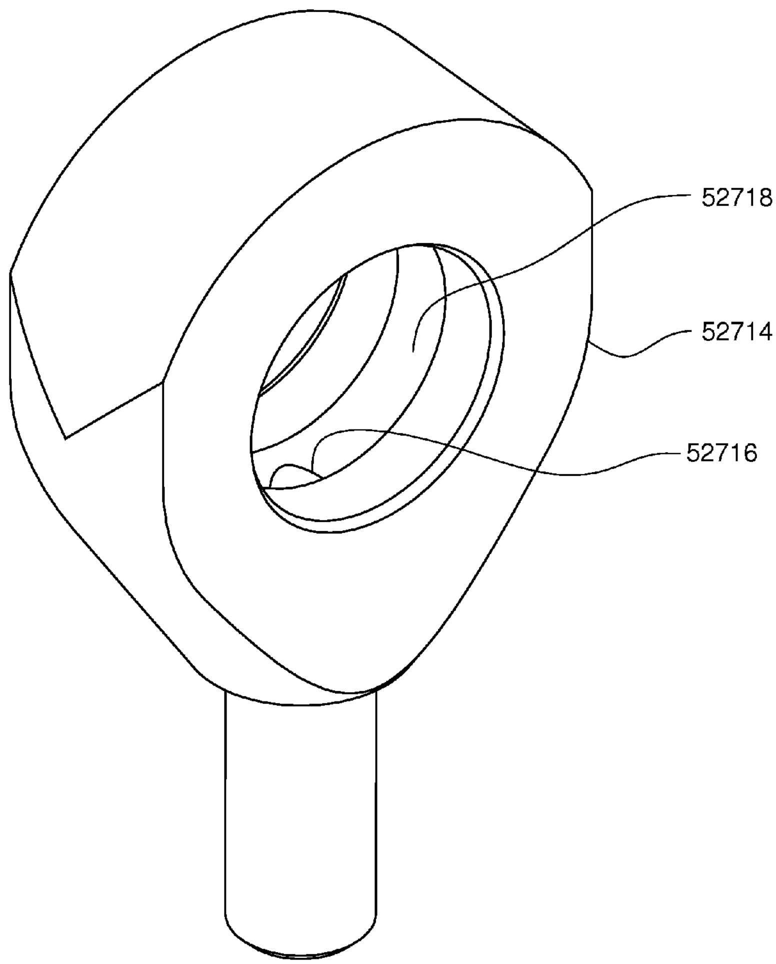
Figure 88D:
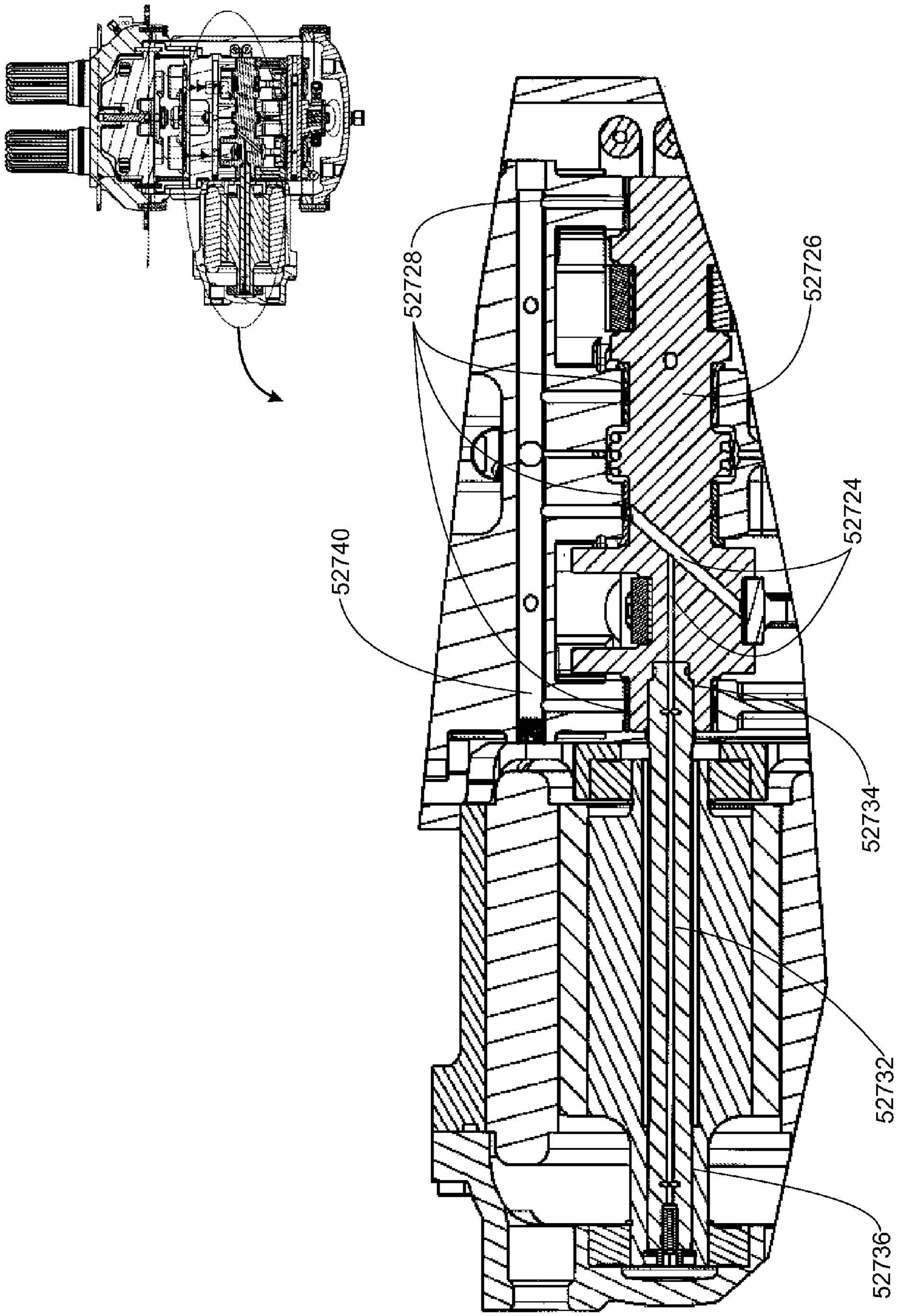
Figure 89A:
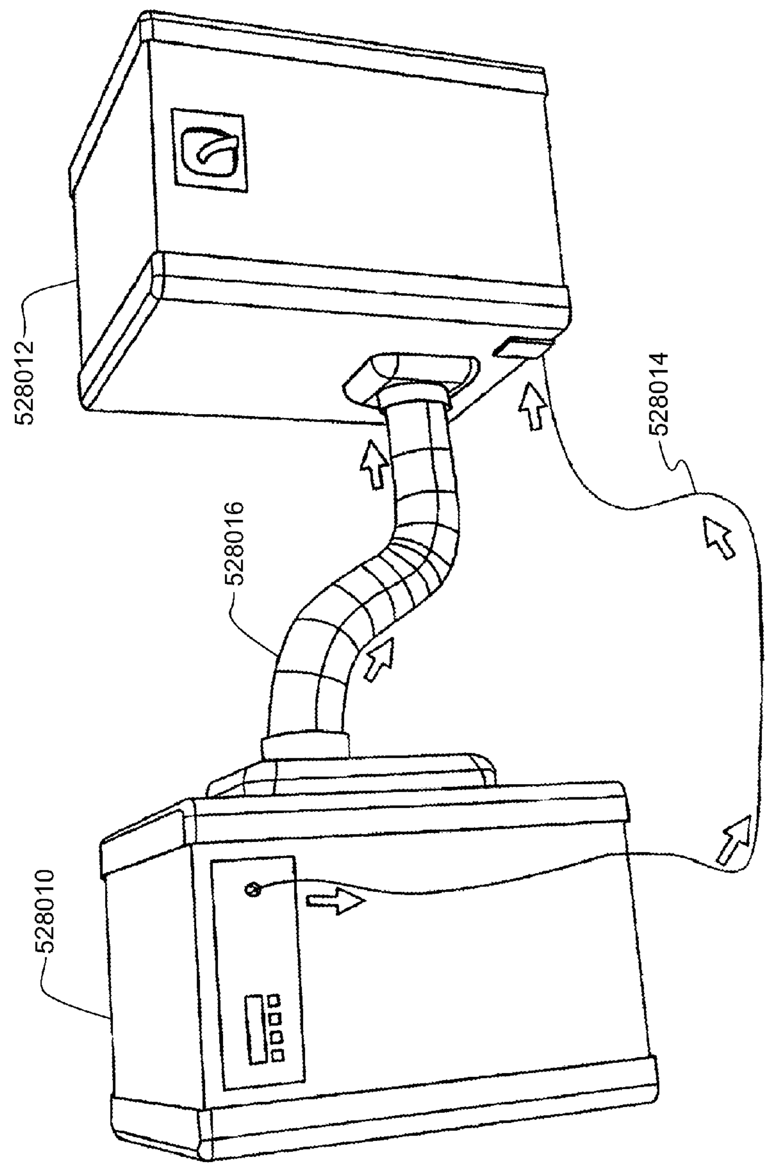
Figure 89B:
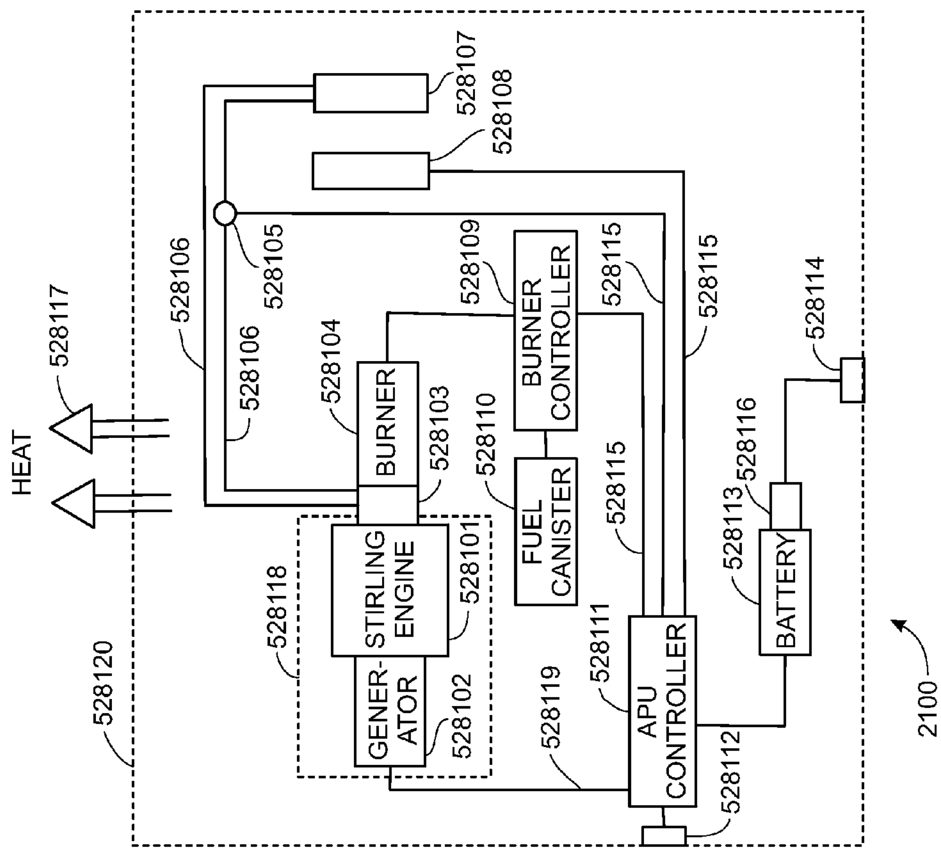

FIG. 45C is an exploded view of the exemplary embodiment of the regenerative blower;

FIG. 45D is a detailed view of the outer surface of the upper section of the housing for the exemplary embodiment of the regenerative blower;

FIG. 45E is a detailed view of the inner surface of the upper section of the housing for the exemplary embodiment of the regenerative blower;

FIG. 45F is a detailed view of the inner surface of the lower section of the housing for the exemplary embodiment of the regenerative blower;

FIG. 45G is a detailed view of the outer surface of the lower section of the housing for the exemplary embodiment of the regenerative blower;

FIG. 45H is a cross-section view of the exemplary embodiment of the regenerative blower;

FIG. 45I is a cross-section view of the exemplary embodiment of the regenerative blower;

FIG. 45J is a cross-section view of the exemplary embodiment of the regenerative blower;

FIG. 45K is a schematic of the exemplary embodiment of the regenerative blower assembly;

FIG. 45L is a cross-section view of the exemplary embodiment of the regenerative blower;

FIG. 46 is a detailed view of the impeller assembly for the exemplary embodiment of the regenerative blower;

FIG. 46A is a cross-section view of the impeller assembly according to one embodiment;

FIG. 47 is an assembly view of the level sensor assembly according to one embodiment;

FIG. 47A is an exploded view of the exemplary embodiment of the level sensor assembly;

FIG. 47B is cross-section view of the settling tank within the level sensor housing according to one embodiment;

FIG. 47C is cross-section view of the blowdown sensor and product level sensor reservoirs within the level sensor housing according to one embodiment;

FIG. 48 is an isometric view of level sensor assembly according to one embodiment;

FIG. 48A is cross-section view of the level sensor assembly according to one embodiment;

FIG. 49 is an isometric view of the front side of the bearing feed-water pump according to one embodiment;

FIG. 49A is an isometric view of the back side of the bearing feed-water pump according to one embodiment;

FIG. 50 is a schematic of the flow path of the source water for the exemplary embodiment of the water vapor distillation apparatus;

FIG. 50A is a schematic of the source water entering the heat exchanger according to one embodiment;

FIG. 50B is a schematic of the source water passing through the heat exchanger according to one embodiment;

FIG. 50C is a schematic of the source water exiting the heat exchanger according to one embodiment;

FIG. 50D is a schematic of the source water passing through the regenerative blower according to one embodiment;

FIG. 50E is a schematic of the source water exiting the regenerative blower and entering according to one embodiment;

FIG. 51 is a schematic of the flow paths of the product water for the exemplary embodiment the water vapor distillation apparatus;

FIG. 51A is a schematic of the product water exiting the evaporator/condenser assembly and entering the level sensor housing according to one embodiment;

FIG. 51B is a schematic of the product water entering the product level sensor reservoir within the level sensor housing according to one embodiment;

FIG. 51C is a schematic of the product water exiting the product level sensor reservoir and entering the heat exchanger according to one embodiment;

FIG. 51D is a schematic of the product water passing through the heat exchanger according to one embodiment;

FIG. 51E is a schematic of the product water exiting the heat exchanger according to one embodiment;

FIG. 51F is a schematic of the product water entering the bearing-feed water reservoir within the level sensor housing according to one embodiment;

FIG. 51G is a schematic of the product water exiting the level sensor housing and entering the bearing feed-water pump according to one embodiment;

FIG. 51H is a schematic of the product water exiting the bearing feed-water pump and entering the regenerative blower according to one embodiment;

FIG. 51I is a schematic of the product water exiting the regenerative blower and entering the level sensor housing according to one embodiment;

FIG. 52is a schematic of the vent paths for the exemplary embodiment the water vapor distillation apparatus;

FIG. 52A is a schematic of the vent path allowing air to exit the blowdown sensor reservoir and enter the evaporative/condenser according to one embodiment;

FIG. 52B is a schematic of the vent path allowing air to exit the product sensor reservoir and enter the evaporative/condenser according to one embodiment;

FIG. 52C is a schematic of the vent path allowing air to exit the evaporator/condenser assembly according to one embodiment;

FIG. 53 is a schematic of the low-pressure steam entering the tubes of the evaporator/condenser assembly from the sump according to one embodiment;

FIG. 54 is a chart illustrating the relationship between the differential pressure across the regenerative blower and the amount of energy required to produce one liter of product according to one embodiment;

FIG. 55 is a depiction of a monitoring system for distributed utilities according to one embodiment;

FIG. 56 is a depiction of a distribution system for utilities according to one embodiment;

FIG. 57 is a conceptual flow diagram of a possible embodiment of a system incorporating another embodiment of the water vapor distillation apparatus;

FIG. 57A is a schematic block diagram of a power source for use with the system shown in FIG. 57;

FIGS. 58A-58E depict the principle of operation of a Stirling cycle machine;

FIG. 59 shows a view of a rocking beam drive in accordance with one embodiment;

FIG. 60 shows a view of a rocking beam drive in accordance with one embodiment;

FIG. 61 shows a view of an engine in accordance with one embodiment;

FIGS. 62A-62D depicts various views of a rocking beam drive in accordance with one embodiment;

FIG. 63 shows a bearing style rod connector in accordance with one embodiment;

FIGS. 64A-64B show a flexure in accordance with one embodiment;

FIG. 65 shows a four cylinder double rocking beam drive arrangement in accordance with one embodiment;

FIG. 66 shows a cross section of a crankshaft in accordance with one embodiment;

FIGS. 67-68 diagrammatically depict a membrane pump;

FIG. 69 shows an illustrative view of one embodiment of a water vending apparatus appliance;

FIG. 70 depicts one embodiment of a water vending apparatus appliance;

FIG. 71A shows a view of an engine in accordance with one embodiment;

FIG. 71B shows a crankshaft coupling in accordance with one embodiment;

FIG. 71C shows a view of a sleeve rotor in accordance with one embodiment;

FIG. 71D shows a view of a crankshaft in accordance with one embodiment;

FIG. 71E is a cross section of the sleeve rotor and spline shaft in accordance with one embodiment;

FIG. 71F is a cross section of the crankshaft and the spline shaft in accordance with one embodiment;

FIG. 71G are various views a sleeve rotor, crankshaft and spline shaft in accordance with one embodiment;

FIG. 72 shows the operation of pistons of an engine in accordance with one embodiment;

FIG. 73A shows an unwrapped schematic view of a working space and cylinders in accordance with one embodiment;

FIG. 73B shows a schematic view of a cylinder, heater head, and regenerator in accordance with one embodiment;

FIG. 73C shows a view of a cylinder head in accordance with one embodiment;

FIG. 74A shows a view of a rolling diaphragm, along with supporting top seal piston and bottom seal piston, in accordance with one embodiment;

FIG. 74B shows an exploded view of a rocking beam driven engine in accordance with one embodiment;

FIG. 74C shows a view of a cylinder, heater head, regenerator, and rolling diaphragm, in accordance with one embodiment;

FIGS. 74D-74E show various views of a rolling diaphragm during operation, in accordance with one embodiment;

FIG. 74F shows an unwrapped schematic view of a working space and cylinders in accordance with one embodiment;

FIG. 74G shows a view of an external combustion engine in accordance with one;

FIGS. 75A-75E show views of various embodiments of a rolling diaphragm;

FIG. 76A shows a view of a metal bellows and accompanying piston rod and pistons in accordance with one embodiment;

FIGS. 76B-76D show views of metal bellows diaphragms, in accordance with one embodiment;

FIGS. 76E-76G show a view of metal bellows in accordance with various embodiments;

FIG. 76H shows a schematic of a rolling diaphragm identifying various load regions;

FIG. 77 shows a view of a piston and piston seal in accordance with one embodiment;

FIG. 78 shows a view of a piston rod and piston rod seal in accordance with one embodiment;

FIG. 79A shows a view of a piston seal backing ring in accordance with one embodiment;

FIG. 79B shows a pressure diagram for a backing ring in accordance with one embodiment;

FIGS. 79C and 79D show a piston seal in accordance with one embodiment;

FIGS. 79E and 79F show a piston rod seal in accordance with one embodiment;

FIG. 80A shows a view of a piston seal backing ring in accordance with one embodiment;

FIG. 80B shows a pressure diagram for a piston seal backing ring in accordance with one embodiment;

FIG. 81A shows a view of a piston rod seal backing ring in accordance with one embodiment;

FIG. 81B shows a pressure diagram for a piston rod seal backing ring in accordance with one embodiment;

FIG. 82 shows views of a piston guide ring in accordance with one embodiment;

FIG. 83 shows an unwrapped schematic illustration of a working space and cylinders in accordance with one embodiment;

FIG. 84A shows a view of an engine in accordance with one embodiment;

FIG. 84B shows a view of an engine in accordance with one embodiment;

FIG. 85 shows a view of a crankshaft in accordance with one embodiment;

FIGS. 86A and 86C show various configurations of pump drives in accordance with various embodiments;

FIG. 87A show various views of an oil pump in accordance with one embodiment;

FIG. 87B shows another view of an engine;

FIGS. 88A and 88B show views of an engine in accordance with one embodiment;

FIG. 88C shows a view of a coupling joint in accordance with one embodiment;

FIG. 88D shows a view of a crankshaft and spline shaft of an engine in accordance with one embodiment;

FIG. 89A shows an illustrative view of a generator connected to one embodiment of the apparatus; and FIG. 89B shows a schematic representation of an auxiliary power unit for providing electrical power and heat to a water vapor distillation apparatus.

DETAILED DESCRIPTION OF THE PREFERRED EMBODIMENTS

Definitions. As used in this description and the accompanying claims, the following terms shall have the meanings indicated, unless the context otherwise requires.

The term "evaporator condenser" is used herein to refer to an apparatus that is a combination evaporator and condenser. Thus, a structure is referred to as an evaporator condenser where the structure itself serves as both. The evaporator condenser structure is referred to herein as an evaporator/condenser, evaporator condenser or evaporator and condenser. Further, in some instances, where either the evaporator or the condenser is being referred to individually, it should be understood that the term is not limiting and refers to the evaporator condenser structure.

The term "fluid" is used herein to include any type of fluid including water. Thus, although the exemplary embodiment and various other embodiments are described herein with reference to water, the scope of the apparatus, system and methods includes any type of fluid. Also, herein, the term "liquid" may be used to indicate the exemplary embodiment, where the fluid is a liquid.

The term "unclean water" is used herein to refer to any water wherein it is desired to make cleaner prior to consuming the water.

The term "cleaner water" is used herein to refer to water that is cleaner as product water than as source water.

The term "source water" refers to any water that enters the apparatus.

The term "product water" refers to the cleaner water that exits the apparatus.

The term "purified", "purifying" or "purification" as used herein, and in any appended claims, refers to reducing the concentration of one or more contaminants or otherwise altering the concentration of one or more contaminants.

The term "specified levels" as used herein refers to some desired level of concentration, as established by a user for a particular application. One instance of a specified level may be limiting a contaminant level in a fluid to carry out an industrial or commercial process. An example is eliminating contaminant levels in solvents or reactants to a level acceptable to enable an industrially significant yield in a chemical reaction (e.g., polymerization). Another instance of a specified level may be a certain contaminant level in a fluid as set forth by a governmental or intergovernmental agency for safety or health reasons. Examples might include the concentration of one or more contaminants in water to be used for drinking or particular health or medical applications, the concentration levels being set forth by organizations such as the World Health Organization or the U.S. Environmental Protection Agency.

The term "system" as used herein may refer to any combination of one or more elements, said elements including but not limited to, a water vapor distillation apparatus (which may be referred to as a water system or a water vapor distillation system), a water vapor distillation apparatus together with a power source, such as a Stirling engine, and a water vending apparatus.

The system is described herein with reference to exemplary embodiments. The term "raw water" is used to refer to any source water entering the water distillation system.

The term "blowdown" as used herein may refer to any water leaving the system having a higher concentration of one or more contaminants than the water had while entering the system. Blowdown may also be referred to as waste water.

Figure 1:
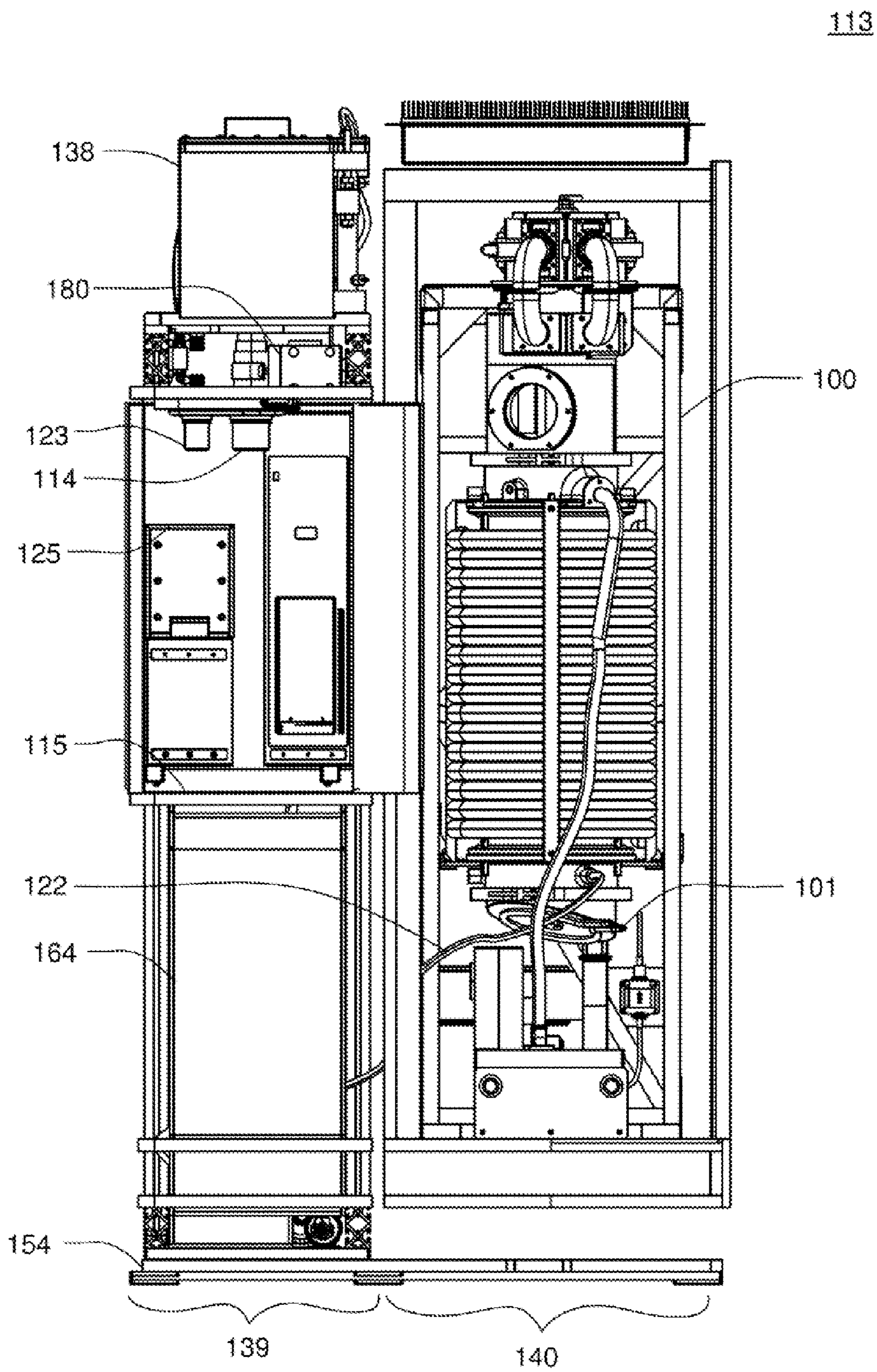
FIG. 1 is front view of internal components of a water vending apparatus according to one embodiment.

Referring now to FIG. 1 a vending apparatus 113 may be configured to accept incoming raw water, perform various steps to increase water quality and drinkability, and dispense cleaner water (also referred to as product water) to a vendee-supplied vessel 121 upon vendee request. A water vapor distillation system 100 may be housed in a vending apparatus 113 to facilitate cleansing raw water. The process by which cleaner water is dispensed to a vessel 121 may begin when raw water enters the vending apparatus 113 through the input conduit 122. The input conduit 122 may be attached the purification system 100 to the primary tank 164 in the dispensing portion 139 and bring the product water to the dispensing portion 139 of the vending apparatus 113.

Figure 6:
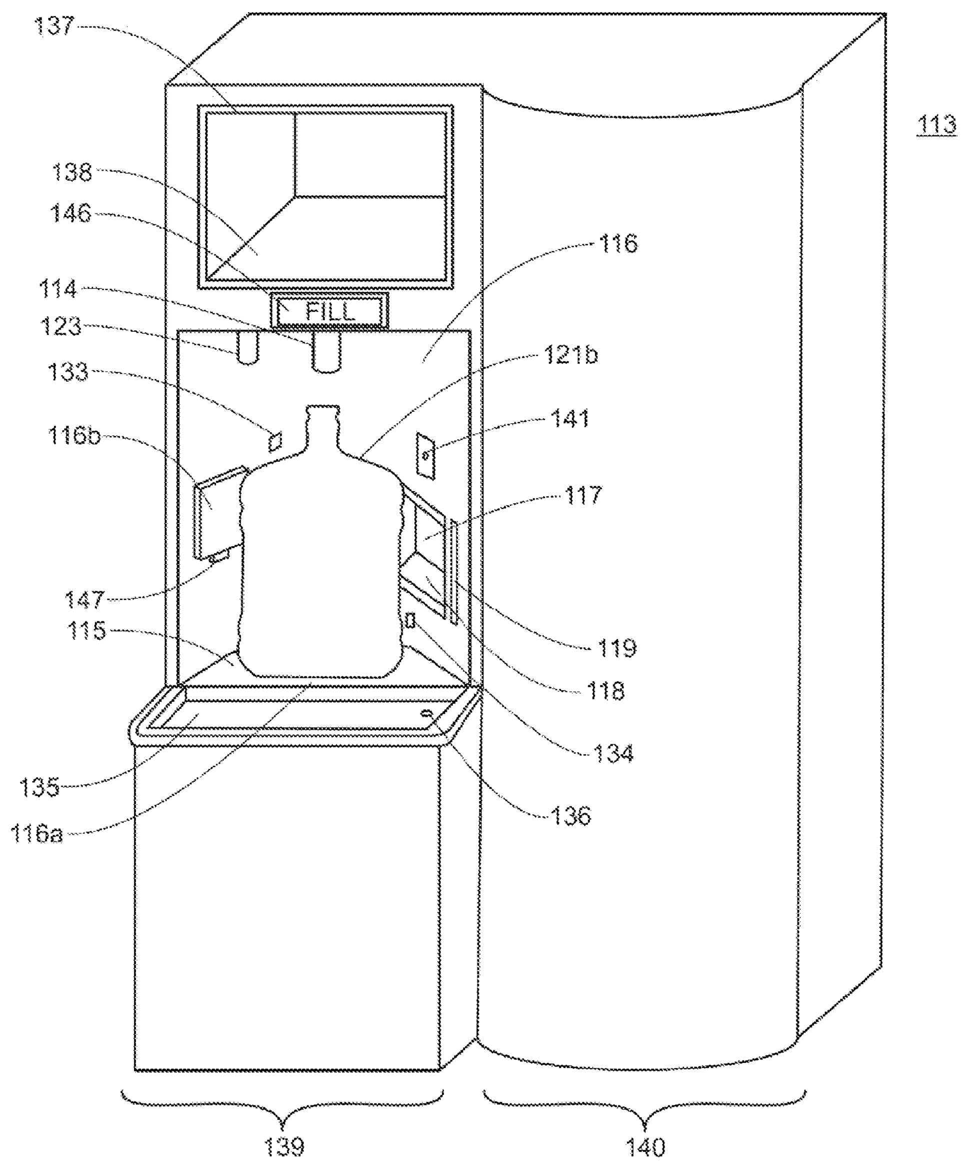
FIG. 6 is a front view of the front view of a water vending apparatus according to one embodiment.

In the exemplary embodiment, referring to FIG. 6, a water vending apparatus 113 may include a dispensing portion 139 situated adjacent to a purification portion 140. Vendee interfaces and filling components may be localized on the dispensing portion 139 whereas the primary purification equipment may reside on the purification portion 140. It may be advantageous to classify, and isolate components in such a manor for maintenance purposes. Additionally, as components within the purification portion 140 may operate at high temperatures, some separation may be necessary to maintain operational efficiency. However, vending apparatus components are not limited to one specific portion, as they may reside on either portion where convenient.

1. Dispensing 1.1 Internal Components

Figure 11:
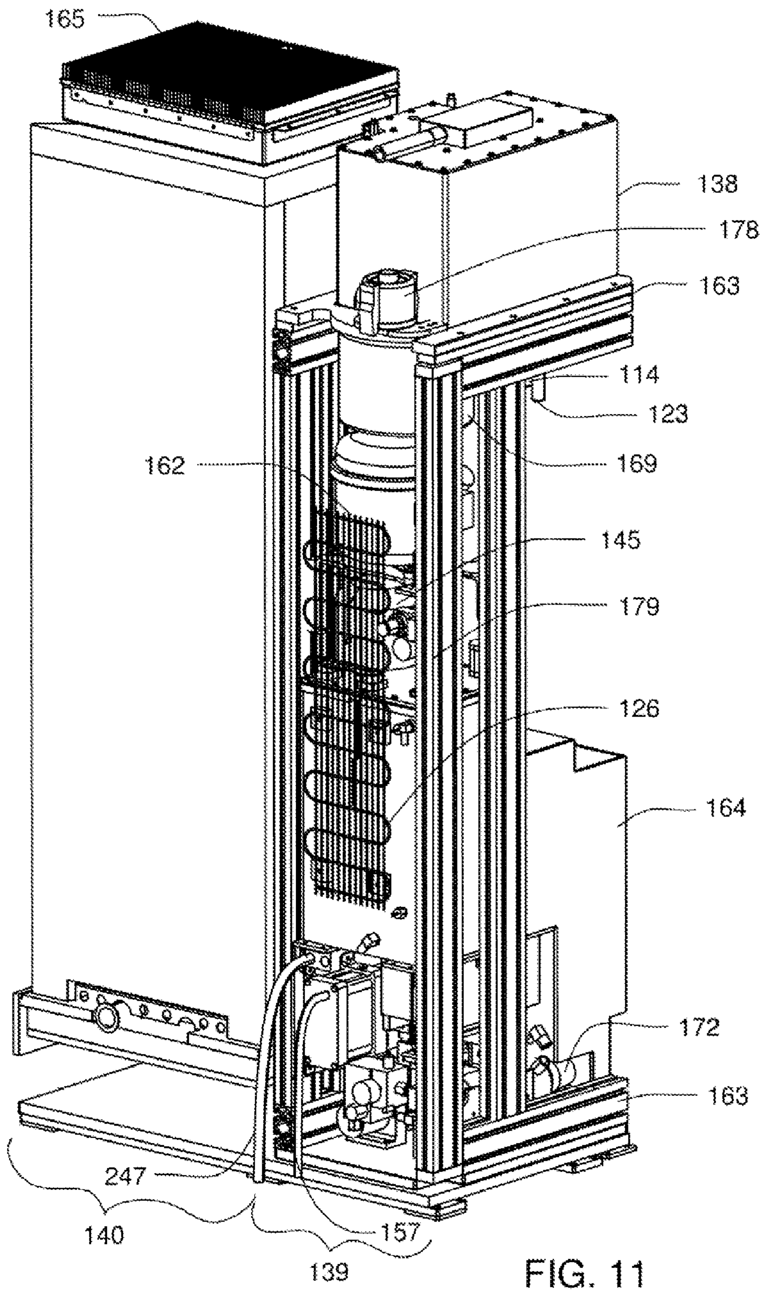
FIG. 11 is a perspective view of the rear portion of a water vending apparatus without tubing shown according to one embodiment.
Figure 11B:
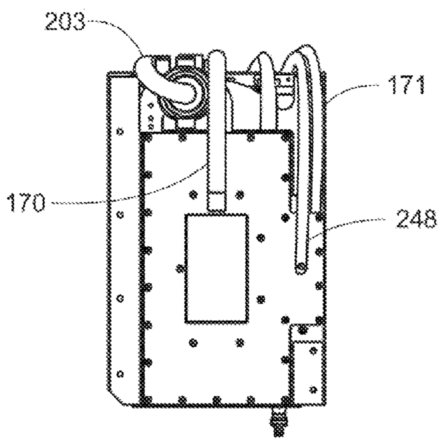
FIG. 11B is a top view of the dispensing portion of the vending apparatus showing visible tubing according to one embodiment.
Figure 11A:
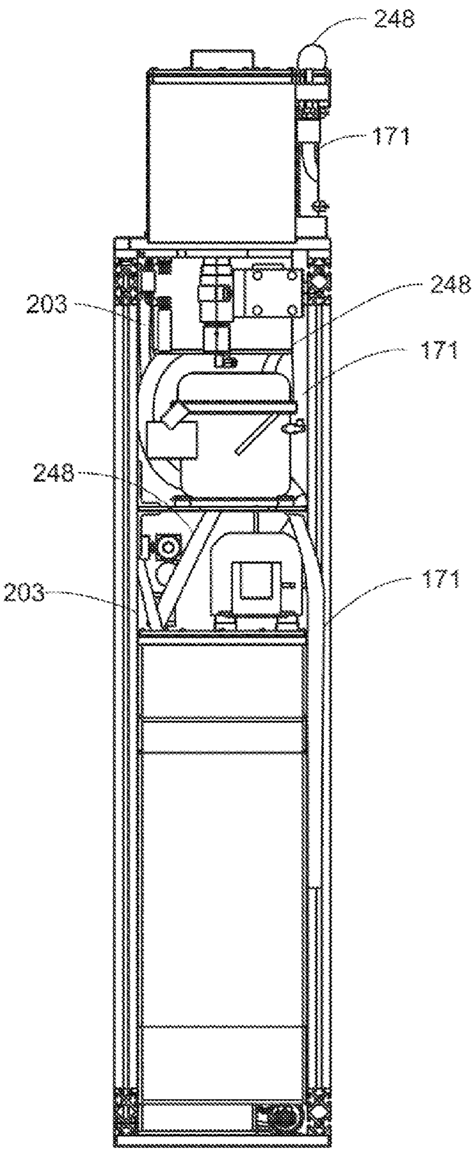
FIG. 11A is a front view of the dispensing portion of the vending apparatus showing visible tubing according to one embodiment.
Figure 11C:
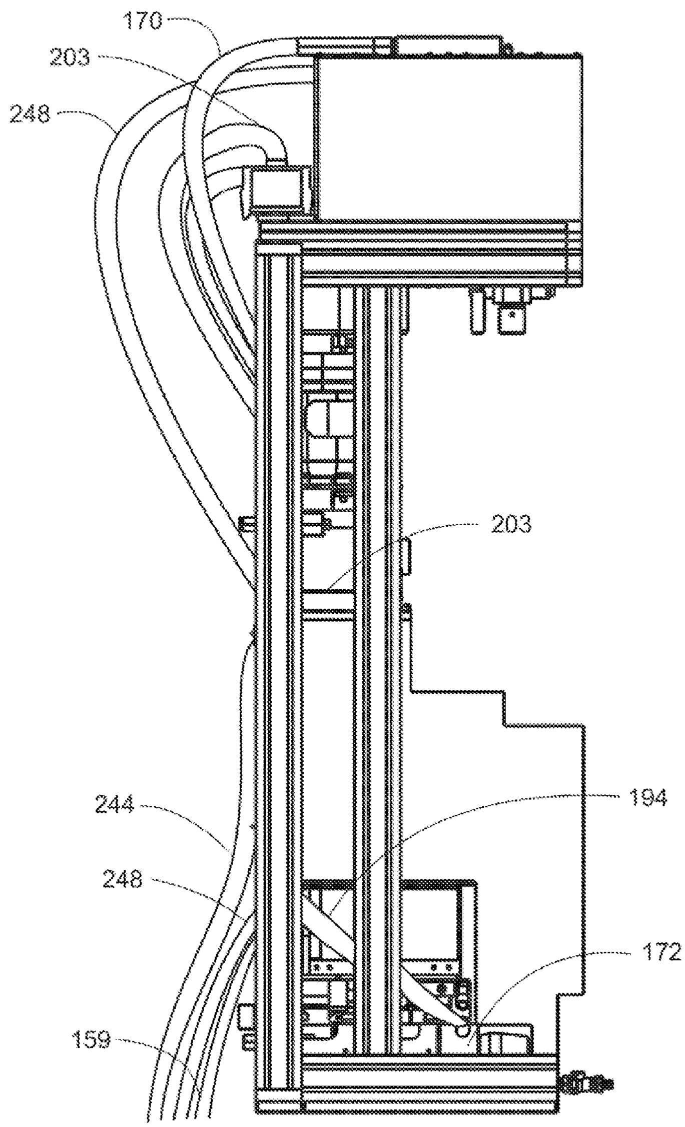
FIG. 11C is a right side view of the dispensing portion of the vending apparatus showing visible tubing according to one embodiment.
Figure 11D:
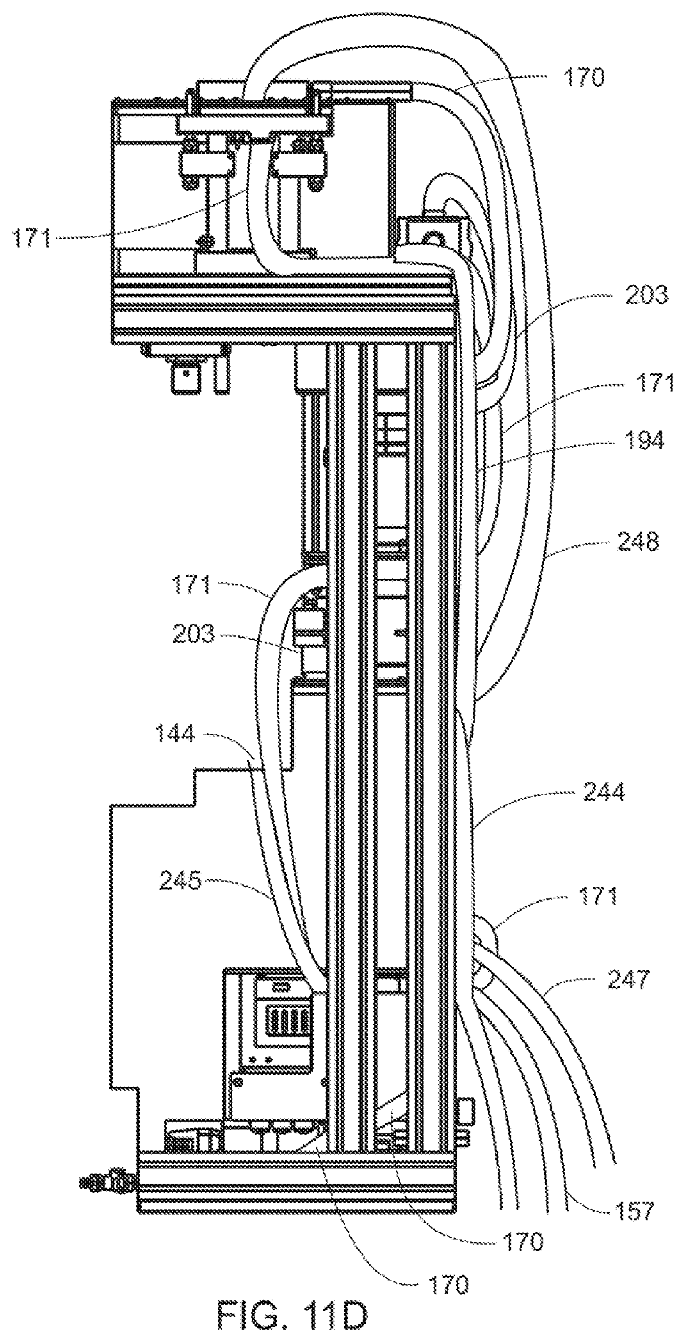
FIG. 11D is a left, side view of the dispensing portion of the vending apparatus showing visible tubing according to one embodiment.
Figure 11E:
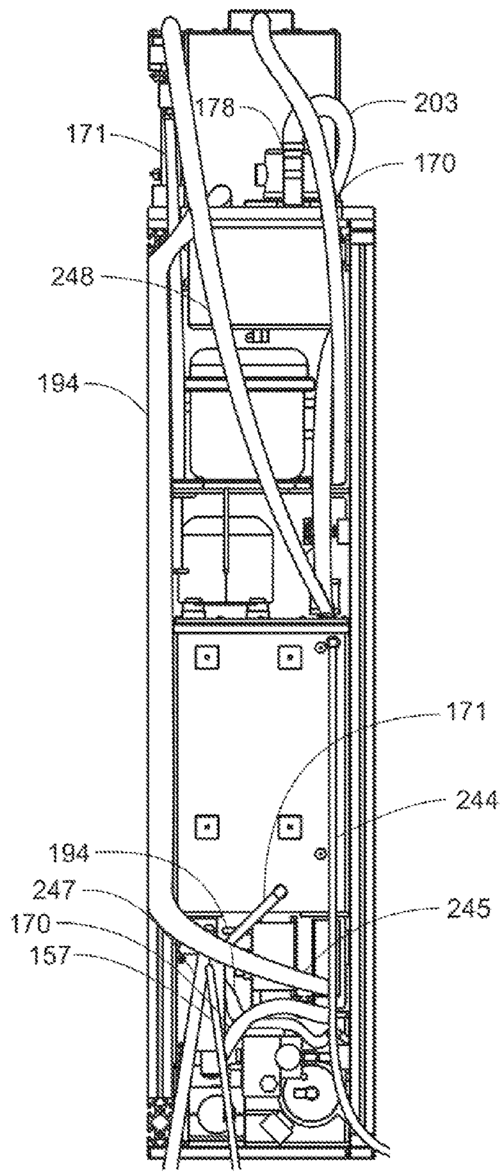
FIG. 11E is a back view of the dispensing portion of the vending apparatus showing visible tubing according to one embodiment.
Figure 11F:
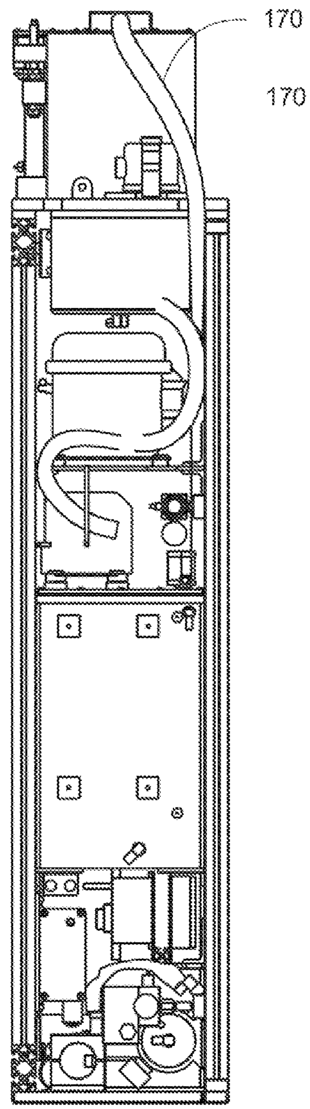
FIG. 11F is a back view of the dispensing portion of the vending apparatus showing the filling conduit according to one embodiment.
Figure 11G:
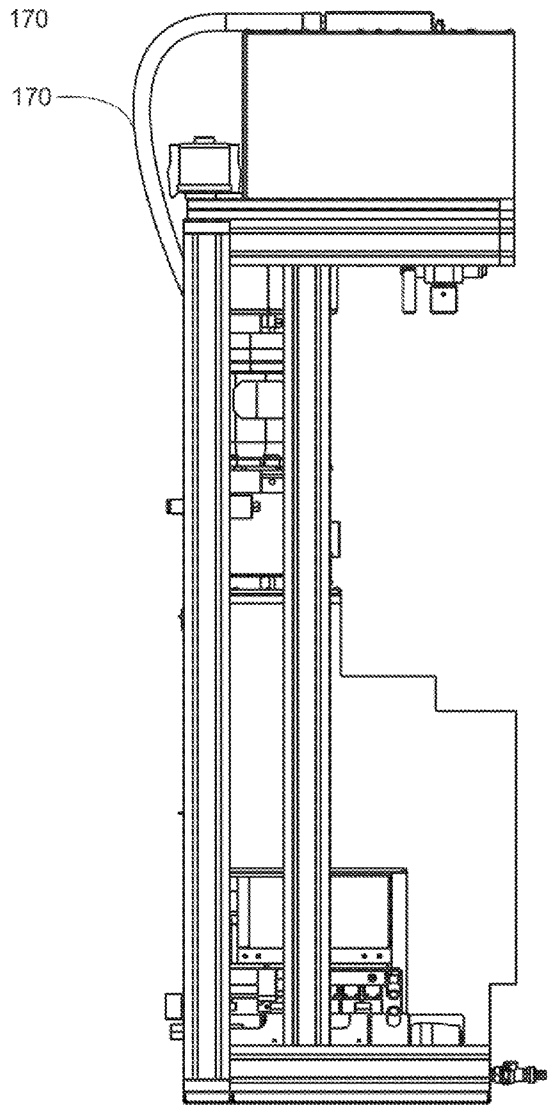
FIG. 11G is a right side view of the dispensing portion of the vending apparatus showing the filling conduit according to one embodiment.
Figure 11H:
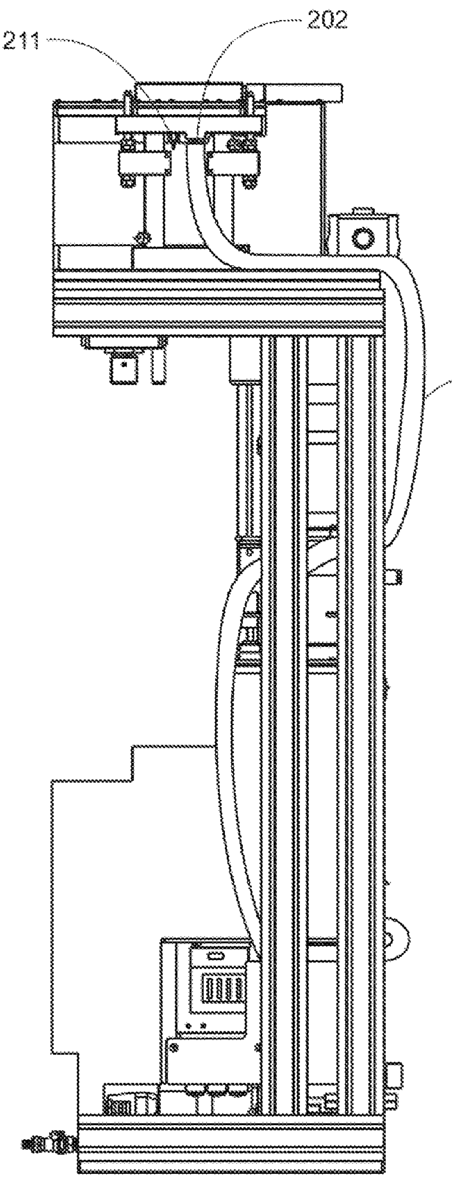
FIG. 11H is a left side view of the dispensing portion of the vending apparatus showing the overflow conduit according to one embodiment.
Figure 11I:
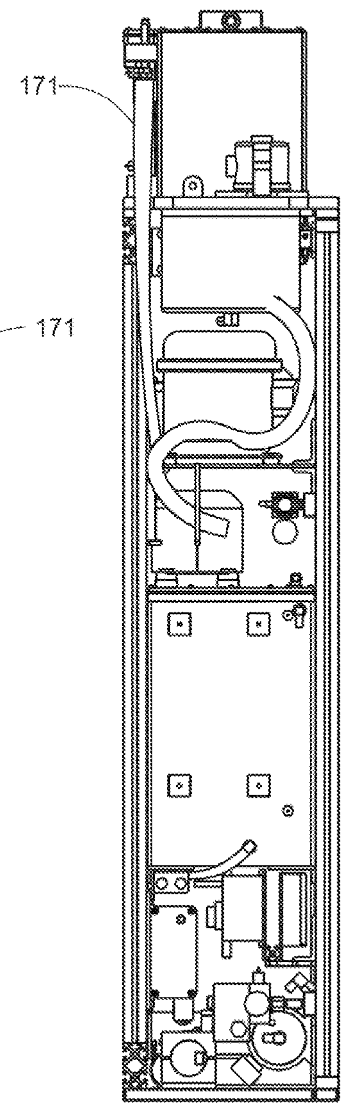
FIG. 11I back view of the dispensing portion of the vending apparatus showing the overflow conduit according to one embodiment.
Figure 11J:
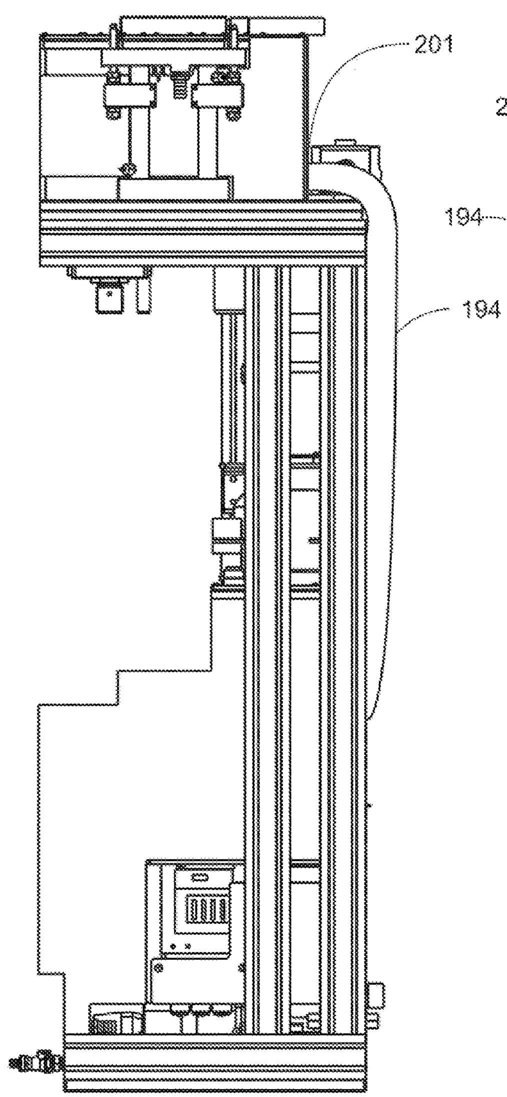
FIG. 11J is a left side view of the dispensing portion of the vending apparatus showing the UV conduit according to one embodiment.
Figure 11K:
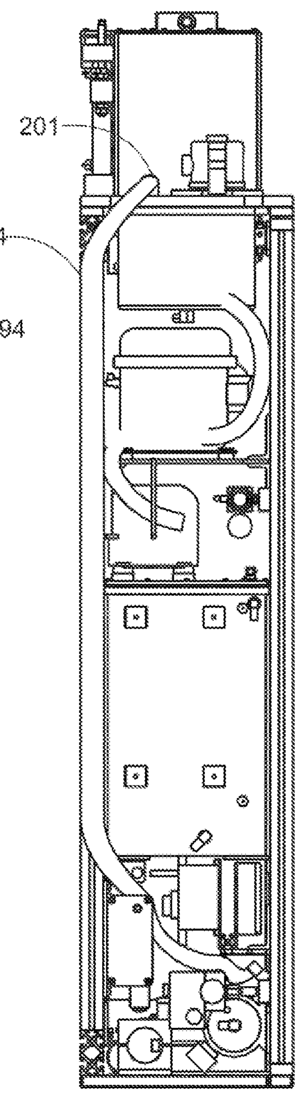
FIG. 11K back view of the dispensing portion of the vending apparatus showing the UV conduit according to one embodiment.
Figure 11L:
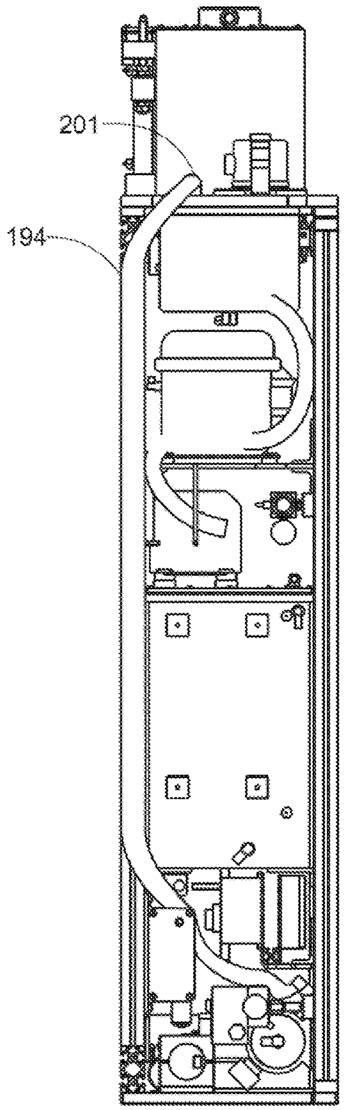
FIG. 11L back view of the dispensing portion of the vending apparatus showing the UV conduit according to one embodiment.
Figure 11M:
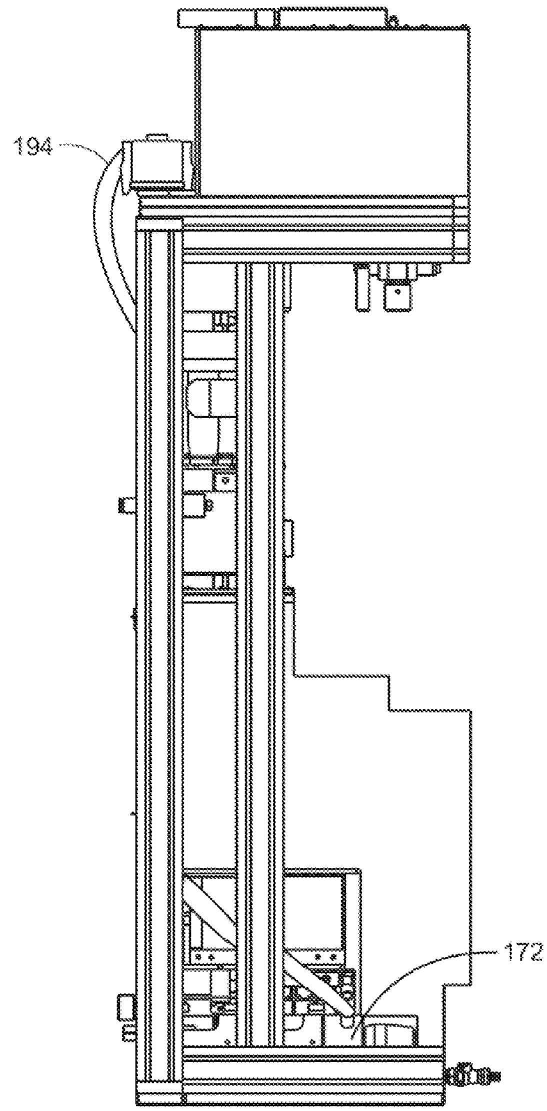
FIG. 11M is a right side view of the dispensing portion of the vending apparatus showing the UV conduit according to one embodiment.
Figure 11N:
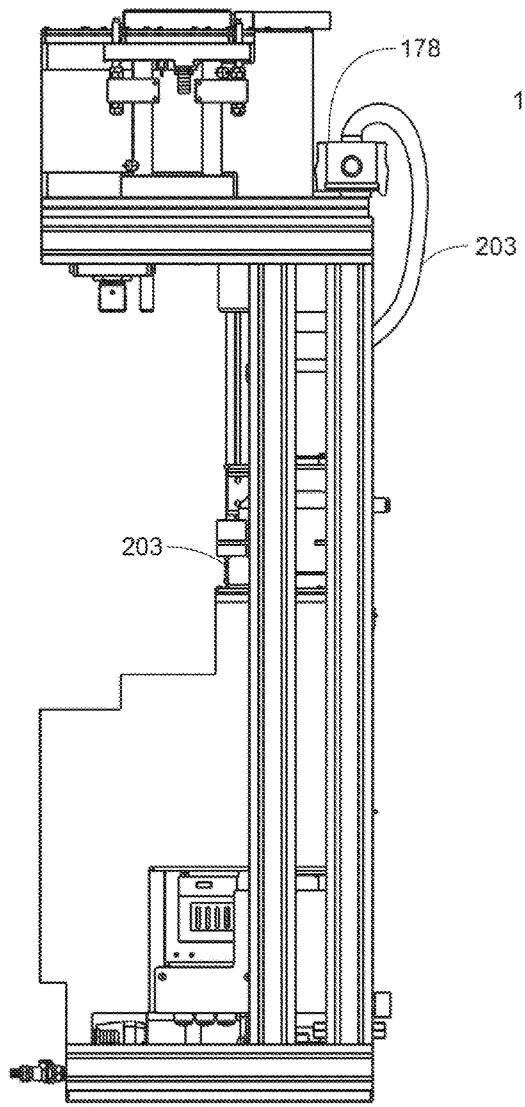
FIG. 11N is a left side view of the dispensing portion of the vending apparatus showing the vent conduit according to one embodiment.
Figure 11O:
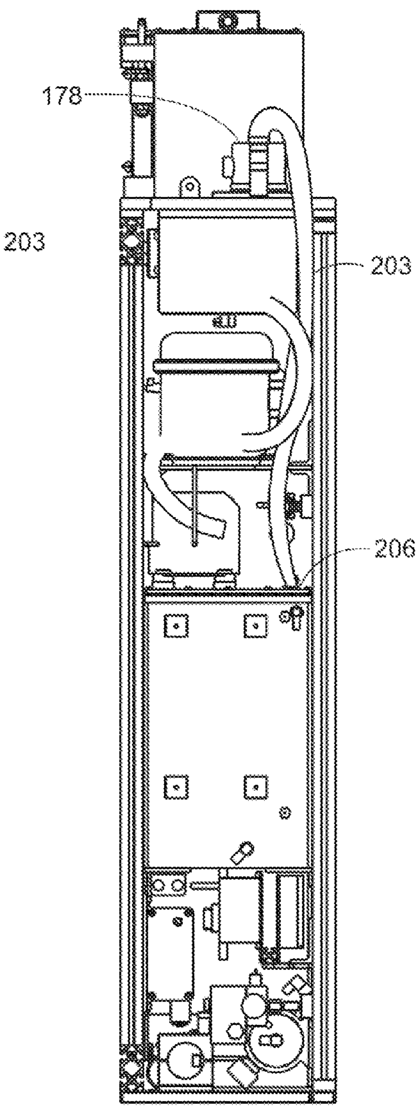
FIG. 11O back view of the dispensing portion of the vending apparatus showing the vent conduit according to one embodiment.
Figure 11P:
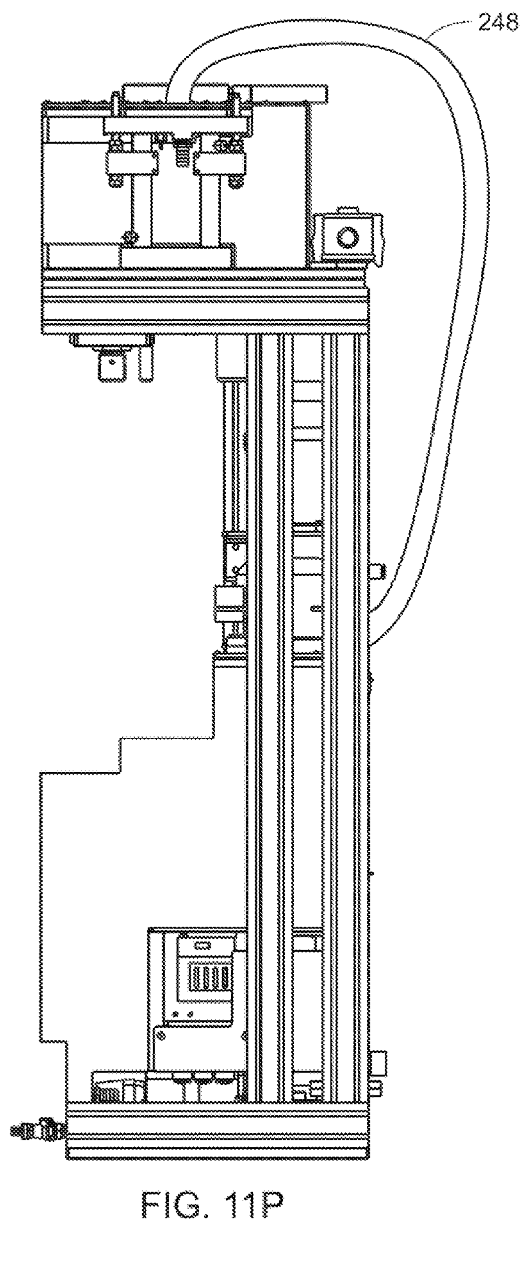
FIG. 11P is a left side view of the dispensing portion of the vending apparatus showing the airflow conduit according to one embodiment.
Figure 11Q:
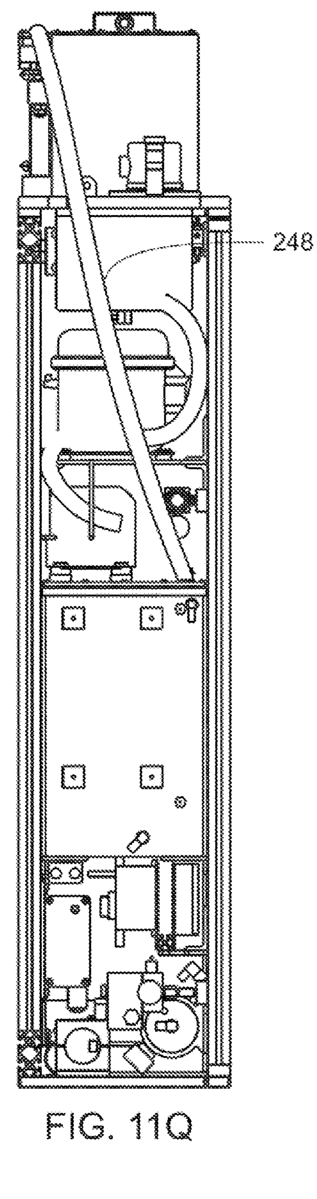
FIG. 11Q back view of the dispensing portion of the vending apparatus showing the airflow conduit according to one embodiment.
Figure 11R:
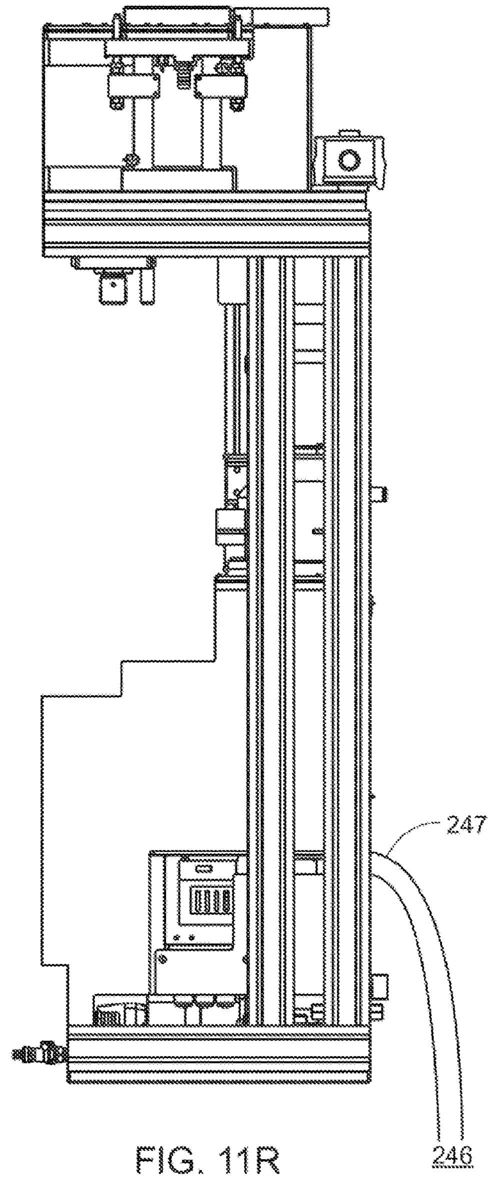
FIG. 11R is a left side view of the dispensing portion of the vending apparatus showing the product divert line according to one embodiment.
Figure 11S:
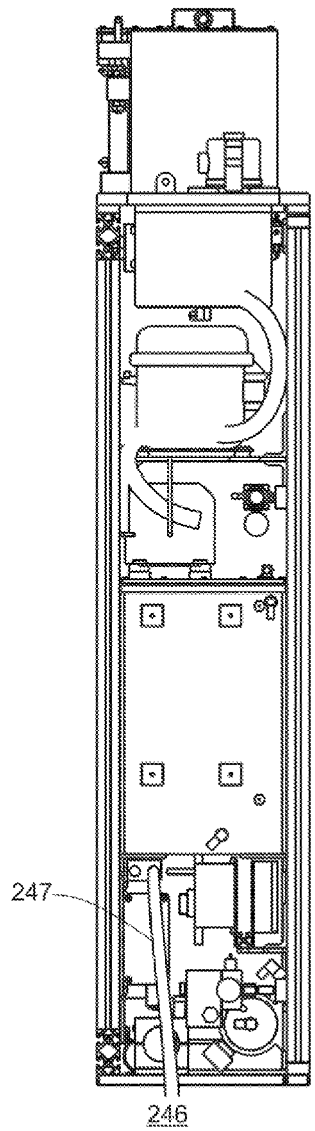
FIG. 11S back view of the dispensing portion of the vending apparatus showing the product divert line according to one embodiment.
Figure 11T:
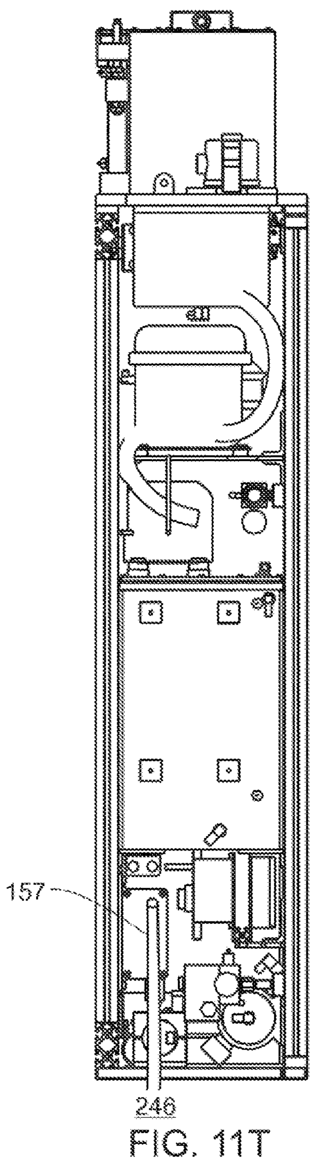
FIG. 11T back view of the dispensing portion of the vending apparatus showing the blowdown tube according to one embodiment.
Figure 11U:
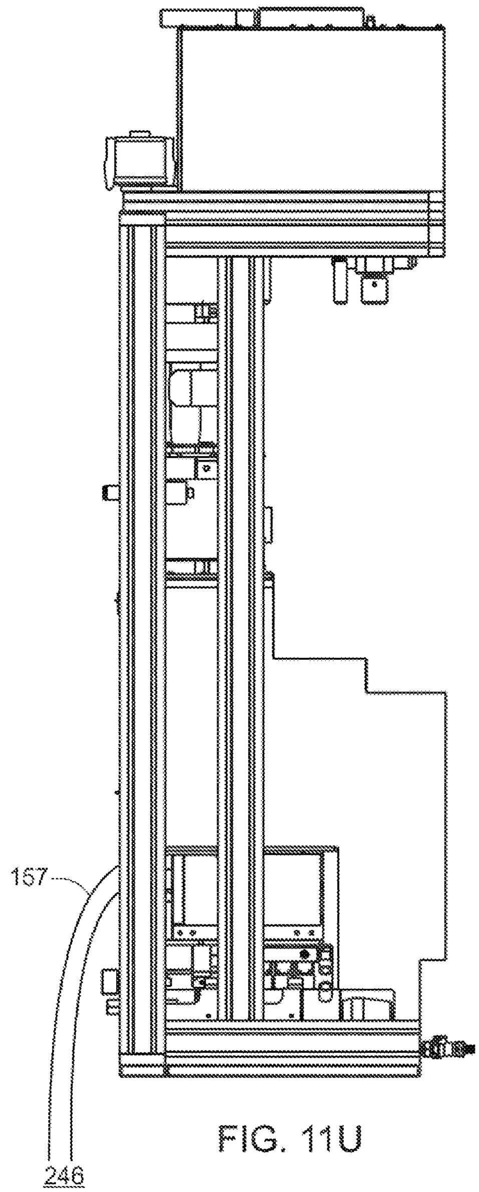
FIG. 11U is a right side view of the dispensing portion of the vending apparatus showing the blowdown tube according to one embodiment.
Figure 11V:
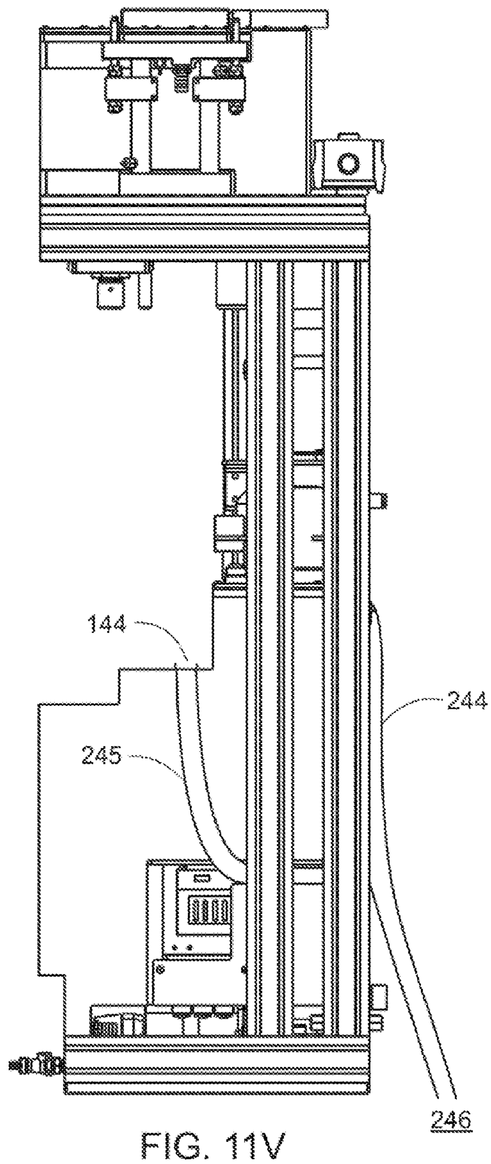
FIG. 11V is a left side view of the dispensing portion of the vending apparatus showing the primary tank overflow tube according to one embodiment.
Figure 11W:
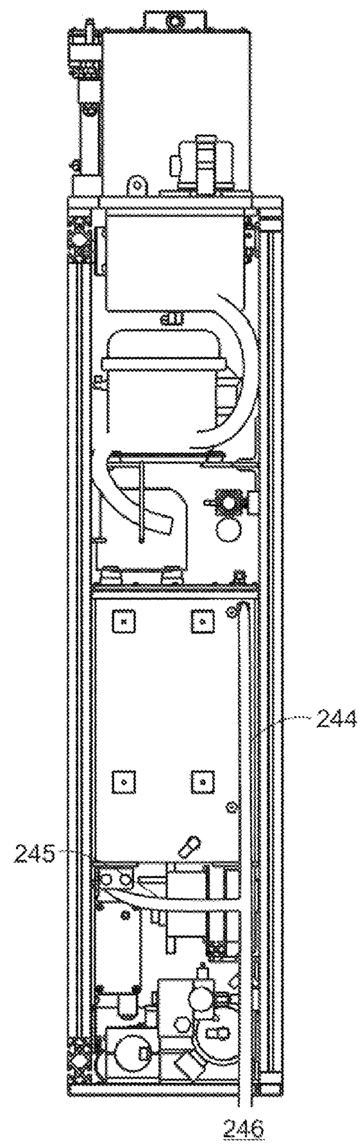
FIG. 11W back view of the dispensing portion of the vending apparatus showing the primary tank overflow tube according to one embodiment.
Figure 11X:
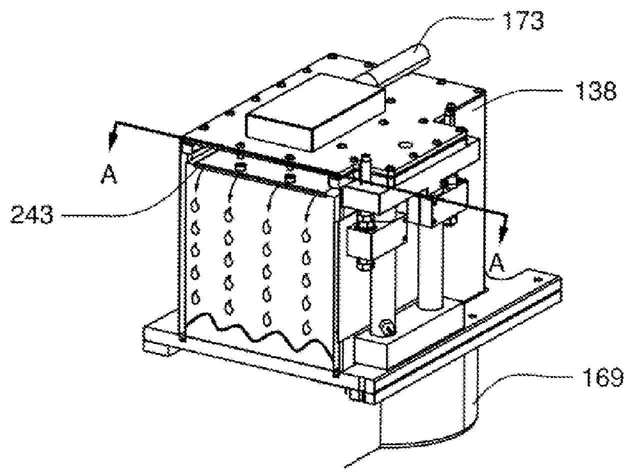
FIG. 11X is a section view of the secondary tank according to one embodiment.
Figure 11Y:
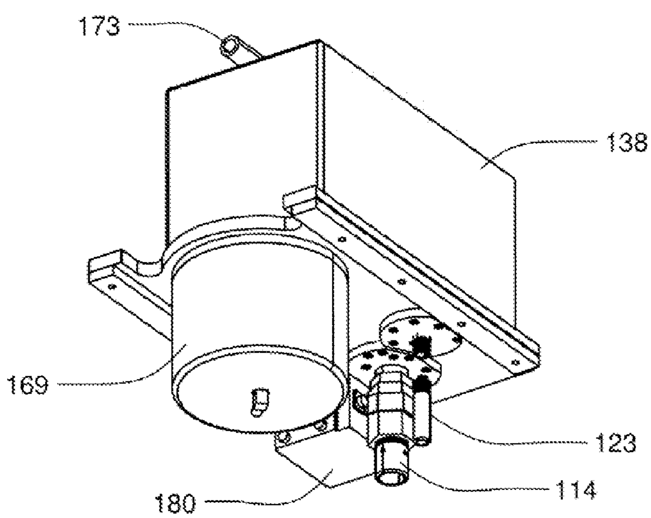
FIG. 11Y is a perspective bottom view of the secondary tank according to one embodiment.
Figure 11Z:
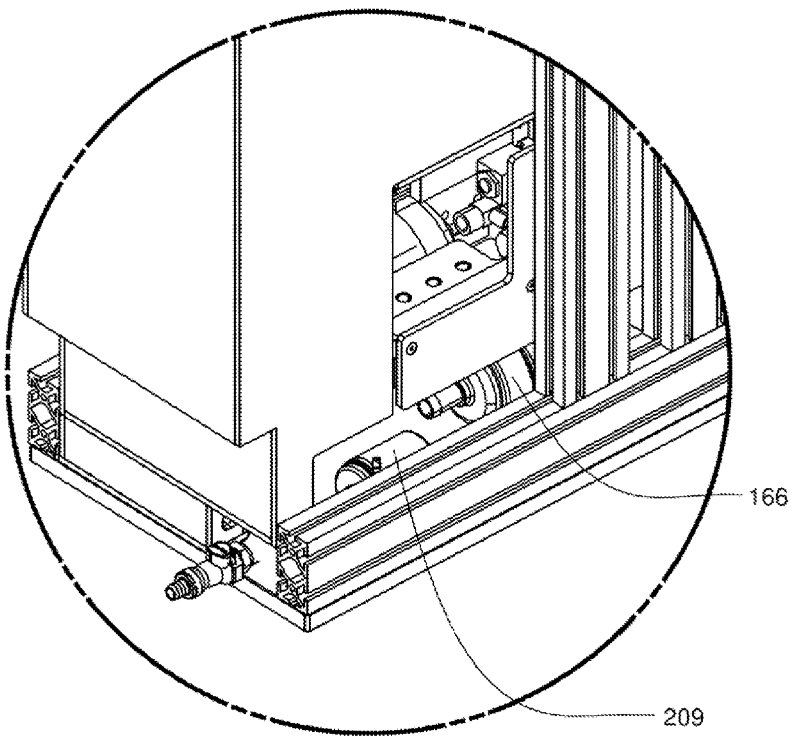
FIG. 11Z is a detailed view of the lower portion of the dispensing porting showing the fill pump and UV pump according to one embodiment.

Referring to FIG. 1 and FIG. 11-11Z, in the exemplary embodiment, the dispensing portion 139 may have a rigid dispensing frame 160 for fastening electrical, mechanical and other various components associated with delivering product water to a filling station. The frame material may be, but is not limited to, of the 80/20 T-slotted aluminum type. The base 154 may provide the primary surface to which the dispensing frame 160 is attached, as the separating wall 161 and external vending apparatus housing may not provide sufficient support. In the exemplary embodiment, the separating wall 161, and in some embodiments, the whole system shell is made from ¾" plywood. A variety of fasteners are used including, but not limited to, socket head cap screws.

Still referring to FIG. 1 and FIG. 11-11Z in the exemplary embodiment, the rear right vertical member of the dispensing frame 160 also serves as a chamber 179, from which, compressed air may be stored and transferred through a 1 gallon and a 5 gallon spool valve 215,214, respectively, to pneumatic nozzle valves 159. To facilitate functionality as a compressed air store 179, the dispensing frame 160 may define an internal cavity sufficiently sealed to preclude leaking under pressure, and may be coupled to an air compressor 162, also attached to the frame 160. 80/20 T-slotted aluminum frames may be pressurized by capping off the ends of the frame 160 with pressure manifold plates 163. Manifold plates 163, as commonly known in the art, may be made from anodized aluminum and may withstand up to 150 psig of positive/vacuum pressure. In the exemplary embodiment, about/approximately 120 psig is used to actuate at the desired speed. However, in other embodiments, more or less psig may used. A pressure switch may be coupled to the compressed air store 179 to ensure that adequate gas or air is maintained by a means of actuating the nozzle assemblies 114,123.

Still referring to FIG. 11 in the exemplary embodiment, an air compressor 162 and additional pressurization of the frame 160 may not be necessary as the valves 159 may be of the non-pneumatic type, such as, Georg Fischer EA21/31/42 electrically actuated ball valves by Georg Fischer Piping Systems Ltd. Schaffhausen, Switzerland.

In various embodiments, the dispensing portion 139 may include insulation, either partially or totally encapsulating the portion 139. The insulation on the dispensing portion 139 may maintain the temperature of the water to be dispensed and may be desired where it is at any extreme temperature outside the vending machine 113 than inside the dispensing portion 139.

Referring now to FIG. 1, in the exemplary embodiment, a larger, 15 gallon, plastic, and in the exemplary embodiment, polycarbonate, primary tank 164 may store product water exiting the purification system 100, and may be fluidly coupled to a smaller, 7 gallon polycarbonate secondary tank 138. There may also be another smaller chiller tank 169, which may be a 1-7 gallon tank, coupled to the secondary tank 138, for the purpose of, in some embodiments, storing/dispensing chilled water. In various embodiments the chiller tank 169 may be coupled to the primary tank 164 or it may be its own separate tank. In these embodiments an additional pump may be utilized to bring water to or from the chiller tank 169 to a multipurpose interface 117 where water may be dispensed. In these embodiments additional tubing may be involved to bring water from the purification system 100 to the chiller tank 169. In various embodiments, the size of the tanks may be altered due to need of water in the location of the apparatus 113. Polycarbonate may be advantageous as a tank material because it leaches minimally into water; however, any material may be used, including but not limited to, those approved by any governmental agency that protects the public health by regulating safety and efficacy of ingested products and materials containing products to be ingested such as, but not limited to the United States Department of Health and Human services, the United States Food and Drug Administration and National Sanitary Foundation, may be utilized. In various embodiments, the dispensing portion 139 may utilize a system of one or more product water tanks, of varying material, to store purified water. The material used for the tanks may be any plastic or other material, desired, but in the exemplary embodiment, polycarbonate is used.

Still referring to FIG. 1, FIG. 11H-I and FIG. 20A-20B the exemplary embodiment utilizes a two tank 164,138 system along with a chiller tank 169. Various embodiments may use one tank or more than three tanks, in these embodiments the optical sensors 211,212,213,167,168 and spill over tube 171 may differ than the exemplary embodiment. The spill over tube 171 connects to a port 202 on the secondary tank 138 and into the bottom of the primary tank 164.

Figure 20A:
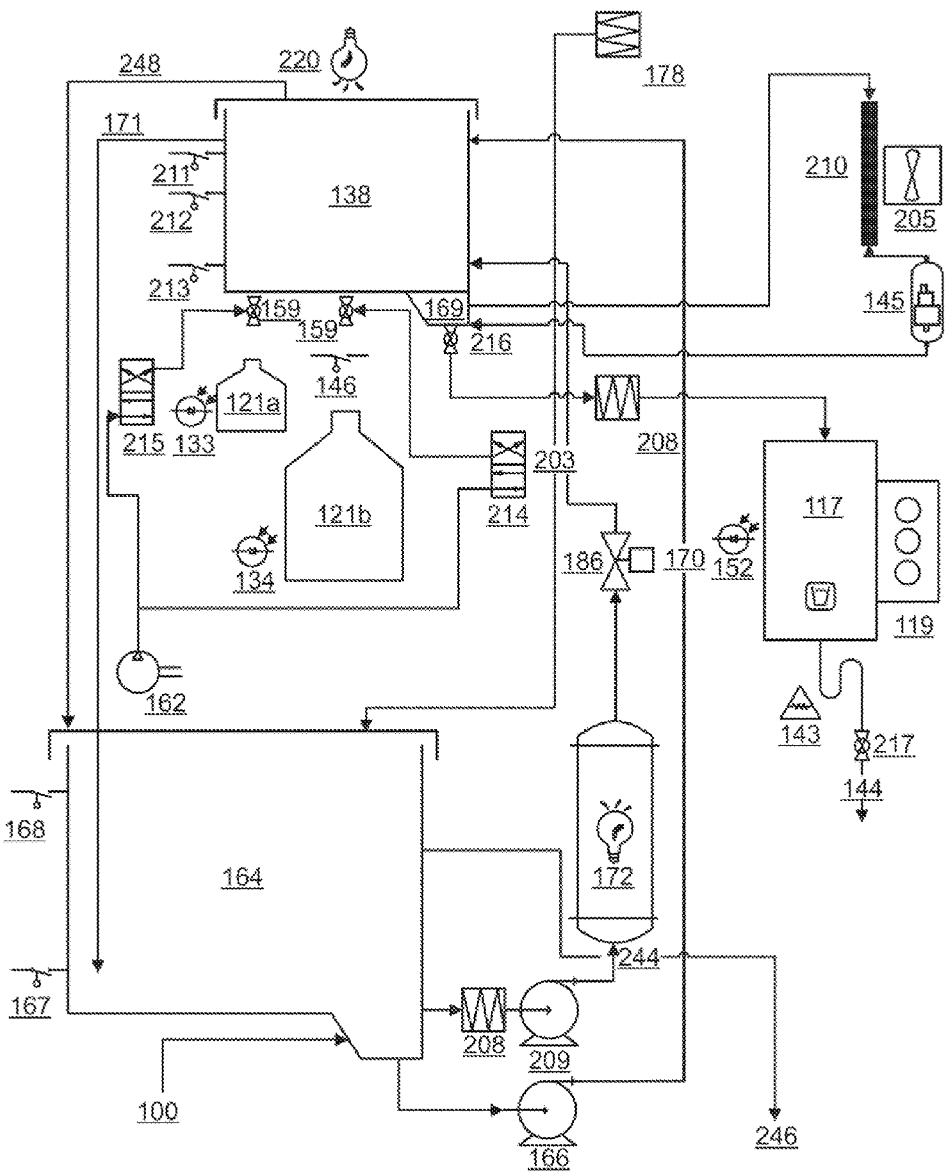
FIG. 20A is a flow chart of main water path, circuitry, and mechanical portions of the dispensing portion according to one embodiment.
Figure 20B:
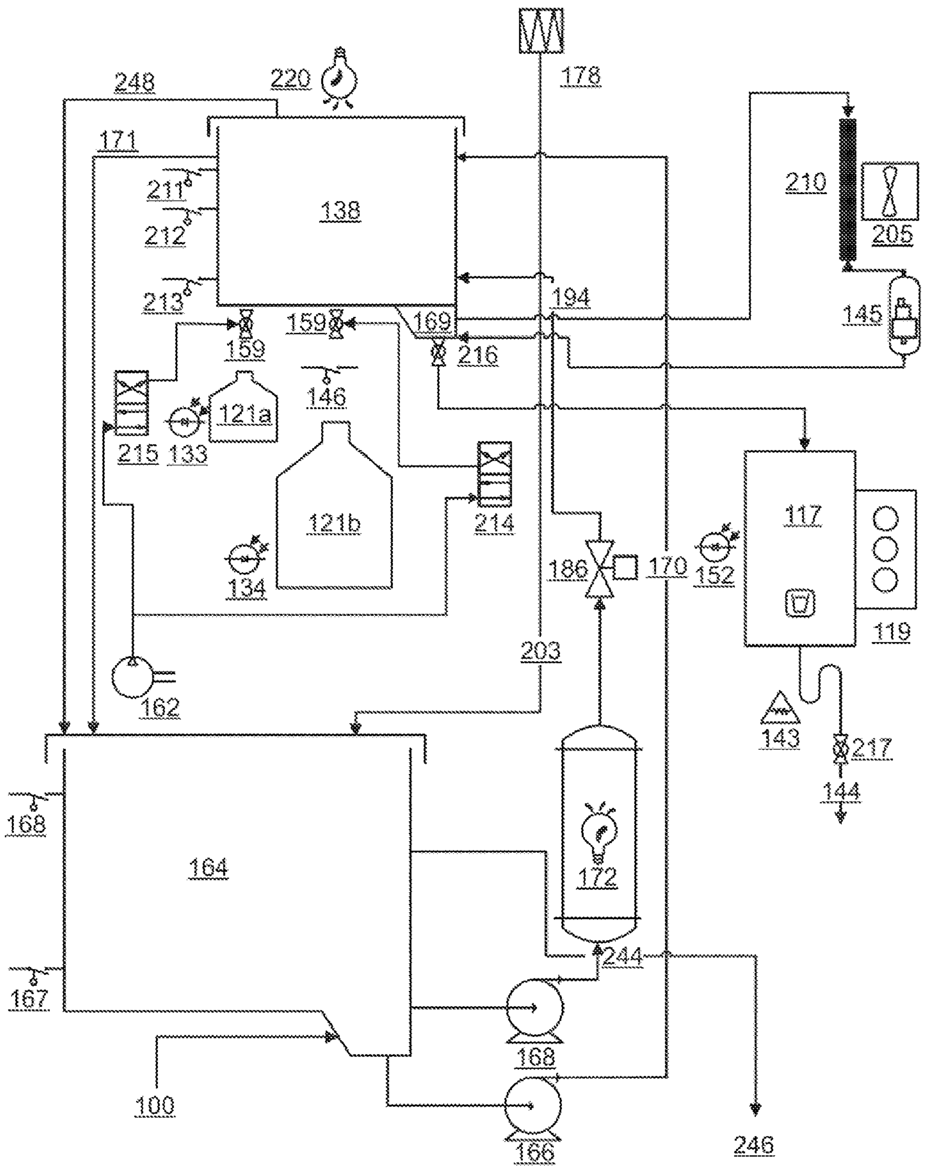
FIG. 20B is a flow chart of another embodiment of the main water path, circuitry, and mechanical portions of the dispensing portion according to one embodiment.

Still referring to FIG. 1 and FIG. 20A-20B in the exemplary embodiment, the secondary tank 138 may be used to measure the amount of water ready to be dispensed. In a ready-state, the secondary tank 138 may be completely filled, and may be capable of dispensing operations independent of the amount of water in the primary tank 164. Water may enter through the top of the secondary tank 138 and travel down the sides of the tank 138, creating a visually appealing display.

Referring now to FIG. 14-14A and FIGS. 11 and 11Z, product water may be transferred from primary tank 164 to secondary tank 138 by way of the pumping mechanism. In the exemplary embodiment, a fill pump 166 is coupled to the filling conduit 170 fluidly connecting the primary tank 164 and secondary tank 138. The fill pump 166 may facilitate filling the secondary tank 138, and in various embodiments, the fill pump 166 may provide a means for circulation, and/or provide required flow for ultraviolet sterilization components. Additionally, the fill pump 166 may receive and respond to electrical signals from a programmable logic controller ("PLC"), 184 and/or purification controller 165. In some embodiments, the fill pump 166 may be engaged after a certain volume of water is dispensed from the secondary tank 138, or upon initialization of the vending apparatus 113 from an empty state. In still other embodiments, the fill pump 166 may run continuously to circulate and sterilize water stored in the dispensing portion 139.

Still referring to FIGS. 11 and 11Z and additionally FIG. 11X the fill pump 166 may cause water rushing into the secondary tank 138 to be turbulent, and difficult to dispense. Level water is also important in preventing false information from being sent to the fill pump 166, such as, communication from a sensor to the PLC 184 that the secondary tank 138 is full when it is not. Accordingly, a diffuser 243 may be utilized to facilitate a controlled, even, filling flow of the secondary tank 138. In the exemplary embodiment, the diffusing device 243 may exist between the tilling conduit 170 and top of the secondary tank 138. In various embodiments, a diffuser may be used in a similar, fashion to control the flow of water from the purification system 100 to the primary tank 164. In the various embodiments, any type of diffuser may be used.

Referring to FIG. 14-14A, and FIG. 20A-20B one or more sensors may be coupled to the tanks 164,138 to facilitate transfer of water throughout the vending apparatus 113. Sensors may be of the off-the-shelf optical type, such as, a GEMS ELS-900 by Gems Sensors & Controls Plainview, Conn., which is capable of sensing the presence of water by measuring the difference of index of refraction with respect to an empty tank. In the exemplary embodiment, a minimum volume sensor 167 located on the primary tank 164 detects whether the primary tank 164 contains a volume sufficient to fill the secondary tank 138. A maximum volume sensor 168 may detect the presence of a completely filled primary tank 164. In some embodiments, the minimum volume sensor 167 may send a signal to a PLC 184 after a particular volume, such as, but not limited to, 7 gallons, has been transferred into the primary tank 164 from the purification system 100; the PLC 184 may then send a signal to the pump 166 responsible for transferring product water from the primary tank 164 into the secondary tank 138. The purification system 100 may continue to fill the primary tank 164 until the maximum volume sensor 168 detects a completely filled state, at which point, the maximum volume sensor 168 may send a signal to the PLC 184 or the purification system 100 to cease filling operations. Since the dispensing process may reduce the volume of water stored in the tanks 164,138, the PLC 184 may signal the purification system 100 to begin production of water and transfer the product water to the primary tank 164. In some embodiments, additional sensors may be coupled to the metering/secondary tank 138.

Still referring to FIG. 20A-B sensors may be coupled to the tanks 164,138 via male pipe threads, such as, but not limited to, ¼ inch male pipe threads, but in other embodiments, a larger or smaller thread may be used. Predrilled threaded holes may be utilized to receive the sensors. Teflon tape may additionally be used to secure the sensors, but in other embodiments, any type of securing device may be used, and other tape materials are contemplated. Again, polycarbonate tank material may be advantageous due to its ease of mating with Teflon tape. In other embodiments, straight threads with an o-ring seal that may be used for securing the sensors.

In other various embodiments, the number of sensors utilized in filling operations may be reduced or increased. In some embodiments, additional sensors may be coupled to the secondary tank 138 to ensure a filling operation has been completed. Conversely, the number of sensors may be reduced by using predetermined dispensing volumes, and fill time variables. In some embodiments, a signal may be sent to the PLC 184 to dispense 5 gallons of water from the primary nozzle 114; the PLC 184 may then send a signal to engage the fill pump 166 for a period of time such that the secondary tank 138 is refilled; additionally the purification system 100 may also be engaged for a period of time such that the primary tank 164 is refilled.

Now referring to FIG. 11D-E and FIG. 11N-Q the primary tank 164 may also incorporate a ventilation system to allow atmospheric pressure to enter and exit the dispensing system 139. A venting conduit 203 may be needed to maintain or adjust the rate of flow through the dispensing portion 139. The venting conduit 203 may be comprised of a length of silicon tube coupled to a port 206 located on the top of the primary tank 164, as well as, incorporating a filtering device 178, such as, a High Efficiency Particulate Air ("HEPA") filter 178 to prevent outside particulate from entering the dispensing system 139. Additionally, in some embodiments, there may be an additional tube, an airflow conduit 248, where air may be transferred from the secondary tank to the primary tank during the dispensing process. This airflow conduit may assist with keeping the necessary amount of air within the system to actuate the nozzle valves 159. This airflow conduit 248 also brings air back to the primary tank 164 when the secondary tank 138 is being filled. In various embodiments, the diameter of the ventilation port 206 may be increased or decreased such that a desired rate of flow is obtained. In various embodiments, the location of the HEPA filter 178 may vary. However, in the exemplary embodiment the HEPA filter 178 is located in a high location so as to minimize spilling water into the filter 178.

Still referring to FIG. 11D-E and additionally FIGS. 11, 11R-S and 11V-W in an overflow situation, tubing 244 may be advantageous in that it may allow a certain volume of water to flow out of the tube 244, thereby exiting the primary tank 164 to the drain 246 without adversely exiting the dispensing portion 139. In some embodiments, there may also be a product divert line 247 this product divert line 247 may divert product water away from the primary tank 164 and towards the drain 246 for some or all product, waste, blowdown, overflow water.

Referring to FIG. 14-14A and FIG. 20A-20B, upon execution of a fill request, product water may be dispensed from the secondary tank 138 to a nozzle assembly 114,123. Thus, the secondary tank 138 may serve both storage and delivery purposes. Physical delivery of product water to a nozzle assembly 114,123 may include actuating a valve 159 and letting the force of gravity (or natural water pressure from the secondary tank 138) flow the water away from the secondary tank 138. With this configuration, it may be advantageous to position the secondary tank 138 at a location vertical to the nozzle assemblies 114,123 to ensure an adequate rate of flow. In the exemplary embodiment, the pneumatically actuated ball valve actuator, also called the actuator block 180 is mounted on the underside of the secondary tank 138, between the tank 138 and the nozzle 114,123.

In various embodiments, a pump may be used to shift product water from a tank to a nozzle assembly. Similarly, pressurizing the tank itself may also encourage water flow. These systems may be advantageous where limited space inside the vending apparatus 113 precludes use of a tank located vertically above the nozzle assemblies, or in situations where gravity is not the exemplary means of delivery.

Still referring to FIG. 14-14A and FIG. 20A-20B in the exemplary embodiment a sensor 168 is located high on the primary tank 164 that senses the presence of water. Where the sensor 168 does not detect water, a signal is sent to the purification system 100 to begin operation.

Still referring to FIG. 14A-14B and FIG. 20A-20B although in the exemplary embodiment of the apparatus 113, the water exiting the vapor compression distiller (also referred to as "VCD" or purification system 100), may be free of microbial bacterial, or include reduced contamination, the vending apparatus 113 may, in some embodiments, to protect from any microbial bacteria present in the dispensing system 139, incorporate a means of sterilizing the stored water since water exiting the dispensing system 139 may not be completely free of microbial bacteria. In the exemplary embodiment, an ultraviolet ("UV") microbial sterilizer 172 is coupled to the fluid path 194 between the primary and secondary tank 164, 138 (respectively). The UV sterilizer 172 may be any of the type that are designed specifically for drinking water, however, other UV sterilizers 172 may be utilized as many different brands are well known in the art. In the exemplary embodiment, the UV microbial sterilizer 172 is a Sterilight SPV-1.5 made by Sterilight Inc, Corporation, Ontario Canada. In various embodiments, the UV microbial sterilizer 172 may be located between the nozzle assembly 114,123 and the secondary tank 138 to sterilize just before dispensing the water. Fluid may pass through the UV sterilizer 172 such that a UV light bulb exposes the passing fluid to UV light, killing microorganisms. The UV sterilizer 172 may also be coupled to, or internally incorporate, sensors capable of sending signals to the PLC 184 and the purification system 100 to halt the flow of water in the event that the UV sterilizer 172 is degraded; such as, but not limited to, a burnt out UV bulb, or unacceptable wavelength and/or intensity of the emitted UV light may cause the sterilizer 172 to send signals to the PLC 184 to cancel vending request and/or halt purification.

Figure 14A:
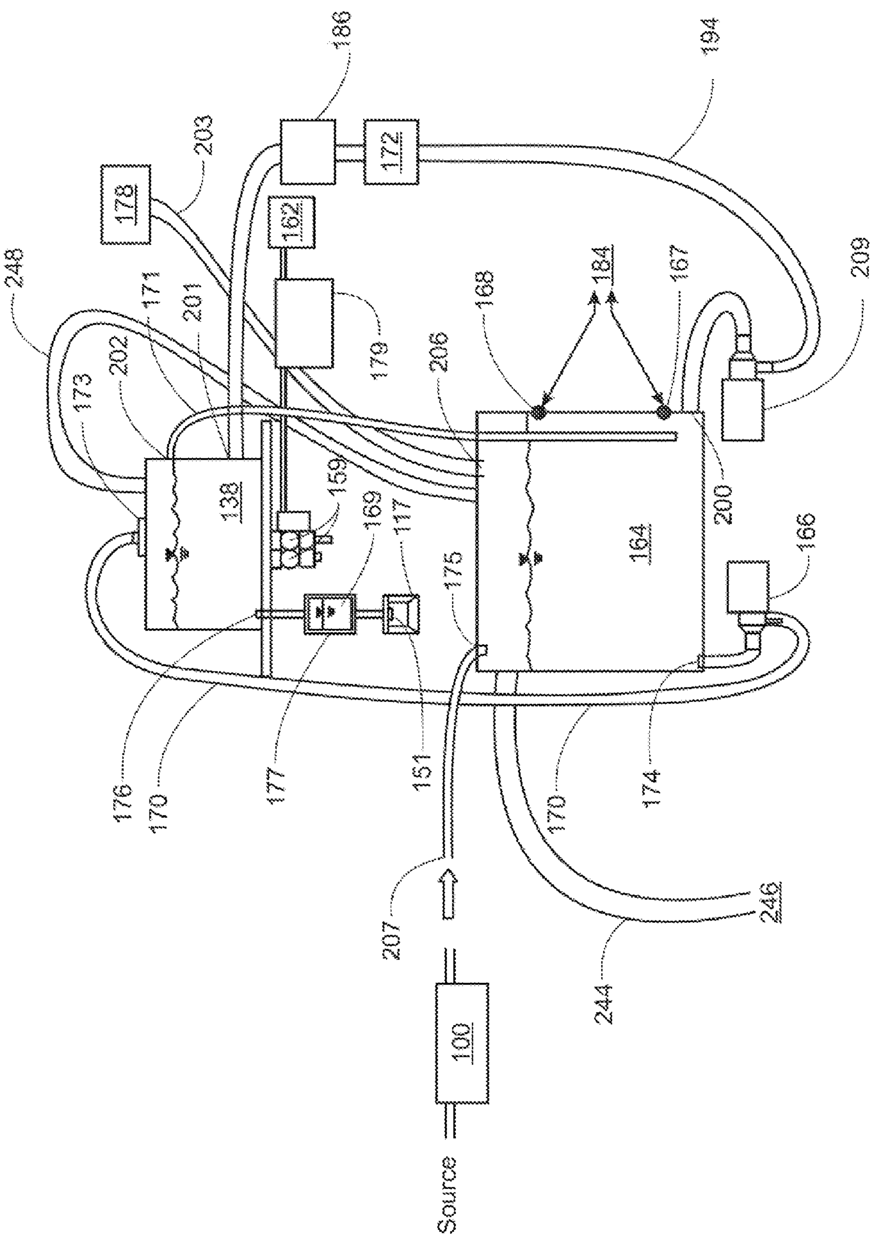
FIG. 14A is a diagram of the fluid pathways associated with the water storage tanks including a separate UV circulation pump and conduit according to one embodiment.

Still referring to FIG. 14A, in the exemplary embodiment, there is a dedicated path for the UV system. In the exemplary embodiment, water may be pulled out of the primary tank 164 by means of a circulation pump or UV pump 209, which may be any pump including but not limited to a centrifugal pump; the water may be pushed through the UV sterilizer 172 and up into the secondary tank 138. The UV disinfected water enters the secondary tank 138 near the bottom and then flows out by means of the spill over tube or over flow conduit 171, the spill over tube 171 then returns back into the primary tank 164.

In other various embodiments, one or more other various microbial sterilizers may be utilized. Additionally, a microbial sterilizer may reside in a different location within the vending apparatus 113, such as, between the purification system 100 and the primary tank 164. In other various embodiments, the UV sterilizer 172 may be located on the fill tube 170, therefore requiring only one pump for the dispensing system 139. In these embodiments, the sterilizer 172 may be of a different kind or may be larger as to accommodate the larger flow of water from the primary tank 164 to the secondary tank 138. In other embodiments, the sterilizer 172 may be the same kind however the fill pump 166 may run slower to allow the UV sterilizer 172 to accommodate the capacity of the sterilizer.

In other various embodiments, chemicals, such as chlorine, chlorine dioxide, hypochlorite, phosphate, peroxide, trioxygen, or other chemicals may be used to sterilize water. However, using chemicals includes maintenance tasks associated with renewing or testing chemical concentration, and the safety issues that may arise due to the potential for human error. In contrast, a UV sterilization system may be reliably operated for months or years at a time with less maintenance.

Figure 18:
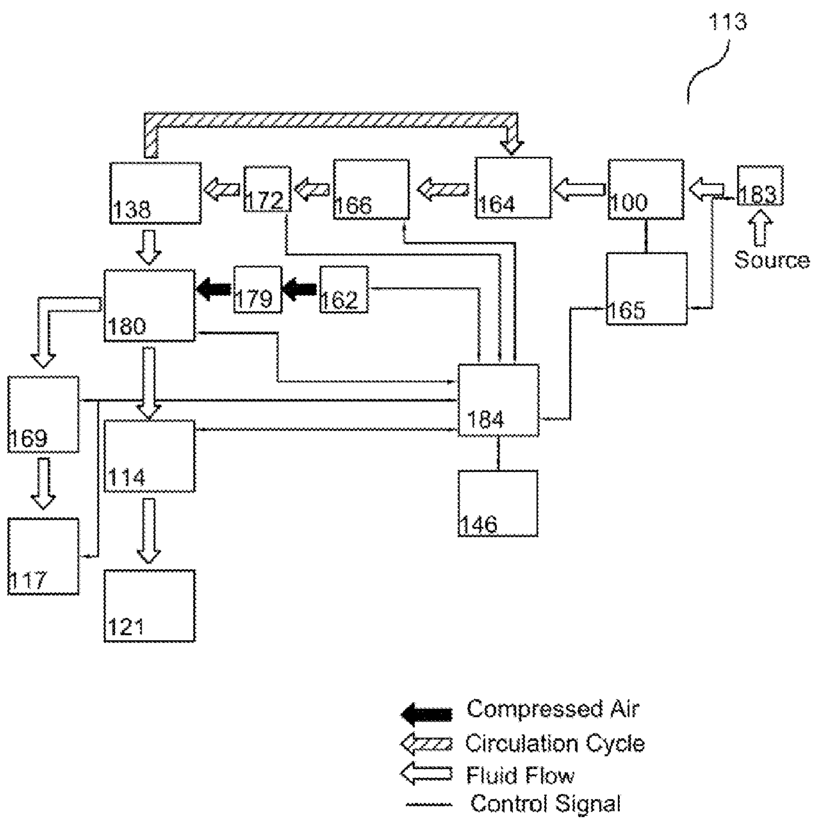
FIG. 18 is a flow diagram of a water vending apparatus according to one embodiment.

Still referring to FIG. 14A and additionally FIGS. 18 and 20A-20B, since the exemplary embodiment may not contain chemicals to destroy bacteria from growing within the tanks 164,138 and conduits 170,171,194, water residing in the dispensing portion 139 may be sterilized by UV light and continuously circulated. Benefits from continuous flow include deionization of the water and self cleaning tank capability. The circulation cycle may take approximately 10 minutes (i.e., every particle of water is sterilized every 10 min), at a flow rate of 1.5 gallons/minute. In the exemplary embodiment circulation may be facilitated through the UV conduit 194 by a small circulation pump 209, this fluid path may begin with transferring water through a port 200 located on the bottom of the primary tank 164, through a particulate strainer, through the circulation pump 209, through the UV sterilizer 172, through a UV valve 186 to the bottom of the secondary tank 138, where the water will continue filling the tank until it reaches the spill over tube 171 in the secondary tank 138, the spill over conduit 171 may be coupled to a port 201 located on the bottom of the primary tank 164**.

Still referring to FIG. 14A-14B and FIGS. 18 and 20A-20B, considering the exemplary circulation configuration, the port 174 through which water exits the primary tank 164 may be located on bottom of the tank 164, and the port 201 through which water returns to the primary tank 164 may be located anywhere on the primary tank 164 however in the exemplary embodiment, the port 201 may be located approximately a ¼ way up from the bottom of the tank. This configuration may lessen the chances of stagnant water in the dispensing system 139 and ensure that the entire volume of water is circulated. This is the exemplary embodiment however this is not the only embodiment, the port 174 which water exits may be in any location on the tank 164 as to allow the entire or a portion of the water to circulate.

Figure 14B:
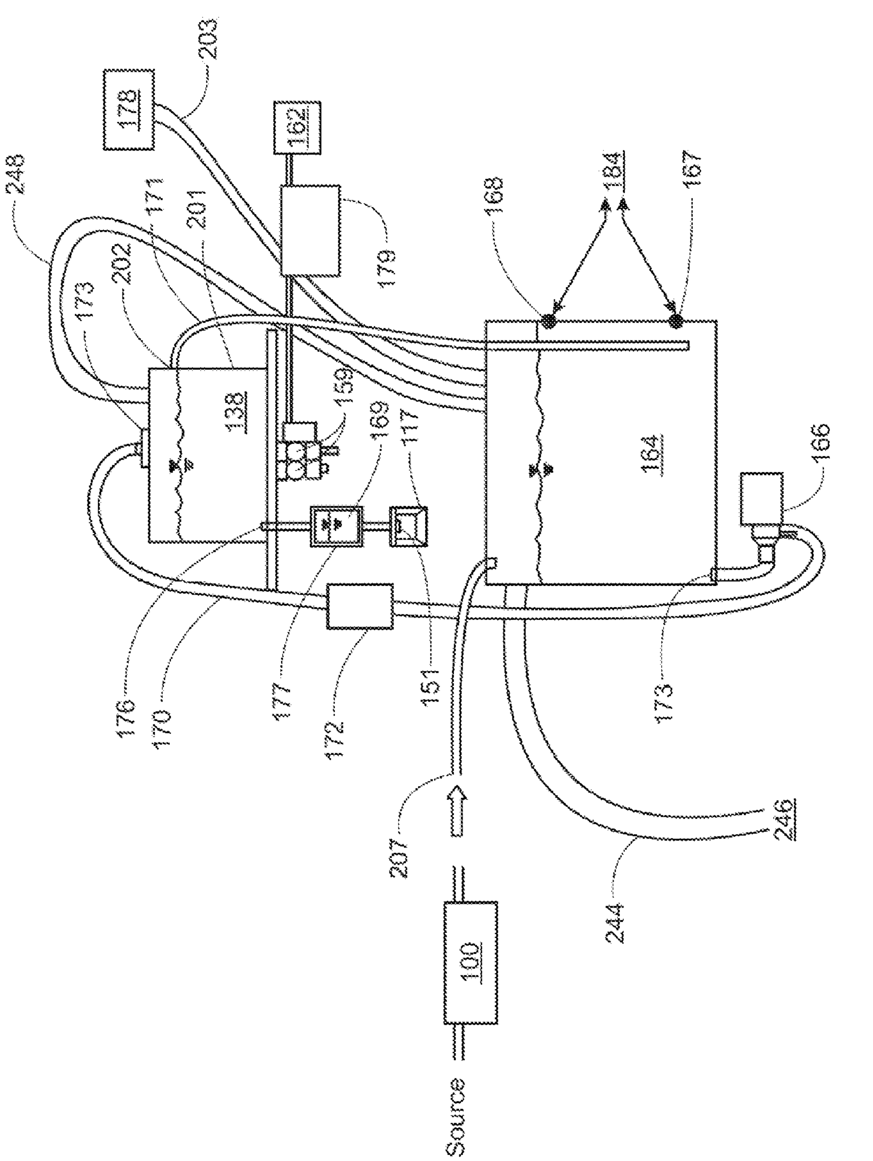
FIG. 14B is a diagram of the fluid pathways associated with the water storage tanks including one pump and conduit for filling and sterilizing according to one embodiment.

Now referring to FIG. 14B, in other embodiments, circulation may be facilitated by the fill pump 166. In these embodiments, the fluid sterilization path through the dispensing portion 139 may be comprised of the following flow path: water may be transferred through a port 174 located on the primary tank 164, through an 80×80 mesh particulate strainer 208, through the fill pump 166, through the UV sterilizer 172, through the UV valve 186, through a diffuser 243 coupled to a port 173 located on the secondary tank 138; water may then fill the secondary tank 138, spill over the rim of the secondary tank 138 into an overflow conduit 171 coupled to a port 201 located on the bottom of the primary tank 164.

Still referring to FIG. 14A-14B, one limiting factor in optimizing the circulation flow is the maximum flow rate at which the UV sterilizer 172 may properly sterilize water. This factor may vary as many different sterilizers may be used as noted previously. Another limiting factor is the noise and vibration the fill pump 166 may create when in use. These aspects may be mitigated by adjusting the flow rate to a slower setting. Vibration dampers may be, but is not limited to, a rubber isolation mount or foam rubber, may also be placed between the pump 166 and the frame 160 and/or around the pump 166. The vibration dampers may be anything to isolate the movement of the pump 166 from the frame 160.

The type of conduit used to create the fluid pathways throughout the vending apparatus 113 may be selected based on safety and affect on water taste. In the exemplary embodiment, ultra-pure, platinum catalyzed, medical-grade silicone tubing is used because there is no plasticization agent in the silicon which may contaminate and adversely affect the taste of the water. Silicone tubing is the industry standard for vending machines, however, other types of tubing may be used, such as, but not limited to, Tygon tubing which is designed for beverage applications.

The size of conduit used may be selected based on application within the vending apparatus 113. In general, large volume flow rates require larger tubing. It may be beneficial to use smaller tubing where possible to save space, cost, and prevent stagnancy. In the exemplary embodiment, shown in FIG. 11A-11E, three sizes are used: ¾ inch, ½ inch, and ⅜ inch. The largest ¾ inch tubing may couple the secondary tank 138 to the primary tank 164 for rapid filling, and may also be used to return water spilling over the top of the secondary tank 138 to the primary tank 164 during circulation. The ½ inch tube may be used for air-venting (may also accommodate overflow) the secondary tank 138, for a balancing purpose, the air vent conduit 203 may be of similar size as the dispensing nozzle 114,123. The smallest ⅜ inch tubing is used for the UV sterilization/circulation process because the sterilizer 172 requires a lower flow rate relative to the rest of the fluid pathways.

Still referring to FIG. 11A-11E, as previously mentioned, the volume of the secondary tank 138 may be used for measuring or determining a specific volume of water to be dispensed; tubing attached to the sides of the tank 138 may shift the maximum volume. In some embodiments, where tubing may be coupled to the sides of the secondary tank 138, it may be important to note that the smallest possible tubing is desirable as volumetric errors during dispensing operations may be increased by using larger tubing. However in these embodiments, it may be possible to calibrate the sensors so the sensors 211,212,213 may account for the diameter of the tubes. However in other embodiments, the tubing may be below the 5 gallon dispensing sensor 213 and therefore may not cause volumetric errors.

1.2 Filling Cavity

Figure 3:
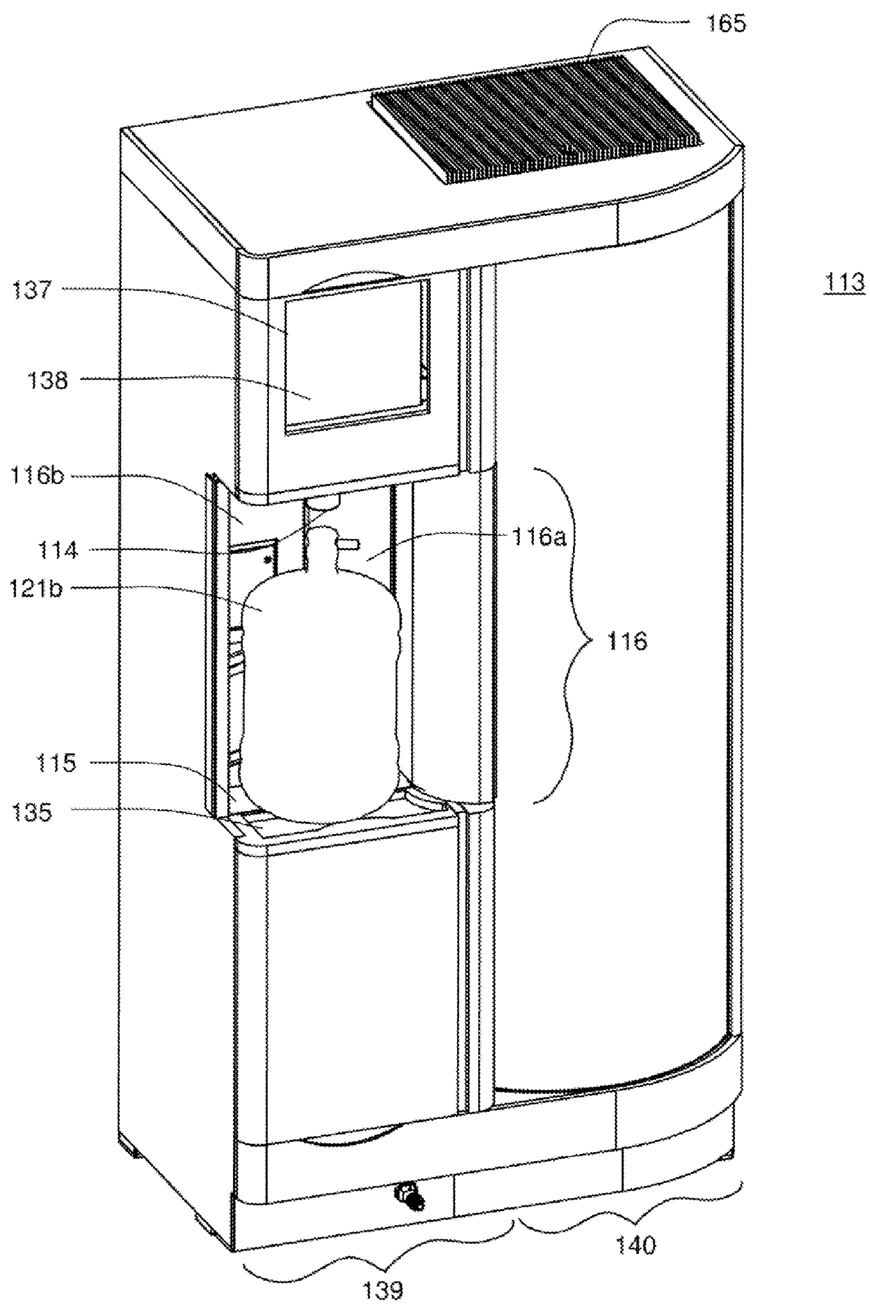
FIG. 3 is a diagram of a filling station incorporated into a water vending apparatus according to one embodiment.

Referring now to FIG. 6 and FIG. 3, the vending apparatus 113 may contain a filling cavity 116, which may be embodied as a recessed region extending into the housing surface. The filling cavity 116 may define the area in which vendee/vending apparatus interactions occur, and more specifically, a region in which one or more interfaces may be capable of dispensing product water to a vessel 121*a*-121*c* residing at a filling station 116*a*-116*b*. Additionally, the filling cavity 116 may have dimensions such that abroad range of vendee-supplied vessels 121*a*-121*c*, such as small drinking glasses 121*c* to five gallon jugs 121*b*, are able to be filled. To facilitate the abovementioned functionality, the filling cavity 116 may contain one or more filling stations 116*a-c*, proximity sensors 133, 134,152 water quality sensing components, a multipurpose interface 117, and one or more control panels 146,141. In other various embodiments, one or more of the abovementioned components may reside outside the filling cavity 116.

Figure 1A:
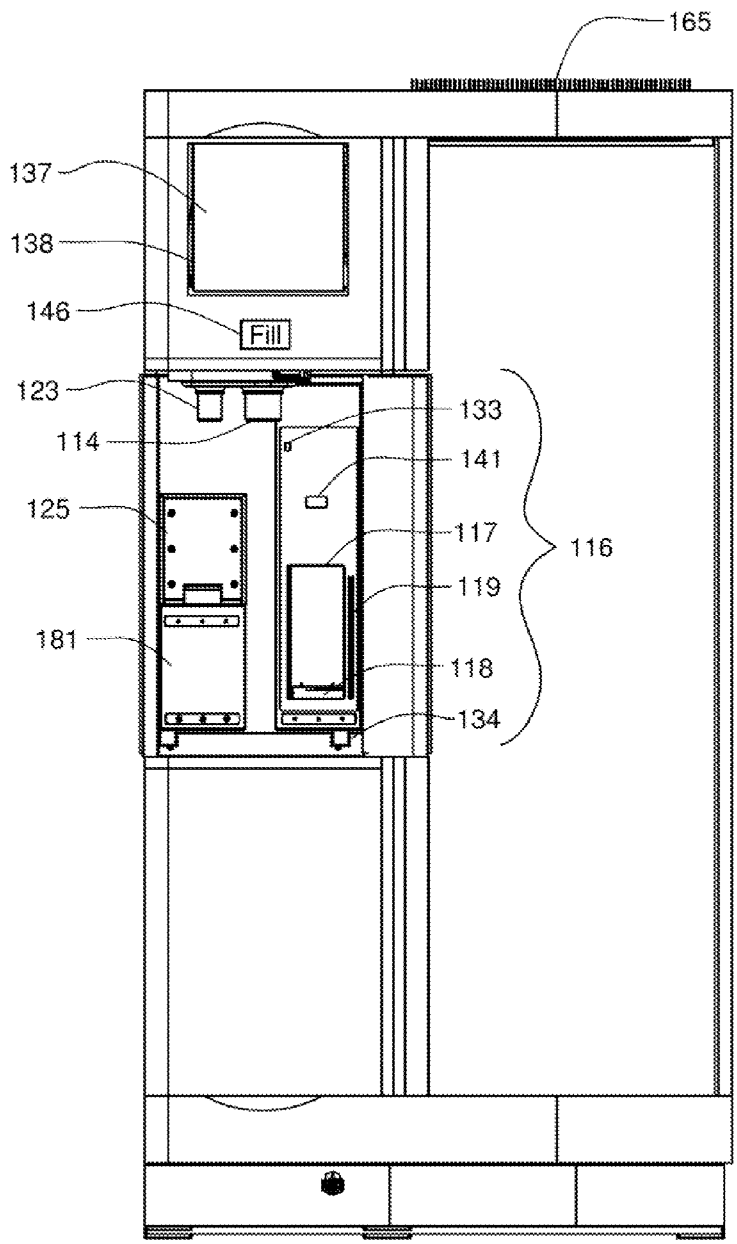
FIG. 1A is a front view of the vending apparatus according to one embodiment.

Referring now to FIG. 1A, in the exemplary embodiment, a filling cavity 116 is located on the front, dispensing portion 139 of the vending apparatus 113, and approximately chest-height with respect to an average person. Careful positioning of the filling cavity 116 may lessen the amount of work required in removing a full vessel 121*b* upon completion of the water vending process. In other embodiments, the filling cavity may be in the lower portion of the front of the dispensing portion 139 of the vending apparatus 113. This may allow for easy transfer of filling vessels 121*a-c* to and from water carts or other vehicles used to carry the vessels 121*a-c*.

1.2.1 Primary Filling Station

Still referring to FIG. 6, in the exemplary embodiment, the primary filling station 116*a* may adequately service vessels 121*b* having a volume of approximately 5 gallons. This station may accomplish a filling operation utilizing a primary base surface 115, main nozzle 114, proximity sensor 134, and a switch or control panel 146. The primary base surface 115 may provide a stable surface on which vessels 121*b* may rest throughout the course of a filling operation, and further, may have a structural composition such that fully filled vessels 121*b* may be adequately supported for an indefinite amount of time after a filling operation is complete. A vessel 121*b* placed on the primary base surface 115 may trigger a proximity sensor 134 (discussed further below), which may send a signal to the dispensing control or PLC 184 circuitry to permit a fill operation. The logic to permit a fill operation includes where the machine senses the presence of either a 5 or 1 gallon jug 121*b*, 121*a*. The control algorithm in the PLC 184 then chooses which valve 180 to actuate upon vendee input to a control panel 146.

Still referring to FIG. 6, product water may be dispensed to a vessel 121*b* at the primary filling station 116*a* through a main nozzle 114 protruding from the upper portion of the filling cavity 116. Positioning of the main nozzle 114 may be optimized such that product water flows directly to the center of the vessel 121*a* on the base surface 115. In various embodiments, water flow rate and/or water stream diameter may be a predetermined, nonadjustable parameter. However, in certain embodiments, flow rate and/or water stream diameter may be adjustable via a manual twisting mechanism on the nozzle 114,123, or automated via a control panel. In the exemplary embodiment, the filling station 116 is a plywood structure having covering of stainless steel side and back walls, and a plastic spill tray with a plywood structure.

1.2.2 Secondary Filling Station

Figure 7:
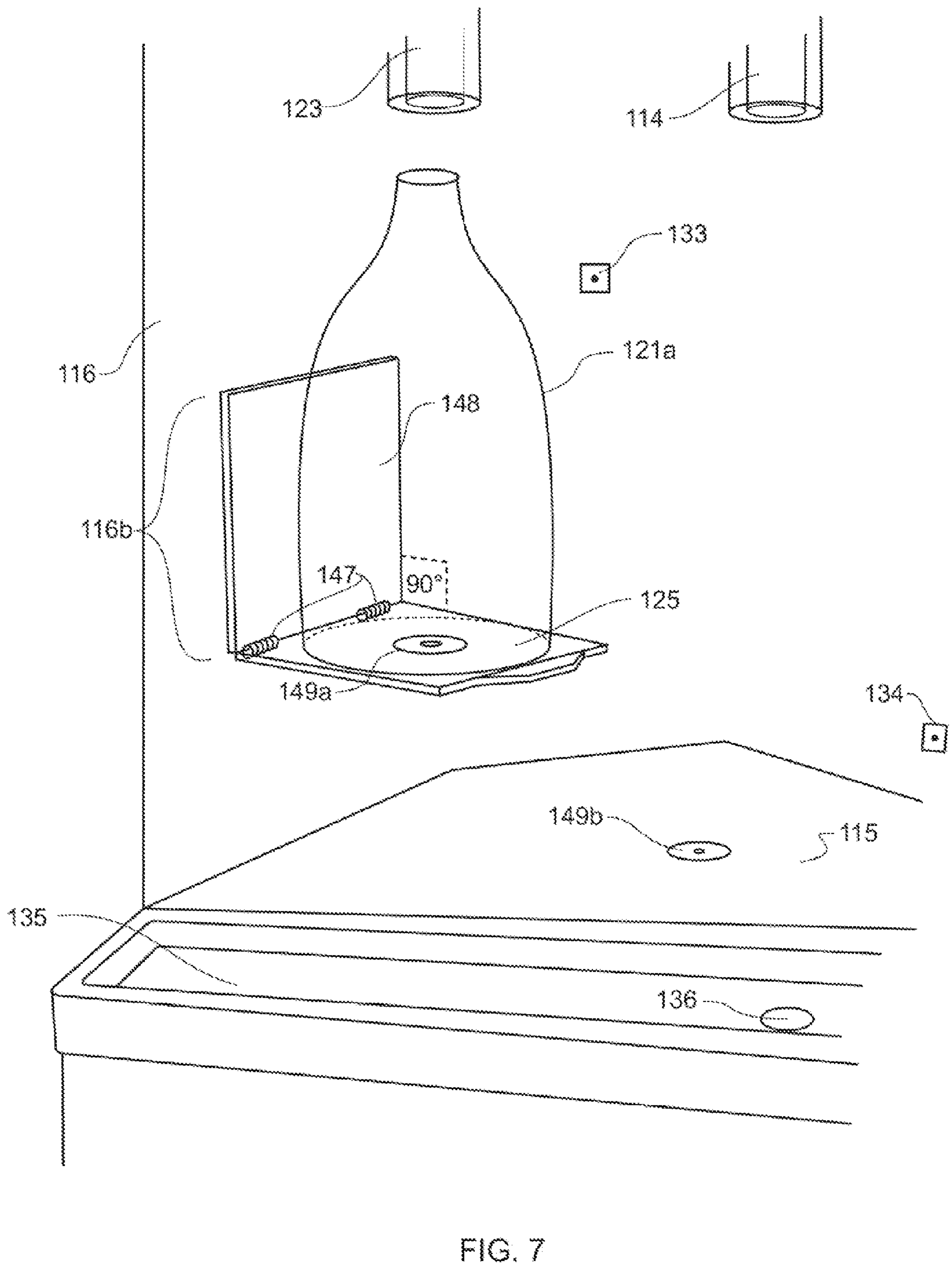
FIG. 7 is a front detail view of the secondary filling station in an unfolded state according to one embodiment.
Figure 8:
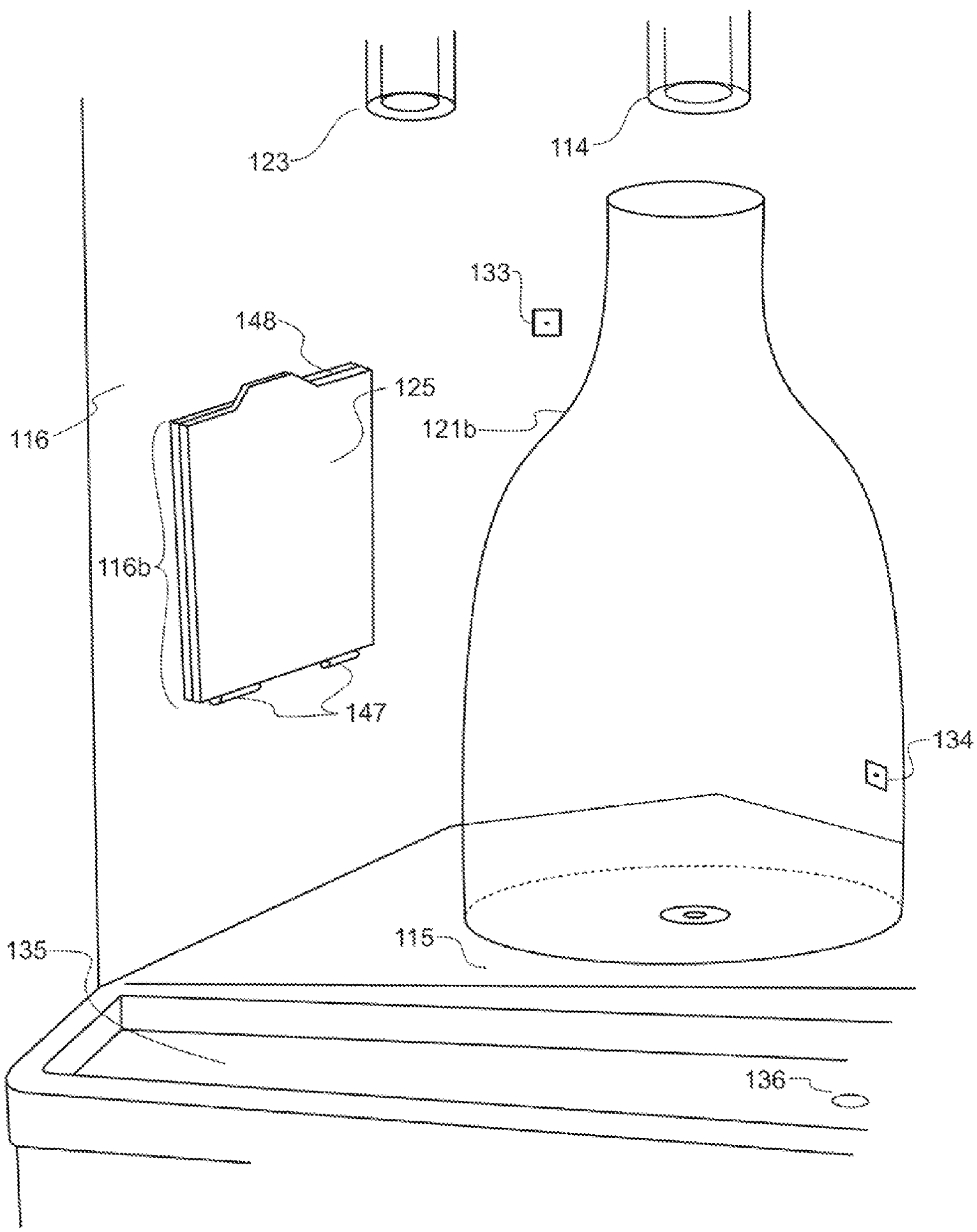
FIG. 8 is a front detail view of the secondary filling station in a folded state according to one embodiment.
Figure 9:
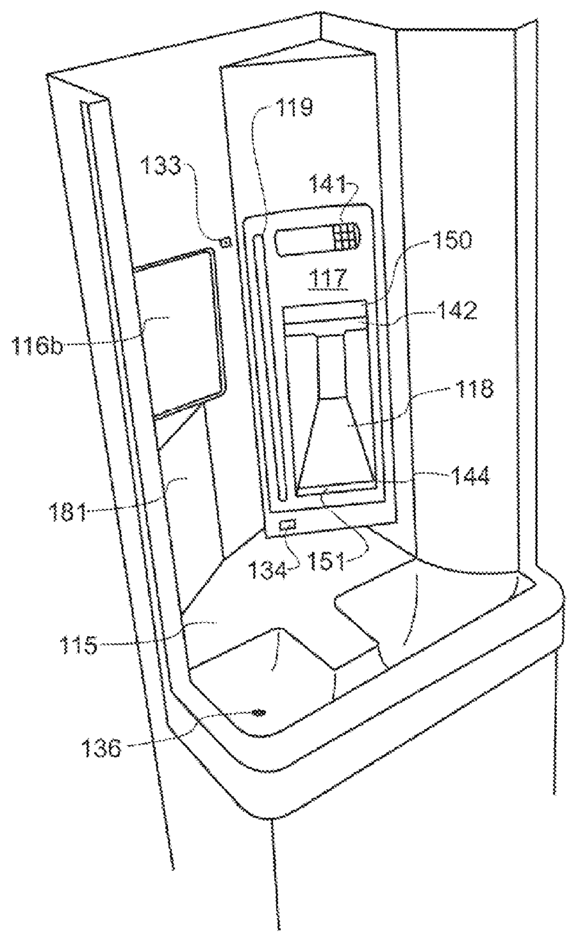
FIG. 9 is a diagram of the multipurpose interface according to one embodiment.

Referring to FIGS. 7-9, the filling cavity 116 may also include a secondary filling station 116*b*, having a secondary base surface 125 and serviced by a secondary nozzle 123. This filling station may prove beneficial in accommodating vessels with a smaller form factor than vessels 121*b* serviced by the main nozzle 114. In the exemplary embodiment, 1 gallon vessels 121*a* are serviced at the secondary fill station 116*b*, however, in other embodiments this station may accommodate a varying array of vessel volumes.

Still referring to FIG. 7-9, the secondary base surface 125 may be elevated to minimize the distance from secondary nozzle 123 to the rim of a 1 gallon vessel 121*a*. Additionally, the secondary base surface 125 may be capable of folding flat against, or mating with, a back plate 148 oriented adjacent to the vertical wall of the filling cavity 116. In a completely unfolded state the secondary base surface 125 may reside at a 90 degree angle from the back plate 148. Folding functionality may be facilitated by way of one or more hinges 147 coupling the back plate 148 and the secondary base surface 125. In other embodiments, the secondary base surface 125 may not fold flat against the back plate 148, the bottom of the secondary base surface 125 may be used to help locate the correct positioning for the vessel used in the primary filling station 116*a*. In this embodiment, the bottom of the secondary base surface 125 may be designed to fit the receiving end, the opening, or mouth of the 5 gallon vessel 121*b* in a position as to allow the main nozzle 114 to dispense water directly into the vessel 121*b*. In another embodiment of this embodiment, the bottom of the secondary base surface 125 may be designed to fit the neck of the 5 gallon vessel 121*b* in a position as to allow the main nozzle 114 to dispense water directly into the vessel 121*b*.

Figure 4:
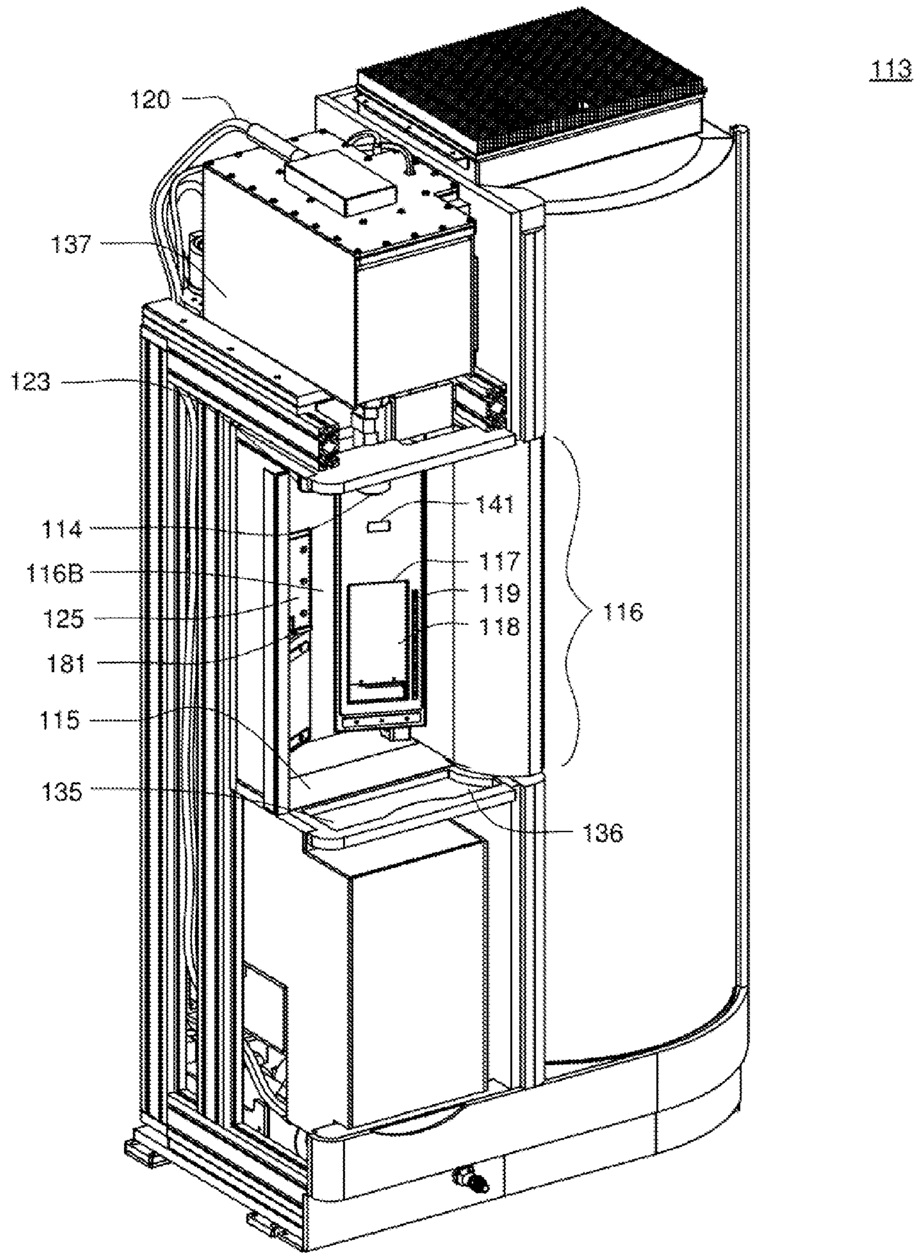
FIG. 4 is a perspective view of the water vending apparatus focusing on a water quality testing interface according to one embodiment.

Referring to FIG. 4 and FIG. 9, in certain embodiments that incorporate the abovementioned folding functionality, the secondary base surface 125 may rest on a protuberance 181 of the filling cavity 116 such that stress on the hinges is minimized and stability is increased (FIG. 4 and FIG. 9 show secondary filling station 116*b* in an upright position).

In various embodiments, a secondary filling station 116*b* may include a non-elevated base surface residing on the same plane as the primary filling station base surface 115. In this configuration a secondary filling nozzle 123 may be located below the main nozzle 114 to reduce the distance product water must travel to a vessel 121*a*.

In various embodiments, a nozzle assemblies 114,123 and water flow path may allow product water to be dispensed to two or more vessels simultaneously. In one of these embodiments, both the 1 gallon vessel 121*a* and 5 gallon vessel 121*b* may be filled at the same time.

In various embodiments, a secondary filling station 116*b* may reside at a location isolated from the filling cavity 116. Front, side, and backside areas of the vending apparatus 113 may provide an adequate region for placement of a secondary filling station 116*b*. Further, a secondary filling station 116*b* may exist as an easy-access spout of the type commonly found on water coolers.

1.2.3 Nozzles

Referring now to FIG. 1 and FIG. 7-8, in the exemplary embodiment, both main nozzle 114 and secondary nozzle 123 may be constructed from stainless steel. In the exemplary embodiment, the stainless steel nozzles 114,123 are surrounded by an acrylic ring with imbedded LEDs 218. However, in other embodiments, the nozzle 114,123 may be made from a clear plastic material. In either case, in the exemplary embodiment LEDs 218 may be embedded within the plastic and programmed to illuminate continuously, or at certain steps within a vending operation. Nozzle illumination may also provide a basic error checking mechanism for the vendee. In some embodiments, LED circuitry may be programmed to illuminate before product water is distributed to the piping associated with a targeted nozzle. This way, a vendee may be more likely to discover an error in the dispensing process (or error in vessel placement), and take steps to prevent spilling product water. This may include moving a vessel 121*a* to the correct nozzle, utilizing a discontinue button (not shown), or notifying a water vending apparatus representative.

Figure 26A:
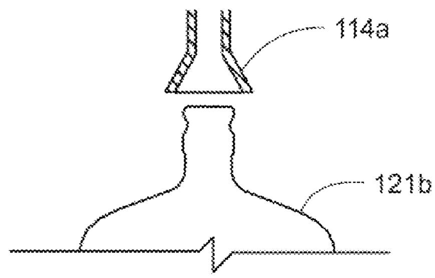
FIG. 26A is another embodiment of the nozzle assembly.
Figure 26B:
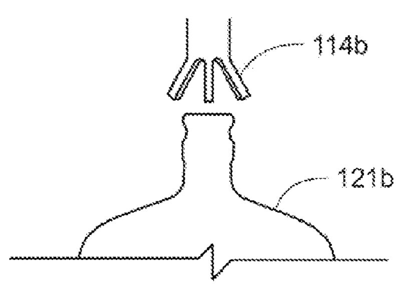
FIG. 26B is another embodiment of the nozzle assembly.
Figure 26C:
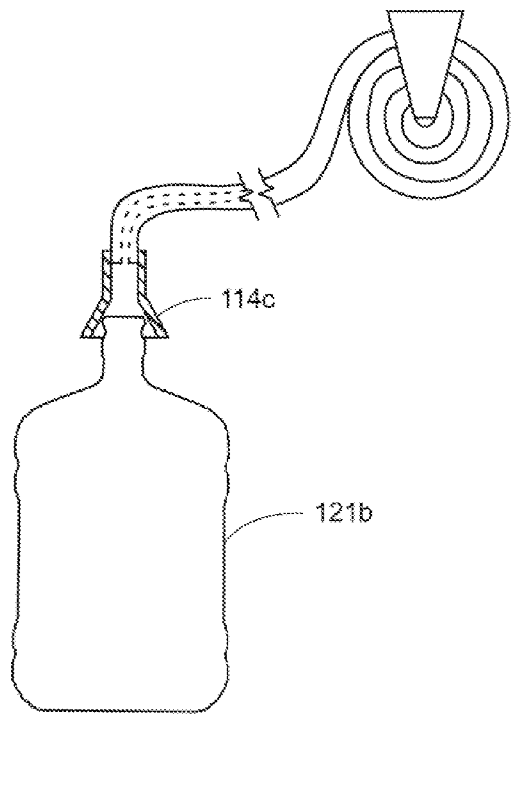
FIG. 26C is another embodiment of the nozzle assembly.
Figure 26D:
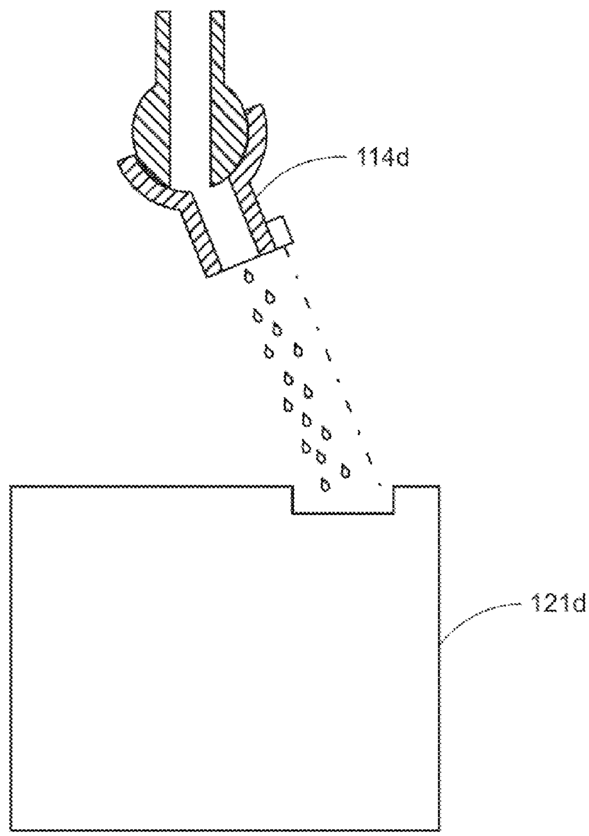
FIG. 26D is another embodiment of the nozzle assembly.
Figure 26E:
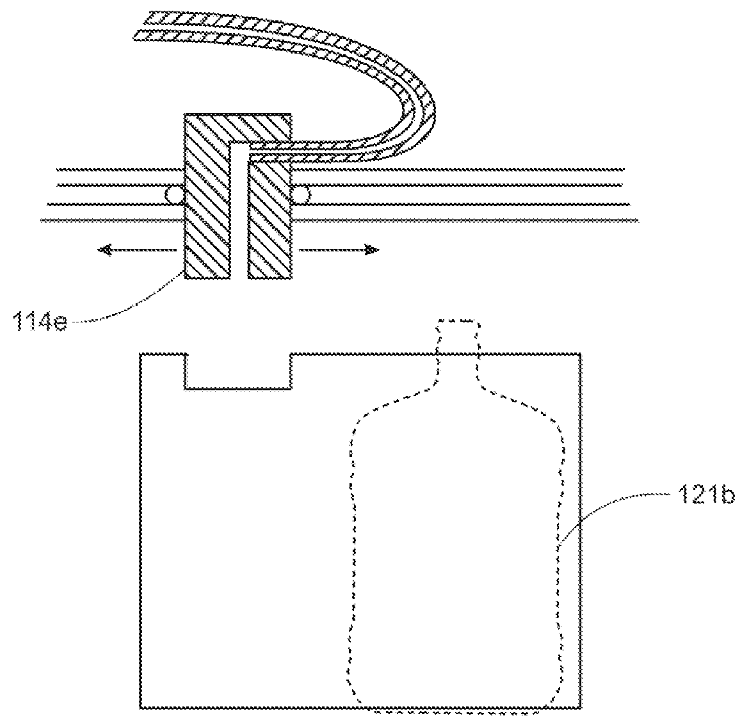
FIG. 26E is another embodiment of the nozzle assembly.
Figure 26F:
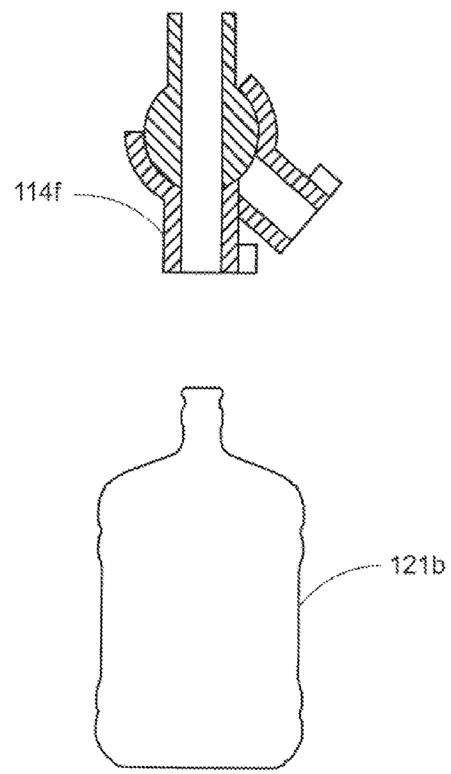
FIG. 26F is another embodiment of the nozzle assembly.

In other various embodiments, as shown in FIG. 26F, one or more filling stations 116*a*-116*c* may have a swiveling single nozzle having one or more orifices within the nozzle. In this configuration, a single nozzle may be manipulated such that it provides product water to the primary filling station 116*a* in one position and the secondary filling station 116*b* in another position. Further, a swiveling nozzle apparatus may provide a means of occluding the unused nozzle orifice to prevent loss of product water. Swiveling functionality may be performed manually or, alternatively, as an automated operation in response to vendee input from a control panel. In some embodiments, the swiveling function may be performed automatically once the proximity sensor 133 or 134 recognizes a vessel 121*a* or 121*b* has been placed in the filling cavity 116.

In other various embodiments, one or more filling stations may include a telescoping nozzle. A telescoping nozzle capabilities may provide a means of lessening the distance from nozzle to vessel 121*b*, preventing the urge to hold a vessel 121*b* up to a nozzle. In such a configuration, a vendee may manually perform the telescoping function when filling a vessel 121*b* with a small form factor. Alternatively, telescoping functionality may be automated and extend/retract according to vendee input on a control panel. The telescoping functionality may be automated with proximity sensors to detract/retract so no additional vendee input is required. In this embodiment, the proximity sensors may determine a vessel 121*b* is in place and automatically detract to accommodate the vessel 121*b* for filling.

Figure 8A:
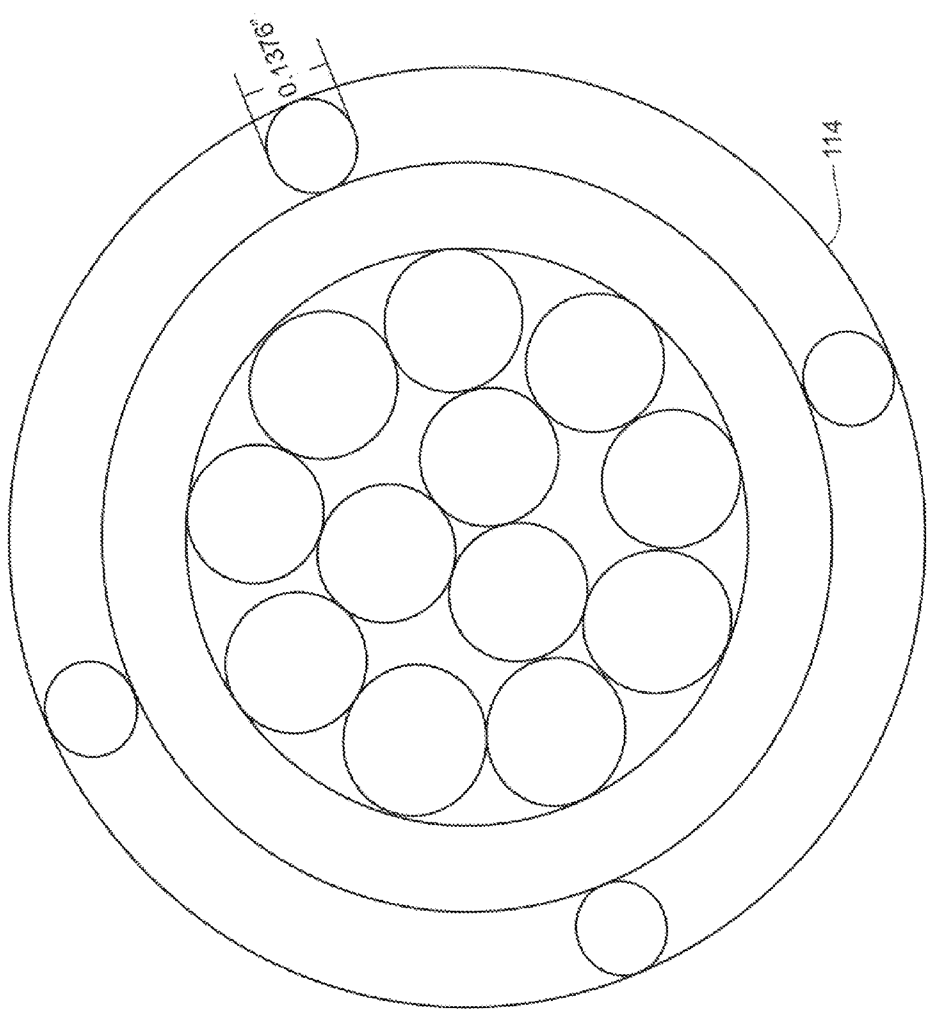
FIG. 8A is a downward view of the main nozzle assembly according to one embodiment.
Figure 8B:
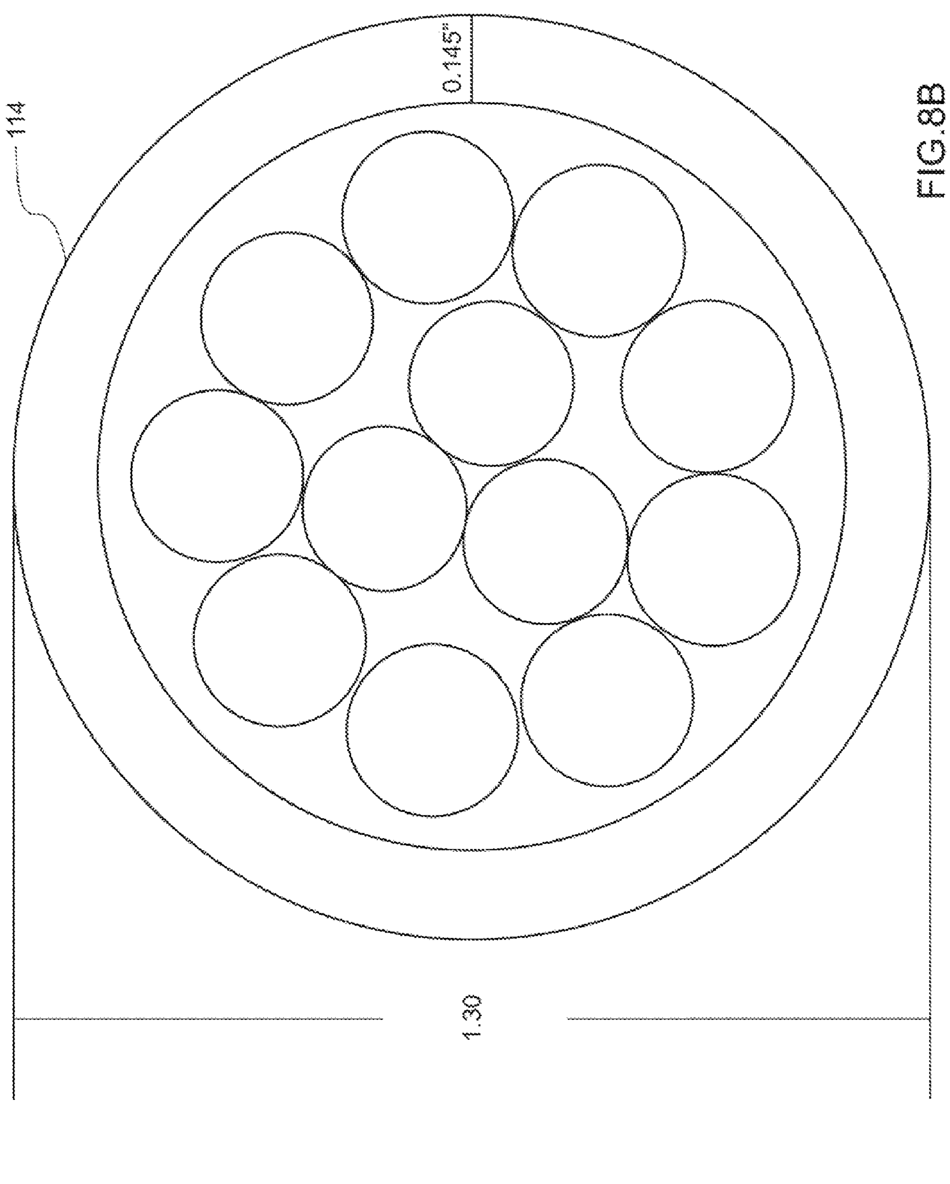
FIG. 8B is an upward view of the main nozzle assembly according to one embodiment.
Figure 8C:
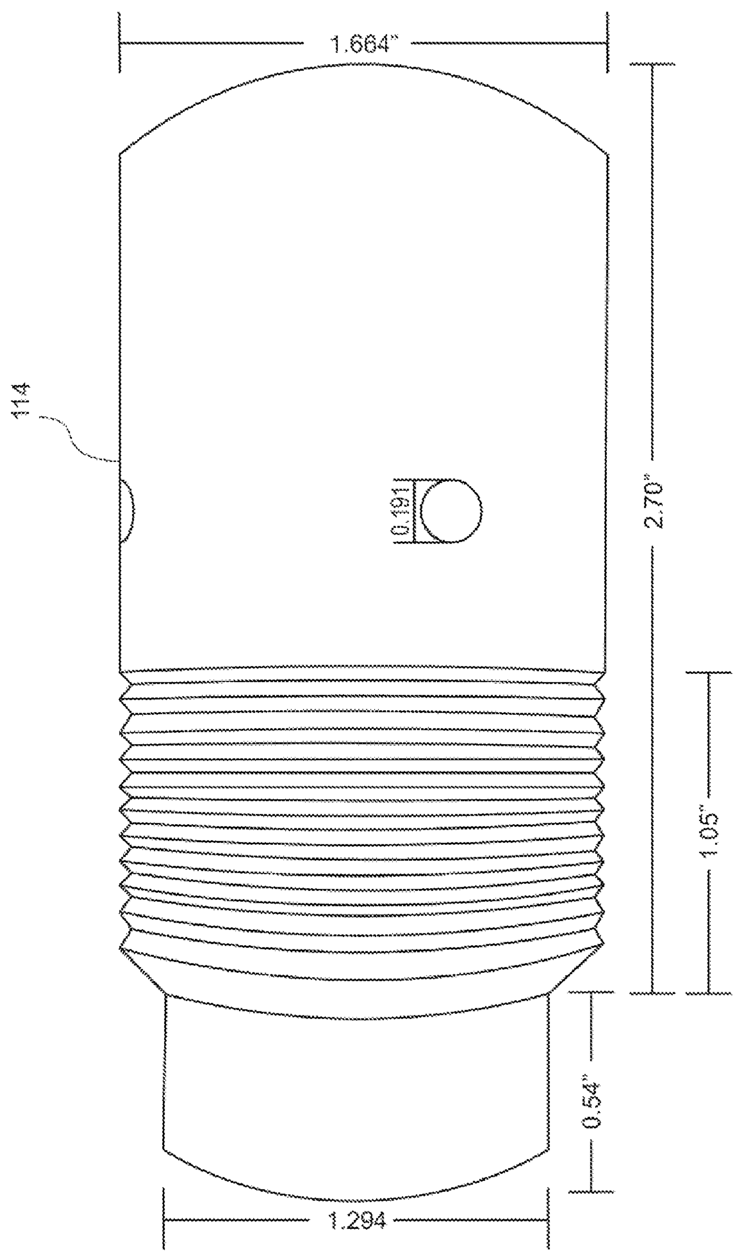
FIG. 8C is a side view of the main nozzle assembly according to one embodiment.

Now referring to FIG. 8A-C, in various embodiments, nozzle assemblies may implement material, such as but not limited to, tubing, to provide an even, parallel layered fluid flow commonly referred to as laminar flow. In some embodiments having a smooth, even fluid flow would be desirable to limit or eliminate water spraying in various directions once exiting the nozzle assemblies prior to entering the vessel. In the exemplary embodiment, as shown in FIG. 8A-8B, the main nozzle implements a means for providing a laminar fluid flow towards the vessel. The laminar flow is created by using 12 stainless steel tubes of a 0.24 inch inner diameter and a thickness of approximately 0.0125 inch. This tubing is only the exemplary embodiment, other embodiments may use tubing of a larger or smaller diameter or a larger or smaller thickness of the tubing. Also in other embodiments, greater than or less than 12 tubes may be used to achieve the optimal desired fluid flow from the nozzle. Stainless steel was chosen because it will not rust, will not cause a discoloration or change in taste in the water. In other embodiments, stainless steel may not be chosen and any material that will not rust, cause discoloration or change the taste of the water would be desirable. In some embodiments, it may be desirable, to cut down on tubing, to have tubing that does not extend throughout the nozzle assembly. In the exemplary embodiment, as shown in FIG. 8B the tubing providing laminar flow is approximately 0.25 inch above the end of the nozzle. This is only the exemplary embodiment, in some embodiments it may be advantageous to have tubing extending to the end of the nozzle or beyond the nozzle.

1.2.4 Control Panel

Figure 12:
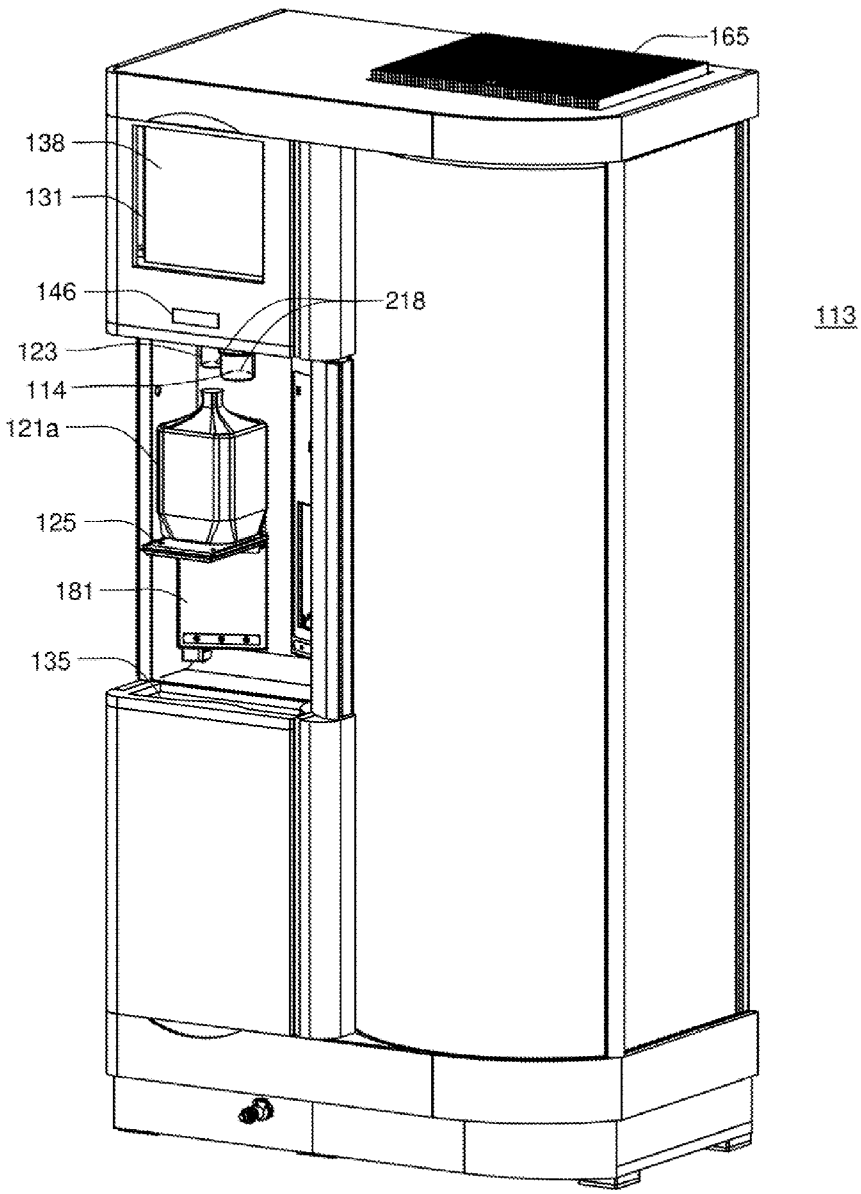
FIG. 12 is a front perspective view of a water vending apparatus according to one embodiment.
Figure 13:
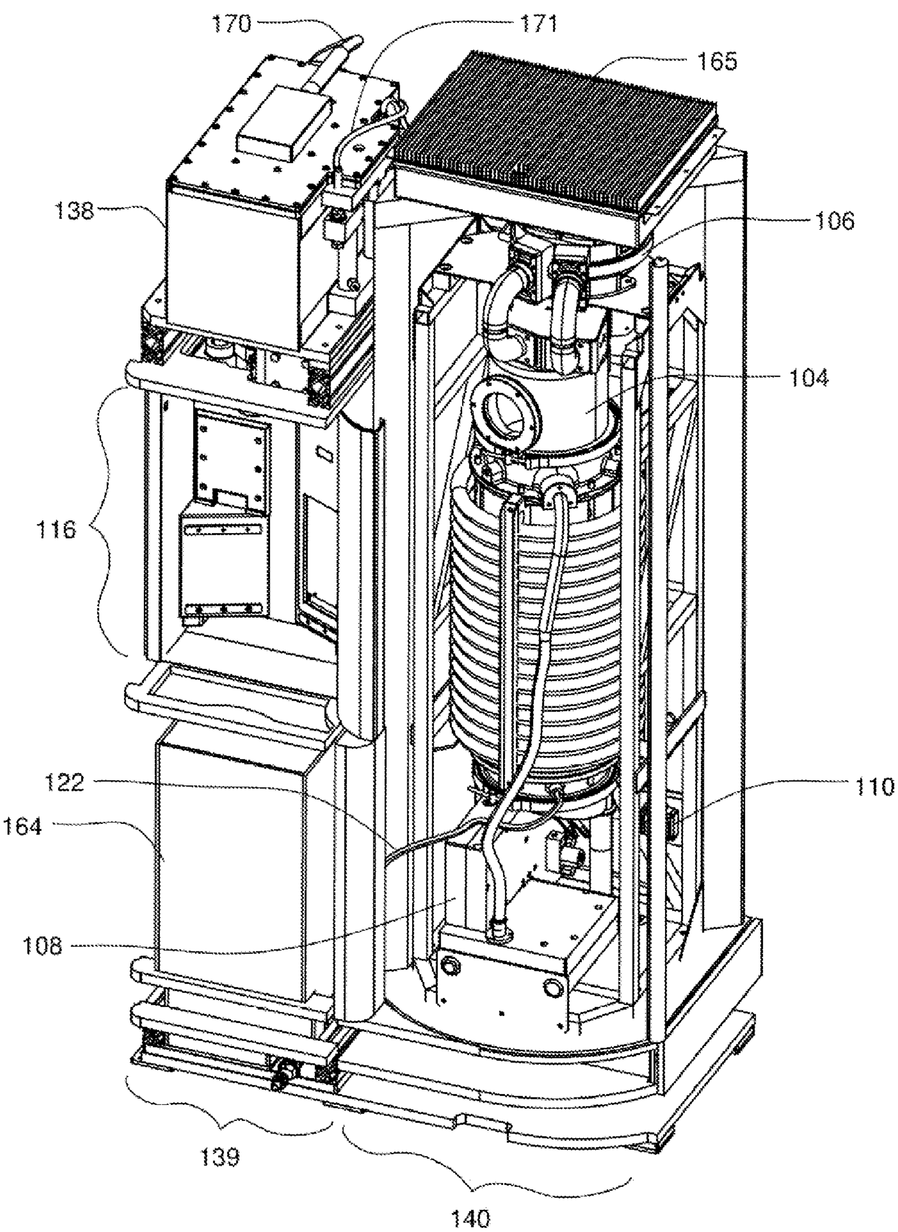
FIG. 13 is a front perspective view of water storage tanks incorporated within a water vending apparatus according to one embodiment.

In the exemplary embodiment, as shown in FIG. 6 and FIG. 12, a control panel 146 resides outside and vertical to, the filling cavity 116. The control panel 146 may be a single button which sends a fill request to dispensing control circuitry. In turn, such a request may be granted or denied based on analysis of a variety of input variables required for a filling operation to commence. These variables may include product water storage tank levels, proximity sensor output, dispensing component status, purification component status, product water quality levels, or other status indicators. A fill request may be denied where proximity sensor output signals are determinative that no vessel 121*b*, 121*a* exists at the primary or secondary base surface 115, 125 (respectively). In some embodiments a fill request may be denied where the water purification system 100 has sent a status signal to the dispensing control circuitry, also referred to as the PLC, 184 indicating that one or more components are in a degraded state. When the dispensing control circuitry 184 has determined that all variables required to dispense product water are in a logic high state, product water may be dispensed to a vessel 121*b*, 121*a* depending on the placement at the filling station 116*a*, 116*b*.

In other various embodiments, one or more control panels may be incorporated within the filling cavity 116. Additionally, each fill station 116*a*, 116*b* may be associated with a dedicated control panel for filling operations.

In other various embodiments a control panel 146 may be comprised of a fill button and a discontinue button. A discontinue button may be advantageous where dispensing control circuitry is programmed to dispense a predetermined volume of product water, thus allowing a vendee to prevent a vessel 121*a*,121*b* from overflowing. Another advantage of a discontinue button may be partial filling capability. A vending control panel 146 may also be comprised of an assortment of Liquid Crystal Display (LCD) units, buttons, switches and/or knobs. In some embodiments, a vendee may manually enter the volume to be dispensed, select a working nozzle 114, 123, and complete the fill request by way of depressing a fill button on an electronic keypad.

In various embodiments, a predetermined volume of water may be dispensed to a vessel 121*a*, 121*b* based on positioning at a fill station 116*a*, 116*b*. In this configuration, a vendee may be required to supply a vessel 121*a*, 121*b* with a volume corresponding to one of the predetermined volumes supported by the vending apparatus 113. In other various embodiments, a vendee may select from a range preset volumes from a control panel, or input a volume manually.

Now referring to FIG. 1A, in the exemplary embodiment, to keep buttons, switches and knobs to a minimum, to discontinue filling a vessel, the vendee may press the fill button twice to discontinue filling the vessel. In some embodiments, if a vendee supplied a 5 gallon vessel 121*b*, but only needed 3 gallons the vendee may use the control panel 146 to submit a fill request and after 3 gallons has dispensed, the vendee may use the control panel using the same manner in selecting a fill request to discontinue filling the vessel. This may discontinue filling the vessel prior to the 5 gallon expectation of the system.

1.2.5 Multipurpose Interface

Referring to FIG. 4 and FIG. 9, FIG. 11V-11W, the filling cavity 116 may also contain a multipurpose interface 117 which may operate as a filling station, or as a water quality multipurpose interface, depending on mode. In filling mode, this component may be beneficial for vendees seeking to fill a vessel smaller than 1 gallon, or more specifically, vendees seeking no more than a single glass of water per use. In the filling mode, a drinking glass valve 216 similar to the valves 159 in the primary and secondary nozzles 114, 123, respectively, is actuated to allow the water to flow to the glass. In testing mode, such a component may aid the vendee in deciding whether or not the machine is functioning properly and/or aid maintenance personnel in performing diagnostic tests. In the testing mode, once the water is dispensed and tested using a conductivity sensor 143 to test the water then the water will pass through a conductivity valve 217 before it flows to the multipurpose interface drain 144 to the interface drain tube 245 to exit the system towards the drain 246. Mode may be selectable based on input from a control panel 141.

In the exemplary embodiment, a multipurpose interface 117 may be composed of a recessed metallic region with dimensions such that a drinking glass or any other small vessel 121*c* may be inserted underneath an upper panel 150. A spout 151 and a proximity sensor 152 may reside under the upper panel 150. Within the recessed area, an angled spillway 118 may prevent product water from splashing out of the filling cavity 116, and additionally, provide a path for product water (or even vendee supplied water) to reach a conductivity sensor 143 after passing through a multipurpose drain 144.

Regarding usage as a filling station, a multipurpose interface 117 may incorporate a proximity sensor 152 (functioning as previously described) residing underneath the upper panel 150. When a vessel 121*c* is placed within the recessed area, product water may be automatically dispensed. In this configuration, product water may be dispensed continuously as long as the sensor's return signal is obstructed from reaching the detector. Overflow water may drain into the multipurpose drain 144 and additionally pass over one or more inactive or active conductivity sensors 143 before being transferred into a drainage or recirculation system.

In other various embodiments of a multipurpose interface, a proximity sensor may be omitted from the design and an electronic keypad may be used to carry out the function of dispensing product water in fill-mode. In other embodiments, a single button may be utilized rather than an electronic keypad to dispense the product water.

In the exemplary embodiment, a 1 gallon chiller 169 may be utilized to reduce the temperature of product water dispensed from the multipurpose interface 117. Operating at 0 degrees Celsius, the chiller 169 may also be cold enough to prevent or slow the growth of most harmful bacteria. Such a component may be needed as the heat exchanger 102 may not cool product water to a favorable drinking temperature. A chiller 169 may act as an intermediary component between the secondary tank 138 and the multipurpose interface 117. The chiller may utilize a fan 205, a condenser 210, a compressor 145, and refrigeration coils 126, as commonly known in the art of refrigeration. In various embodiments, the chiller 169 may be larger or smaller than 1 gallon.

Preferably located below the secondary tank 138 and above the multipurpose interface 117, the chiller 169 may utilize a gravity based filling and distribution system; such as, but not limited to, product water may drain from a port 176 on the secondary tank 138 into the chiller 169 at a gravity determined flow rate, and pass through the spout 151 upon fill/test request.

Figure 4A:
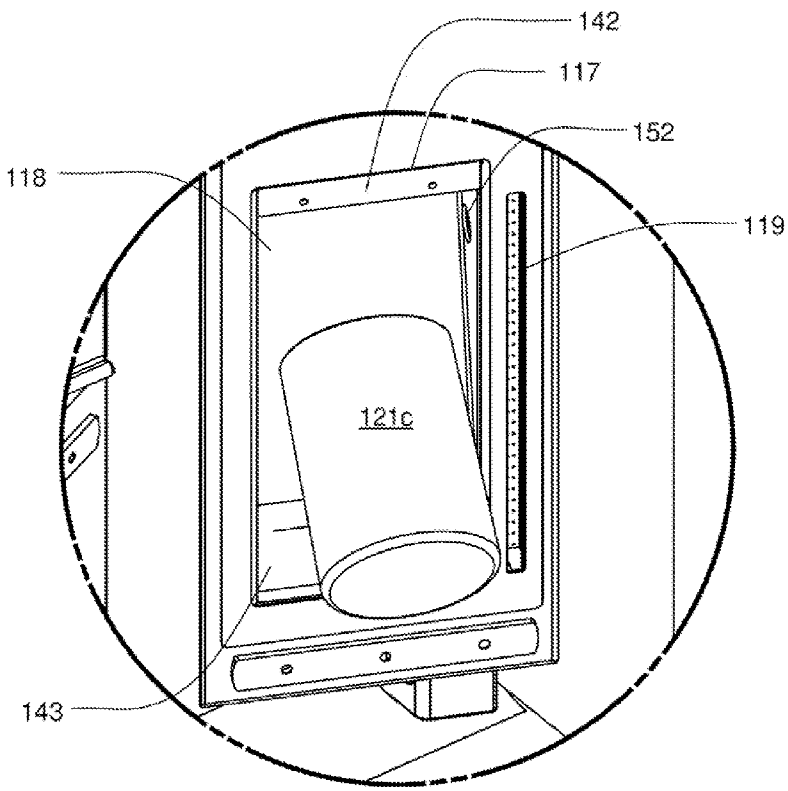
FIG. 4A is a detail view of the water quality testing interface and a vessel for receiving water according to one embodiment.
Figure 4B:
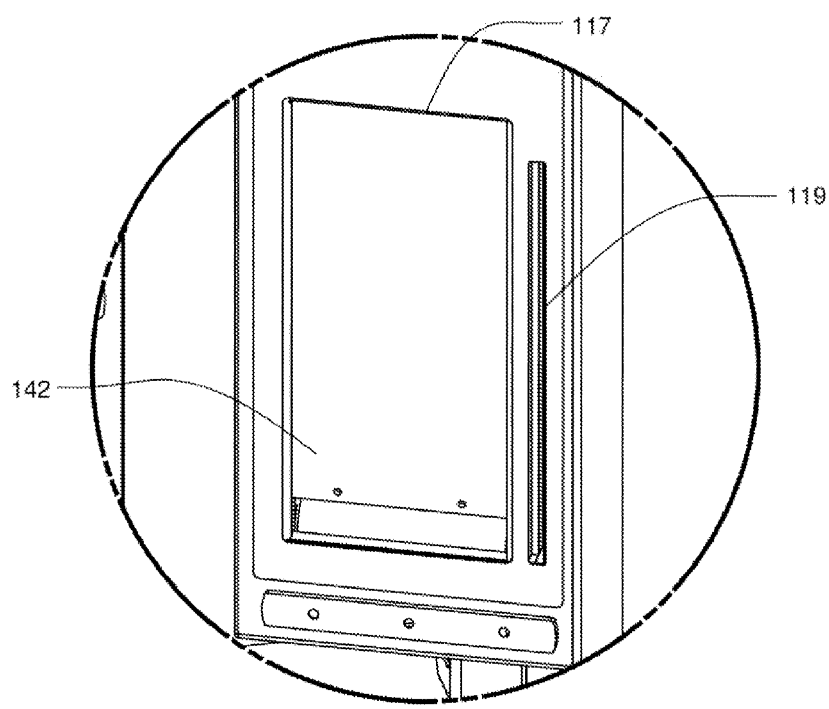
FIG. 4B is a detail view of the water quality testing interface and a closed door according to one embodiment.

Now referring to FIG. 4A-B, the chiller 169 may be surrounded by an insulating layer 177 for increased efficiency and to prevent condensation from forming and dripping onto other dispensing components. This layer may be comprised of a hard urethane foam core (2 halves) and a soft neoprene outer covering/shell for insulation.

In various embodiments, the chiller 169 may be bypassed when the multipurpose interface 117 is in test mode such that product water is dispersed from secondary tank 138 directly to the spout 151.

Regarding usage as a testing interface, referring to FIG. 9, a multipurpose interface 117 may incorporate one or more sensors, such as a conductivity sensor 143, display 119, and control panel 141. A conductivity sensor 143 may be utilized to test the quality of water by measuring the ability of water to conduct electric current. Usually when there are a greater proportion of ions in water the conductivity of the water is higher. In the exemplary embodiment, product water may be supplied to the sensor 143 via the spout 151 or a sample of water from a vendee supplied vessel 121*a*, 121*b*, 121*c*. Thus, a vendee may also use the multipurpose interface 117 to test vendee-supplied raw water or a vending competitor's water before deciding to proceed with tilling operation.

Again referring to FIG. 4 and FIG. 9, the conductivity sensor may be coupled to a display 119 and the control panel 141. In some embodiments, a display 119 may visually depict a conversion from sensor output to an easy to read vertical light strip. As shown in FIG. 4, a vendee may test the quality of the product water by first utilizing a control panel 141 to set the multipurpose interface 117 in test mode. The test-mode state may initialize the conductivity sensor 143 or simply apply power to its control circuitry and also power the display 119. Next, the vendee may depress another button (or the same button yet again) on the control panel 141 to dispense a product water sample over the conductivity sensor 143. Sample water may be dispensed in a predetermined volume, or for the duration of the button press. Finally, the display 119 may illuminate for a predetermined period of time, depicting the purity level. In certain embodiments, the display may stay illuminated until test-mode is discontinued.

It may be important that sample water be removed from a local storage unit, such as the secondary tank 138, the chiller tank 169, or the primary tank 164, connected to the purification portion 100 to ensure that product water from a subsequent dispense operation will have substantially similar conductivity levels. In the exemplary embodiment, the water exits from the chiller tank 169 however the water may exit any tank for testing purposes. An additionally aspect that may be important in the exemplary design, is that product water visibly falls onto an angled spillway 118 so that a vendee may have increased confidence that the multipurpose interface 117 is legitimately testing product water.

Still referring to FIG. 9, the water quality display 119 may convey purity information to a vendee by illuminating a number of LEDs proportional to the output of the conductivity sensor 143. In the exemplary embodiment, the highest state of purity may illuminate a single LED at the highest point of a vertically aligned strip of LEDs. As water quality decreases, additional LEDs may be incrementally lit down the strip. The lowest state of purity may consist of the entire strip being illuminated. Further, the display 119 may be color coded such that purity information is more intuitive. In the exemplary embodiment, LEDs are colored from blue at the highest purity, yellow in the middle, and to red at the lowest purity. In other embodiments, the LED colors may be any in the visible spectrum or, in some embodiments incorporating various colored lighting, any colors in the nonvisible spectrum may be used when informing a vendee of water purity.

In various embodiments, different components or mechanisms for displaying purity may be implemented. A different display may take the form of a gauge, meter, LCD unit, or a combination of visual indicators. Similarly, different colors are contemplated for an array of LEDs such as in the exemplary embodiment.

The multipurpose interface 117 may also include a door 142. In the exemplary embodiment, the door is of the sliding type and has a tab 153 for manually producing sliding motion. A fully closed state results in the door 142 slid down over the front recession of the multipurpose interface 117, fully covering the internal components. In a fully open state, as shown in FIG. 9, the majority of the door 142 may be hidden from view and slipped underneath both upper panel 150 and vending machine housing. A door may be important in maintaining the accuracy of the conductivity sensor by keeping the region relatively free of unintended contact with air, dirt, water, and other particulate. Accordingly, in various embodiments, the entire filling cavity may incorporate a door for similar reasons. In various embodiments, the door 142 may be a sliding bar capable of protecting the conductivity sensor 143 and the multipurpose drain 144.

1.2.6 Proximity Sensors

Proximity sensors 134, 133, 152 may be utilized to prevent dispensing product water without a vessel in appropriate position on the primary or secondary base surfaces 125, 115 (respectively). A proximity sensing device 133, 134, 152 may be of the type commonly known in the art, and as such, emit a beam of electromagnetic radiation, such as an infrared beam, and detect changes in the return signal. However, a proximity sensor may be embodied in a number of different technologies such as an ultrasonic rangefinder, pressure sensing devices embedded in the base surfaces, micro laser rangefinder, or other devices. Proximity sensor output may be one of several variables analyzed by dispensing control circuitry 184 before a filling event is permitted to occur.

In the exemplary embodiment, a proximity sensor 134 may be positioned within the filling cavity 116 such that a vessel 121*b* resting on the base surface 115 of the primary filling station 116*a* may obstruct an infrared beam, thus allowing a filling event to occur. Conversely, a filling request may be precluded where the proximity sensor 134 receives an unobstructed return signal, indicating that no vessel is in place on the base surface 115. Signal return may be facilitated by a surface positioned to optimize reflection of an electromagnetic beam. In certain embodiments, however, the vending apparatus housing may provide a sufficient surface for reflecting a beam back to the emitter. In certain embodiments, different types of sensors are used and there would be no need for a reflecting surface, a separate emitter and detector may be used wherein reflection is not necessary. In the exemplary embodiment, a proximity sensor 133 may be positioned within the filling cavity 116 such that a vessel 121*a* resting on the base surface 125 of the secondary filling station 116*b* may obstruct an infrared beam, thus allowing a filling even to occur.

Dispensing control circuitry, also called the PLC, 184 may provide error checking for proximity sensing devices. In the exemplary embodiment, the vending apparatus 113 is programmed to dispense through only one nozzle at a time, relying on proximity sensor output to determine which nozzle should be utilized. Here, if dispensing control circuitry 184 determines that vessels exist at more than one fill station prior to discharging product water, the filling request may not granted and/or the system may display/sound an error. Further, the vending apparatus 113 may check for proximity sensor failure, and provide a means of continuing service without relying on output from a failed sensor. In such a situation, dispensing circuitry 184 may execute a contingency routine, which may allow a vendee to manually select an appropriate nozzle through, in some embodiments, a keypad.

In various embodiments, a proximity sensor may be positioned to minimize erroneous output. This may include aiming the sensor toward the fill area most likely to contain the largest diameter of a vessel (likely the bottom of the target fill station), thereby increasing the probability of correctly sensing a vessel. Additionally, one or more proximity sensors may be aimed at the same location. Having multiple sensors per fill station may minimize sensing error and become especially advantageous where one or more sensors fail.

1.2.7 Assisted Vessel Positioning

Again referring to FIG. 7-8 and FIG. 28A-28F, in some embodiments the primary and secondary base surfaces 115, 125 (respectively) may each include positioning indicators 149*b*, 149*a*, which may allow vendees to most efficiently ascertain the fluid flow passing through the nozzle assemblies 114, 123. In other embodiments, the primary and secondary base surfaces 115, 125 (respectively) may each include positioners 149*c*, 149*d* which may compel the vendee provided vessel 121*a*, 121*b*, 121*c*, 121*d* into an appropriate location below the nozzle assemblies 114, 123. These may be desirable in some embodiments to ensure efficient transfer of water from machine to vessel.

Figure 25:
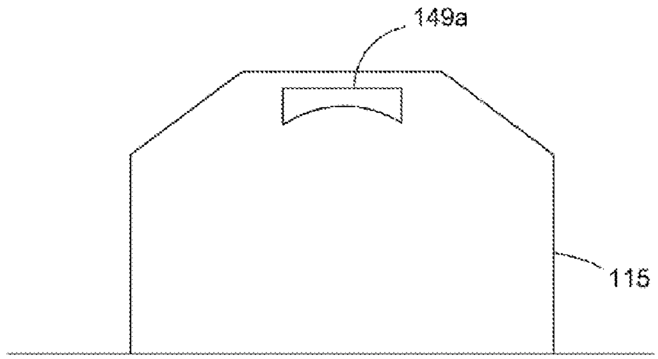
FIG. 25A is another embodiment of the positioning indicator for the vendee vessel.
FIG. 25B is another embodiment of the positioning indicator for the vendee vessel.
FIG. 25C is another embodiment of the positioning indicator for the vendee vessel.
FIG. 25D is another embodiment of the positioning indicator for the vendee vessel.
FIG. 25E is another embodiment of the positioning indicator for the vendee vessel.
FIG. 25F is another embodiment of the positioning indicator for the vendee vessel.
FIG. 25G is another embodiment of the positioning indicator for the vendee vessel.
FIG. 25H is another embodiment of the positioning indicator for the vendee vessel.
Figure 25:
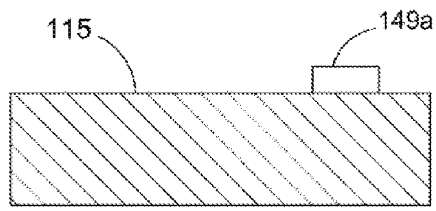

In the exemplary embodiment, FIGS. 7 and 8, the filling cavity may have multiple filling stations 116*a*, 116*b* and those filling stations 116*a*, 116*b* may distribute different volumes of water. Because the vessels 121*a*, 121*b* may not reach the nozzles 114, 123, there may be a need for devices assisting the placement of the vendee vessels 121*a*, 121*b* as to limit spilling. The positioning indicators 149*a*, 149*b* or positioners 149*c*, 149*d* may range from indents in the base surface to LED lights. The exemplary embodiment as shown in FIG. 25A-B uses an extruded curved surface to help users position the vessel directly under the nozzle.

Figure 25C:
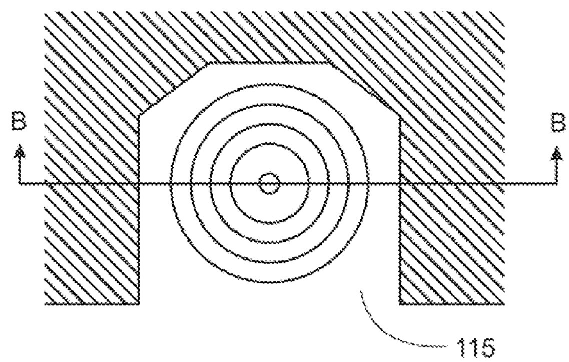
Figure 25D:

In other embodiments, FIG. 25A-25H, the positioner 149*a*, 149*b* may be, but is not limited to, a series of concentric indentations in the base surface, 115, and 125 guiding the various vessels 121*a*, 121*b* to the proper location below the nozzle assemblies 114,123 as shown in FIG. 25C-D. The back wall of the filling cavity 116 may contain a partial extrusion (not shown) preventing the vessel 121*a*, 121*b* from passing beyond the nozzle flow path. In another embodiment, the positioning indicator 149*a*, 149*b* may be a protruding circle where the vessel 121*a*, 121*b* may be positioned within as shown in FIG. 25G-H.

Figure 25E:
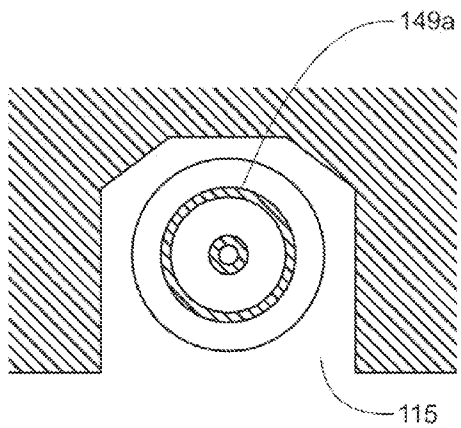
Figure 25F:
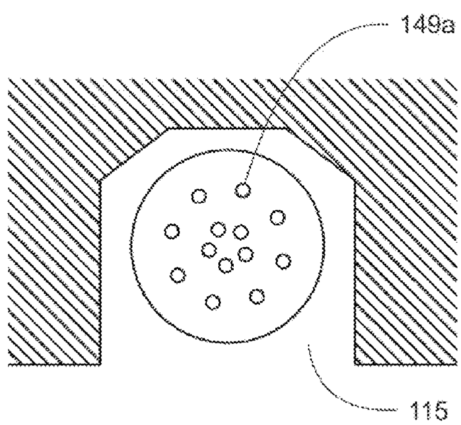
Figure 25G:
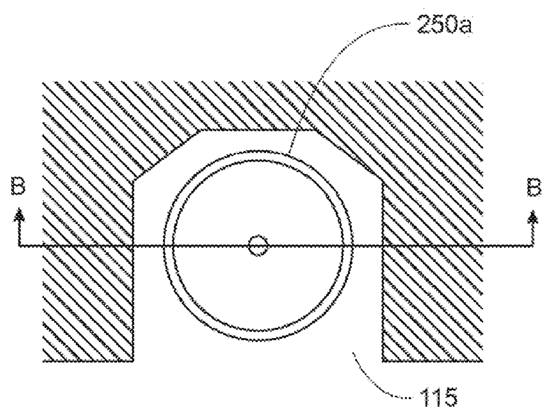
Figure 25H:
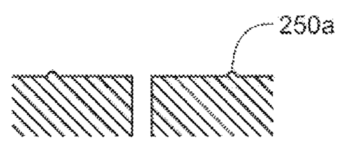

In some embodiments the positioning indicators 149*c*, 149*d* may be, but are not limited to, increasing concentric LED lights on the base surface of the filling cavity as shown in FIG. 25E-F. In other embodiments, the nozzle may contain at least one downward pointing laser light in which the vendee may position the vessel under the light to ensure the vessel is within the flow of the product water. In still other embodiments, the LED lights 218 may notify the vendee when the vessel enters the maximum receiving position of dispensing water by shining a color that may be, but not limited to, yellow to show the vendee the vessel is not in an appropriate location and once the vendee moves the vessel to an appropriate location the LED lights 218 may shine a different color that may be, but is not limited to, blue to show the dispensing device 139 is ready.

1.3 Drainage

Referring to FIG. 6-8, a water vending apparatus 113 may also have collection reservoir 135 to allow spilled or overflow water to leave the vending apparatus 113 as waste water through a gravity induced drain tube 157 to an all purpose drain 246. In the exemplary embodiment, a collection reservoir 135 is essentially a flush extension of the primary base surface 115, protruding outward to accommodate generous overflow from the filling cavity 116. The primary base surface 115 may have a slight angle such that both base surfaces 115, 125 are able to flow spilled water into the collection reservoir 135. The base of the collection reservoir 135 may also have a slight angle to allow water to reach the drain 136. The drain 136 may be connected to a substantially vertical output tube that provides a means for drainage to a targeted area. In other embodiments, the drain 136 may be coupled via fluid connection to a pumping mechanism for the purpose of evacuating waste water.

In various embodiments, the water entering the collection reservoir 135 may be re-circulated into the purification system 100. Realizing that the purification system 100 requires a pressurized input source, drainage water may be pumped from the collection reservoir 135 into a pressurized tank. In turn, as the pressurized tank reaches a full state, the source water conduit (not shown) may be blocked and the purification system 100 may accept drainage water instead of municipal raw water to enter the purification system 100 then the input conduit 122 before entering the dispensing portion 139. This embodiment may create a more efficient system as it may reduce the amount of municipal raw water required for operation. The input conduit 122 connects the purification system 100 to the primary tank 164.

In various other embodiments, the primary base surface 115 may dually function as a collection reservoir. Dual functionality may prove beneficial in minimizing the vending apparatus footprint, as a protruding collection reservoir 135 may be eliminated from the design. In such a system, the primary base surface 115 may be comprised of a plurality of elongated slits spaced far enough apart to allow water to pass through, yet spaced such that the surface is sound enough to provide support for large loads.

2. Operating States

When the device 113 is completely shut down, the water in the primary tank 164 and secondary tank 138 remain where they are, there is no circulation of the water. In various embodiments, water in the secondary tank 138 may be drained to prevent bacteria from growing within the sitting water or the water going stale. When the device 113 is shut down the heater 101 and compressor 106 are not powered and wait for the device 113 to be powered on. Once the device 113 is powered on from the shut down state the device 113 may take up to 3 hours to become fully operational.

As described earlier, there is the running state, or operating state, where the purification system 100 is producing product water and blowdown. In the running state the purification system 100 is operating and generally requires the water to enter the vending apparatus 113, preheat in the heat exchanger 102, heat and convert to steam, transform into a high pressure steam, condense into product water within the evaporator condenser 104, fed into a level sensor assembly 108 then fed back into the heat exchanger 102. When the device 113 is in the running state, all elements of the device 113 are operating to produce product water.

In the running state the purification system 100 may continue to fill the primary tank 164 until the maximum volume sensor 168 detects a completely filled state, at which point, the maximum volume sensor 168 may send a signal to the PLC 184 or the purification system 100 to cease filling operations. When the primary tank 164 and secondary tank 138 are filled, the device 113 may automatically enter a standby or idle state. In this idle state, the heater 101 may enable itself periodically to maintain the system 100 at a temperature of approximately 110 degrees centigrade while the compressor 106 shuts down. In other embodiments of the idle state, the heater 101 may become enabled manually to maintain the system 100 at a temperature of approximately 110 degrees centigrade while the compressor 106 shuts down. In other embodiments of the idle state, the heater 101 may run at a low output continuously rather than enable and disable itself continuously. The water in the primary tank 164 and secondary tank 138 may remain circulating however the device 113 will refrain from producing more product water. This idle state consumes approximately 100-200 watts to run but changing idle state to running state may only take 1-2 minutes for the device 113 to be fully operational.

3. Visual Display

In various embodiments, referring to FIG. 6, the external housing of the vending apparatus 113 may have a display window 137 through which purified water in the secondary tank 138 may be viewed. This type of internal display 137 may be especially effective in areas of the world in which raw water has previously been misrepresented as purified water. A Plexiglas window installed on the front of the machine, in some embodiments, may encourage use of the vending apparatus 113 by increasing vendee confidence that product water is truly is purified. In some additional embodiments, a light 220 may be used to illuminate the tank 138 show clarity of the water within the secondary tank 138.

In other various embodiments, a transparent material, such as, Plexiglas, through which an internal cavity is visible, may define one or more vertical surfaces of the secondary tank 138 or primary tank 164. In such a configuration, the transparent material may also define an external surface of the vending apparatus 113. In the exemplary embodiment, the secondary tank 138 has Plexiglas on the front vertical surface allowing vendees to see the water being dispensed into the vessel.

Figure 5A:
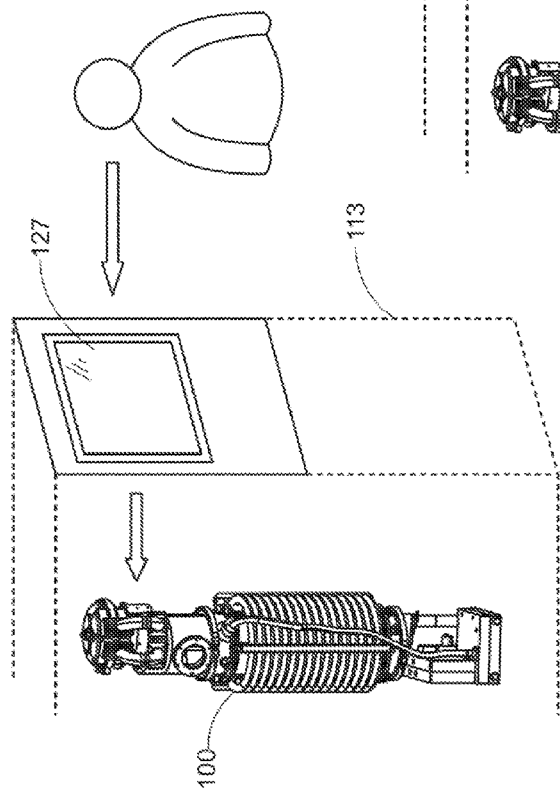
FIG. 5A is a diagram of an internal display window according to one embodiment.

In certain embodiments, referring to FIG. 5A, the purification portion 140 may be constructed to create an internal display such that the water purification system 100 may be viewed. In this configuration, a window 127 placed on the external housing may coincide with an observation window located on the evaporator/condenser steam chest, producing a partial view of the purification process. Alternatively, a large section of the external housing surrounding the purification portion 140 may be replaced with transparent material. To conserve heat energy, a display window incorporated into the purification portion 140 may benefit from multiple, spaced layers of Plexiglas, in various embodiments, and heavily insulated seams. In various embodiments, conventional double paned, vacuumed/gas filled windows may be implemented to allow vendees to view the process and insulate the purification portion appropriately.

Figure 5B:
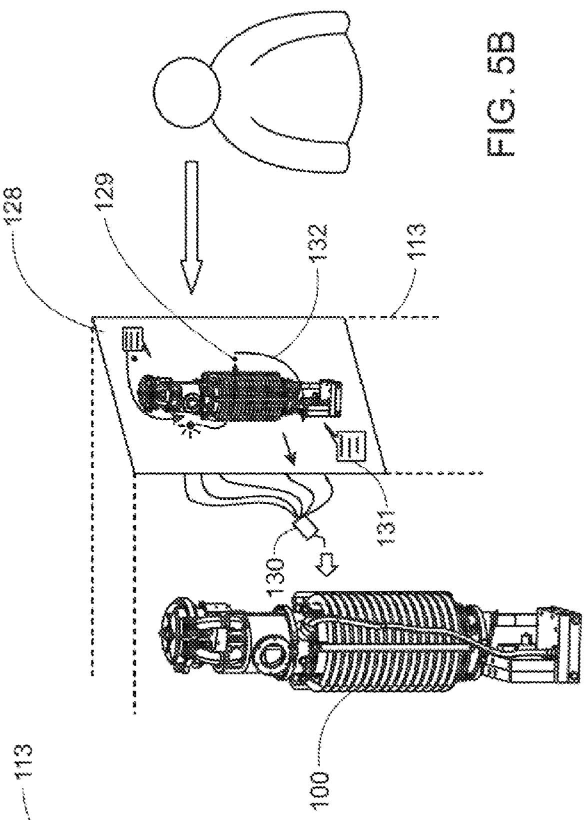
FIG. 5B is a diagram of a real-time purification path display panel according to one embodiment.

In another embodiment, referring to FIG. 5B, a real-time purification path display panel 128 may be similarly used to increase a vendee's level of trust in the purification process. Such a display panel may be located on the external front or side housing, and may utilize LEDs 129, an electric circuit 130 (such as a simple circuit board for conversion of sensor output to LED 129 input), a graphical depiction 132 of the internal water purification system 100, and/or text explanation 131 to create a step-by-step view of individual water purification procedures. Real-time updates of the water moving through the purification path may be facilitated by coupling sensors to the water purification system 100; such as, but not limited to, a vendee may initiate the vending process, triggering an input flow sensor which sends a signal to a display logic circuit 130, which in turn, illuminates one or more corresponding LED lights 129 located near the graphically-depicted heat exchanger 132. As water continues through the system 100, other LEDs representing the heat exchanger 102, evaporator/condenser 104, and regenerative blower 106 may be illuminated when appropriate.

In other various embodiments, a purification path display 128 may not be linked to sensors but instead simulate a purification flow path continuously, or upon vendee input. In some embodiments, this configuration involving a graphical display panel 128 may simply have a continuously looping LED control circuit, drawing power from the main vending apparatus power source.

In an even further embodiment, an internal display window 127 may be combined with a purification path display panel 128. In some embodiments, decals used represent the purification path may be transparent and overlaid, or etched onto a Plexiglas window. Additionally, LEDs may be embedded within the window 127.

In still further embodiments, a visual display 137 utilizing a window may not be desirable due to sunlight increasing the opportunity of bacteria to grow within the tanks 164,138.

4. Control Systems 4.1 Dispensing Control

In various embodiments, now referring to FIG. 18, 20A-B, 21A-21B, a programmable logic controller (PLC) 184 may serve as a centralized node for sending control signals and processing variables associated with performing filling operations. The PLC 184 may be of the type any type known in the art. The PLC 184 may be manually or automatically programmed with a set of instructions that respond to electrical inputs by way of processing, or analyzing the inputs with relation to a set of predefined variables or other inputs signals, and sending output control signals to various electrical and mechanical components within the dispensing portion 139. Signals may be distributed throughout the vending apparatus 113 by way of wire. The wire may be any sufficient gauge to carry the signal throughout the vending apparatus. In other various embodiments, the signals may be distributed wirelessly and therefore no wiring would be necessary.

In other various embodiments, a PLC 184 may control the entire functionality of the vending apparatus 113, including the purification system 100. In still other embodiments, the PLC 184 and purification controller 165 may be combined into one single unit controller device.

In the exemplary embodiment, the PLC 184 is a Direct Logic DL06 by Direct Logic, Inc. Corp., Peoria, Ill., this is just the exemplary embodiment however; any PLC 184 may be used in any of the described embodiments of the vending apparatus 113. The PLC 184 may receive and send signals throughout the vending apparatus.

4.1.1 Power On

Figure 21A:
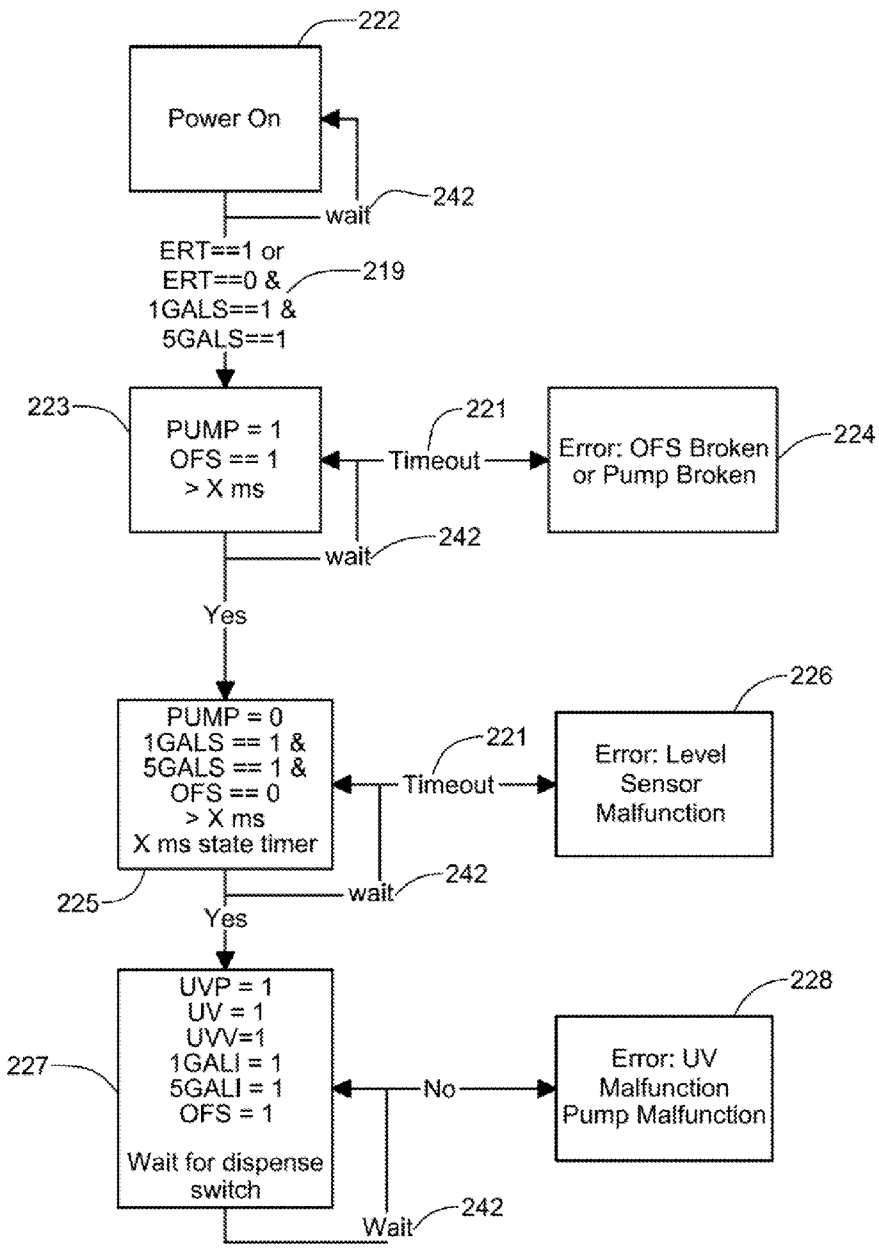
FIG. 21A is a flowchart of the electrical signals when turning on the dispensing portion of the vending apparatus according to one embodiment.

Now referring to FIG. 21A once the vending device 113 is powered on 222, the device 113 will refrain from accepting till requests until a series of requirements are met. The dispensing system PLC 184 may wait for the minimum volume sensor 167 to send a signal that there is water at the sensor 167, all shown in 219. This minimum volume sensor 167 may be measuring, to confirm there is enough water, such as, but not limited to, 5 gallons, in the primary tank 164 as to replenish the secondary tank 138. There may also be a wait period 242 before the sensor 167 sends the signal to confirm this is not a false positive and that there is water at the sensor 167. In some embodiments there may not be a wait period 242 or there may be additional sensors to confirm there are no false positive signals sent to the PLC 184. In another embodiment, the PLC 184 may wait for the secondary tank sensors 211, 212, 213 to signal to the PLC 184 that there is water at each sensor including, the 5 gallon sensor 213, the 1 gallon sensor 212, and the overflow sensor 211 before accepting a fill request rather than waiting for the minimum volume sensor 167 to signal there is water in the primary tank 164.

Still referring to FIG. 21A, the dispensing system may confirm the fill pump 166 is pumping water to the secondary tank 138 and the over flow, or spill over sensor 211 determines there is water at the sensor 211, again there may be a wait period 242 to confirm this is not a false positive, shown in 223. There may be a maximum time period 221 given to receive the signal from the pump 166 and over flow sensors 211 and if there is no signal received it may prove to be an error with the system 113 and it may prove to be a way to check if the pump 166 or the over flow sensor 211 may be broken shown in 224. In some embodiments there are additional sensors on the different components to confirm if there is an error with the system 113 prior to the maximum time limit 221 being reached. This would dismiss the need for the time limit.

Still referring to FIG. 21A once the fill pump 166 and the over flow sensor 211 signal to the PLC 184 that they are operating and ready, the fill pump 166 may turn off, and the 1 gallon sensor 212 may signal there is water at the sensor 212, and the 5 gallon sensor 213 may then signal there is water at the sensor 213 and the over flow sensor 211 should turn off because no excess water will be pumped into the tank 138, shown in 225. After a maximum time there is another time limit 221 where the system 113 may check if there is an error with the level sensors 211, 212, 213 shown in 226. If the pump 166 and over flow sensor 211 turn off and the 1 and 5 gallon sensors 212, 213 (respectively) indicate there is water at both sensors 212, 213 then the PLC 184 may check the next system. Again in some embodiments there are additional sensors on the different components to confirm if there is an error with the system prior to the maximum time limit 221 being reached. This would dismiss the need for the time limit.

Still referring to FIG. 21A, once the above mentioned sensors and elements indicate the system is ready, the UV pump, or circulation pump 209, may begin pumping the product water. Then the UV valve 186 may allow water through the circulation tube 194, following the UV pump 209 and valve 186, the UV 172 may turn on to sterilize the product water prior to dispensing it. Once all of the UV components are functioning, the 1 gallon illumination and 5 gallon illumination, LEDs 218, may activate to signal to a vendee the system 113 is ready to dispense water. Once the LEDs 218 for the 1 gallon and 5 gallon nozzles activate, the overflow sensor 211 may sense water and signal to the PLC 218 that water is present at the sensor shown in 227. If the UV system or the illuminations 218 or over flow sensor 211 do not signify normal function, an error may be noted by the system that there is a pump malfunction or some malfunction between the devices shown in 228. The water may then continue to circulate between the UV system, the primary tank 164 and secondary tank 138 until a fill request is submitted.

4.1.2 Fill Request

Figure 21B:
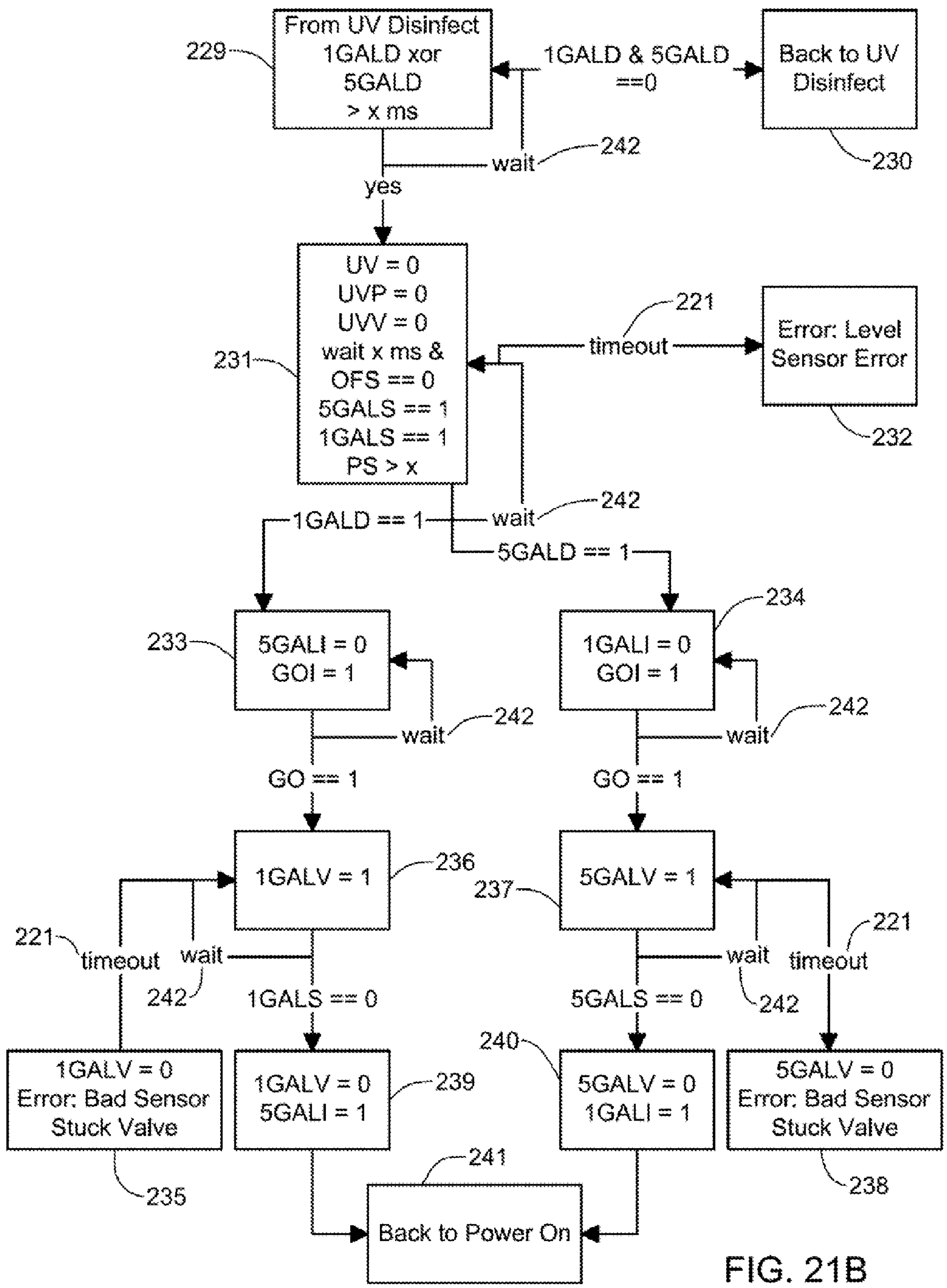
FIG. 21B is a flowchart of the electrical signals when a fill request is placed in the vending apparatus according to one embodiment.

Now referring to FIG. 21B, when the vendee places a vessel 121*a*, 121*b* in the filling cavity 116, the proximity sensors 113, 134 in the filling cavity 116 may detect if there is a 1 gallon 121*a* or 5 gallon 121*b* vessel present shown in 229. If there is no vessel detected, the water will circulate from the secondary tank 138 back to the primary tank 164 and through the UV system until a vessel 121*a*, 121*b* is present shown in 230.

Still referring to FIG. 21B, if the proximity sensors 133, 134 detect a vessel 121*a*, 121*b*, then the UV 172 may turn off, the PLC 184 will then signal the UV pump 209 to turn off, the system may then wait until the over flow sensor 211 does not detect water but that the 5 gallon sensor 213 and the 1 gallon sensor 212 do detect water and air pressure sensor (not shown) detects enough air to turn the nozzle valve 159 on and off, as shown in 231. If the PLC 184 does not detect all of these signals then the system will time out 211 and signify there is an error with the level sensors 211 212, 213 or with the UV system, as shown in 232. In other embodiments, there may be additional sensors to signal if there is an error with another sensor or with a system as to signal the error before the time limit is reached.

Still referring to FIG. 21B, if all the sensors signal to the PLC 184 that everything is in order then the proximity sensors 133, 134 will signal to the PLC 184 if there is a vessel 121*a*, 121*b* in the 1 gallon filling surface 125 or in the 5 gallon filling surface 115. If there is a vessel 121*b* in the 5 gallon filling surface 115, the 1 gallon illuminating LED may turn off and the "Fill" button may illuminate. If there is a vessel 121*a* in the 1 gallon filling surface 125, the 5 gallon illuminating LED may turn off and the "Fill" button may illuminate. Then the system may wait until there is a Fill request input by the vendee as shown in 233, 234. In some embodiments, the fill request will be filled automatically based on a vessel 121*a*, 121*b* being present at one of the filling stations 116*a*, 116*b*. In the exemplary embodiment, the system will wait for the "Fill" button to be selected.

Still referring to FIG. 21B, if a fill request is submitted then the fill station 116*a*, 116*b* where, in some instances, the 5 gallon vessel is present in the filling station 116*a*, the 5 gallon valve may release water until the 5 gallon sensor signals there is no water at the sensor as shown in 237. There is a time out 221 present for this filling as a safety in case the valve 159 or sensor 212, 213 malfunctions, this may prevent spilled water, as shown in 238. The same process may occur for the 1 gallon valve if there is a 1 gallon vessel 121*a* present, as shown in 236. There may also be a time out 221 for the 1 gallon filling station 116*b* that may prevent spilled water as well as shown in 235. In other embodiments there may be a time limit based on the length of time it may take to fill a 5 gallon or a 1 gallon vessel 121*b*, 121*a* based on the speed of water leaving the dispensing system that may eliminate a need for a water level sensor. In some of these embodiments, the water flow rate may not be gravity based but rather include a dispensing pump so the time limit may be as accurate as possible for filling the various vessels.

Still referring to FIG. 21B, once the volume sensor indicates the correct volume of water has been dispensed, the valve 159 that recently dispensed water will signal that it is closed, and the other nozzle assembly may illuminate, such as if the 5 gallon vessel 121*b* was recently filled in the process, the valve in the main nozzle 114 may turn off and the 1 gallon nozzle assembly 123 may illuminate, as shown in 239. Similarly, if the 1 gallon vessel 121*a* was recently filled in the process, the valve in the secondary nozzle 123 may turn off and the 5 gallon nozzle assembly 1114 may illuminate, as shown in 240. Finally, the PLC 184 may restart the process back from FIG. 21A power on as shown in 222 and 241.

4.2 Purification Controller

In the exemplary embodiment, referring to FIG. 11, the purification system 100 may have a dedicated electrical control system, also referred to as the purification controller 165. The purification controller 165 may be responsible for various tasks associated with management of the purification portion 140, such as but not limited to, monitoring purification system status, monitoring raw water quality, analyzing status data, responding to demand for product water, sending control signals, communicating with the PLC 184 or other dispensing components, and creating an event log. The purification controller itself will be discussed further on.

To facilitate the above mentioned tasks of the purification controller 165, the purification controller 165 may include one or more of the following, but not limited to: hardware, software, at least one processor and memory. Additionally, in some embodiments, this component may receive input from a plurality of sensors, coupled to the purification system 100. Based on sensor output, physical control of the system may be accomplished by sending control signals to actuators and/or motors coupled to various control points on the purification system 100.

Communication between PLC 184 and purification controller 165 may be important in maintaining an efficient vending apparatus. The PLC 184 may interact with the purification controller 165 to avoid generating excess, or a shortage of, product water. This may be accomplished by way of sending request-production/stop-production signals over a bus coupling both units. Additionally, the PLC 184 may relay the purification controller periodic dispensing component status signals. In some embodiments, the PLC 184 monitors the intensity at certain wavelengths of the sterilizer. If the PLC 184 determines that the sterilizer has dropped below a threshold level, the PLC 184 may send a signal to shut the entire system down. In some embodiments the PLC 184 monitors one or more of the various sensors and if the PLC 184 determines that one or more sensors are not meeting a threshold, or have exceeded a threshold, the PLC 184 may send a signal to turn the system down.

5. Performance Data 5.1 Convenience Store Example

Figure 23A:
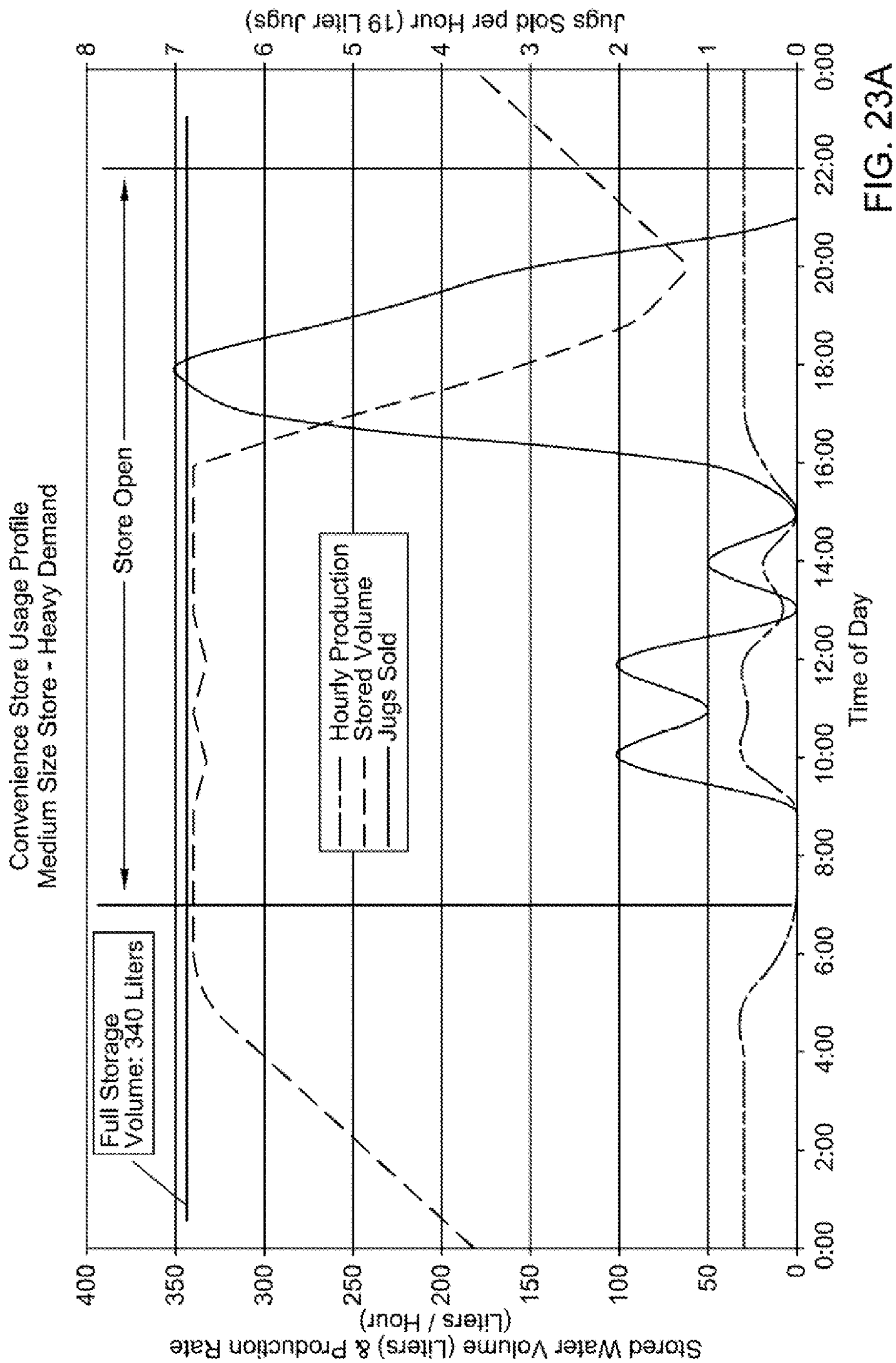
FIG. 23A is a graph of a convenience store usage profile of the water vending apparatus having a heavy demand for water according to one embodiment.
Figure 23B:
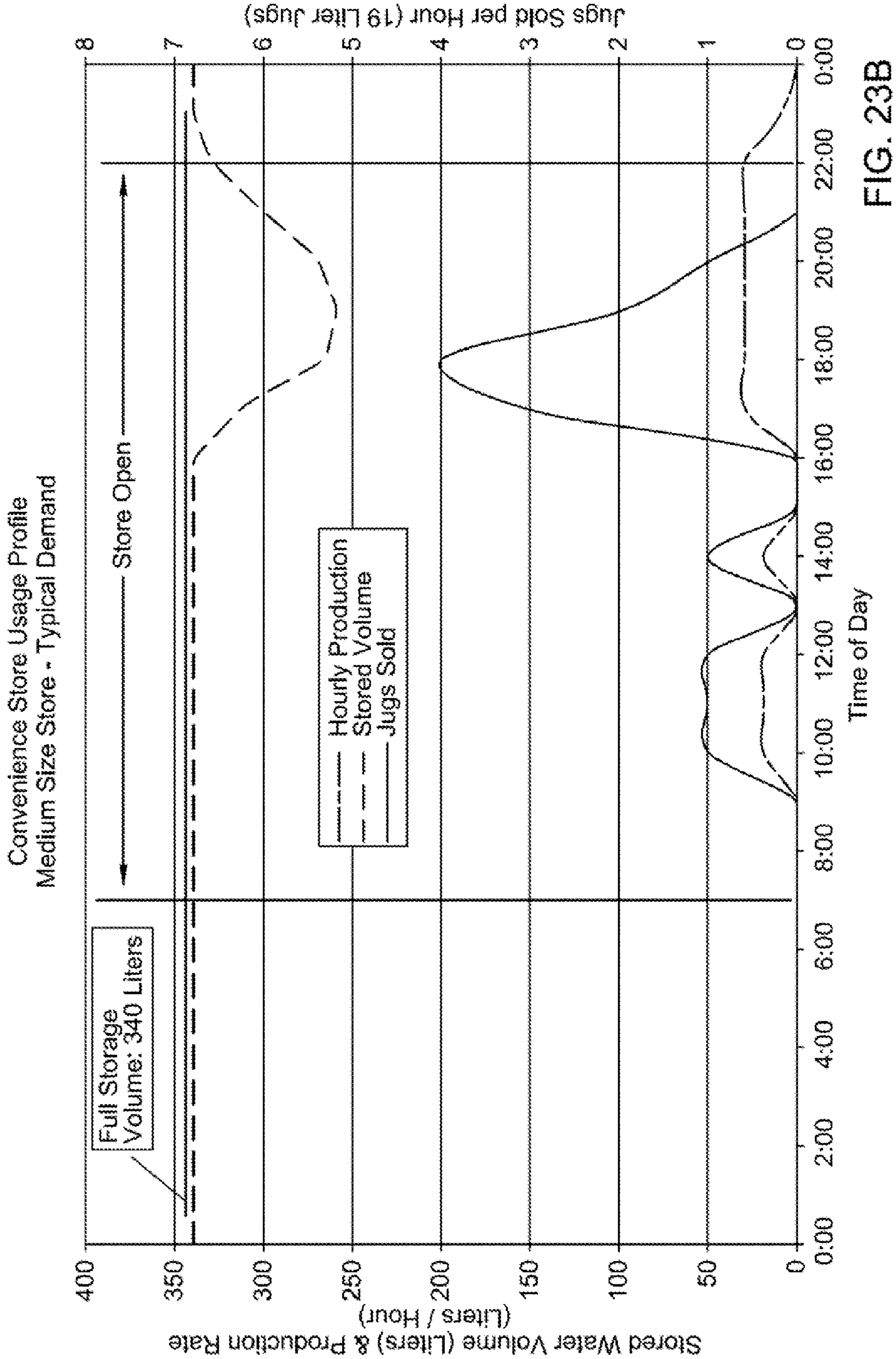
FIG. 23B is a graph of a convenience store usage profile of the water vending apparatus having typical demand for water according to one embodiment.
Figure 23C:
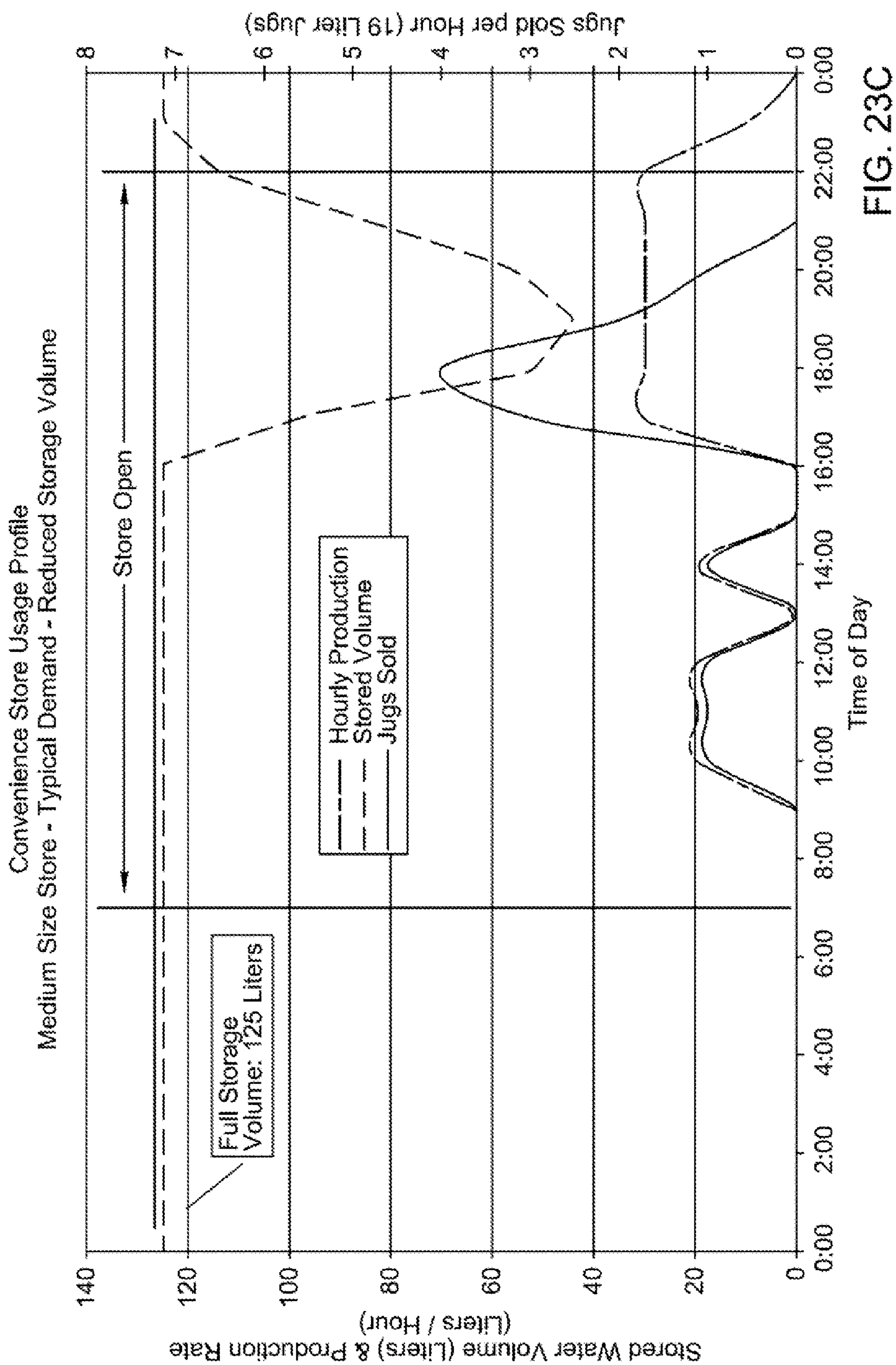
FIG. 23C is a graph of a convenience store usage profile of the water vending apparatus having a reduced storage tank and typical demand for water according to one embodiment.
Figure 24:
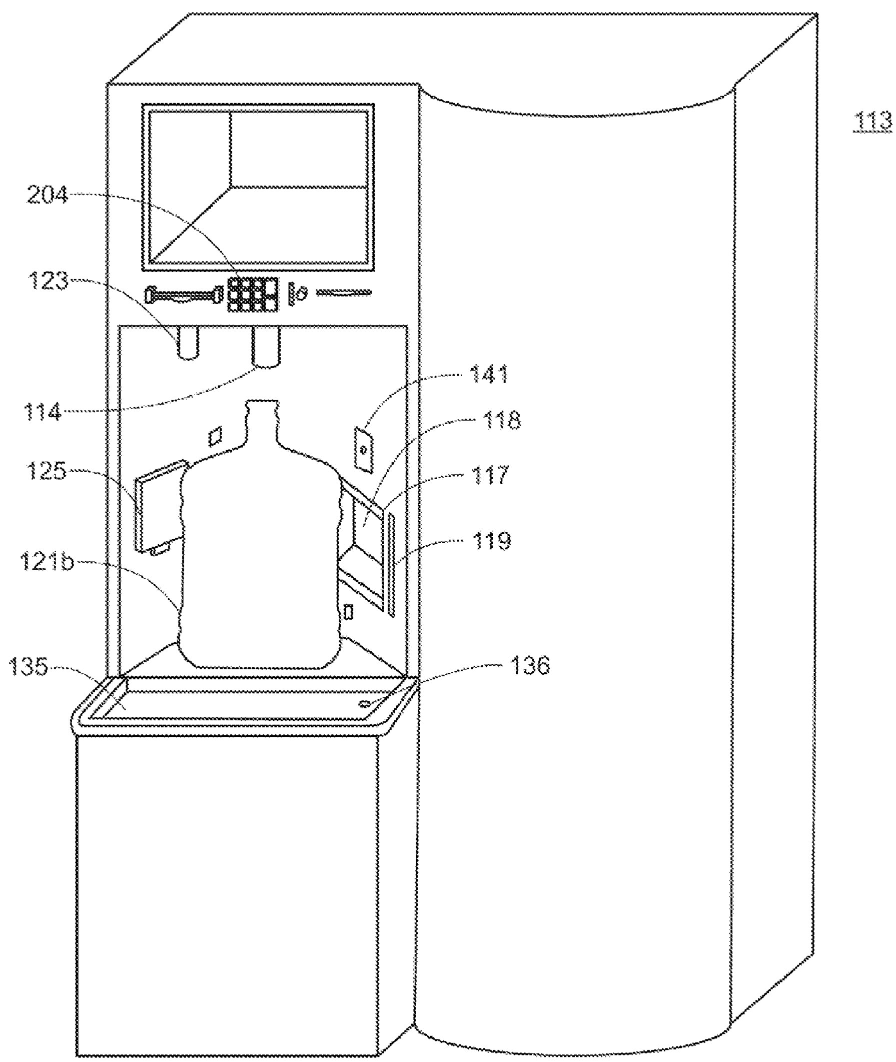
FIG. 24 is another embodiment of the water vending apparatus including a currency acceptor according to one embodiment.

FIGS. 23A-23C are graphic depictions of how the vending apparatus 113 storage water may become depleted when water is dispensed or purchased in a convenience store environment. Once water is dispensed/depleted the purification system 100 within the device must replenish the water dispensed by the tanks 164, 138 throughout the day. FIGS. 23A-23C also show the amount of time the device 113 is run during an average day at a convenience store, also shown is the hourly production rate, the volume of product water stored throughout the day and the number of jugs sold. As the more jugs are sold the stored volume may decrease and the hourly product may increase to compensate for the depleted stored water. Shown within FIGS. 23A-23C are the importance of having an onsite distiller 100 within the apparatus 113 and how to accommodate water sales with the onsite distiller 100.

Shown in FIG. 23A is an example of an average sized convenience store having a storage volume of 340 liters having a heavy demand for water throughout the open hours of the day. The full storage volume may be determined by a study performed in the area on the average amount of water purchased and then comparing that with the production rate, e.g., approximately 30 liters an hour. Based on those calculations, this example shows the full storage volume necessary to meet the need of the consumers who may purchase water from this establishment as well as head room calculated to accommodate additional consumers on various days. FIG. 23A shows the stored volume decreasing as jugs of water are purchased and the low stored volume reached during the high point of the clay for purchasing water. Towards the end of the high point of sales in the day, the stored water volume is at its lowest point but does not reach 0 liters. Once the store closes FIG. 23A shows the stored water increase as production remains on. Also shown in FIG. 23A is the hourly production of the vending apparatus. Once the full storage capacity is reached, the hourly production ceases until water is sold. Water production begins again to compensate for the sold water and to continue to fill the storage tanks until it reaches a full storage point again.

Referring now to FIG. 23B in this example, the vending apparatus includes a storage volume of 340 liters and experiences average or "typical" demand for water. As shown in this chart, hourly production is at a minimum throughout the day and night as minimal water was depleted from the storage tanks and therefore minimal production is necessary to compensate for the depletion.

Referring now to FIG. 23C, this example is an average sized convenience store with the same demand as shown in FIG. 23B, only in this example, the vending apparatus includes a reduced storage volume. FIG. 23C shows storage tanks may be resized to meet the demand of the convenience store on a typical day rather than accommodate a heavy demand on a day in which there may not be a heavy demand. Here it is shown to have minimal storage left at the end of the rush period for purchasing water. This storage would be appropriate for a typical day however it may not meet the demand for a heavy day and would need to be resized to accommodate the heavy demand days.

6. Other Embodiments 6.1 Integration of a Bottle Molding Apparatus

In other various embodiments of the vending apparatus 113 having a water purification system 100 may be configured to purify raw water, autonomously manufacture bottles, fill the recently made bottles with purified water, and dispense bottled water upon vendee request. Forming a vessel within the vending apparatus may reduce supply chain expenditures associated with distributing fully formed plastic bottles to vending apparatuses. Additionally, due to the small size of a yet to be formed bottle, a vending apparatus could increase its bottle-storing capacity, thereby significantly increasing the maintenance interval.

Figure 19:
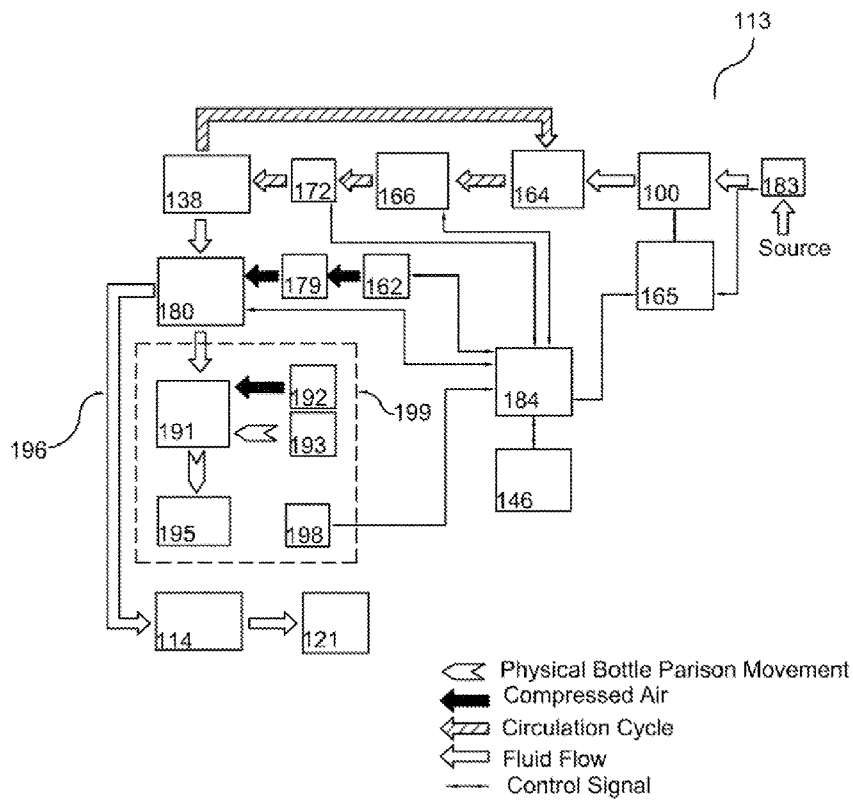
FIG. 19 is a flow diagram of a water vending apparatus having a bottle molding/filling system according to one embodiment.

FIG. 19 depicts integration of bottle molding/filling system 199 within a water vending apparatus 113. A molding apparatus 191 may perform the task of generating a bottle capable of holding liquid only moments before vending the product. The molding apparatus 191 may be comprised of a metallic chamber, having one or more movable sections capable of closing and opening around the parison. This chamber may define the cavity having the desired vessel shape and size. The molding apparatus 191 may accept a pre-extruded hollow tube, or parison, having a preformed threaded section at one end, from a parison storage unit 193. After the parison enters the molding apparatus 191, it may be molded into the shape of a hollow vessel using molding techniques commonly known in the art, such as stretch blow molding, injection molding, or extrusion blow molding. In some embodiments, the blow molding technique uses compressed air to mold the parison to the shape of the divided chamber. Thus, FIG. 19 also depicts compressed air entering the molding apparatus 191 from a compressed air supply 192. After the parison is fully formed into a bottle and filled with a beverage, the bottle may be disbursed to a dispensing chamber 195. A vendee may then reach into the dispensing chamber 195 and remove the final product.

In various embodiments, still referring to FIG. 19, a bottle molding/filling system 199 may utilize a processor 198, having memory, for controlling molding and filling operations. Such a processor 198 may be capable of executing a set of instructions associated with monitoring and controlling variables, such as, molding apparatus pressure, molding apparatus state, filling rate, current number of parison performs in the parison storage unit 193, or other molding/filling variables. The processor may also perform calculations based on system variables. The PLC 184 may be communicably coupled to the processor 198 for status/error reporting. In some embodiments, the processor may be integrated or part of the PLC 184 or the purification controller 165 or both.

In various embodiments, still referring to FIG. 19, a water vending apparatus 113 having a bottle molding system may be capable of bypassing the bottle molding system components 199, and dispensing water through a nozzle 114 (multipurpose interface not shown) as previously disclosed. The fluid bypass 196 may be utilized by adding additional actuator control and control panel mode instructions to the PLC 184.

In various embodiments, the molding apparatus may use a fluid to hydraulically stretch a parison to its final molded shape. In various embodiments, purified water may be forcibly injected to a parison such that hydraulic pressure, pushing the inner walls of the parison against a mold, forms the desired bottle shape. This configuration may be considered efficient in that fills and forms a vessel simultaneously, reducing the steps required in the vending process. This process may meter the water as well as fill the mold.

In various embodiments, a parison may be comprised of a biodegradable material. This may minimize environmental impact as most current plastic vessels are non-biodegradable. A vending apparatus 113 capable of generating biodegradable bottles may be advantageous in environments where vendees typically consume beverages within a short period of time, such as amusement parks.

6.2 Currency Operation

In various embodiments, the vending apparatus 113 may be capable of operating in conjunction with currency. A currency receiving module 204, coupled to the vending apparatus 113, may be capable of detecting a variety of coins and paper money and sending signals to other vending apparatus components, such as, the PLC 184, purification controller 165, or other electrical components. In some embodiments, upon valid input of a predetermined value, fill request circuitry may be energized, or made available for vendee use, pending utilization of a control panel 146 to perform a request. Thereafter, fill request circuitry may no longer be powered. A currency receiving module 204 may transfer received currency into a secured storage area, accessible to vending apparatus personnel. In some embodiments of the currency receiving module 204, there may be sensors and modules to use various moneyless systems such as but not limited to, credit or debit cards, and an RFID tag-reading system with a pin.

6.4 Remote Purification

It may be advantageous to have a remotely-supplied purified water dispensing apparatus where vandalism or theft is prevalent, or where space is limited. Accordingly, in various embodiments, the dispensing and purification portions 139, 140 of the vending apparatus 113 may be coupled as previously described, yet reside in different locations. In various embodiments, a dispensing portion 139 may be supplied with product water from a remote purification portion 140, residing in a secured area, via an extended conduit coupling the primary tank 164 to the output of the purification system 100. Electrical signals, such as status, request, stop, and data logging may also be transferred via extended wiring. A pump (i.e. greater head pressure) may be utilized to transfer product water from purification system 100 to primary tank 164.

In various embodiments, electrical signals may be transferred wirelessly to minimize wiring. A wireless configuration may require one or more wireless transceivers coupled to one or more remote portions of the vending apparatus 113. Wireless components may be communicably coupled to the PLC 184 and purification controller 165.

6.5 Scalability

The size and shape of the exemplary embodiments disclosed in this document are not considered fixed. Thus, a water vending apparatus 113 may contain all the previously mentioned functionality and have radically different dimensions. Typically, vending machines, as commonly known in the art, are large and cumbersome. Scalability may be advantageous in locations having a need for high-quality, on demand water, without wanting a large and visually unappealing apparatus.

Figure 17:
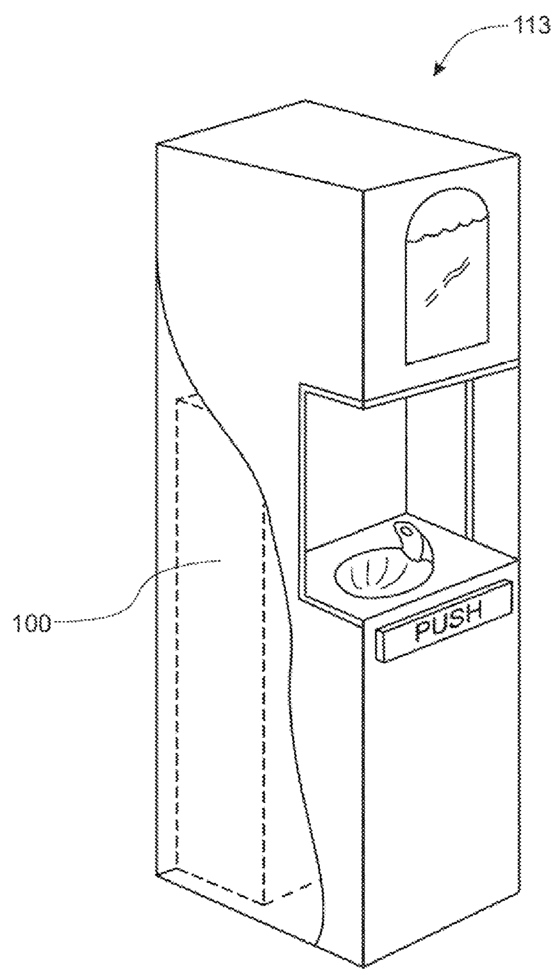
FIG. 17 is a diagram of a small-scale water vending apparatus in the form of a drinking fountain according to one embodiment.

In various embodiments, the purification system components may be modified and arranged to fit within a much smaller area of space. The exemplary purification system 100 (Water Vapor Distillation apparatus), as described in U.S. Patent Application Pub. No. US 2009/0025399 A1 published on Jan. 29, 2009 and entitled "Water Vapor Distillation Apparatus, System and Method," the contents of which are hereby incorporated by reference herein, has component dimensions such that a 10 gal/hr production rate is obtained. Various components within the purification system 100 may be scaled down to meet a lesser demand, or lesser desired flow rate, also enabling a water vending apparatus 113 to operate in a much smaller package. Scaling down the purification system 100 may yield a slower rate of production; however, benefits of a slower rate may be realized in different applications. In some embodiments, referring to FIG. 17, a water vending apparatus 113 may take the form of a drinking fountain or office water cooler, where a slow production rate adequately accommodates needs of vendees.

Similarly, dispensing components may also be scaled down. Considering a water vending apparatus 113 having a small scale purification system 100, an easily modifiable aspect of dispensing components may be tank size. Primary and secondary tanks 164, 138, respectively, may be reduced in size to account for a lower production volume. In some embodiments, the secondary tank where a 5 gallon vessel may be filled may not be scaled down due to the need to have 5 gallon's in the secondary tank in order to fill 5 gallon vessels. In embodiments where 5 gallon tanks may not be filled the secondary tank may be scaled down significantly. Using the drinking fountain embodiment exemplified in FIG. 17, a small scale purification system 100 may be fully disposed within the so-called dispensing portion 139 of a water vending apparatus 113. The vending apparatus 113 may also have reduced tank size, or a lesser number of storage tanks. This configuration may practically reduce the footprint and overall volume of the water vending apparatus by ½.

In other various embodiments, the water vending apparatus components may be scaled tip to be incorporated in high demand commercial applications. In some of these embodiments, the purification system may be larger to purify more water than the current embodiment, also the storage tanks may be scaled up appropriately to accommodate the amount of product water produced. In certain other embodiments, a scaled up water vending apparatus 113 may comprise one or more purification systems 100, servicing one or more filling stations 116.

6.6 Water/Beverage Additives and Indicators

In various embodiments of the present system, additives may be mixed into purified water to enhance the product. A broad range of additives are contemplated which may include, but are not limited to, one or more of the following, one or more nutraceuticals, caffeine, syrup, tea, liquid/powder flavoring, medicine, alcohol, minerals, vitamins and/or carbonation. In some embodiments, a flavored beverage may be created by mixing in syrup and/or flavoring, whereas a medicinal beverage may be created by mixing in one or more minerals and/or chemicals to achieve a desired result. In some embodiments, hybrid beverage functionality, such as, but not limited to, the ability to mix flavoring with caffeine and medicine may be an attractive selling point for vendees. Combinations of flavoring and medicine may also be beneficial in masking undesirable taste typically associated with medicine.

Neutraceuticals or flavorings may be added to the purified water using pumps. These pumps may include any type of pump including, in some embodiments, those pumps shown in FIGS. 139-140 and in some embodiments, may include one or more pumps or pumping systems as discussed or similar to those discussed in U.S. Patent Application Pub. No. 2009/0159612 published on Jun. 25, 2009 and entitled "Product Dispensing System", the contents of which are hereby incorporated by reference herein. Other examples of pumps, pump assemblies, pumping systems and/or various pumping techniques are described in U.S. Pat. Nos. 4,808,161; 4,826,482; 4,976,162; 5,088,515; and 5,350,357, the contents of which are incorporated herein by reference in their entireties. In some embodiments, the pump assembly may be a membrane pump as shown in FIGS. 139-140. In some embodiments, the pump assembly may be any of the pump assemblies and may use any of the pump techniques described in U.S. Pat. No. 5,421,823 the contents of which is herein incorporated by reference in its entirety.

The above-cited references describe non-limiting examples of pneumatically actuated membrane-based pumps that may be used to pump fluids. A pump assembly based on a pneumatically actuated membrane may be advantageous, for one or more reasons, including but not limited to, ability to deliver quantities, for example, microliter quantities of fluids of various compositions, which include, but are not limited to, concentrated fluids and/or fluids which include recently reconstituted powders, reliably and precisely over a large number of duty cycles; and/or because the pneumatically actuated pump may require less electrical power because it may use pneumatic power, for example, from a carbon dioxide source. Additionally, a membrane-based pump may not require a dynamic seal, in which the surface moves with respect to the seal. Vibratory pumps such as those manufactured by ULKA generally require the use of dynamic elastomeric seals, which may fail over time for example, after exposure to certain types of fluids and/or wear. In some embodiments, pneumatically-actuated membrane-based pumps may be more reliable, cost effective and easier to calibrate than other pumps. They may also produce less noise, generate less heat and consume less power than other pumps. A non-limiting example of a membrane-based pump is shown in FIG. 67.

The various embodiments of the membrane-based pump assembly 2900, shown in FIGS. 67-68, includes a cavity, which in FIG. 67 is 29420, may also be referred to as a pumping chamber, and in FIG. 68 is 29440, which may also be referred to as a control fluid chamber. The cavity includes a diaphragm 29400 which separates the cavity into the two chambers, the pumping chamber 29420 and the volume chamber 29440.

Referring now to FIG. 67, a diagrammatic depiction of an exemplary membrane-based pump assembly 29000 is shown. In this embodiment, the membrane-based pump assembly 29000 includes membrane or diaphragm 29400, pumping chamber 29420, control fluid chamber 29440 (best seen in FIG. 68), a three-port switching valve 29100 and check valves 29200 and 29300. In some embodiments, the volume of pumping chamber 29420 may be in the range of approximately 20 microliters to approximately 500 microliters. In an exemplary embodiment, the volume of pumping chamber 29420 may be in the range of approximately 30 microliters to approximately 250 microliters. In other exemplary embodiments, the volume of pumping chamber 29420 may be in the range of approximately 40 microliters to approximately 100 microliters.

Switching valve 29100 may be operated to place pump control channel 29580 either in fluid communication with switching valve fluid channel 29540, or switching valve fluid channel 29560. In a non-limiting embodiment, switching valve 29100 may be an electromagnetically operated solenoid valve, operating on electrical signal inputs via control lines 29120. In other non-limiting embodiments, switching valve 29100 may be a pneumatic or hydraulic membrane-based valve, operating on pneumatic or hydraulic signal inputs. In yet other embodiments, switching valve 29100 may be a fluidically, pneumatically, mechanically or electromagnetically actuated piston within a cylinder. More generally, any other type of valve may be contemplated for use in pump assembly 29000, with preference that the valve is capable of switching fluid communication with pump control channel 29580 between switching valve fluid channel 29540 and switching valve fluid channel 29560.

In some embodiments, switching valve fluid channel 29540 is ported to a source of positive fluid pressure (which may be pneumatic or hydraulic). The amount of fluid pressure required may depend on one or more factors, including, but not limited to, the tensile strength and elasticity of diaphragm 29400, the density and/or viscosity of the fluid being pumped, the degree of solubility of dissolved solids in the fluid, and/or the length and size of the fluid channels and ports within pump assembly 29000. In various embodiments, the fluid pressure source may be in the range of approximately 15 psi to approximately 250 psi. In an exemplary embodiment, the fluid pressure source may be in the range of approximately 60 psi to approximately 100 psi. In another exemplary embodiment, the fluid pressure source may be in the range of approximately 70 psi to approximately 80 psi. Some embodiments of the dispensing system may produce carbonated beverages and thus, may use, as an ingredient, carbonated water. In these embodiments, the gas pressure of CO2 used to generate carbonated beverages is often approximately 75 psi, the same source of gas pressure may also be regulated lower and used in some embodiments to drive a membrane-based pump for pumping small quantities of fluids in a water vending apparatus.

In response to the appropriate signal provided via control lines 29120, valve 29100 may place switching valve fluid channel 29540 into fluid communication with pump control channel 29580. Positive fluid pressure may thus be transmitted to diaphragm 29400, which in turn may force fluid in pumping chamber 29420 out through pump outlet channel 29500. Check valve 29300 ensures that the pumped fluid is prevented from flowing out of pumping chamber 29420 through inlet channel 29520.

Switching valve 29100 via control lines 29120 may place the pump control channel 29580 into fluid communication with switching valve fluid channel 29560, which may cause the diaphragm 29400 to reach the wall of the pumping chamber 29420 (as shown in FIG. 139). In an embodiment, switching valve fluid channel 29560 may be ported to a vacuum source, which when placed in fluid communication with pump control channel 29580, may cause diaphragm 29400 to retract, reducing the volume of pump control chamber 29440, and increasing the volume of pumping chamber 29420. Retraction of diaphragm 29400 causes fluid to be pulled into pumping chamber 29420 via pump inlet channel 29520. Check valve 29200 prevents reverse flow of pumped fluid back into pumping chamber 29420 via outlet channel 29500.

In some embodiments, diaphragm 29400 may be constructed of semi-rigid spring-like material, imparting on the diaphragm a tendency to maintain a curved or spheroidal shape, and acting as a cup-shaped diaphragm type spring. In some embodiments, diaphragm 29400 may be constructed or stamped at least partially from a thin sheet of metal, the metal that may be used includes but is not limited to high carbon spring steel, nickel-silver, high-nickel alloys, stainless steel, titanium alloys, beryllium copper, and the like. Pump assembly 29000 may be constructed so that the convex surface of diaphragm 29400 faces the pump control chamber 29440 and/or the pump control channel 29580. Thus, diaphragm 29400 may have a natural tendency to retract after it is pressed against the surface of pumping chamber 29420. In this circumstance, switching valve fluid channel 29560 may be ported to ambient (atmospheric) pressure, allowing diaphragm 29400 to automatically retract and draw fluid into pumping chamber 29420 via pump inlet channel 29520. In some embodiments the concave portion of the spring-like diaphragm defines a volume equal to, or substantially/approximately equal to the volume of fluid to be delivered with each pump stroke. This has the advantage of eliminating the need for constructing a pumping chamber having a defined volume, the exact dimensions of which may be difficult and/or expensive to manufacture within acceptable tolerances. In this embodiment, the pump control chamber is shaped to accommodate the convex side of the diaphragm at rest, and the geometry of the opposing surface may be any geometry, i.e., may not be relevant to performance.

In some embodiments, the volume delivered by a membrane pump may be performed in an ‘open-loop’ manner, without the provision of a mechanism to sense and verify the delivery of an expected volume of fluid with each stroke of the pump. In some embodiments, the volume of fluid pumped through the pump chamber during a stroke of the membrane may be measured using a Fluid Management System (“FMS”) technique, described in greater detail in U.S. Pat. Nos. 4,808,161; 4,826,482; 4,976,162; 5,088,515; and 5,350,357, all of which are hereby incorporated herein by reference in their entireties. Briefly, FMS measurement is used to detect the volume of fluid delivered with each stroke of the membrane-based pump. A small fixed reference air chamber is located outside of the pump assembly, or example in a pneumatic manifold (not shown). A valve isolates the reference chamber and a second pressure sensor. The stroke volume of the pump may be precisely computed by charging the reference chamber with air, measuring the pressure, and then opening the valve to the pumping chamber. The volume of air on the chamber side may be computed based on the fixed volume of the reference chamber and the change in pressure when the reference chamber was connected to the pump chamber.

In some embodiments, as discussed above, flavorings and/or nutraceuticals may be added to the purified water before or at the time of dispense using one or the pumps discussed above, or, in other embodiments, another pump or method. In some embodiments, the nutraceutical and/or flavoring may be contained in a disposable "blister pack" or other type of packaging, that, in some embodiments, may be sized according to a specific dispense volume, e.g., for a dispense of 1 gallon or a dispense of 8 ounces. In these embodiments, the nutraceutical and/flavoring may be dispensed and then the packaging disposed. In other embodiments, some nutraceuticals and/or flavorings may be stored in a larger volume and dispensed in a selected or recommended volume related to dose, e.g., 1 milliliter per liter or 1 gram per 5 liters, etc. In some embodiments, the water dispensing apparatus may include a user interface, e.g., a screen or other user interface, including but not limited to a touch screen and/or one or more buttons, for selecting the at least one flavoring and/or nutraceutical to add to the water being dispensed. In some embodiments, the user interface may include a menu requesting information from the user, e.g., height, weight, gender and to identify any medical condition, e.g., dehydration, pregnancy, etc. The water dispensing apparatus may recommend a customized nutraceutical and or flavoring for the water being dispensed based on one or more of the user's entered information. In some embodiments, the water dispensing apparatus may be linked to a computing system which would allow a user to save their profile or preferences and access these at the water vending apparatus. These profiles and preferences may include any information regarding and including, but not limited to, user profile (e.g., height, weight, gender, medical condition, etc.), flavoring preferences, vitamin preferences and/or carbonation preferences, amongst others.

The water vending apparatus is well-suited to provide, in some embodiments, water containing therapeutic compounds tailored to the particular needs of individuals. For example, the apparatus may be equipped to generate an oral rehydration solution ("ORS") similar to that recommended by the World Health Organization ("WHO") for persons who have become dehydrated. The dehydration may be from any cause; the ORS may be modified to treat adults or children with gastrointestinal illness, for example. The water vending apparatus permits the production of several possible solutions, depending upon the particular deficiencies that an individual may have. In one example, the water vending apparatus may produce one of two frequently used solutions—a standard WHO ORS having a total osmolarity of approximately 311 mmol/L, or a reduced-osmolarity WHO ORS having a total osmolarity of approximately 245 mmol/L. For example, if a reduced-osmolarity ORS is desired, the water vending apparatus may add sufficient concentrates to the water to produce a solution comprising sodium chloride 2.6 g/L (75 mmol/L), glucose 13.5 g/L (75 mmol/L), potassium chloride 1.5 g/L (20 mmol/L), and trisodium citrate 2.9 g/L (10 mmol/L). Optionally, a zinc sulfate concentrate may be added to the solution if a diarrheal illness is being treated, in order to reduce the duration and severity of the symptoms. The water vending apparatus may allow for adjustment of the concentration of zinc sulfate at 10 mg per 5 ml, or up to 20 mg per 5 ml, for example, as the case may require, and depending upon whether the solution is targeted for an adult or child.

The water vending apparatus may also be adapted to provide vitamin or mineral supplementation to certain groups at particular risk for certain dietary deficiencies. For example, it is known that folic acid supplementation in women of child-bearing potential may reduce the incidence of spina bifida (a congenital spinal cord disorder) in their newborns, particularly if supplementation is provided before conception. Knowing how much water she is likely to drink in a day would allow a user to select an amount of folate concentrate to be added to the water dispensed to achieve, for example, an oral intake of about 400 mcg folate per day. Other vitamins that may be added to the water, depending on individual dietary circumstances, including, but not limited to, thiamine to prevent beriberi, riboflavin to prevent ariboflavinosis, niacin to prevent pellagra, vitamin B12 to prevent anemia, and vitamin C to prevent scurvy. Ingestion of certain antibiotics such as isoniazid may contribute to Vitamin B6 deficiency, resulting in neurological and dermatological symptoms and anemia. Persons under treatment for tuberculosis may optionally add Vitamin B6 concentrate to their water.

The water vending apparatus may also be equipped to dispense a specified concentration of fluoride or chloride in the drinking water. The former would provide protection against dental decay, and the latter would be useful if the water being dispensed is intended to be stored for a period of time in the home before consumption.

Figure 16:
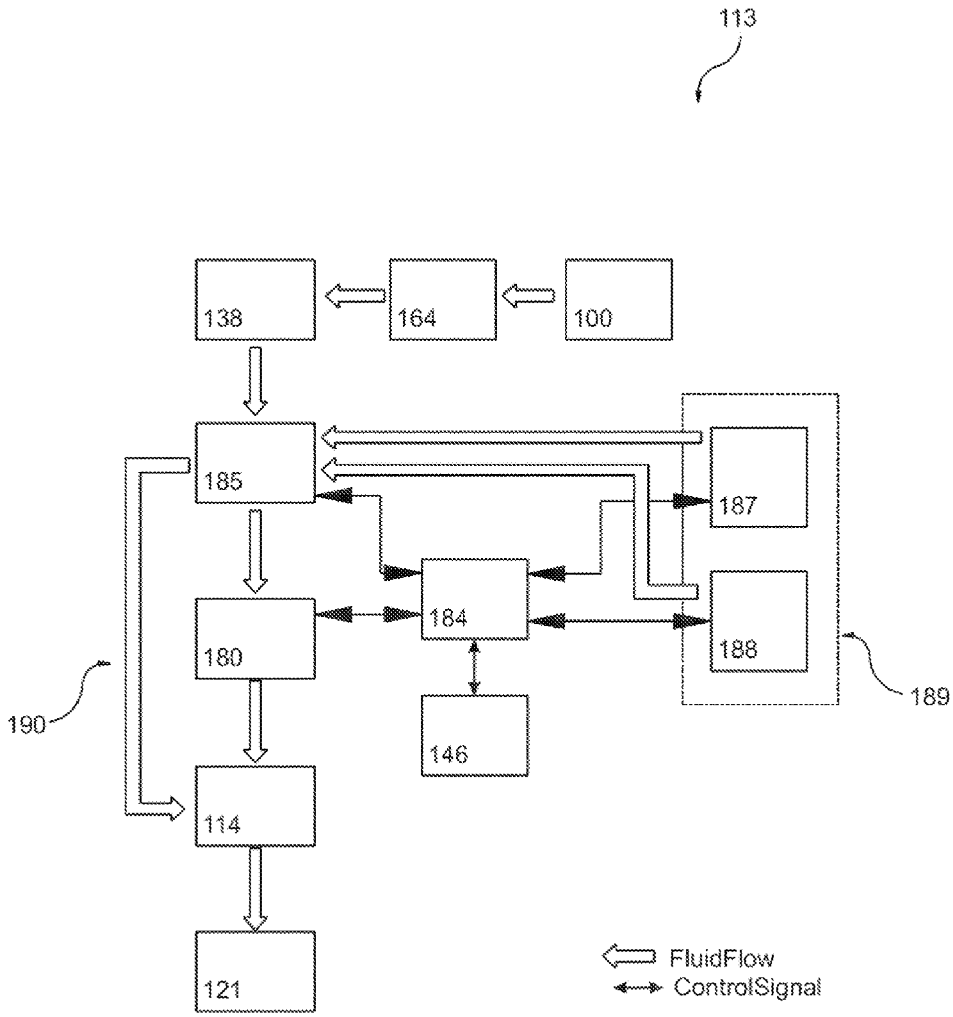
FIG. 16 is a simplified flow diagram of the components used to inject additives into a vessel according to one embodiment.

To facilitate a water vending apparatus 113 capable of mixing additives into purified water, in addition to those described above, in some embodiments, one or more components may be integrated into the exemplary embodiment as shown in simplified flow diagram FIG. 16. In various embodiments, the PLC 184 may be communicably coupled to a modified or additional control panel 146 capable of receiving a specific combination of additives. A mixing chamber 185 may be integrated within the dispensing portion 139, such that, after an additive request, and/or valid additive request, is input to the control panel 146, a predetermined volume of water is disbursed to the mixing chamber 185 from the secondary tank 138 along with the desired additive from at least one flavoring storage compartment 187. In embodiments where a medicinal additive is requested, it may also be disbursed to the mixing chamber 185 from at least one medicinal storage compartment 188. At least one additive storage compartment 189 may be located within the vending apparatus 113 to facilitate periodic refilling or flavor swapping. Additive storage compartments 189 may also incorporate a means of verifying that the correct flavoring is aligned in the correct location and with the proper conduit, such as but not limited to, an RFID tag-reading system, or specially shaped compartments. The actuator block, labeled generally as 180 in FIG. 16, may be comprised of one or more actuators capable of controlling the flow of one or more fluid conduits. The mixing chamber 185 may mechanically stir the additive(s) into the product water, sending a signal to the PLC 184 when the beverage is fully mixed. After mixing is complete the enhanced beverage may be dispensed to a vessel 121_a-c_ as previously disclosed. Alternatively, when no additives are requested, the mixing chamber 185 may be bypassed as shown by fluid flow arrow 190.

The PLC 184 may also contain additional logic to facilitate a rinsing operation after a completed additive dispensing operation. Rinsing may be advantageous where one or more common conduits are utilized to dispense fluid containing additives in one operation, and unmodified product water in another operation, as some additive residue may remain within the conduit. A rinse operation may include flushing unmodified product water through the one or more common conduits, the mixing chamber, and back into the purification system input.

In various embodiments, now referring to a much different type of additive, chemical additives may be added to the product water storage tanks as a means of ensuring water purity. Certain indicator chemicals may be capable of changing color in response to local environmental conditions of temperature, humidity, pressure and the presence or absence of specific other chemicals, as described in U.S. Pat. No. 5,990,199 the contents of which are herein incorporated by reference in its entirety. Such color changing properties may allow a vendee or maintenance worker to verify product water quality. Other chemicals may be added for similar reasons to detect biological agents.

In other embodiments, chemical additives may be periodically introduced to a tank separate from the product water storage tanks. This configuration may be capable of testing the current water quality while keeping the storage tanks free from extra chemicals. The color of the water contained in such a separate tank may be visible from outside the water vending apparatus, or sensed electronically and sent as data to control circuitry, such as, the PLC. This process may include introducing the indicator into the separate tank upon completion of a circulation cycle, flushing both indicator and product water out of the separate tank, and repeat process during each subsequent circulation cycle.

6.7 Additional Nozzle Embodiments

In some embodiments of the nozzle assembly, one or more filling stations 116 may include a positionable nozzle. A positionable nozzle may be used for ensuring most of the product water enters the vessel 121*a-c* during filling.

In various embodiments, a length of tubing or hose may be attached to a nozzle 114*c* of a water vending apparatus. A hose may allow vessels not capable of fitting into a filling station to be filled, and additionally, may provide a more convenient means of filling a vessel. Filling station nozzles may have a threaded section, capable of mating with a corresponding threaded hose section. Alternatively, a hose may remain permanently coupled to the vending apparatus housing and may be selected for use by way of manual switch or electronic keypad. In the latter embodiment, the hose may remain rolled up into in a special compartment in the dispensing portion when not in use, and may be capable of rolling out when selected for use. Either of these embodiments may be used when a vendee has a vehicle or cart containing several large vessels 121*b* to fill, here the extending hose nozzle may be brought to the vessel 121*b* rather than lifting and moving several vessels 121*b* for filling. The extending hose nozzle may protect vendees from unnecessary back pains from carrying the heavier vessels 121*b*, such as, but not limited to, the 5 gallon vessels, from the filling cavity 116 to their vehicle.

The hose may also incorporate a device to ensure purity. In certain embodiments, a nipple may mate with the end of the hose from which product water is dispensed. A nipple may limit the number of filling operations that may be obtained. The nipple may be a disposable component, capable of sending a signal to the vending machine to allow one or more filling operations. In this configuration, the vendee may be confident that the new nipple has not been exposed to contaminants.

In other embodiments, the nozzle 114*e* may move along a track to allow filling of both smaller vessels 121*a* and larger vessels 121*b* by using the proximity sensors 133, 134 to determine which sized vessel 121*a*, 121*b* is in the filling cavity 116, moving to the designated filling station 116*a*, 116*b* and adjusting the fill limit appropriately.

In various embodiments, the nozzle 114*d* may swivel to different angles to allow 5 gallon vessels 121*d* that do not have a centered opening to be filled within the filling station 116*a*. In some of these embodiments, there may be a proximity sensor to confirm the nozzle has moved to the correct angle to maximize filling of the vessel 121*d*.

In still further embodiments, the nozzle 114*a*, 114*b* may include an expanded orifice that may narrow towards the valve 159 so the nozzle 114*a*, 114*b* itself may position the vessel 121*b* into a position to maximize the filling operation. In some embodiments the nozzle 114*a* may contain an orifice fully covered within the nozzle while in other embodiments the nozzle 114*b* orifice may be comprised of at least two prongs that may encircle the vessel 121*b* and position the vessel 121*b* using the prongs. In some embodiments of these embodiments, the expanded orifice nozzles 114*a*, 114*b* may lower towards the vessel 121*b* to assist with positioning the vessel 121*b* accordingly.

6.8 Water Scale Indicator

In various embodiments, a water vending apparatus 113 may incorporate at least one sensor to indicate the present state of scale and sedimentation within the system 100. Water scale is a precipitate deposited on surfaces in contact with hard water. Carbonates and bicarbonates of calcium and magnesium are especially likely to cause scale buildup. If ignored, scale deposits may interfere with operation of the purification system 100 and create significant efficiency loss. Thus, a sensor may be beneficial.

In certain embodiments, a scale sensor may be visual indicator, such as, a glass bottle external to the purification system 100 and fluidly coupled to an area prone to scale. Other methods for preventing scale may include using: ion-exchange, phosphates, permanent magnets, electronic conditioning, and inhibitors. When buildup is acknowledged via the glass bottle (or other sensor), action may be taken to manually remove the scale from the affected surfaces.

6.9 Disposable Bottle Liners

In various embodiments, the vending apparatus may provide bottle liners to maintain the purity of the dispensed distilled water. There are instances where a vessel may become contaminated with or without the vendee's knowledge and bottle liners may prevent bottle contamination from reaching the dispensed water.

In some embodiments the bottle liner may be contained within a vessel cap. In these embodiments the cap may have a removable lining that may be opened into the vessel to assure the dispensed water is entering a sterile environment. In other embodiments the bottle lining may be of an elastic material that may adhere to the mouth of the vessel and as the vessel is filled the lining will expand to fit the shape of the vessel.

In some embodiments, the bottle liner is dispensed into the vessel prior to the water dispensing. Thus, the vending apparatus dispenses a liner, then dispenses the water.

In some embodiments to vent air, the vessel may be a mesh or lattice rather than whole solid shape to vent air as the bottle liner is filled within the vessel. In other embodiments the vessel may contain a simple hole or multiple holes to vent the air within the bottle and allow filling of the lining within the vessel. In various embodiments of the vending apparatus, the bottle lining may be automated to include a vacuum to remove air within the vessel prior or during filling of the liner to allow full filling of the vessel.

6.10 Water Purification Appliance

In some embodiments, the various embodiments of the water vapor distillation system described herein may be used as a home, office, boat, and/or remote cabin water purification appliance. There embodiments may include a "scaled down" embodiment of the water vapor distillation apparatus as described herein where various features, and or the capacity, may be reduced to meet at specific need.

Referring now to FIG. 69, one embodiment of a water purification appliance 27000 is shown. This apparatus 27000 includes a water vapor distillation apparatus within a housing sized appropriately for, but not limited to, a residence/home or office kitchen, a boat, or other. With respect to embodiments in a residence/home, the daily or hourly water volume requirements for a residence or home are often much less than a convenience store or community water supply, as discussed elsewhere herein. Thus, the water vapor distillation apparatus may be "scaled down" to meet the need of the home, for example, while being sized appropriately to be conveniently located within a kitchen, under a counter, for example (see FIG. 70). In other embodiments, a water vapor distillation system may be larger and stored in a basement or garage, for example. In the various home appliance embodiments, the purified water may be fed into a faucet and/or refrigerator. In some embodiments, the appliance may include a e.g., a 1 gallon pressurized bladder tank. This water appliance may be desirable for it provides on-demand purified water conveniently through a faucet or refrigerator. This may be desired for those households currently either purchasing water at a remote location, having water delivered to their home, or have an internal filtering system. For households that may have a well, as well water is not regulated, the well may not provide safe drinking water. Thus, a water purification appliance may be a solution. Additionally, for homes in remote areas, the water purification appliance may provide additional convenience.

In some embodiments, a scaled down water purification appliance may be used on a personal boat or yacht. This may be a desirable alternative to a reverse osmosis system for many reasons, including but not limited to, the low maintenance required and the absence of a membrane (which may be clogged). Additionally, reverse osmosis systems may only be used in open waters due to the petroleum, bleach and other dangerous chemicals generally present at port. A water purification appliance may therefore provide a safer and more reliable alternative to a reverse osmosis system on a boat or yacht.

7. Purification 7.1 Water Vapor Distillation

In the exemplary embodiment, the purification system 100 is a Water Vapor Distillation apparatus (see FIG. 31) as described in U.S. Patent Application Pub. No. US 2009/0025399 A1 published on Jan. 29, 2009 and entitled "Water Vapor Distillation Apparatus, System and Method," the contents of which are hereby incorporated by reference herein. The purification system 100 is also referred to as a fluid vapor distillation apparatus or a water vapor distillation apparatus. The purification system is an apparatus for distilling unclean water known as source water into cleaner water known as product water. The apparatus cleanses the source water by evaporating the water to separate the particulate from the source water. The purification system 100 is regarded as the exemplary purification means because it is more efficient, requires fewer user inputs and is more reliable than other devices known in the art. In some embodiments, the purification system described in U.S. Patent Application Pub. No. US 2005/0016828 published on Jan. 27, 2005 and entitled "Pressurized Vapor Cycle Liquid Distillation", the contents of which are hereby incorporated by reference herein, may be used.

Generally considering the exemplary method of purification, raw water entering the vending apparatus 113 through the input conduit 122 may first pass through a counter flow tube-in-tube heat exchanger 102 to filter and increase the temperature of the water. Increasing the temperature of the source water reduces the amount of thermal energy required to evaporate the water within the evaporator/condenser 104. The source water may receive thermal energy from the other fluid streams present in the heat exchanger 102. Typically, these other streams have a higher temperature than the source water motivating thermal energy to flow from the higher temperature streams to the lower temperature source water.

Receiving the heated source water is the evaporator area of the evaporator/condenser assembly 104. This assembly evaporates the source water to separate the contaminants from the water. Thermal energy may be supplied using a heating element and high-pressure steam. Typically, the heating element will be used during initial start-up, thus under normal operating conditions the thermal energy will be provided by the high-pressure steam. The source water fills the inner tubes of the evaporator area of the evaporator/condenser. When the high-pressure steam condenses on the outer surfaces of these tubes thermal energy is conducted to the source water. This thermal energy causes some of the source water to evaporate into low-pressure steam. After the source water transforms into a low-pressure steam, the steam may exit the outlet of the tubes and pass through a separator. The separator removes any remaining water droplets within the steam ensuring that the low-pressure steam is dry before entering the compressor.

Upon exiting the evaporator area of the evaporator/condenser the low-pressure steam enters a compressor. The compressor creates high-pressure steam by compressing the low-pressure steam. As the steam is compressed the temperature of the steam increases with the steam at an elevated temperature and pressure the steam exits the compressor.

The high-pressure steam enters the condenser area of the evaporator/condenser. As the steam fills the internal cavity the steam condenses on the tubes contained within the cavity. The high-pressure steam transfers thermal energy to the source water within the tubes. This heat transfer causes the steam to condense upon the outer surface of the tubes creating product water. The product water is collected in the base of the condenser area of the evaporator/condenser. The product water leaves the evaporator area of the evaporator/condenser and enters the level sensor housing.

The level sensor housing contains level sensors for determining the amount of product and blowdown water within the apparatus. These sensors allow an operator to adjust the amount of product water being produced or the amount of incoming source water depending on the water levels within the apparatus.

The level sensor assembly 108 may be the gateway for product water to enter the dispensing portion 139, also housed in the vending apparatus 113. Waste Water (also referred to as "blowdown") created throughout the purification process may be evacuated from the vending apparatus 113 by way of conduit exclusively reserved for handling waste water. Using this cycle, the purification system 100 is capable of a 95% municipal water recovery rate, however the exemplary embodiment is modified to a 75% municipal water recovery rate and yields a 10 gal/hr flow rate. In other various embodiments the flow rate may increase to 12 gal/hr or may be slowed to below 10 gal/hr. However, various components of the system may be modified or scaled in size to produce a desired flow rate.

Figure 15:
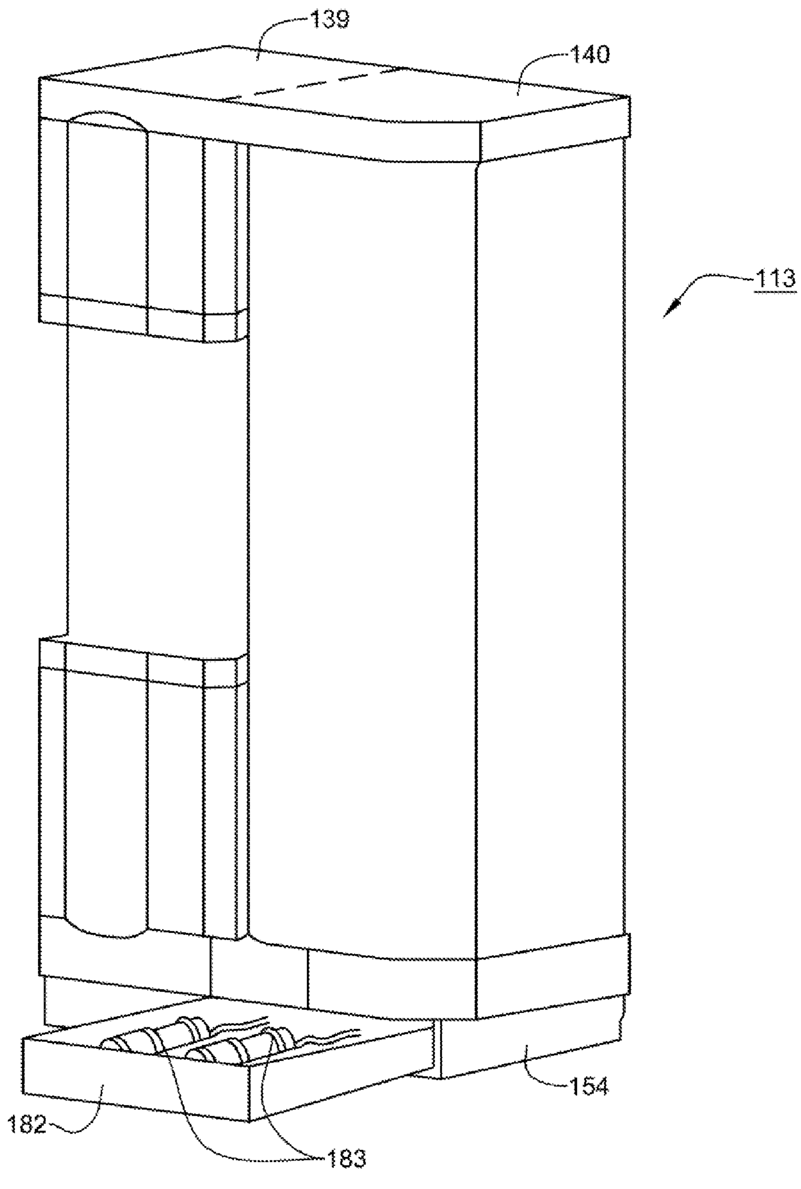
FIG. 15 is a front perspective view of a filter drawer, in the open position, as incorporated in a water vending apparatus according to one embodiment.

Referring to FIG. 15, regarding filtration, upon entering the vending apparatus 113, raw water may pass through a series of filters 183 to remove large particulate. This step may help maintain the purification system 100 by reducing wear and clogging associated with internal filtration of large particulate. In the exemplary embodiments, the filter 183 is a particle filter (5-50 micron size in the exemplary embodiment). In the exemplary embodiment, an Omnipure "Dirt & Sand Reduction" filter, model number CL10PF5 is used. The product water may flow through two carbon filters 183, arranged in series, before exiting the purification system 100, although, any number of filters could be used. Although the exemplary embodiment utilizes filters 183, other embodiments may not utilize filters. The type of carbon filters used may be any type known in the art, in the exemplary embodiment, Omnipure "Taste & Odor Reduction" units are used, model number CL10RO T/33. In the exemplary embodiment, in general, the particle filter 183 may be changed, depending on use and source water conditions, each year at a maximum flow rate of 0.5 GPM. The carbon filters may be changed after 1500 gallons, or 1 year, whichever is met earliest.

Filtration components may reside in an easily accessible location, such as a drawer 182. Filter location is important because filters 183 may need to be changed periodically according to filter specifications. As depicted in FIG. 15, carbon filters 183 are mounted in a drawer 182, built into the base 154, beneath the purification portion 140. This drawer 182 may be slid open (as shown in the exemplary FIG. 15) or removed such that the filters 183 may be accessed and replaced. In a fully closed position, the drawer 182 may be flush with vending apparatus housing, thus hidden from view and protected from the elements.

Figure 2:
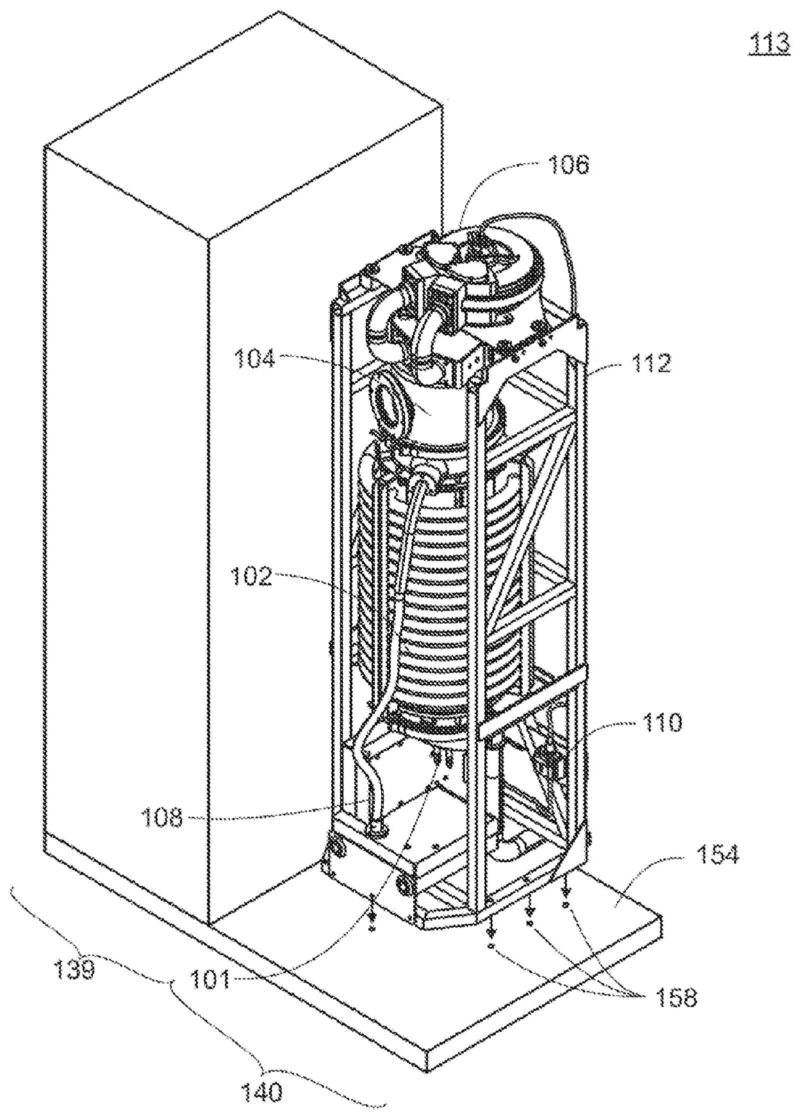
FIG. 2 is one embodiment of the water vapor distillation apparatus according to one embodiment.
Figure 2A:
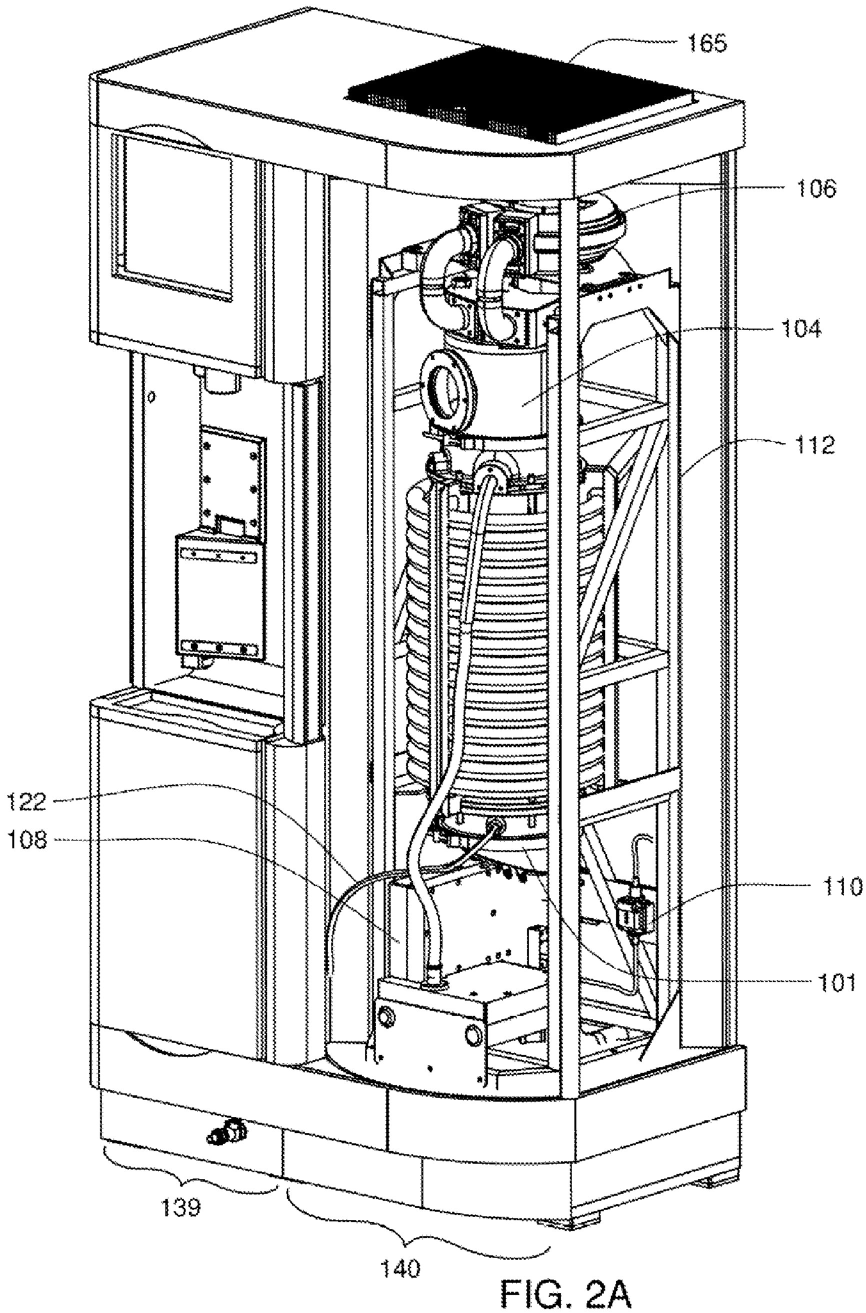
FIG. 2A is a perspective view of one embodiment of the water vapor distillation apparatus within the water vending apparatus according to one embodiment.

Referring to FIG. 1-2, arrangement of the components that form a water purification system 100 may be aligned in a fashion that promotes integration into the housing of a water vending apparatus 113. In the exemplary embodiment, the water purification system 100 exists within the vending apparatus 113 in a vertically aligned fashion. A vertical alignment, as shown in FIG. 2, may be the exemplary method operation since water vapor distillation involves the vertical process of evaporation. Additionally, such alignment may minimize the footprint of the water purification system 100 and consequently create more space within the housing for other components and features.

A frame 112 may provide support for a vertical alignment of purification system components 108, 102, 104, 106, 110, and additionally provide a means of securing the water purification system 100 within the vending apparatus 113. The frame 112 may be centered on the base 154 and aligned adjacent to the dispensing portion 139 also residing on the base 154. For stability, the frame 112 may be fixed to the base 154 by way of passing industrial strength bolts through the lowermost periphery of the frame and into predrilled holes 158 located on the base 154. In other various embodiments the purification system 100 may be redundantly fixed to other portions of the vending apparatus 113.

Preferably, the base 154 is composed of corrosion resistant material, such as stainless steel. In various other embodiments, the base 154 may be composed of any of a variety of materials, included but not limited to, plastic, fiberglass or other types of metal including metal composites. In various embodiments, it may be desirable that the base be composed of a material in which water does not exacerbate decay.

In the exemplary embodiment, one or more adjustable pads, or "feet", may be coupled to the underside of the base 154 to ensure that the vending apparatus 113 is level. In various embodiments, one or more casters may be coupled to the underside of the vending apparatus base to enable mobility and ease of installation.

The water vapor distillation apparatus as described herein with respect to various embodiments may further be used in conjunction with a Stirling engine to form a water vapor distillation system. The power needed by the water vapor distillation apparatus may be provided by a Stirling engine electrically connected to the water vapor distillation apparatus.

Figure 31:
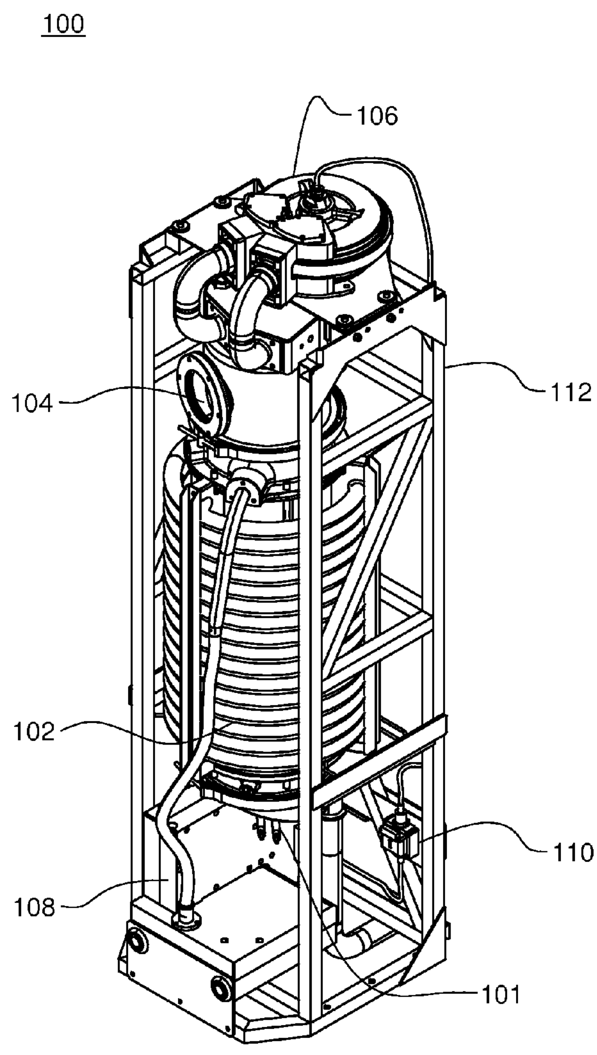
FIG. 31 is an isometric view of the water vapor distillation apparatus according to one embodiment.

Referring to FIG. 31, one embodiment of the water vapor distillation apparatus 100 is shown. For the purposes of this description, the embodiment shown in FIG. 1 will be referred to as the exemplary embodiment. Other embodiments are contemplated some of which will be discussed herein. The apparatus 100 may include a heat exchanger 102, evaporator/condenser assembly 104, regenerative blower 106, level sensor assembly 108, a bearing feed-water pump 110, and a frame 112. See also FIGS. 1A-E for additional views and cross sections of the water vapor distillation apparatus 100.

7.2 Insulation

In some embodiments, insulation is used to decrease the transfer of heat from the purification portion. Loss of heat from the purification portion may decrease the efficiency of the purification system as well as transfer of heat to the dispensing portion may increase the temperature of the product water. Also, depending on the location of the system, outside the system may be extreme temperatures, therefore decreasing the efficiency of the purification system. Thus, in some embodiments, insulation is used to increase or maintain efficiency.

Figure 10B:
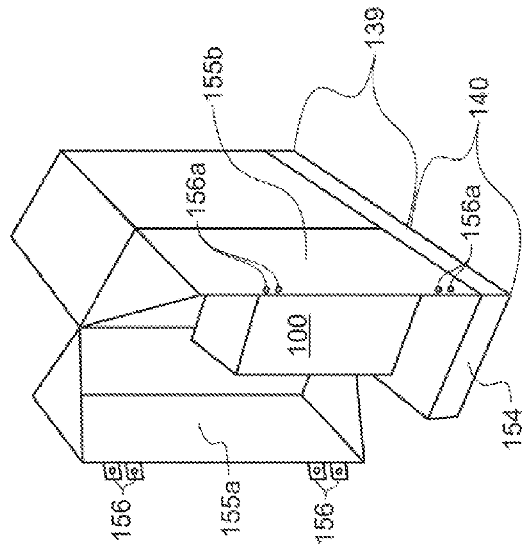
FIG. 10B is a diagram of the purification system with an unfastened portion of insulation according to one embodiment.
Figure 10A:
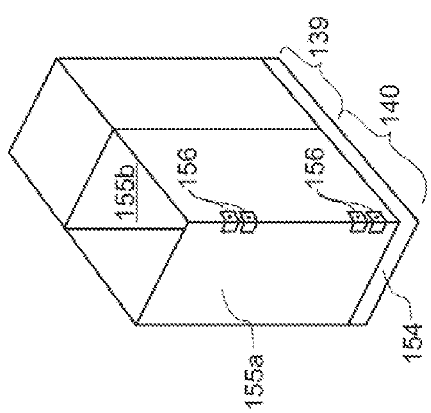
FIG. 10A is a diagram of the purification system as fully surrounded by insulation according to one embodiment.

Referring now to FIG. 10*a*, the purification system 100 may be completely encased in at least one layer of insulation 155. However, in other embodiments, the purification system 100 may be at least partially encased in a layer of insulation and in some embodiments, insulation is not used. This layer may inhabit the region of space between the purification system 100 and the external housing (not shown) of the vending apparatus 113. In some embodiments, insulating means may be used to maintain efficiency as the water vapor distillation method of purification generates considerable heat energy (110 degrees Celsius during normal operation) for the purpose of rapidly evaporating raw water. Surrounding the purification system 100 with insulation 155 may also prevent dispensing portion components from overheating.

Referring now to FIG. 10*b*, in some embodiments, the insulation may be severed diagonally such that two rectangular prism shapes 155*a*, 155*b* are roughly formed. In the exemplary embodiment, the insulation is generally 2" thick. The two pieces may then be fastened to one another by way of Velcro, rope, latching bolting and/or button straps 156 fixed to abutting edges. In the exemplary embodiment, Velcro and bolts are used to fasten the insulation together. In this configuration, one portion of the insulation 155*a* may be swung open, similar to the operation of a door, allowing ease of access for maintenance personnel, or installation/removal procedures. In other embodiments, one portion of insulation may also be completely removed from the device for ease of access for maintenance personnel, or installation/removal procedures. In these embodiments, the external vending apparatus housing may need to be modified to accommodate such functionality. In the exemplary embodiment of this embodiment, to accommodate for the movable insulation, the housing includes clasps that incorporated into the support structure that forms the shell of the vending machine. These clasps engage mating features on the "door" side of the insulation forming a retention point along one side. Additional means of mating the insulation pieces (such as adding a plurality of fasteners to the abutting edges) may be used in various embodiments to prevent substantial heat loss. A rubber seal may be implemented to further insulate the purification device; the rubber seal keeps the purification portion as insulated as possible and prevents heat loss from the system. In the exemplary embodiment, a gap is allowed between the insulation and the purification system.

In various embodiments, portions of insulation 155*a*, 155*b* may define an internal cavity wherein the purification system 100, or various components associated with purification, may benefit from a reduction in pressure created by impact with insulation. In this configuration, it may be beneficial to use insulation that is capable of being manipulated or carved to accommodate purification components. In some embodiments, a flexible conduit running out of the purification portion 140 and into the dispensing portion 139 may be occluded by the force of insulation bearing down on it. It may then be necessary to create a gap in the insulation such that the pressure is relieved.

In various other embodiments, a single block of insulation may be fit over the top of the purification system 100 such that the entire apparatus resides within a cavity. A single block may be useful in producing maximum heat efficiency because only one seam may exist between the base 154 and the insulation.

7.3 Heat Exchanger

Figure 32:
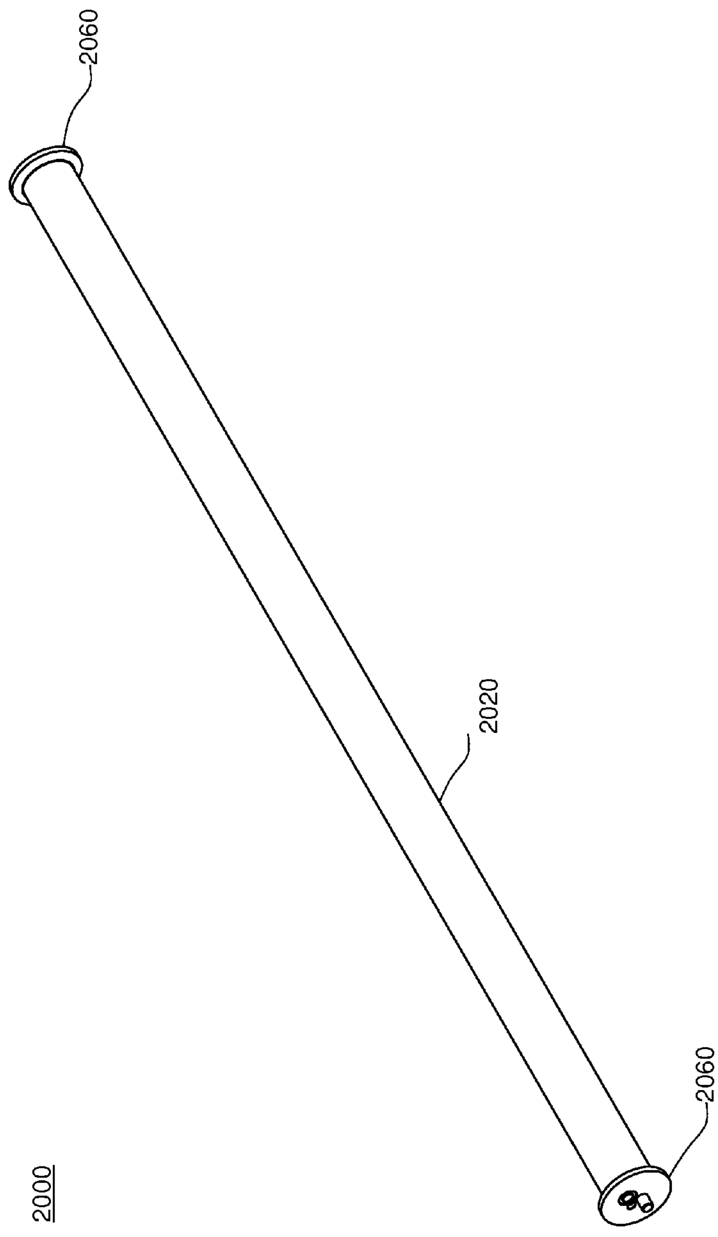
FIG. 32 is an assembly view of the exemplary embodiment of the tube-in-tube heat exchanger assembly.
Figure 32A:
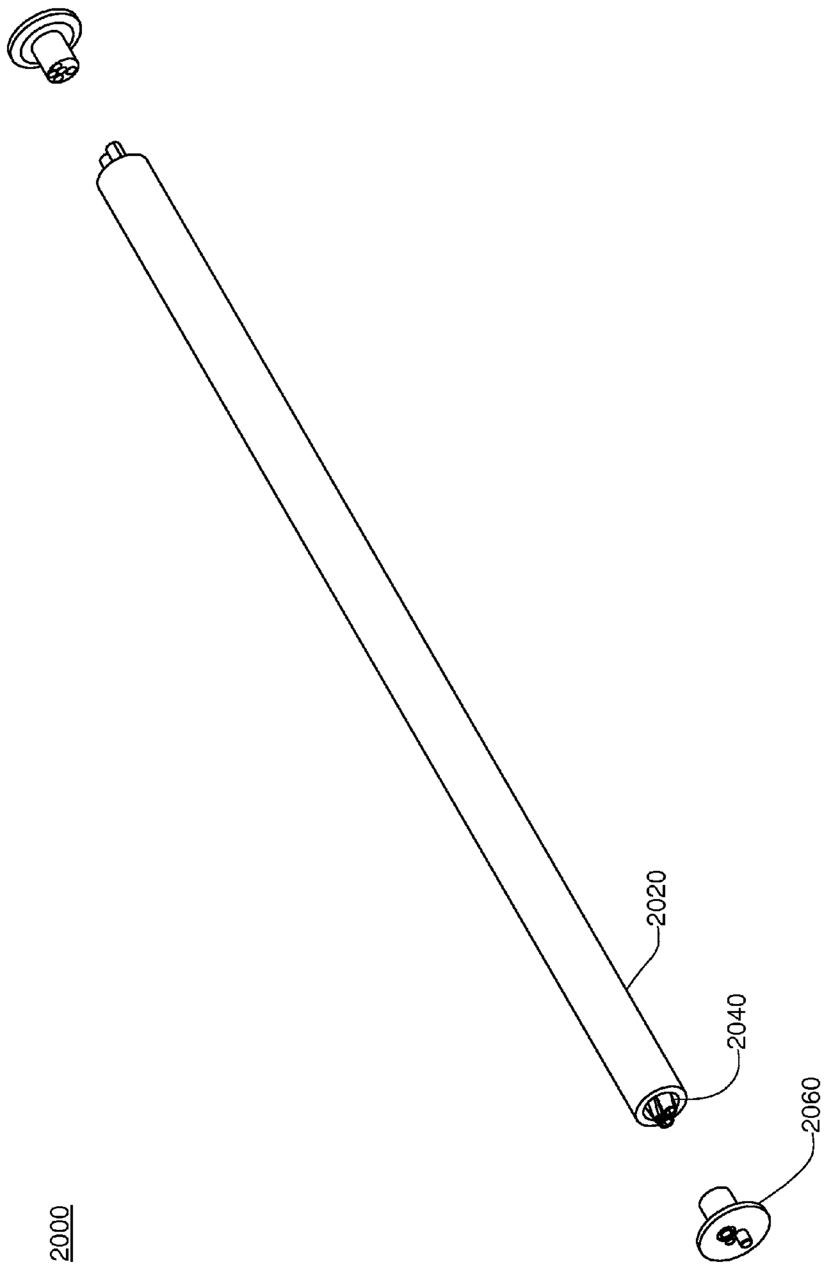
FIG. 32A is an exploded view one embodiment of the tube-in-tube heat exchanger.

Referring now to FIGS. 32-32A, in the exemplary embodiment of the water vapor distillation apparatus, the heat exchanger may be a counter flow tube-in-tube heat exchanger assembly 2000. In this embodiment, heat exchanger assembly 2000 may include an outer tube 2020, a plurality of inner tubes 2040 and a pair of connectors 2060 illustrated in FIG. 102A. Alternate embodiments of the heat exchanger assembly 2000 may not include connectors 2060.

Still referring to FIGS. 32-32A, the heat exchanger assembly 2000 may contain several independent fluid paths. In the exemplary embodiment, the outer tube 2020 contains source water and four inner tubes 2040. Three of these inner tubes 2040 may contain product water created by the apparatus. The fourth inner tube may contain blowdown water.

Still referring to FIGS. 32-32A, the heat exchanger assembly 2000 increases the temperature of the incoming source water and reduces the temperature of the outgoing product water. As the source water contacts the outer surface of the inner tubes 2040, thermal energy is conducted from the higher temperature blowdown and product water to the lower temperature source water through the wall of the inner tubes 2040. Increasing the temperature of the source water improves the efficiency of the water vapor distillation apparatus 100 because source water having a higher temperature requires less energy to evaporate the water. Moreover, reducing the temperature of the product water prepares the water for use by the consumer.

Still referring to FIGS. 32-32A, in the exemplary embodiment the heat exchanger 2000 is a tube-in-tube heat exchanger having an outer tube 2020 having several functions. First, the outer tube 2020 protects and contains the inner tubes 2040. The outer tube 2020 protects the inner tubes 2040 from corrosion by acting as a barrier between the inner tubes 2040 and the surrounding environment. In addition, the outer tube 202 also improves the efficiency of the heat exchanger 2000 by preventing the exchange of thermal energy to the surrounding environment. The outer tube 2020 insulates the inner tubes 2040 reducing any heat transfer to or from the surrounding environment. Similarly, the outer tube 2020 may resist heat transfer from the inner tubes 2040 focusing, the heat transfer towards the source water and improving the efficiency of the heat exchanger 2000.

Figure 32B:
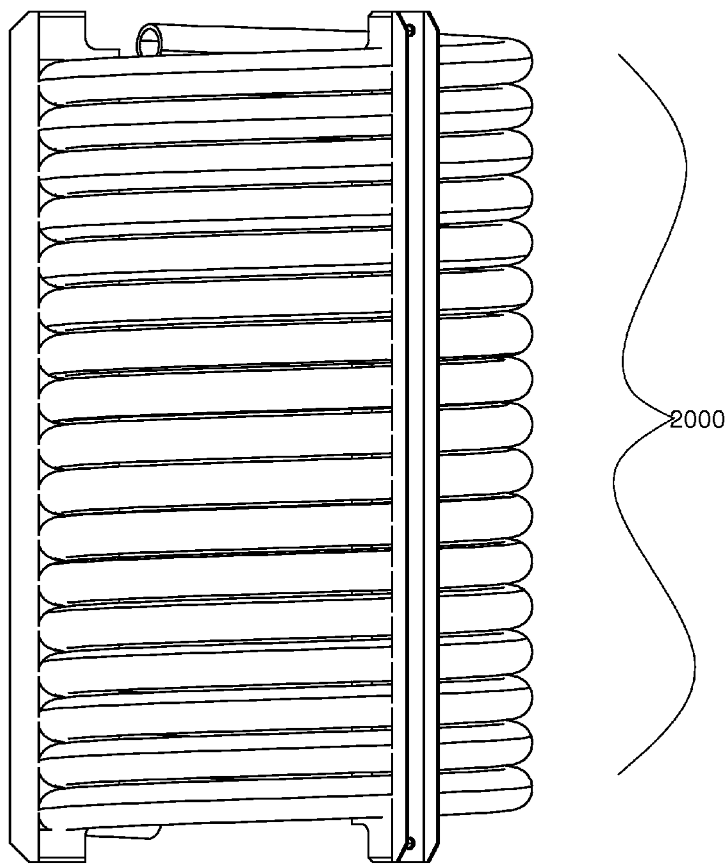
FIG. 32B is an isometric view of the exemplary embodiment of the tube-in-tube heat exchanger from the back.
Figure 32C:
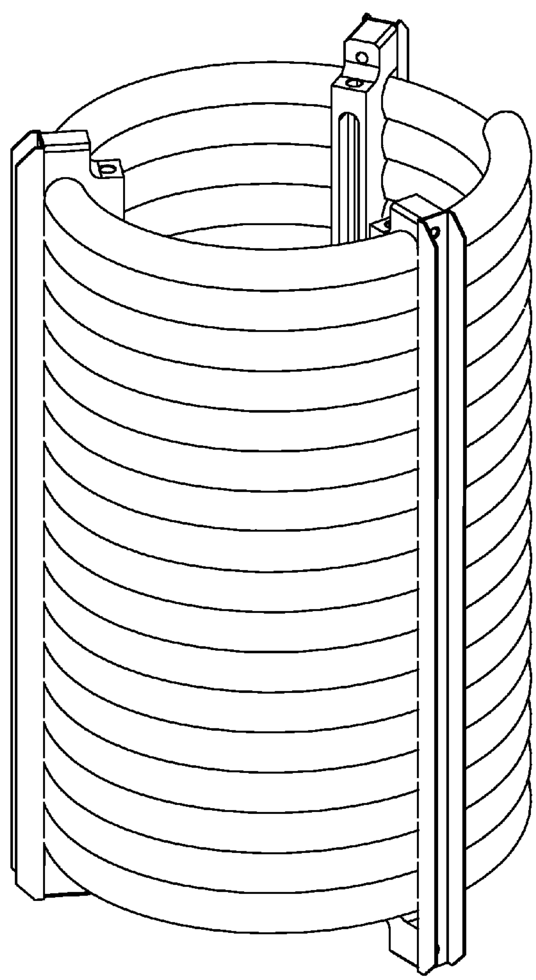
FIG. 32C is an isometric view of the exemplary embodiment of the tube-in-tube heat exchanger from the front.

Referring now to FIGS. 32B-C, another desirable characteristic is for the outer tubing 2020 to be sufficiently elastic to support installation of the heat exchanger 2000 within the water vapor distillation apparatus 100. In some applications space for the distillation apparatus may be limited by other environmental or situational constraints. In the exemplary embodiment the heat exchanger 2000 is wrapped around the evaporator/condenser. In other embodiments, the heat exchanger may also be integrated into the insulated cover of the water vapor distillation apparatus to minimize heat lost or gained from the environment. In the exemplary embodiment the heat exchanger 2000 is configured in a coil as shown in FIGS. 32B-C. To achieve this configuration the inner tubes 2040 are slid into the outer tube 2020 and then wound around a mandrel. An elastic outer tube 2020 assists with positioning the ends of the heat exchanger 2000 at particular locations within the apparatus. Thus, having an elastic outer tube 2020 may facilitate in the installation of the heat exchanger 2000 within the water vapor distillation apparatus 1000.

Figure 32D:
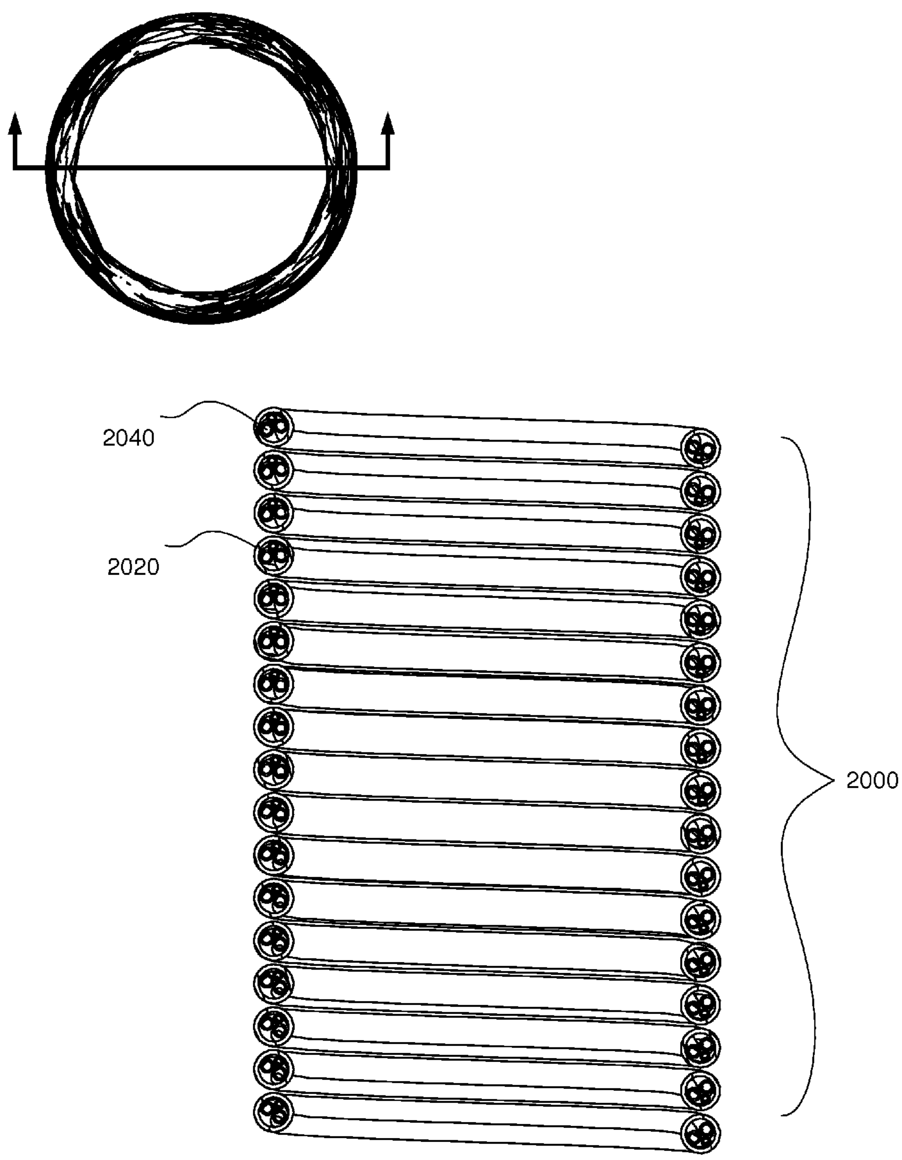
FIG. 32D is a cross-section view of one embodiment of the tube-in-tube heat exchanger.
Figure 32E:
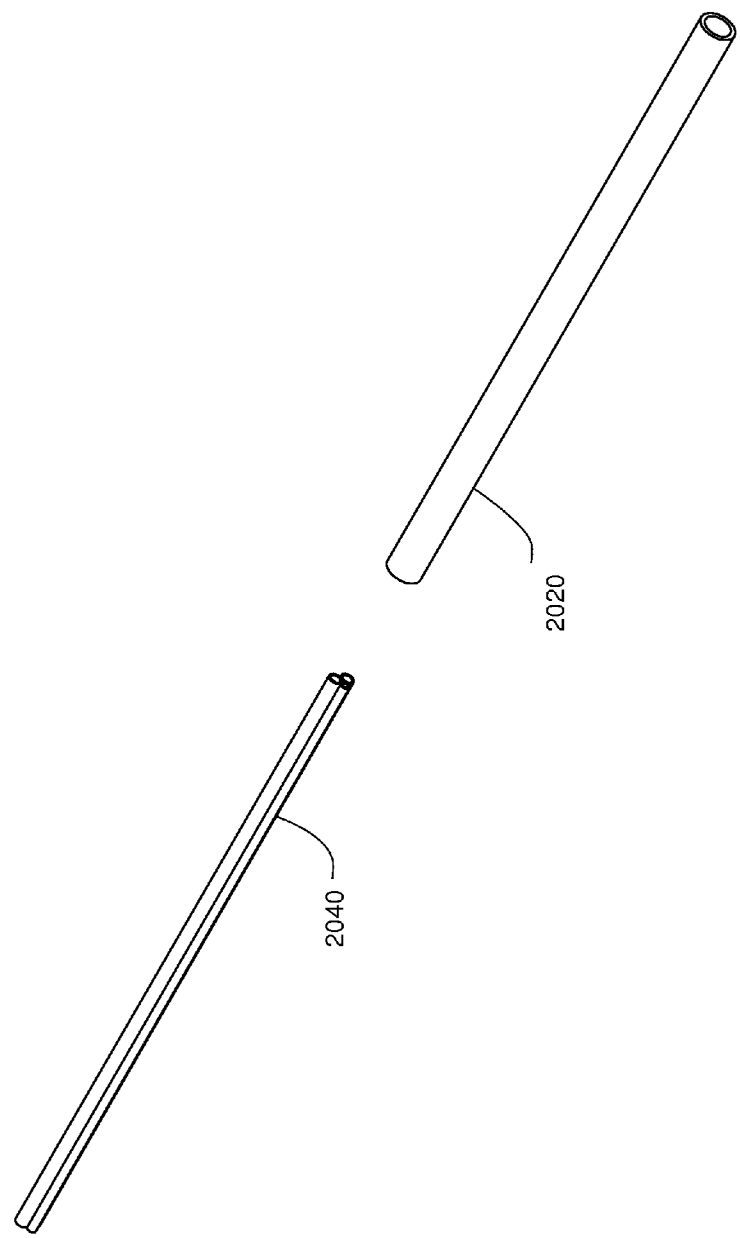
FIG. 32E is a cut away view of one embodiment of the tube-in-tube heat exchanger illustrating the helical arrangement of the inner tubes.
Figure 32F:
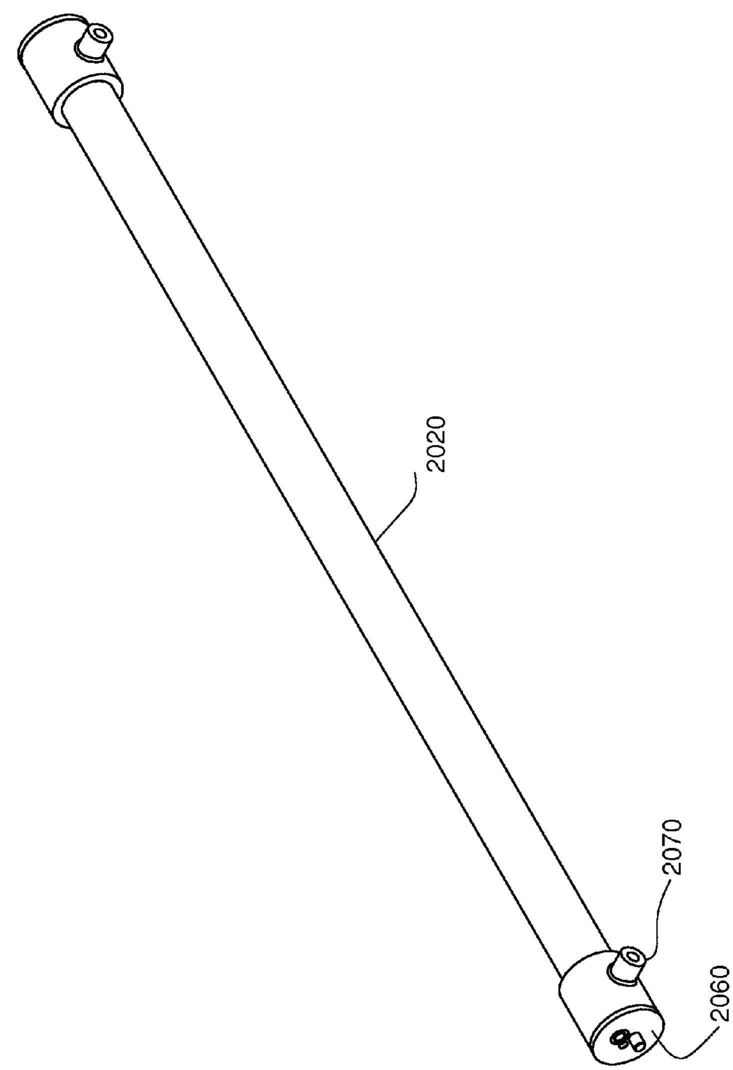
FIG. 32F is an isometric view of the exemplary embodiment of the tube-in-tube heat exchanger.
Figure 32G:
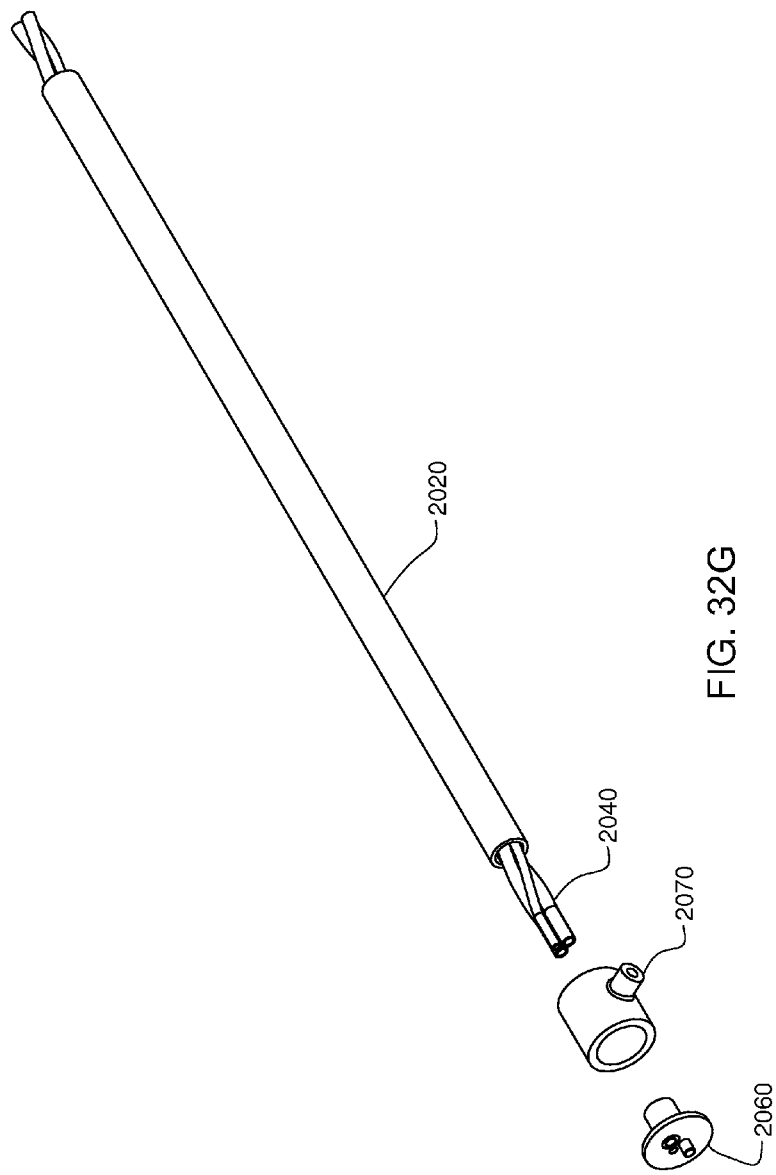
FIG. 32G is an isometric view of the exemplary embodiment of the tube-in-tube heat exchanger.

Now referring to FIGS. 32A and 32D, the inner tubes 2040 may provide separate flow paths for the source, product, and blowdown water. In the exemplary embodiment, these tubes contain product and blowdown water. However, in other embodiments, the inner tubes may contain additional fluid streams. The inner tubes 2040 separate the clean and safe product water from the contaminated and unhealthy source and blowdown water. In the exemplary embodiment, there are three inner tubes 2040 for product water and one inner tube 2040 for blowdown. The source water travels within the outer tube 2020 of the heat exchanger 2000. In various other embodiments, the number of inner tubes may vary, i.e., greater number of inner tubes may be included or a lesser number of inner tubes may be included.

Still referring to FIGS. 32A and 32D, the inner tubes 2040 conduct thermal energy through the tube walls. Thermal energy flows from the high temperature product and blowdown water within the inner tubes 2040 through the tube walls to the low temperature source water. Thus, the inner tubes 2040 are preferably made from a material having a high thermal conductivity, and additionally, preferably from a material that is corrosion resistant. In the exemplary embodiment, the inner tubes 2040 are manufactured from copper. The inner tubes 2040 may be manufactured from other materials such as brass or titanium with preference that these other materials have the properties of high thermal conductivity and corrosion resistance. For applications where the source and blowdown water may be highly concentrated, such as sea water, the inner tubes 2040 may be manufactured from but not limited to copper-nickel, titanium or thermally conductive plastics.

In addition to the tubing material, the diameter and thickness of the tubing may also affect the rate of thermal energy transfer. Inner tubing 2040 having a greater wall thickness may have less thermal efficiency because increasing the wall thickness of the tubing mat also increase the resistance to heat transfer. In the exemplary embodiment, the inner tubes 2040 have 0.25 inch outside diameter. Although a thinner wall thickness increases the rate of heat transfer, the wall thickness must be sufficient to be shaped or formed without distorting. Thinner walled tubing is more likely to kink, pinch or collapse during formation. In addition, the wall thickness of the inner tubes 2040 must be sufficient to withstand the internal pressure created by the water passing through the tubes.

Referring now to FIGS. 32, 32J, and 32K the heat exchanger assembly 2000 may also include a connector 2060 at either end of the heat exchanger 2000. In the exemplary embodiment, the heat exchanger 2000 has two connectors located at either end of the assembly. These connectors 2060 along with the outer tube 2020 define an inner cavity for containing the source water. In addition, the connectors attach to the ends of the inner tubes 2040 and provide separate fluid paths for the product and blowdown water to enter and/or exit the heat exchanger 2000. The connectors 2060 allow the heat exchanger assembly to be mechanically connected to the evaporator/condenser and other apparatus components. In some embodiments an extension 2070 may be included within the heat exchanger 2000 to provide an additional port to remove or supply water to the heat exchanger 2000.

Figure 33:
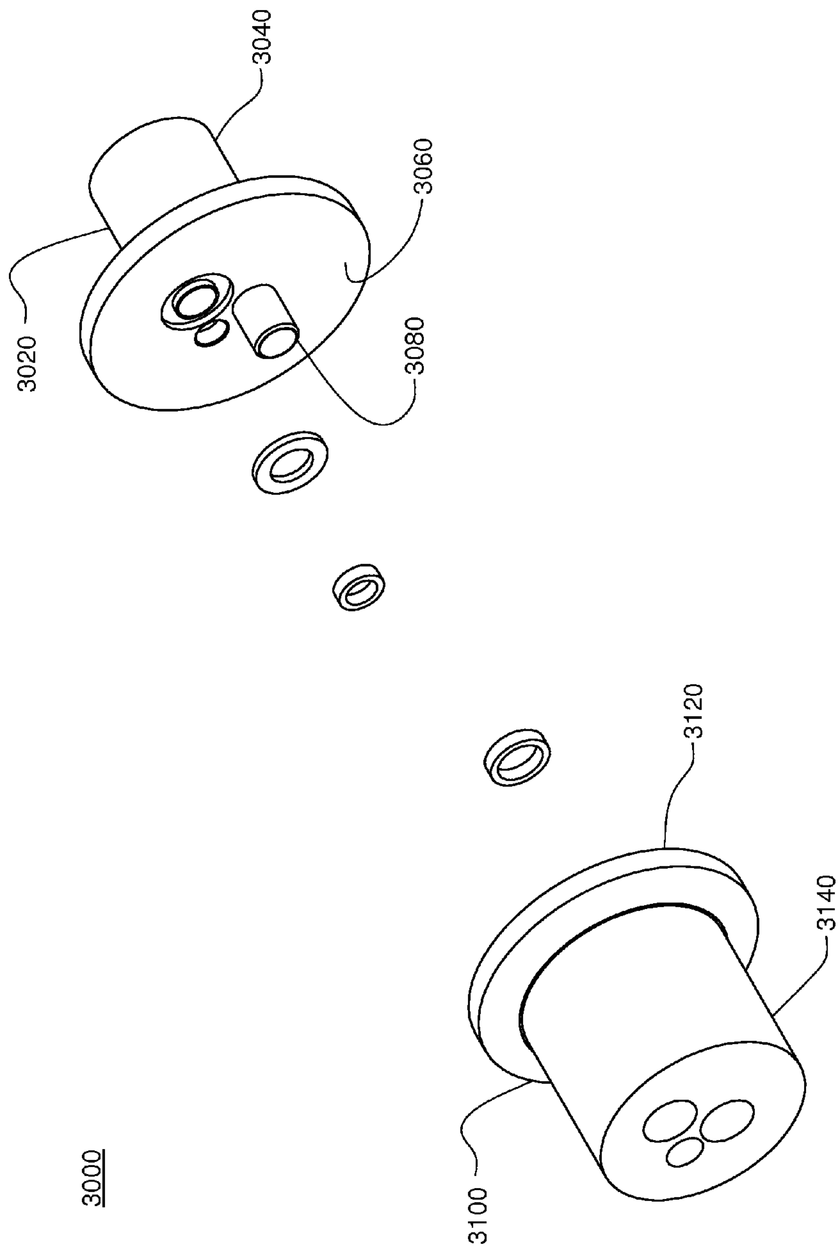
FIG. 33 is an exploded view of the connectors for the fitting assembly that attaches to the tube-in-tube heat exchanger.
Figure 33A:
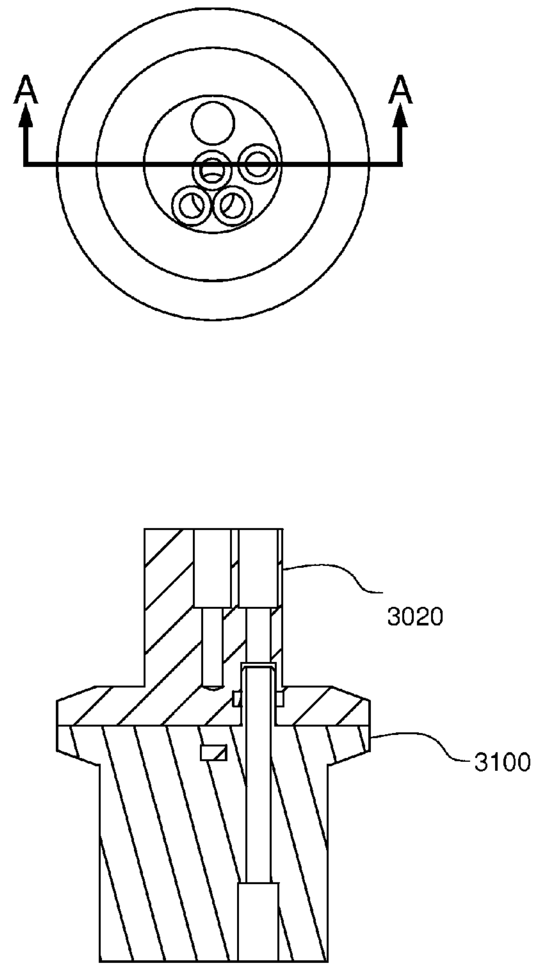
FIG. 33A is a cross-section view of fitting assembly for the tube-in-tube heat exchanger.
Figure 33B:
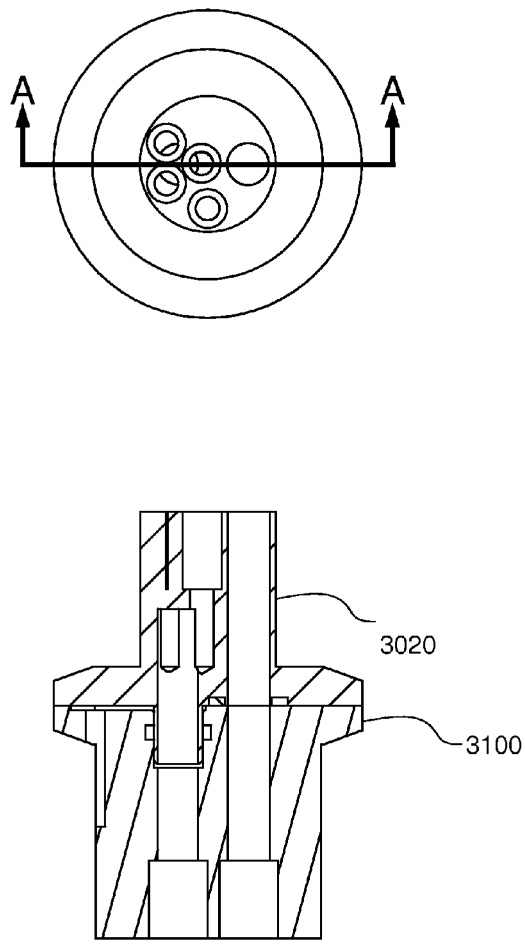
FIG. 33B is a cross-section view of fitting assembly for the tube-in-tube heat exchanger.

Referring now to FIG. 33, the exemplary embodiment of the counter flow tube-in-tube heat exchanger 2000 may include a fitting assembly 3000. The fitting assembly supports installation of the heat exchanger 2000 within the water vapor distillation apparatus 100. In addition, the fitting assembly 3000 allows the heat exchanger 2000 to be easily disconnected from the apparatus for maintenance. The assembly may consist of a first connector 3020 (Also identified as connector 2060 of FIG. 102) and a second connector 3100 shown on FIG. 33. See also, FIGS. 33A-B for cross-section views of the fitting assembly 3000.

Still referring to FIG. 33, in the exemplary embodiment of the fitting assembly 3000 is manufactured from brass. Other materials may be used to manufacture the fitting assembly 3000 including, but are not limited to stainless steel, plastic, copper, copper nickel or titanium. For installation purposes, having the fitting assembly manufactured from similar material as the tubing that attaches to the assembly is preferred. Similar materials allow for the assembly to be installed within the water vapor distillation apparatus using a soldering or welding technique. The fitting assembly 3000 is preferably manufactured from materials that are corrosion resistant and heat resistant (250° F.). In addition, the materials preferably allows for a fluid tight connection when the assembly is installed. For applications where the source and blowdown water may be highly concentrated, such as sea water, the fitting assembly 3000 may be manufactured from but not limited to copper-nickel or titanium.

Still referring to FIG. 33, the first connector 3020 includes a first end 3040 and a second end 3060. The first end 3040 attaches to the heat exchanger 2000 as shown in FIGS. 32-32A. The connector may be attached to the heat exchanger 2000 by clamping the outer tube 2020 using a hose clamp against the outer surface of the first end 3040 of the connector 3020. The inner tubes 2040 of the heat exchanger 2000 may also connect to the connector 3020 at the first end 3040. These tubes may be soldered to the heat exchanger side of the connector 3020. Other methods of attachment may include, but are not limited to welding, press fitting, mechanical clamping or insert molding. See also FIGS. 3A-3B for cross-section views of fitting assembly 3000.

Figure 33C:
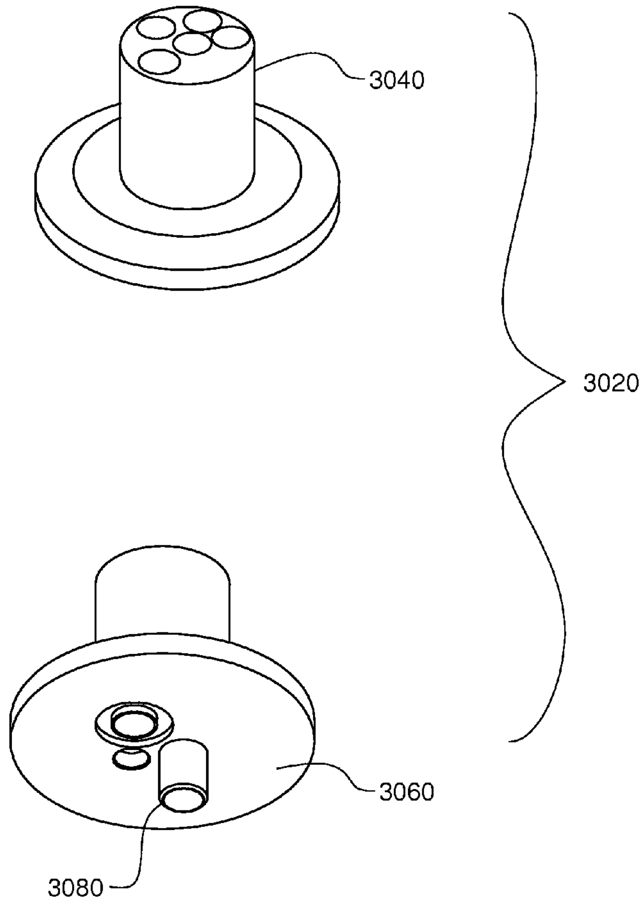
FIG. 33C is an isometric view of the exemplary embodiment for the first connector.
Figure 33D:
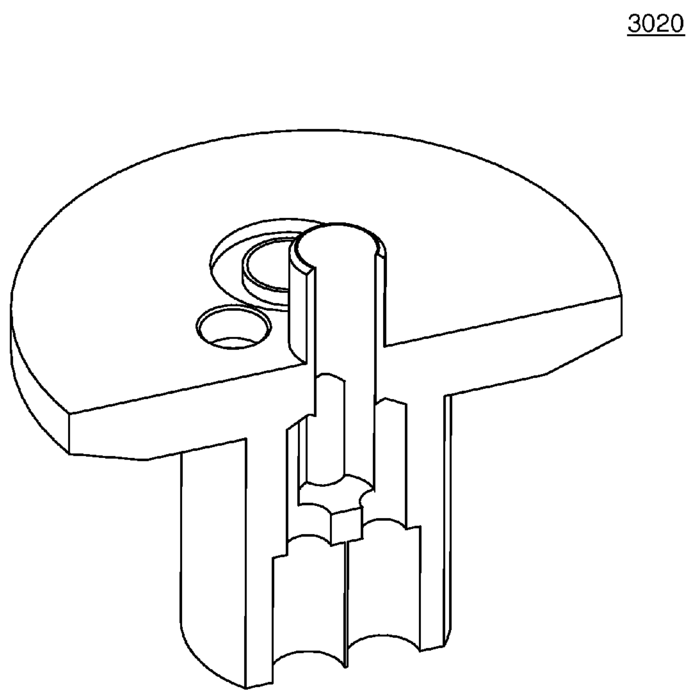
FIG. 33D is a cross-section view of the exemplary embodiment for the first connector.

Now referring to FIG. 33C, in this embodiment the first end 3040 of the connector 3020 may have five ports. Three ports may be in fluid connection with one another as shown on FIGS. 33D-E. This configuration may combine multiple streams of product water into one stream. Multiple streams of product water increases the amount of heat transfer from the product water to the source water, because there is more product water within the heat exchanger to provide thermal energy to the source water. The remaining ports are separate and provide fluid pathways for blowdown and source water illustrated in FIGS. 33E-F. Alternate embodiments may not have any ports in fluid connection with one another.

Figure 33G:
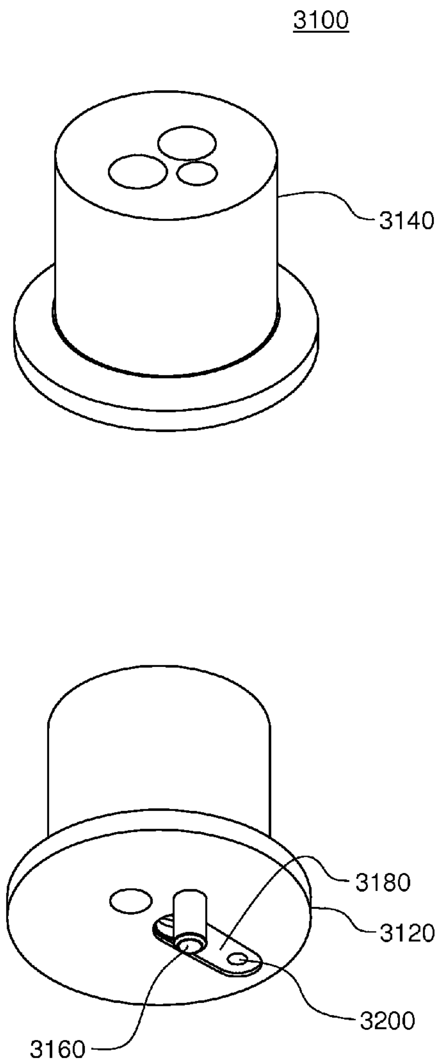
FIG. 33G is an isometric view of the exemplary embodiment for the second connector.
Figure 33H:
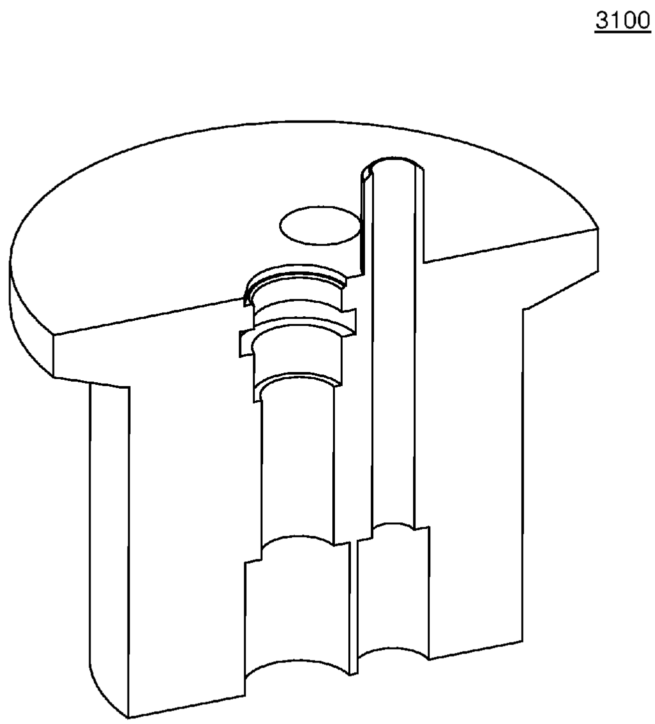
FIG. 33H is a cross-section view of fitting assembly for the tube-in-tube heat exchanger.
Figure 33I:
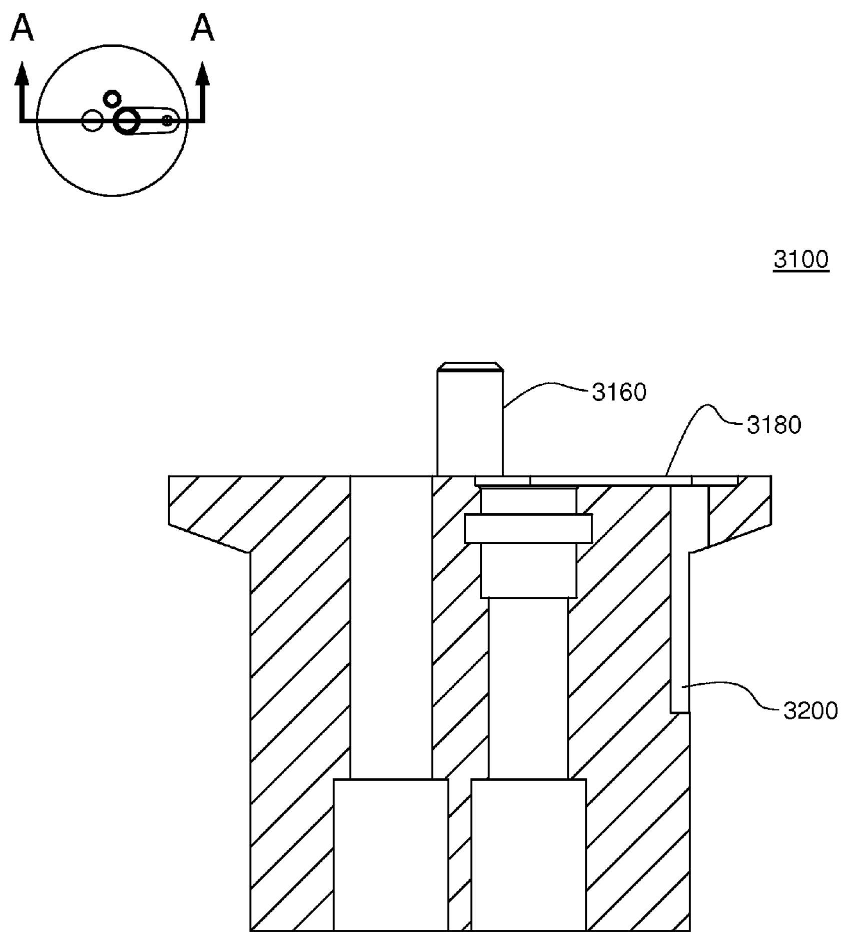
FIG. 33I is a cross-section view of the exemplary embodiment for the second connector.

Now referring to FIGS. 33G-H, the second connector 3100 includes a first end 3120 and a second end 3140. The first end 3120 mates with the first connector 3020 as shown on FIG. 33. This end may also include an extension 3160 as shown in FIG. 33G. The extension 3160 allows for the o-ring groove to be located within the body of the first connector 3020 rather than within the surface of end 3060 of the first connector 3020. In addition, this connector may have a leak path 318 on the first end 3120. This path is located around the port for the product water to prevent source or blowdown water from entering the product stream. Blowdown and source water may contain contaminants that affect the quality and safety of the product water. The leak path allows the blowdown and source water to leave the fitting rather than entering the product stream through a drain 3200 illustrated on FIGS. 33G-I. In addition to the drain 3200, the exemplary embodiment may include three independent fluid paths within the connector 3100 illustrated on FIGS. 33I-J.

7.4 Evaporator Condenser

Figure 34:
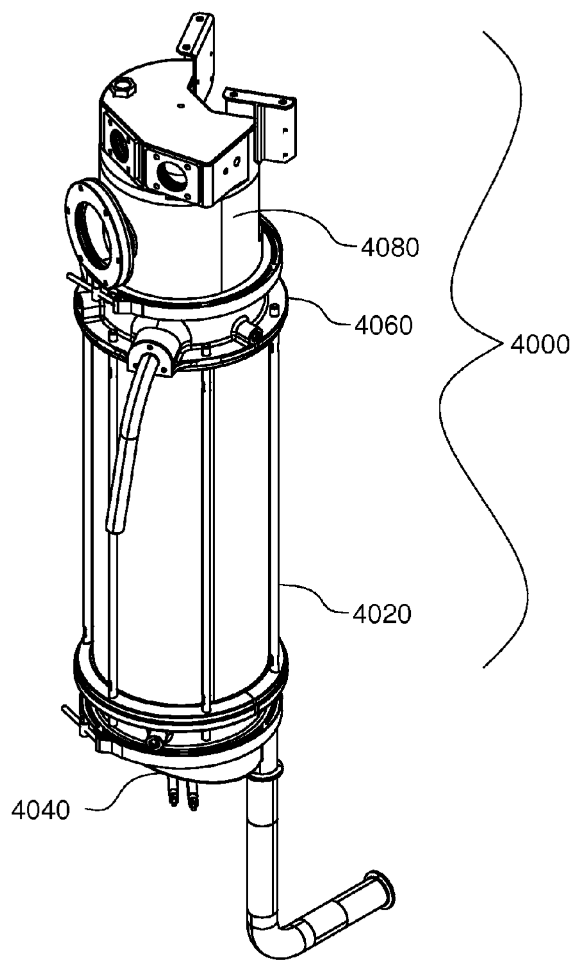
FIG. 34 is an isometric view of the exemplary embodiment of the evaporator/condenser assembly.
Figure 34A:
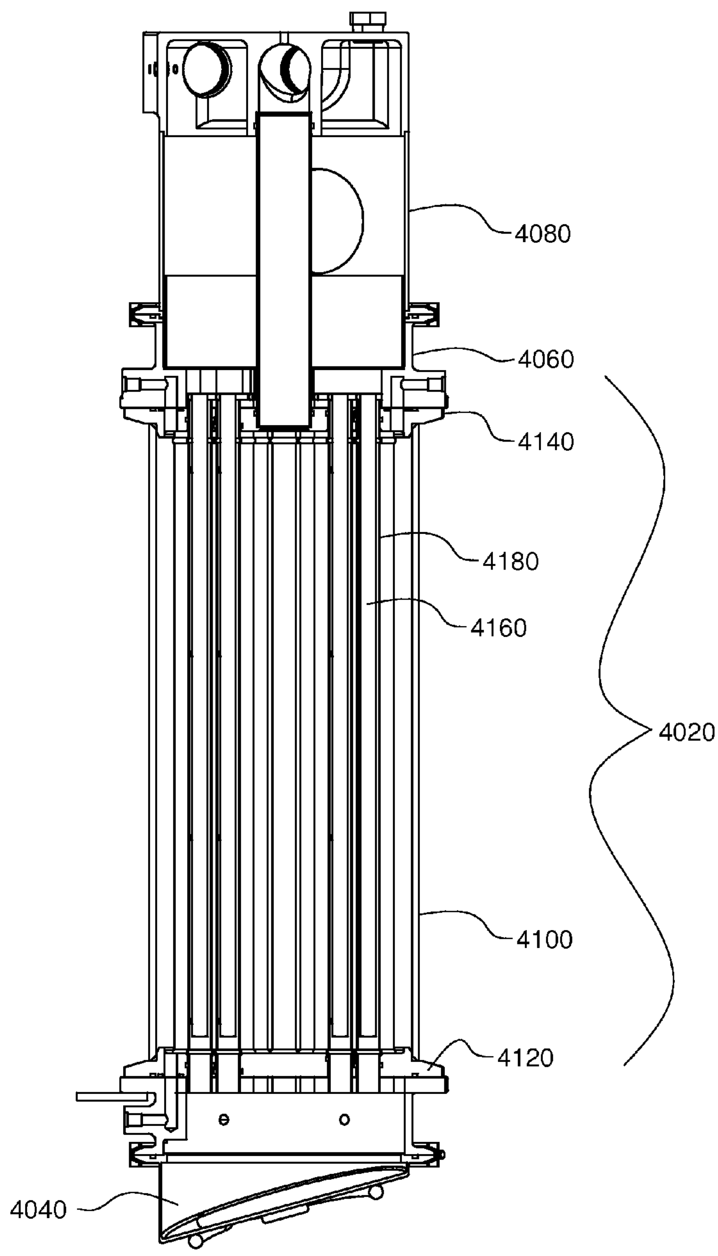
FIG. 34A is a cross-section view of the exemplary embodiment of the evaporator/condenser assembly.
Figure 34B:
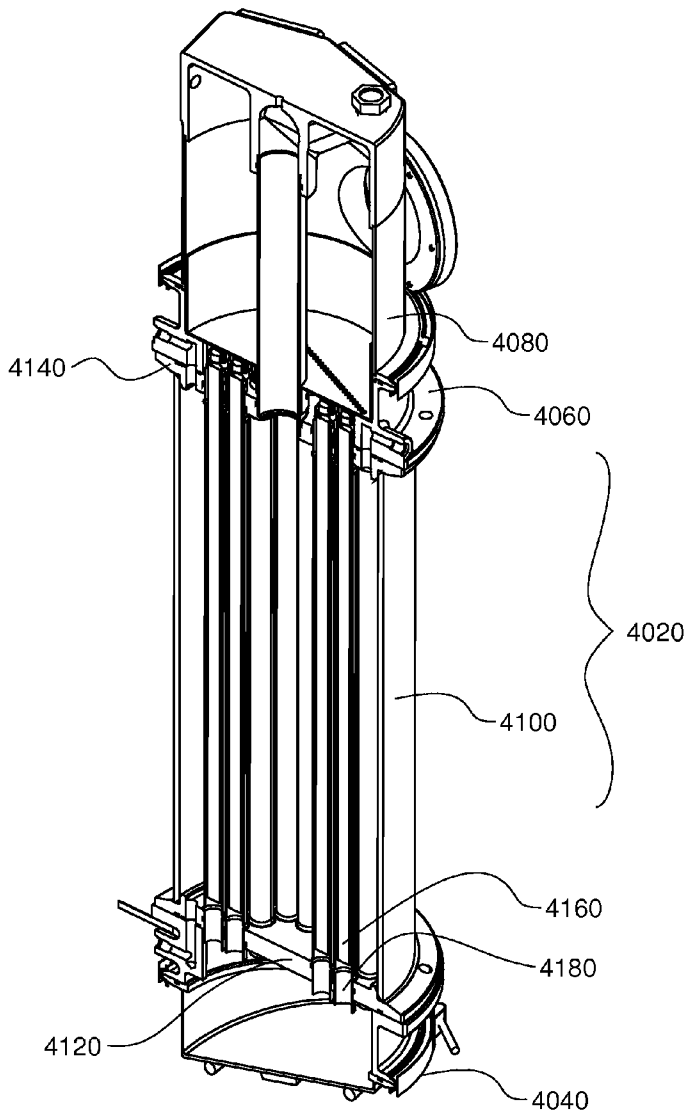
FIG. 34B is an isometric cross-section view of the exemplary embodiment of the evaporator/condenser.

Now referring to FIGS. 34-34B, the exemplary embodiment of the evaporator condenser (also herein referred to as an "evaporator/condenser") assembly 4000 may consist of an evaporator/condenser chamber 4020 having a top and bottom. The chamber 4020 may include a shell 4100, an upper tube sheet 4140 and a lower tube sheet 4120. Attached to the lower tube sheet 4120 is a sump assembly 4040 for holding incoming source water. Similarly, attached, to the upper tube sheet 4140 is an upper flange 4060. This flange connects the steam chest 4080 to the evaporator/condenser chamber 4020. Within the evaporator/condenser chamber 4020 are a plurality of rods 4160 where each rod is surrounded by a tube 4180 as illustrated in FIGS. 34A and 34B. The tubes 4180 are in fluid connection with the sump 4040 and upper flange 4060. See also FIG. 34C illustrating another embodiment of the evaporator/condenser assembly 4200.

Figure 35:
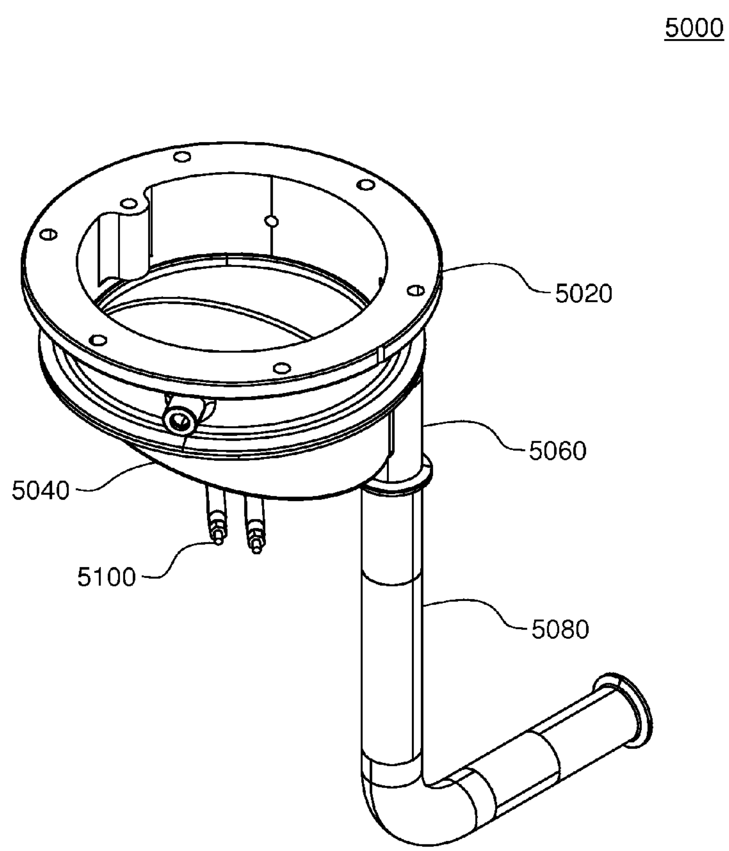
FIG. 35 is an assembly view of the exemplary embodiment of the sump.
Figure 35A:
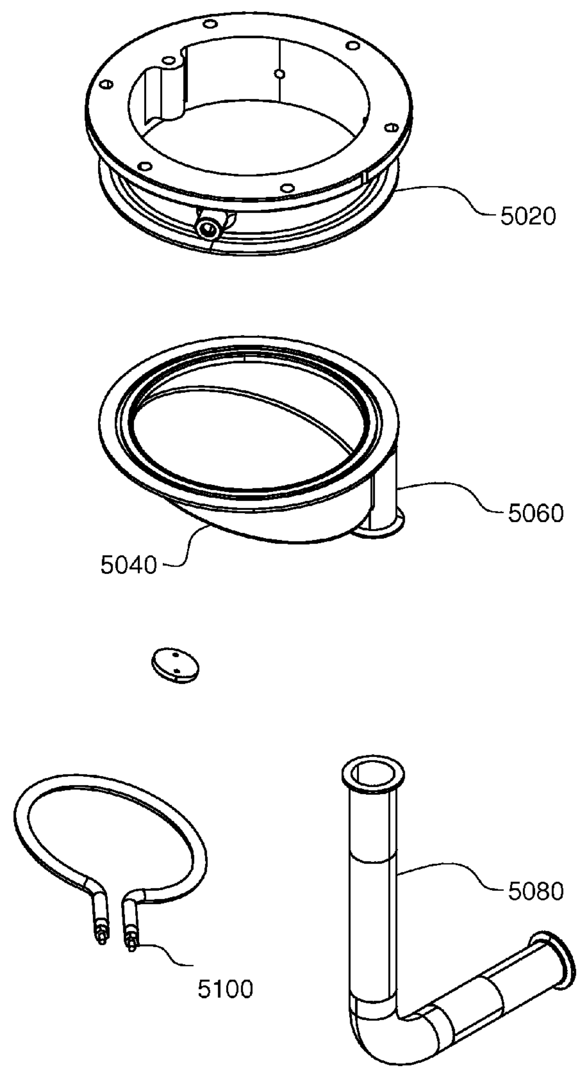
FIG. 35A is an exploded view of the exemplary embodiment of the sump.

Still referring to FIGS. 35-35A, the source water may be heated using a heating element 5100 of the sump assembly 5000. The heat element 5100 increases the temperature of the source water during initial start up of the water vapor distillation apparatus 100. This element provides additional thermal energy causing the source water to change from a fluid to a vapor. In the exemplary embodiment, the heat element 5100 may be a 120 Volt/1200 Watt resistive element electric heater.

Still referring to FIGS. 35-35A, the sump assembly 5000 may include a bottom housing 5040 having an angled lower surface in order to assist with the collection of particulate. The bottom housing 5040 may have any angle sufficient to collect the particulate in one area of the housing. In the exemplary embodiment the bottom housing 5040 has a 17 degree angled-lower surface. In other embodiments, the bottom housing 5040 may have a flat bottom.

Still referring to FIGS. 35-35A, the exemplary embodiment may include a drain assembly consisting of a drain fitting 5060 and a drain pipe 5080. The drain assembly provides access to inside of the evaporator area of the evaporator/condenser to remove particulate buildup without having to disassemble the apparatus. The drain assembly may be located near the bottom of the sump to reduce scaling (buildup of particulates) on the tubes inside the evaporator/condenser. Scaling is prevented by allowing periodic removal of the scale in the sump assembly 5000. Having less particulate in the sump assembly 5000 reduces the likelihood that particulate will flow into the tubes of the evaporator/condenser. In the exemplary embodiment the drain assembly is positioned to receive particulate from the angled-lower surface of the bottom housing 5040. The drain assembly may be made of any material that may be attached to the bottom housing 5040 and is corrosion and heat resistant. In the exemplary embodiment, the drain fitting 5060 is a flanged sanitary fitting manufactured from stainless steel.

Still referring to FIGS. 35-35A, attached to the drain fitting 5060 may be a drain pipe 5080. The drain pipe 5080 provides a fluid path way for particulate to travel from the drain fitting 5060 out of the evaporator/condenser assembly 4000. The drain pipe 5080 may be manufactured from any material, with preference that the material is corrosion and heat resistant and is capable of being attached to the drain fitting 5060. In the exemplary embodiment, the drain pipe 5080 is manufactured from stainless steel. The diameter of the drain pipe 5080 is preferably sufficient to allow for removal of particulate from the sump assembly 5000. A larger diameter pipe is desirable because there is a less likelihood of the drain pipe 5080 becoming clogged with particulate while draining the sump assembly 5000.

Figure 36:
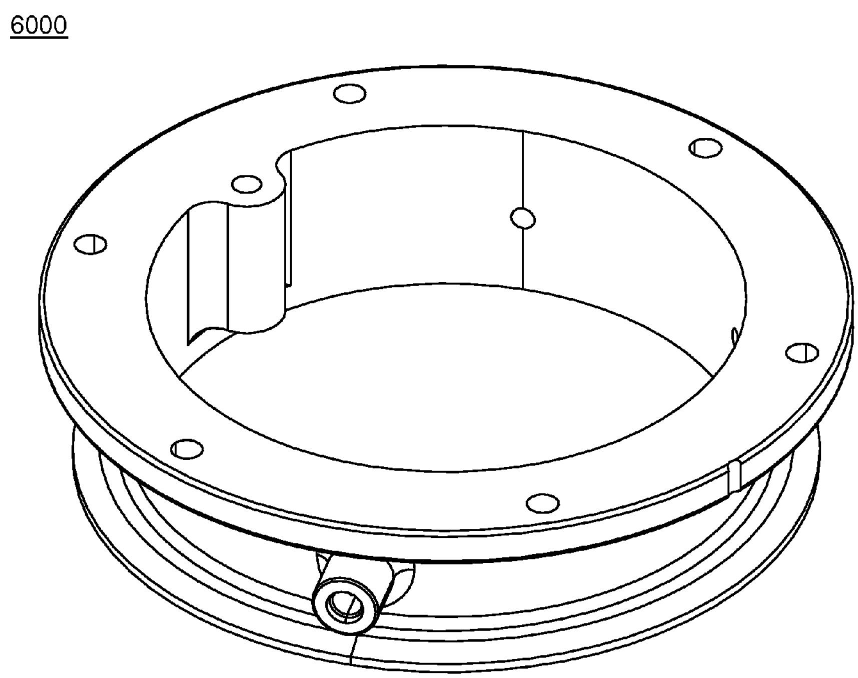
FIG. 36 is an isometric detail view of the flange for the sump assembly.
Figure 37:
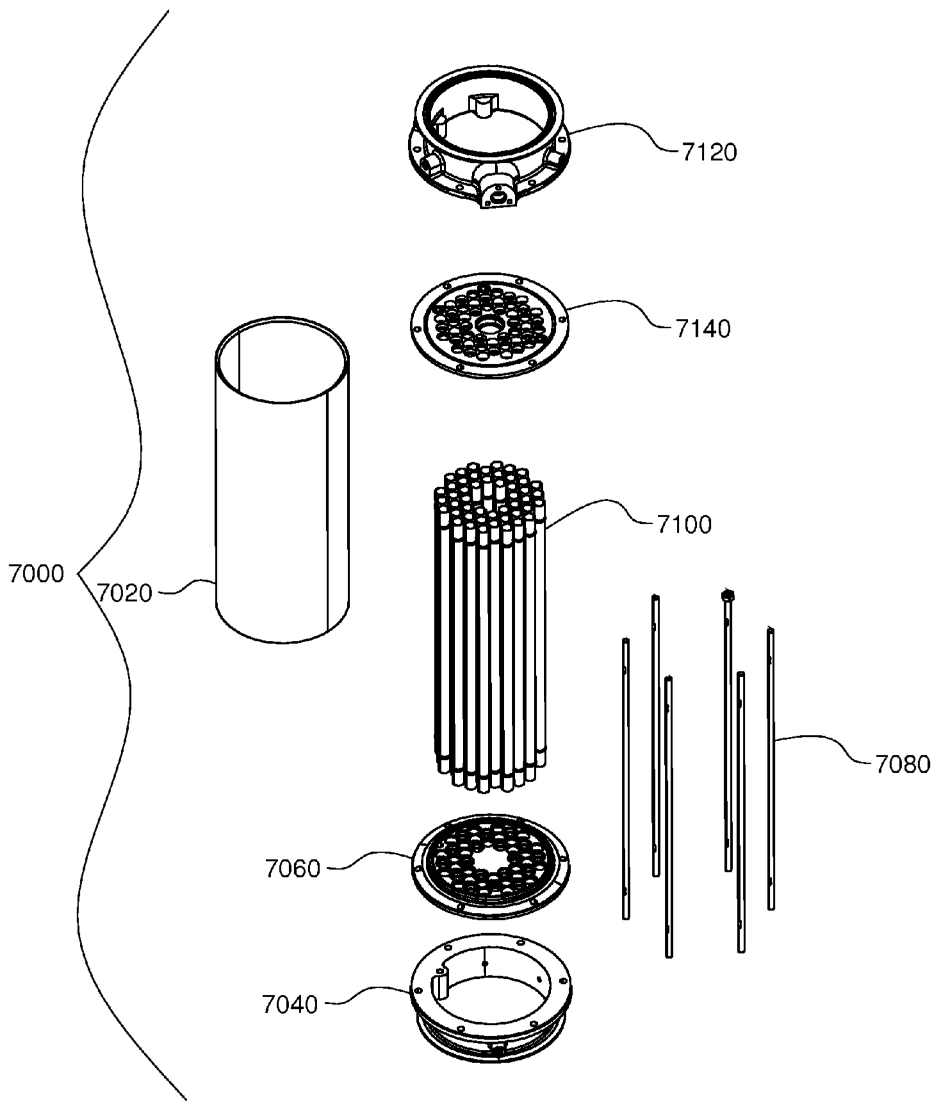
FIG. 37 is an exploded view of the exemplary embodiment of the evaporator/condenser.
Figure 37A:
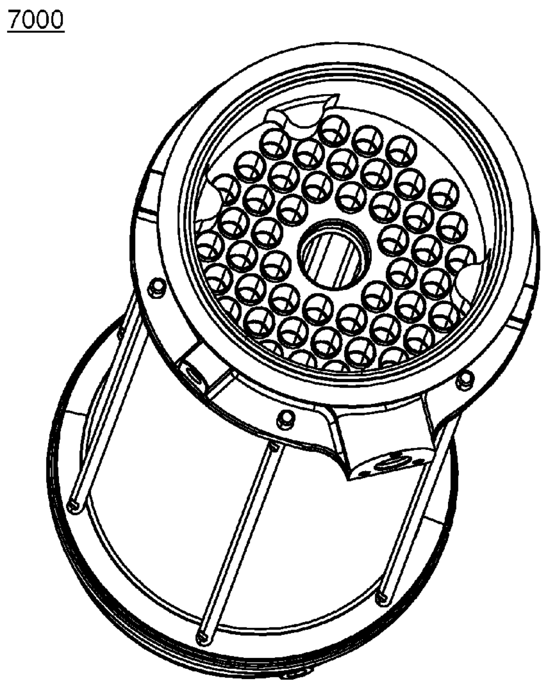
FIG. 37A is an top view of the exemplary embodiment of the evaporator/condenser assembly.

Now referring to FIG. 37, the exemplary embodiment of the evaporator/condenser chamber 7000 (also identified as 4020 of FIG. 34) may include a shell 7020 (also identified as 4100 of FIGS. 4A-B, a lower flange 7040 (also identified as 5020 of FIGS. 35 and 600 of FIG. 36), a lower-tube sheet 7060 (also identified as 4120 of FIGS. 34A-B), a plurality of tie rods 7080, a plurality of tubes 7100 (also identified as 4180 of FIGS. 34A-B), an upper flange 7120 (also identified as 4060 of FIG. 34) and an upper-tube sheet 7140 (also identified as 4140 of FIGS. 34A-B). See also FIG. 37A for an assembly view evaporator/condenser chamber 7000.

Still referring to FIG. 37, the shell 7020 defines an internal cavity where thermal energy is transferred from the high-pressure steam to the source water. This heat transfer supports the phase change of the source water from a fluid to a vapor. In addition, the heat transfer also causes the incoming steam to condense into product water. The shell 7020 may be manufactured from any material that has sufficient corrosion resistant and strength characteristics. In the exemplary embodiment, the shell 7020 is manufactured from fiberglass. It is preferable that the shell has an inner diameter sufficient to contain the desired number of tubes 7100. Within the internal cavity of the shell is a plurality of tubes 7100 having surface area for transferring thermal energy from the high-pressure steam entering the chamber to source water within the tubes 7100.

Still referring to FIG. 37, the evaporator/condenser chamber 7000 defines an inner cavity for the condensation of high-pressure steam. Within this cavity is a plurality of tubes 7100 that transfer thermal energy from high-pressure steam to source water within the tubes as the steam condensing upon outer surfaces of the tubes. The heat transfer through the tube walls causes the source water to undergo a phase change through a process called thin film evaporation as described in U.S. Patent Application Pub. No. US 2005/0183832 A1 published on Aug. 25, 2005 entitled "Method and Apparatus for Phase Change Enhancement," the contents of which are hereby incorporated by reference herein.

Still referring to FIG. 37, in the tubes 7100 of the evaporator/condenser, a Taylor bubble may be developed which has an outer surface including a thin film in contact with an inner surface of the tubes 7100. The Taylor bubble is heated as it rises within the tube so that fluid in the thin film transitions into vapor within the bubble.

Figure 37B:
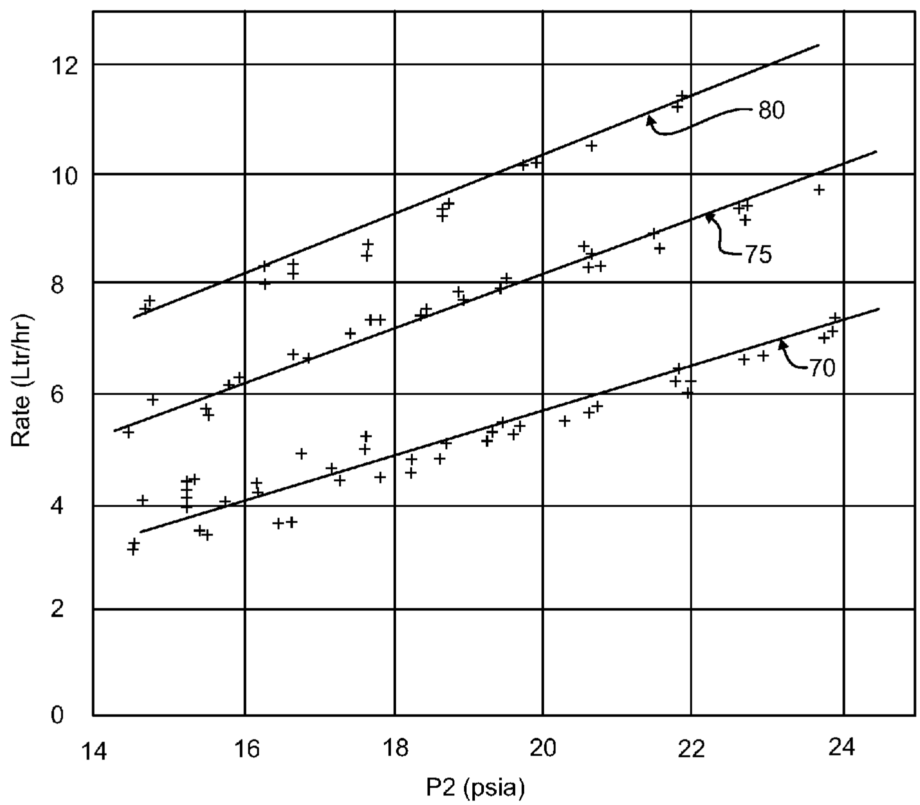
FIG. 37B shows the rate of distillate output for an evaporator as a function of pressure for several liquid boiling modes.

Now referring to FIG. 37B, typically an evaporator may operate in either of two modes: pool boiling mode or thin film mode. In thin film boiling, a thin film of fluid is created on the inner wall of the tubes facilitating heat transfer from the tube wall to the free surface of the fluid. The efficiency of phase change typically increases for thin film mode as compared to pool boiling mode. FIG. 37B shows the difference in the rate of distillate production as a function of condenser pressure for pool boiling and thin film boiling under similar conditions for a representative evaporator. The bottom curve 70 corresponds to pool boiling while the middle curve 75 corresponds to thin film boiling. As will be noted from these two curves, thin film boiling mode offers significantly higher efficiency than pool boiling mode. Thin film boiling is more difficult to maintain than pool boiling, however. Thin film evaporation is typically achieved using apparatus that includes very small openings. This apparatus may easily clog, particularly when the source fluid contains contaminants. Additionally, in thin film mode the water level is typically held just marginally above the tops of the tubes in a vertical tube-type evaporator. For reasons such as this, the apparatus may also be sensitive to movement and positioning of the apparatus.

Figure 38:
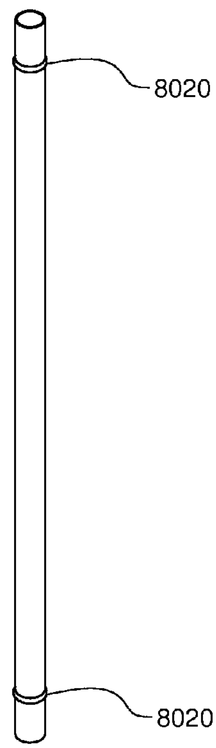
FIG. 38 is an isometric view of the exemplary embodiment of the tube for the evaporator/condenser.

Referring now to FIG. 38, in the exemplary embodiment the tubes 8000 (also identified as 7100 of FIG. 37A-B) have a bead 8020 near each end. The bead 8020 prevents the tubes 8000 from sliding through the apertures in the lower tube sheet 7060 and the upper tube sheet 7140.

Referring now to FIG. 9, improved efficiency of a phase change operation may be achieved by providing packing within the evaporator/condenser tubes 9040. The introduction of such packing may allow the evaporator to take on some of the characteristics of thin film mode, due to the interaction between the fluid, the packing and the tube 9040. The packing may be any material shaped such that the material preferentially fills the volume of a tube 9040 near the tube's longitudinal axis versus the volume near the tube's interior wall. Such packing material serves to concentrate the vapor near the walls of the tube for efficient heat exchange. In the exemplary embodiment the packing may comprise a rod 9020. Each rod 9020 may be of any cross-sectional shape including a cylindrical or rectangular shape. The cross-sectional area of each packing rod 9020 may be any area that will fit within the cross-section of the tube. The cross-sectional area of each rod 9020 may vary along the rod's length. A given rod 9020 may extend the length of a given evaporator tube 9040 or any subset thereof. It is preferable that the rod material be hydrophobic and capable of repeated thermal cycling. In the exemplary embodiment the rods 9020 are manufactured from glass fiber filled RYTON® or glass fiber filled polypropylene.

Figure 39:
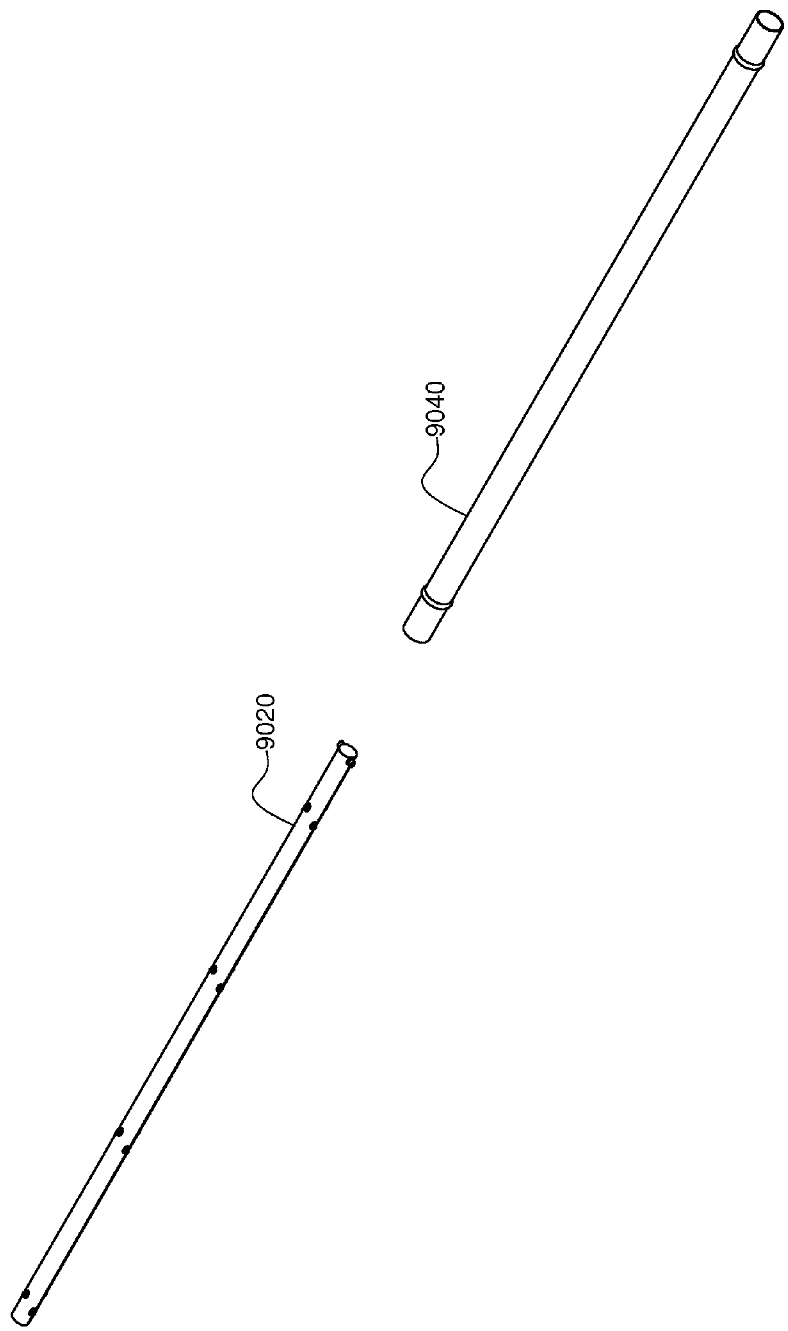
FIG. 39 is an exploded view of the tube and rod configuration for the evaporator/condenser.
Figure 39A:
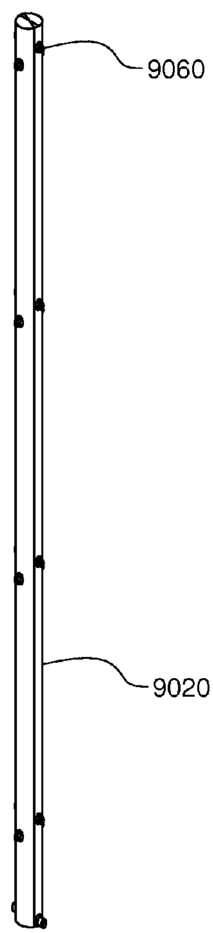
FIG. 39A is an isometric view of the exemplary embodiment of the rod for the evaporator/condenser.

Referring now to FIG. 39A, in the exemplary embodiment, the rods 9020 may have a plurality of members 9060 extending out from the center and along the longitudinal axis of the rod 9020. These members 9060 maintain the rod 9020 within the center of the tube 9040 to produce the most efficient flow path for the source water. Any number of members may be used, however, it is preferential that there is a sufficient number to maintain the rod 9020 in the center of the tube 9040.

Referring back to FIG. 37, the tubes 7100 (Also identified as 8000 of FIGS. 38 and 9040 of FIG. 39) are secured in place by the pair of tube sheets 7060 and 7140. These sheets are secured to each end of the shell 7020 using the tie rods 7080. The tube sheets 7060 and 7140 have a plurality of apertures that provide a pathway for the source water to enter and exit the tubes 7100. When the tubes 7100 are installed within the chamber 7000, the apertures within the tube sheets 7060 and 7140 receive the ends of the tubes 7100. The lower tube sheet 7060 (also identified as 10020 on FIG. 40) is attached to the bottom of the shell 7020. See FIG. 40 for a detail view of the lower tube sheet. The upper tube sheet 7140 (also identified as 10040 on FIG. 40A) is attached to the top of the shell 7020.

Figure 40A:
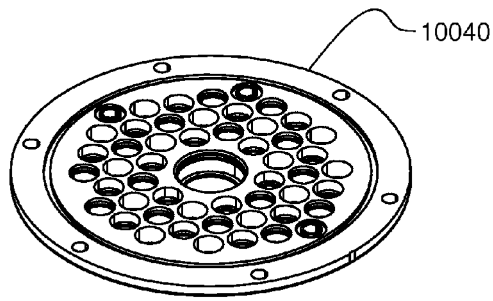
FIG. 40A is an isometric view of the exemplary embodiment of the upper tube sheet.

See FIG. 40A for a detail view of the upper tube sheet. Both tube sheets have similar dimensions except that the upper tube sheet 7140 has an additional aperture located in the center of the sheet. This aperture provides an opening for the high-pressure steam to enter the evaporator/condenser chamber 7000.

Still referring to FIG. 37, in the exemplary embodiments the upper-tube sheet 7140 and the lower-tube sheet 7060 may be manufactured from RADEL®. This material has low creep, hydrolytic stability, thermal stability and low thermal conductivity. Furthermore, tube sheets manufactured from RADEL® may be formed by machining or injection molding. In alternate embodiments, the tube sheets may be manufactured from other materials including but are not limited to G10.

Figure 40:
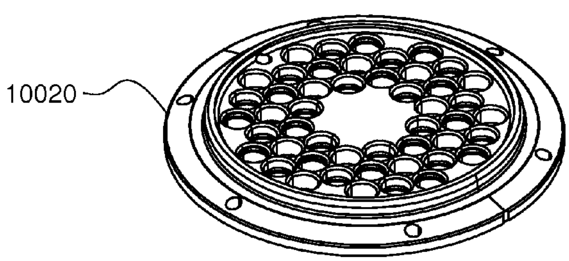
FIG. 40 is an isometric view of the exemplary embodiment of the sump tube sheet.

Now referring to FIG. 40, in the exemplary embodiment the o-ring grooves are located at various depths in the tube sheets 10020 and 10040. The different depths of the o-ring grooves allows the tubes 7100 to be positioned more closely together, because the o-ring grooves from adjacent tubes do not overlap one another. Overlapping o-ring grooves do not provide a sufficient seal, thus each o-ring groove must be independent of the other o-ring grooves within the tube sheet. As a result of varying the location of the o-ring grooves at different depths within the tube sheet, adjacent o-ring grooves do not overlap one another allowing the tubes to be positioned closer together. Thus having the tubes 7100 located closer to one another allows more tubes to be positioned within the evaporator/condenser chamber 7000.

Figure 41:
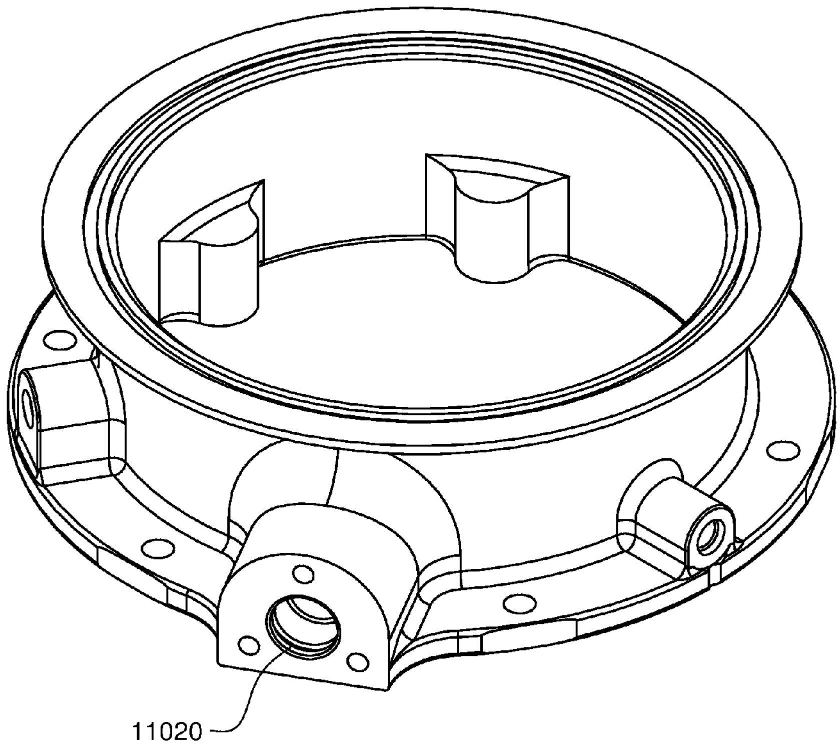
FIG. 41 is a detail view of the top cap for the evaporator/condenser.
Figure 42A:
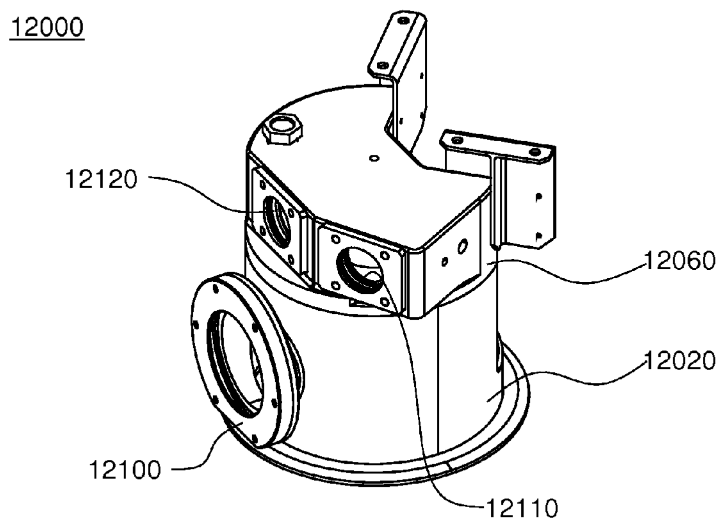
FIG. 42A is an isometric view of the exemplary embodiment of the steam chest.
Figure 42:
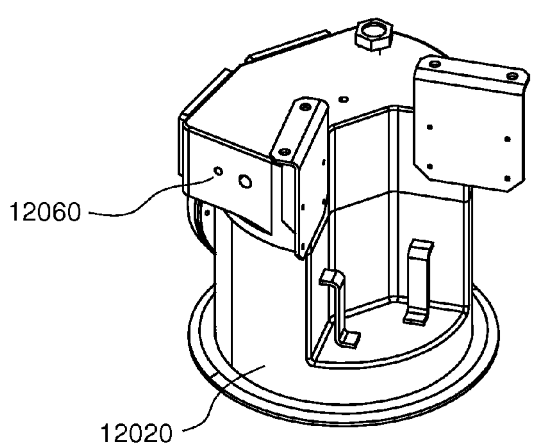
FIG. 42 is an isometric view of the exemplary embodiment of the steam chest.
Figure 42B:
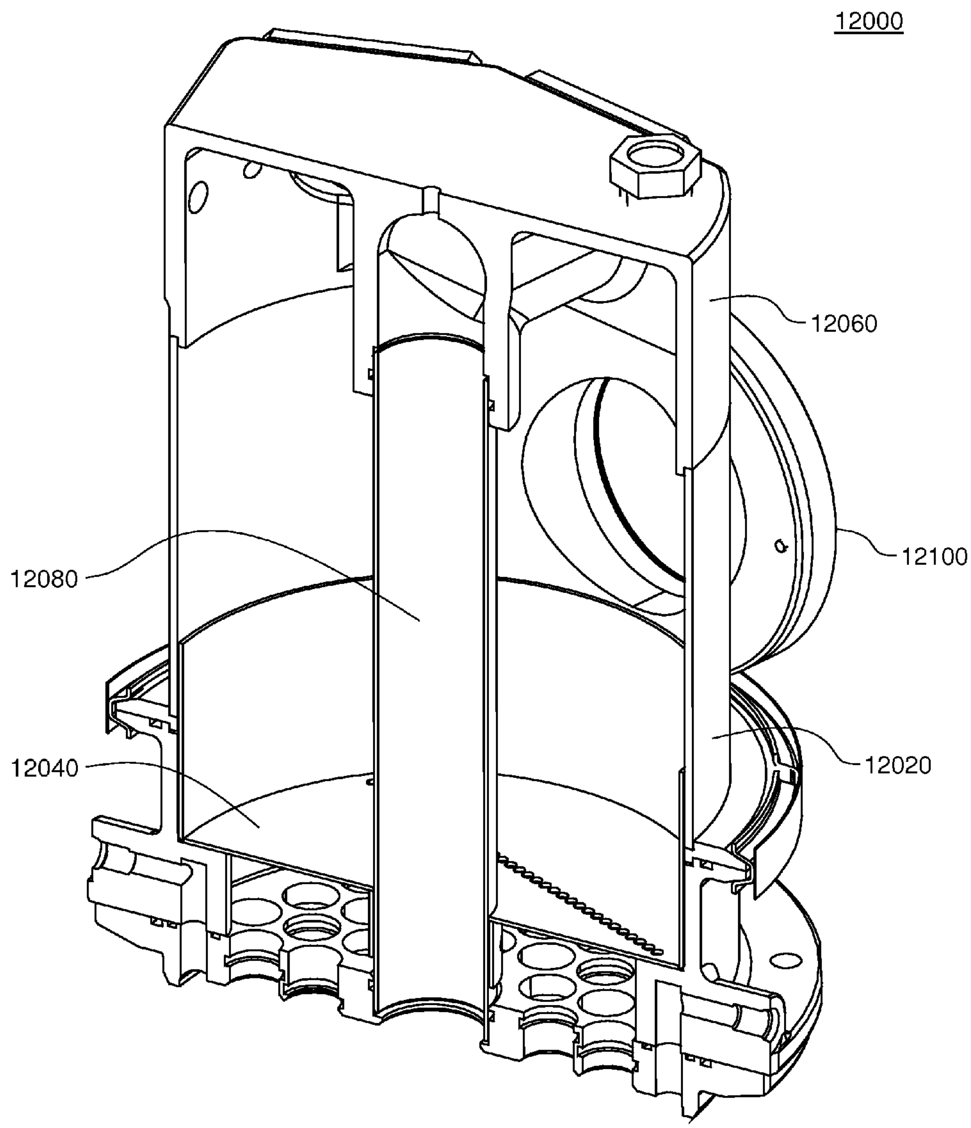
FIG. 42B is a cross-section view of the exemplary embodiment of the steam chest.
Figure 42C:
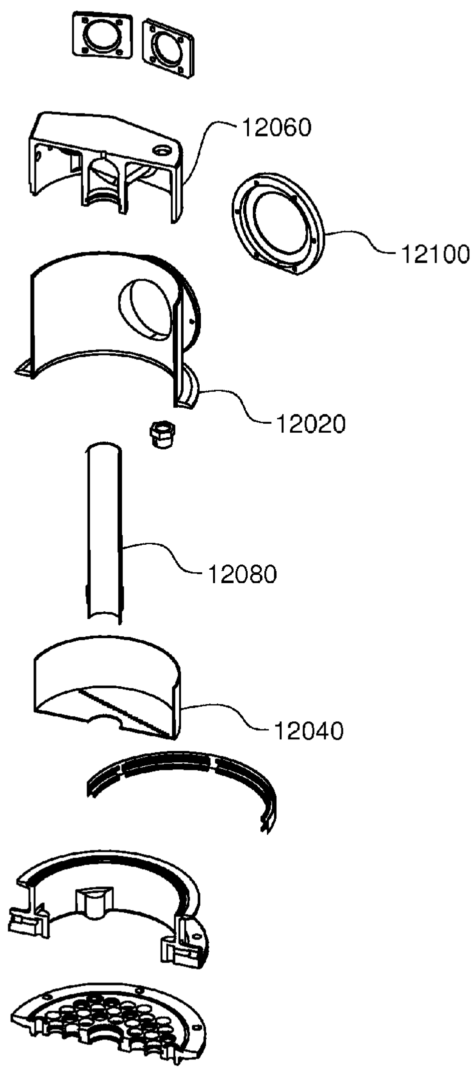
FIG. 42C is an exploded view of the exemplary embodiment of the steam chest.
Figure 42F:
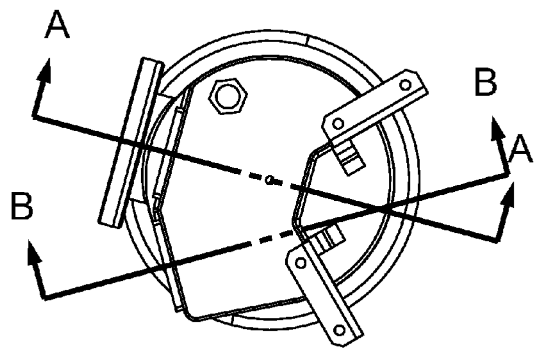
Figure 42D:
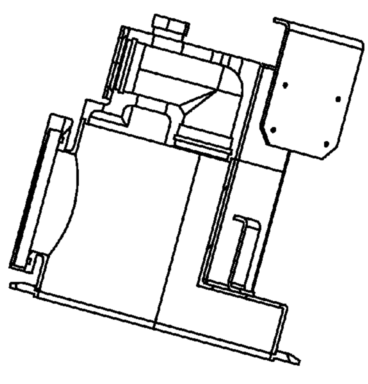
Figure 42E:
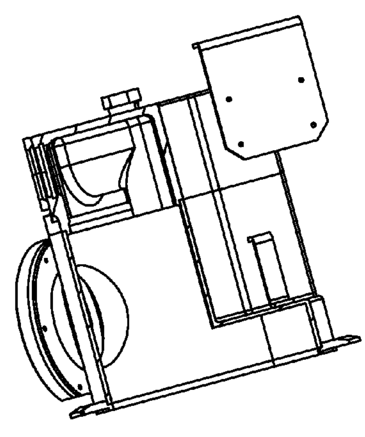

Referring now to FIGS. 42-42C, connected to the upper flange 11000 (also identified as 7120 of FIG. 37) may be a steam chest 12000 (also identified as 4080 in FIG. 34). In the exemplary embodiment, the steam chest 1200 may include a base 1202, a steam separator assembly 12040, a cap 12060 and a steam tube 12080. The base 12020 defines an internal cavity for receiving the low-pressure steam created within the tubes 7100 of the evaporator area of the evaporator/condenser chamber 7000. The base 12020 may have any height such that there is sufficient space to allow water droplets contained within the vapor to be separated. The height of the steam chest allows the water droplets carried by the steam and forcibly ejected from outlets of the tubes 7100 from the rapid release of steam bubbles to decelerate and fall back towards the upper flange 7120 (also identified as 11000 on FIG. 41).

Still referring to FIGS. 42-42C, within the base 12020 may be a steam separator assembly 12040. This assembly consists of a basket and mesh (not shown in FIGS. 42-42C). The basket contains a quantity of wire mesh. In the exemplary embodiment, the steam separator assembly 12040 removes water droplets from the incoming low-pressure steam by manipulating the steam through a layer of wire mesh. As the steam passes through the mesh the water droplets start to collect on the surfaces of the mesh. These droplets may contain contaminants or particulate. As the droplets increase in size, the water falls onto the bottom of the basket. A plurality of apertures may be located in the bottom of the basket to allow water to collect within the upper flange 7120. In addition, these apertures provide a fluid path way for low-pressure steam to enter the steam separator assembly 12040. In addition, the wire mesh provides a barrier from the splashing blowdown water located within the upper flange 7120 of the evaporator/condenser.

In the exemplary embodiment, the steam separator assembly may be manufactured from stainless steel. Other materials may be used, however, with preference that those materials have corrosion and high temperature resistant properties. Other types of materials may include, but are not limited to RADEL®, titanium, copper-nickel, plated aluminum, fiber composites, and high temperature plastics.

Still referring to FIGS. 42-42C, attached to the base 12020 is the cap 12060. The cap and base define the internal cavity for separating the water from the low-pressure steam. In addition, the cap 12060 may have two ports, an outlet port 12110 and inlet port 12120 shown on FIGS. 42B, 42D, 42E and 42F. The outlet port provides a fluid path way for the dry low-pressure steam to exit the steam chest 12000. In the exemplary embodiment, the outlet port 12110 is located near the top surface of the cap 1206 because the locating the port away from the outlets of the tubes 7100 of the evaporator/condenser promotes dryer steam. In alternate embodiments, however, the outlet port 12110 may have a different location within the cap 12060. Similarly, the inlet port 12120 provides a fluid path way for high-pressure steam to enter the high-pressure steam tube 12080 within the steam chest 12000. In the exemplary embodiment, the inlet port 12120 is located near the top surface of the cap 12060. In alternate embodiments, the inlet port 12120 may have a different location within the cap 12060. In the exemplary embodiment, the cap 12060 is manufactured from plated aluminum. Other types of materials may include, but are not limited to stainless steel, plastics, titanium and copper-nickel. The size of these ports may affect the pressure drop across the compressor.

Still referring to FIGS. 42-42C, connected to the inlet port 12120 within the steam chest 12000 is a steam tube 12080. This tube provides a fluid path way for the high-pressure steam to pass through the steam chest and enter the condenser area of the evaporator/condenser chamber. The inner diameter of the steam tube 12080 may be any size, such that the tube does not adversely affect the flow of high-pressure steam from the regenerative blower to the evaporator/condenser chamber. In the exemplary embodiment the steam tube 12080 may be manufactured from stainless steel. Other materials may be used to manufacture the steam tube 12080, but these materials must have sufficient corrosion resistant and high temperature resistant properties. Such materials may include, but are not limited to plated aluminum, plastics, titanium and copper-nickel. For applications where the source water may be highly concentrated, such as sea water, the steam chest 12000 may be manufactured from but not limited to titanium, nickel, bronze, nickel-copper and copper-nickel.

Figure 43:
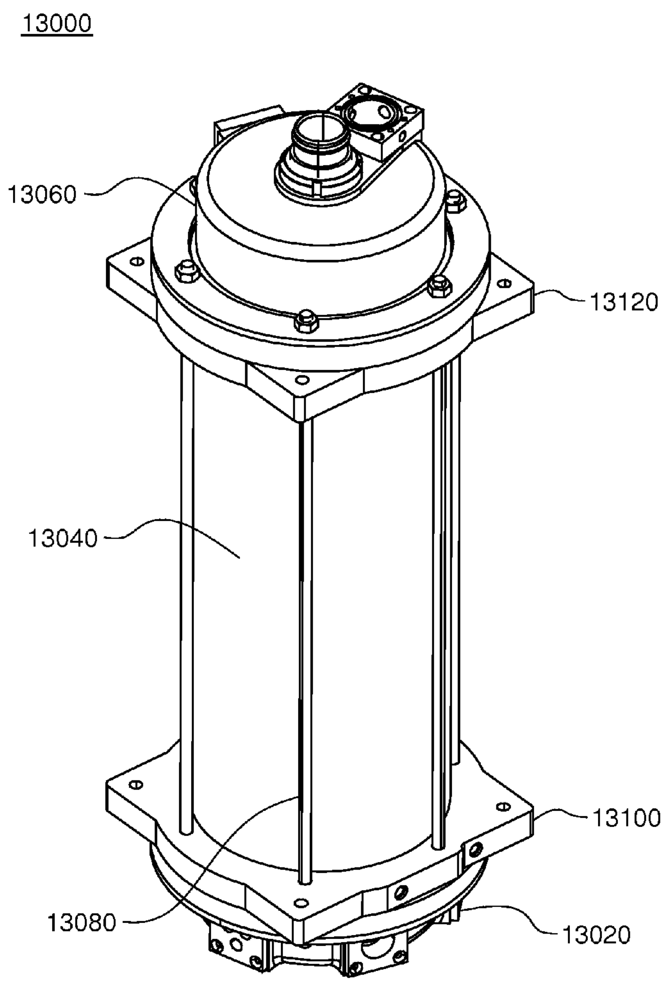
Figure 44:
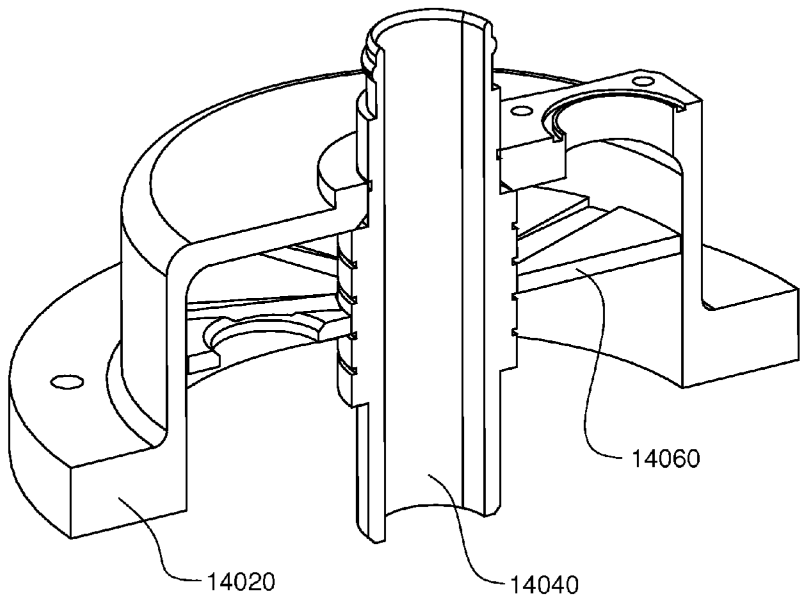
Figure 44A:
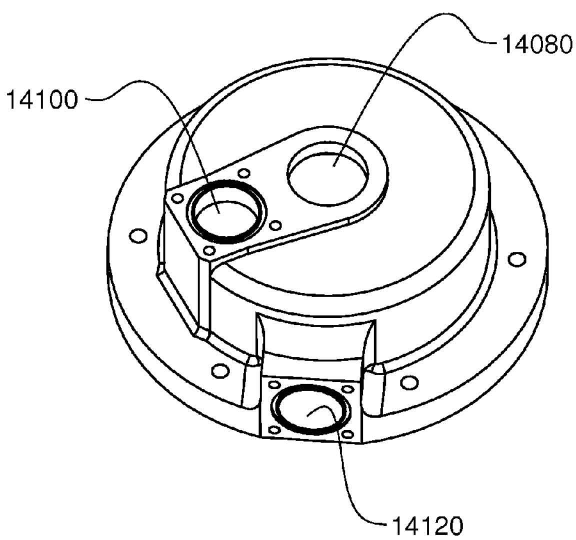
Figure 44B:
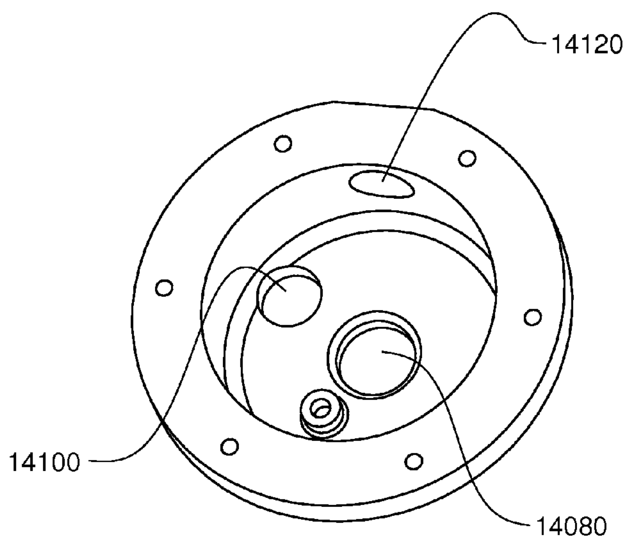
Figure 44C:
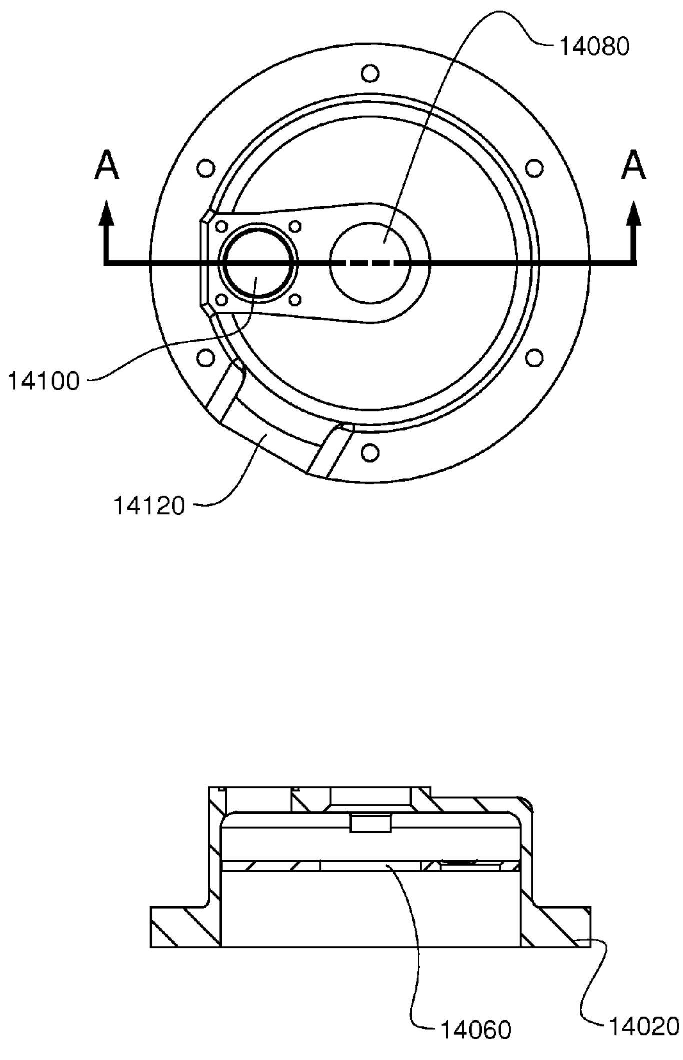
Figure 44D:
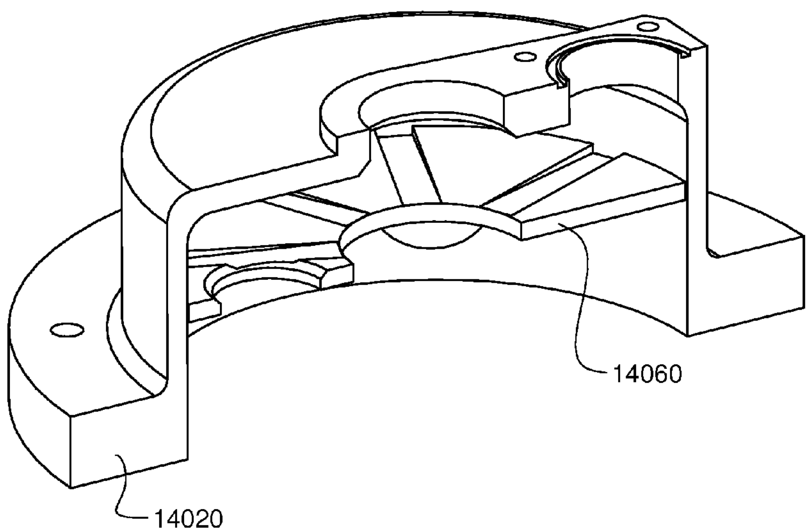

Referring now to FIGS. 44-44C, attached to the upper flange 13120 is the mist eliminator assembly 14000 (also identified as 13060 of FIG. 43). This assembly may consist of a cap 14020, steam pipe 14040, and mist separator 14060 illustrated on FIG. 44. The cap 14020 contains the low-pressure steam that is created from the evaporator side of the evaporator/condenser. The cap 14020 may have three ports 14080, 14100, and 14120 as shown FIGS. 44A-C. See discussion for the steam chest of the exemplary embodiment relating to the height of the volume for removing the water droplets. In addition, the cap 1402 defines a cavity that contains the mist separator 14060 shown on FIGS. 44, 44C and 44D.

Still referring to FIGS. 44-44C, the first port 14080 may be located in the center of the top surface of the cap 14020 and is for receiving the first end of the steam pipe 14040. This port allows the high-pressure steam created by the compressor to re-enter the evaporator/condenser through first end of the steam pipe 14040. The steam pipe 14040 provides a fluid path way for high-pressure steam to enter the evaporator/condenser through the mist eliminator assembly 14000 without mixing with the low-pressure steam entering the mist eliminator assembly 14000. In this embodiment, the steam pipe 14040 is manufactured from stainless steel. In other embodiments the steam pipe may be manufactured from materials including, but not limited to plated aluminum, RADEL®, copper-nickel and titanium. The length of the steam pipe 14040 must be sufficient to allow for connecting with the compressor and passing through the entire mist eliminator assembly 14000. The second end of the steam pipe is received within a port located at the center of the upper flange 13120. The inner diameter of the steam pipe 14040 may affect the pressure drop across the compressor. Another effect on the system is that the steam pipe 14040 reduces the effective volume within the mist eliminator to remove water droplets from the low-pressure steam.

Still referring to FIGS. 44-44C, the mist eliminator assembly 14000 may be manufactured from any material having sufficient corrosion and high temperature resistant properties. In this embodiment, the mist eliminator assembly is manufactured from stainless steel. The assembly may be manufactured from other materials including but not limited to RADEL®, stainless steel, titanium, and copper-nickel.

7.5 Compressor

The water vapor distillation apparatus 100 may include a compressor 106. In the exemplary embodiment the compressor is a regenerative blower. Other types of compressors may be implemented, but for purposes of this application a regenerative blower is depicted and is described with reference to the exemplary embodiment. The purpose of the regenerative blower is to compress the low-pressure steam exiting the evaporator area of the evaporator/condenser to create high-pressure steam. Increasing the pressure of the steam raises the temperature of the steam. This increase in temperature is desirable because when the high-pressure steam condenses on the tubes of the condenser area of the evaporator/condenser the thermal energy is transferred to the incoming source water. This heat transfer is important because the thermal energy transferred from the high-pressure steam supplies low-pressure steam to the regenerative blower.

The change in pressure between the low-pressure steam and the high-pressure steam is governed by the desired output of product water. The output of the product water is related to the flow rate of the high-pressure steam. If the flow rate of steam for the high-pressure steam from the compressor to the condenser area of the evaporator/condenser is greater than the ability of the condenser to receive the steam then the steam may become superheated. Conversely, if the evaporator side of the evaporator/condenser produces more steam than the compressor is capable of compressing then the condenser side of the evaporator/condenser may not be operating at full capacity because of the limited flow-rate of high-pressure steam from the compressor.

Referring now to FIGS. 45-45G, the exemplary embodiment may include a regenerative blower assembly 15000 for compressing the low-pressure steam from the evaporator area of the evaporator/condenser. The regenerative blower assembly 15000 includes an upper housing 15020 and a lower housing 15040 defining an internal cavity as illustrated in FIG. 45C. See FIGS. 45D-G for detail views of the upper housing 15020 and lower housing 15040. Located in the internal cavity defined by the upper housing 15020 and lower housing 15040 is an impeller assembly 15060. The housings may be manufactured from a variety of plastics including but not limited to RYTON®, ULTEM®, or Polysulfone. Alternatively, the housings may be manufactured from materials including but not limited to titanium, copper-nickel, and aluminum-nickel bronze. In the exemplary embodiment the upper housing 15020 and the lower housing 15040 are manufactured from aluminum. In alternate embodiments, other materials may be used with preference that those materials have the properties of high-temperature resistance, corrosion resistance, do not absorb water and have sufficient structural strength. The housings preferably are of sufficient size to accommodate the impeller assembly and the associated internal passageways. Furthermore, the housings preferably provide adequate clearance between the stationary housing and the rotating impeller to avoid sliding contact and prevent leakage from occurring between the two stages of the blower. In addition to the clearances, the upper housing 15020 and the lower 15040 may be mirror images of one another.

Still referring to FIGS. 45D-F, the distance between the inlet ports 15100 and outlet ports 15120 is controlled by the size of the stripper plate 15160. In the exemplary embodiment the stripper plate area is optimized for reducing the amount of high-pressure steam carryover into the inlet region and maximizing the working flow channels within the upper housing 15020 and lower housing 15040.

Referring now to FIGS. 45H-K, in the exemplary embodiment the shaft 15140 is supported by pressurized water fed bearings 15160 that are pressed into the impeller assembly 15060 and are supported by the shaft 15140. In this embodiment, the bearings may be manufactured from graphite. In alternate embodiments, the bearings may be manufactured from materials including but not limited to Teflon composites and bronze alloys.

Hydrodynamic lubrication is desired for the high-speed blower bearings 15160 of the exemplary embodiment. In hydrodynamic operation, the rotating bearing rides on a film of lubricant, and does not contact the stationary shaft. This mode of lubrication offers the lowest coefficients of friction and wear is essentially non-existent since there is no physical contact of components.

Referring to FIGS. 45H-K, in a hydrodynamic bearing the limiting load factor may be affected by the thermal dissipation capabilities. When compared to an un-lubricated (or a boundary-lubricated) bearing, a hydrodynamic bearing has an additional mechanism for dissipating heat. The hydrodynamic bearing's most effective way to reject heat is to allow the lubricating fluid to carry away thermal energy. In the exemplary embodiment the bearing-feed water removes thermal energy from the bearings 15160. In this embodiment, the volume of water flowing through the bearing are preferably sufficient to maintain the bearing's temperature within operational limits. In addition, diametrical clearances may be varied to control bearing feed-water flow rate, however, these clearances preferably are not large enough to create a loss of hydrodynamic pressure.

Referring to FIG. 45L, in the exemplary embodiment, a return path 1526 for the bearing-feed water is provided within the blower to prevent excess bearing-feed water from entering the impeller buckets.

Referring back to FIGS. 45H-K, in the exemplary embodiment the bearing feed-water pump maintains a pressure of two to five psi on the input to the pressurized water fed bearings 15160. The bearing-feed-water flow rate may be maintained by having a constant bearing-feed-water pressure. In the exemplary embodiment, the pressure of the bearing-feed water may be controlled to ensure the flow rate of bearing-feed water to bearings 15160.

Still referring to FIGS. 45H-K, in the exemplary embodiment the impeller assembly may be driven by the motor using a magnetic drive coupling rather than a mechanical seal. The lack of mechanical seal results in no frictional losses associated with moving parts contacting one-another. In this embodiment the magnetic drive coupling may include an inner rotor magnet 15180, a containment shell 15200, an outer magnet 15220, and drive motor 15080.

Still referring to FIGS. 45H-K, Eddy current losses may occur because the shell 15200 is located between the inner rotor magnet 15180 and the outer rotor magnet 15220. If the shell 15200 is electrically conductive then the rotating magnetic field may cause electrical currents to flow through the shell we may cause a loss of power. Conversely, a shell 15200 manufactured from a highly electrically-resistive material is preferred to reduce the amount of Eddy current loss. In the exemplary embodiment titanium may be used for manufacturing the magnetic coupling shell 15200. This material provides a combination of high-electrical resistivity and corrosion resistance. Corrosion resistance is preferred because of the likelihood of contact between the bearing-feed water and the shell 15200. In other embodiments the shell 15200 may be manufactured from plastic materials having a higher electrical resistivity and corrosion resistance properties. In these alternate embodiments the shell 15200 may be manufactured from material including but not limited to RYTON®, ULTEM®, polysulfone, and PEEK.

Still referring to FIGS. 45H-K, the outer rotor magnet 15220 may be connected to a drive motor 15080. This motor rotates the outer rotor magnet 15220 causing the inner rotor magnet to rotate allowing the impeller assembly 15060 to compress the low-pressure steam within the cavity defined by the upper housing 15020 and the lower housing 15040. In the exemplary embodiment the drive motor may be an electric motor. In alternate embodiments the drive may be but is not limited to internal combustion or Stirling engine.

Still referring to FIGS. 45H-K, the blower assembly 15000 may be configured as a two single-stage blower or a two-stage blower. In the operation of a two single-stage blower the incoming low-pressure steam from the evaporator side of the evaporator/condenser is supplied to both the inlet ports of the two separate stages of the blower simultaneously. The first stage may be at the bottom between the lower housing 15040 and the impeller assembly 15060 and the second stage may be at the top between the upper housing 15020 and the impeller assembly 15060. As the impeller assembly 15060 rotates, the incoming low-pressure steam from the inlet port 15100 of both stages is compressed simultaneously and the high-pressure steam exits from the outlet port 15120 of the upper housing 15020 and the outlet port 15120 of the lower housing 15040.

Now referring to FIGS. 46-46A, within the internal cavity defined by the upper housing 15020 and lower housing 15040 is the impeller assembly 16000 (also identified as 15060 of FIG. 45). The impeller assembly 16000 includes a plurality of impeller blades on each side of the impeller 16020 and a spindle 16040. In the exemplary embodiment the impeller 16020 may be manufactured from Radel® and the impeller spindle 16040 may be manufactured from aluminum. In alternate embodiments these parts may be manufactured from materials including but not limited to titanium, PPS, ULTEM®. Other materials may be used to manufacture these parts with preference that these materials have high-temperature resistant properties and do not absorb water. In addition, impeller spindle 16040 may have passages for the return of the bearing-feed water back to the sump. These passages prevent the bearing-feed water from entering the impeller buckets.

Referring back to FIGS. 45H-K, the shaft 15140 is attached to the upper housing 15020 and lower housing 15040 and is stationary. In the exemplary embodiment the shaft 15140 may be manufactured from titanium. In other embodiments the shaft 15140 may be manufactured from materials including but not limited to aluminum oxide, silicon nitride or titanium, and stainless steel having coatings for increasing wear resistance and corrosion resistance properties. In addition the shaft 15140 may have passages channeling the bearing-feed water to the bearings 15160.

7.6 Level Sensor Assembly

Referring now to FIG. 47, the exemplary embodiment of the water vapor distillation apparatus 100 may also include a level sensor assembly 19000 (also identified as 108 in FIG. 31). This assembly measures the amount of product and/or blowdown water produced by the apparatus 100.

Referring now to FIGS. 47-47A, the exemplary embodiment of the level sensor assembly 19000 may include a settling tank 19020 and level sensor housing 19040. The settling tank 19020 collects particulate carried within the blowdown water prior to the water entering into the blowdown level sensor tank 19120. The tank removes particulate from the blowdown water by reducing the velocity of the water as it flows through the tank. The settling tank 19020 defines an internal volume. The volume may be divided nearly in half by using a fin 19050 extending from the side wall opposite the drain port 19080 to close proximity of the drain port 19080. This fin 19050 may extend from the bottom to the top of the volume. Blowdown enters through the inlet port 19060 and must flow around the fin 19050 before the water may exit through the level sensing port 19100. As the blowdown enters into the body of the vessel the velocity decreases due to the increase in area. Any particles in the blowdown may fall out of suspension due to the reduction in velocity. The settling tank 19020 may be manufactured out any material having corrosion and heat resistant properties. In the exemplary embodiment the housing is manufactured from RADEL®. In alternate embodiments the settling tank 1902 may be manufactured from other materials including but note limited to titanium, copper-nickel and stainless steel.

Still referring to FIGS. 47-47A, the settling tank 19020 may have three ports an inlet 19060, a drain 19080 and a level sensor port 19100. The inlet port 19060 may be located within the top surface of the settling tank 19020 as shown on FIGS. 47A-B and may be adjacent to the separating fin 19050 and opposite the drain port 19080. This port allows blowdown water to enter the tank. The drain port 19080 may be located in the bottom of the settling tank 19020 as shown on FIGS. 47A-B. The drain port 19080 provides access to the reservoir to facilitate removal of particulate from the tank. In the exemplary embodiment, the bottom of the tank may be sloped towards the drain as illustrated in FIG. 47B. The level sensor port 19100 may be located within the top surface of the tank as illustrated in FIG. 47A and also adjacent to the separating fin 19050 but on the opposite side as the inlet port 19060. This port provides a fluid pathway to the blowdown level sensor reservoir 19120. A fourth port is not shown in FIG. 47A. This port allows blowdown water to exit the level sensor assembly 19000 and enter the heat exchanger. This port may be located within one of the side walls of the upper half of the settling tank 19020 and away from the inlet port 19060.

Still referring to FIGS. 47-47A, in the exemplary embodiment a strainer may be installed within the flow path after the blowdown water exits the blowdown level sensor reservoir 19120 and settling tank 19020. The strainer may collect large particulate while allowing blowdown water to flow to other apparatus components. The strainer may be manufactured from material having corrosion resistant properties. In the exemplary embodiment the strainer is manufactured from stainless steel. In addition, the filter element may be removable to support cleaning of the element. The strainer removes particulate from the blowdown water to limit the amount of particulate that enters the heat exchanger. Excess particulate in the blowdown water may cause the inner tubes of the heat exchanger to clog with scale and sediment reducing the efficiency of the heat exchanger. In addition, particulate may produce blockage preventing the flow of blowdown water through the heat exchanger.

Still referring to FIGS. 47-47A, the product level sensor reservoir 19140 is in fluid connection with the bearing feed-water reservoir 19160. An external port 19240 provides a fluid pathway for the product water to flow between the product level sensor reservoir 19140 and the bearing feed-water reservoir 19160 shown on FIG. 47C. Product water enters the bearing feed-water reservoir 19160 through the external port 19240. In addition, the bearing feed-water reservoir 19160 has a supply port 19260 and a return port 19280 shown on FIG. 47C. The supply port 19260 provides a fluid pathway to lubricate the bearings within the regenerative blower assembly. Similarly, a return port 19280 provides a fluid pathway for the product water to return from lubricating the bearings of the regenerative blower assembly. The supply and return ports may be located on the side of the level sensor housing 19040 as shown in FIG. 47C.

Still referring to FIGS. 47-47A, to monitor the amount of product water within the bearing feed-water reservoir 19160 an optical level sensor may be installed. In the exemplary embodiment, the optical level sensor may be located at approximately ⅔ height in the bearing feed-water reservoir 19160. This sensor senses water present within the reservoir indicating that there is sufficient water to lubricate the bearings. The sensor may be installed by threading the sensor into the level sensor housing 19040. The sensor may include an o-ring to provide a water-tight seal. In other embodiments the sensor may be but is not limited to conductance sensor, float switches, capacitance sensors, or an ultrasonic sensor.

Now referring to FIGS. 48-48A, within the blowdown level sensor reservoir 19120 and the product level sensor reservoir 19140 are level sensors 20000 (also identified as 19180 of FIGS. 47A and 47E). These sensors may include a base 20020, an arm 20040, and a float ball 2006.

Referring still to FIGS. 48-48A, the exemplary embodiment of the level sensors 20000 may include a base 20020 supporting the arm 20040 and the float ball 20060. The assembly also includes two magnets (not shown). The base is connected to the arm and float ball assembly and the assembly pivots on a small diameter axial (not shown). In addition the base 20020 holds two magnets. These magnets are located 180 degrees from one another and are located on face of the base 20020 and parallel to the pivot. In addition, there magnets may be positioned coaxially to the pivot point within the base 20020. In the exemplary embodiment the magnets may be cylinder magnets having an axial magnetization direction.

Referring still to FIGS. 48-48A, the level sensors 20000 measure the rotation of the arm and ball assembly with respect to the pivot. In the exemplary embodiment, the maximum angle of displacement is 45 degrees. In this embodiment the level sensors are installed to prevent the float ball 20060 from being positioned directly below the pivot. In other embodiments the maximum angle of displacement may be as large as 80 degrees. The sensor may monitor the magnets through the wall of the housing. This configuration allows the sensors not to be exposed to corrosive blowdown water and to seal the level sensor housing. The base may be manufactured from any material having corrosion resistant, heat resistant and non-magnetic properties. In the exemplary, embodiment the base 20020 is manufactured from G10 plastic. In alternate embodiments the base 20020 may be manufactured from other materials including but not limited to RADEL®, titanium, copper-nickel and fiberglass laminate.

Still referring to FIGS. 48-48A, attached to the base 20020 is an arm 20040. The arm 20040 connects the base 20020 with the float ball 20060. In the exemplary embodiment the arm 20040 is manufactured of G10 plastic material. Other materials may be used to manufacture the arm 20040 with preference that those materials have sufficient high temperature resistant properties. Other materials may include, but are not limited to stainless steel, plastic, RADEL®, titanium, and copper-nickel. The length of the arm is governed by the size of the level sensor reservoirs. In addition, the exemplary embodiment has a plurality of apertures located along and perpendicular to the arm's longitudinal axis. These apertures reduce the weight of the arm and allow the arm to be more sensitive to level changes.

Referring now to FIGS. 49-49A, connected to the supply part 19260 of the bearing feed-water reservoir 19160 may be a bearing feed-water pump 21000 (also identified as 110 on FIG. 31). The pump 21000 enables the product water to flow from the bearing feed-water reservoir 19160 to the regenerative blower. In the exemplary embodiment, the flow rate is 60 ml/min with a pressure ranging from 2 psi to 2¼ psi. Any type of pump may be used with preference that the pump may supply a sufficient quantity of water to maintain the proper lubricating flow to the bearings within the regenerative blower. In addition, the pump 21000 preferably is heat resistant to withstand the high temperature of the surrounding environment and of the high-temperature product water passing through the pump. In the exemplary embodiment the bearing feed-water pump 110 is a GOTEC linear positive displacement pump, model number ETX-50-VIC. In alternate embodiments, other pump types such as a centrifugal pump may be used with preference that the pump is capable of operating in high temperatures.

7.7 Controls

The apparatus may also include a control manifold having a plurality of control valves for the different water flow paths. Typically, this manifold may include a control valve within the inlet piping for the source water to controls the amount of water that enters the apparatus. At excessive pressures the control valve could fail to open or once open may fail to close thus a regulator may be included in inlet piping to regulate the pressure of the source water.

Similarly, the manifold may also include a control valve within the outlet piping carrying blowdown water out of the apparatus. This valve may allow the operator to control the amount of blowdown water leaving the apparatus.

The control manifold may also include a control valve within the outlet piping for the product water. This valve may allow the operator to control the amount of product water leaving the apparatus. In the exemplary embodiment, there is one control valve for each section of outlet piping. Similarly, the apparatus includes a vent valve to release gaseous compounds from the evaporator/condenser. The vent valve maintains operating conditions of the apparatus by venting off small amounts of steam. Releasing steam prevents the apparatus from overheating. Similarly, releasing steam also prevents the buildup of compounds in the condenser space that may prevent the apparatus from functioning.

Typically, the control valves may be same type. In the exemplary embodiment, the controls are solenoid type valves Series 4BKR manufactured from SPARTAN SCIENTIFIC, Boardman, Ohio 44513, model number 9-4BKR-55723-1-002. In alternate embodiments, the controls may be but are not limited to proportional valves. The control valves are electronically operated using an electrical input of zero to five volts.

Moreover, the apparatus may include a backpressure regulator as described in U.S. Patent Application Publication No. US 2005/0194048 A1 published on Sep. 8, 2005 and entitled "Backpressure Regulator" (now abandoned), the contents of which are hereby incorporated by reference herein.

The water vapor distillation apparatus may include a voltage regulator. Typically, the apparatus may receive single-phase power provided from a traditional wall outlet. In other countries, however, the voltage may differ. To account for this difference in voltage, a voltage regulator may be included in the apparatus to ensure the proper type of voltage is supplied to the electrical components of the apparatus.

In addition, a battery may be included within the system to provide electrical energy to the apparatus. When electrical energy is supplied from a battery the apparatus will preferably include an electrical inverter to change incoming electricity from direct current to alternating current. In other embodiments, the apparatus may receive electrical energy from a Stirling and internal combustion engine. These embodiments may also require an electrical inverter. In other embodiments, the apparatus may include a boost loop to increase the amount of voltage supplied to the apparatus to power the electrical components.

7.8 Method of Distilling Water

Also disclosed herein is a method of water vapor distillation including the steps of straining the source water, heating the source water using a heat exchanger, transforming the source water into low-pressure steam, removing water from the source vapor to create dry low-pressure steam, compressing the dry low-pressure steam into high-pressure steam, and condensing the high-pressure steam into product water.

Referring still to FIGS. 50-50A, in operation, source water passes through a strainer 22020 to remove large particulates. These large particulates may adversely affect the operation of the apparatus, by clogging the inlet and blowdown valves or the inner tubes of the heat exchanger. In addition, particulate may be deposited onto the tubes of the evaporator/condenser reducing the efficiency of the apparatus. In the exemplary embodiment the strainer 22020 is located before the control valves. In other embodiments the strainer may be positioned before the inlet pump (not shown). In the exemplary embodiment the strainer 22020 has a 50 micron user-cleaner unit. In alternate embodiments the apparatus may not include a strainer 22020. After the source water passes through the strainer 22020, the water enters the heat exchanger 22080.

Referring now to FIG. 50B, upon entering the heat exchanger 22080, the source water may fill the outer tube of the heat exchanger 22080. In the exemplary embodiment, the heat exchanger is a counter-flow tube-in-tube heat exchanger. The source water enters the heat exchanger at approximately ambient temperature. Conversely, the product and blowdown water enter the heat exchanger having temperature greater than ambient. The source water enters the heat exchanger at one end and the product and blowdown water enter the heat exchanger at the opposite end. As the source water flows through the heat exchanger the high thermal energy of the product and blowdown water is conducted outwardly from the inner tubes of the heat exchanger to the source water. This increase in the temperature of the source water enables the water to more efficiently change into steam in the evaporator/condenser.

Referring now to FIGS. 51-51A, product water is formed when high-pressure steam condenses when contacting the outer surface of the tubes within the evaporator/condenser. FIG. 51 shows the product water fluid paths within the apparatus disclosed previously. The product water is created in the evaporator/condenser 24020 as shown in FIG. 51A. As the high-pressure steam condenses against the outer surface of the tubes of the evaporator/condenser, water droplets are formed. These droplets accumulate in the bottom of the evaporator/condenser 24020 creating product water. As the level of product water increases, the water exits the evaporator/condenser 24020 through a port and enters the level sensor housing 24040, illustrated in FIG. 51A.

Referring now to FIGS. 51B-51E, the product water may enter the level sensor housing 24040 through a port connected to the product level sensor reservoir 24060 shown on FIG. 51B. This reservoir collects incoming product water and measures the amount of water created by the apparatus. The water exits the product level sensor reservoir 24060 and enters the heat exchanger 24080 illustrated in FIG. 51C. While passing through the heat exchanger 24080, the high-temperature product water transfers thermal energy to the low-temperature source water through the inner tubes of the heat exchanger 24080. FIG. 51D illustrates the product water passing through the heat exchanger 24080. After passing through the heat exchanger 24080, the product water exits the apparatus as illustrated in FIG. 51E. In the exemplary embodiment the apparatus may include a product-divert valve 24100 and product valve 24120. The product valve 24120 allows the operator to adjust the flow rate of product water leaving the apparatus. Typically, the once the reservoir is 50 percent full, then the product valve 24120 is cycled such that the amount of water entering the reservoir is equal to the amount leaving the reservoir. During initial start-up of the system the first several minutes of production the product water produced is rejected as waste by opening the product-divert valve 24100. Once it has been determined that the product is of sufficient quality the product-divert valve 24100 closes and the product valve 24120 begins operation.

Referring now to FIGS. 51F-51H, as product water fills the product level sensor reservoir 24060, water may also enter the bearing feed-water reservoir 24100. The bearing feed-water reservoir 24100 collects incoming product water for lubricating the bearings within the regenerative blower 24120. Product water exits the bearing feed-water tank 24100 and may enter a pump 24140 as shown in FIG. 51G. The pump 24140 moves the product water to the regenerative blower. After leaving the pump 24140, the product water enters the regenerative blower 24120 illustrated on FIG. 51H.

Referring now to FIGS. 51H-51I, upon entering the blower 24120, the product water provides lubrication between the bearings and the shaft of the blower. After exiting the regenerative blower 24120, the product water may re-enter the level sensor housing 24040 through the bearing feed-water reservoir 24100, see FIG. 51I.

Now referring to FIGS. 52-52C, to support the flow of the water throughout the apparatus vent paths may be provided. These paths support the flow of the water through the apparatus by removing air or steam from the apparatus. The vent paths are shown in FIG. 52. FIG. 52A illustrates a vent path from the blowdown level sensor reservoir 25020 to the steam chest 25040 of the evaporator/condenser 25080. This path allows air within the reservoir to exit allowing more blowdown water to enter the reservoir. Similarly, FIG. 52B illustrates a vent path from the product level sensor reservoir 25060 to the evaporator/condenser 25080. This path allows air within the reservoir to exit allowing product water to enter the reservoir. Finally, FIG. 52C shows a vent path from the condenser area of the evaporator/condenser 25080 to allow air within the apparatus to exit the apparatus to the surrounding atmosphere through a mixing can 25100. In addition, this vent path assists with maintaining the apparatus' equilibrium by venting small quantities of steam from the apparatus.

Referring now to FIG. 53, in operation, source water enters the sump 26020 of the evaporator/condenser 26080 in the manner described in FIGS. 50-50E. When source water initially enters the sump 26020, additional thermal energy may be transferred to the water using a heating element. Typically, the heating element may be used during initial start up of the water vapor distillation apparatus. Otherwise the heater will not typically be used. As the amount of source water in the sump increases, the water flows out of the sump and into the tubes 26040 of the evaporator/condenser through ports within a plate 26060 positioned between the sump 26020 and the evaporator/condenser 26080, illustrated in FIG. 53. During initial start-up of the apparatus, the evaporator section of the evaporator/condenser 26080 is flooded with source water until there is sufficient amount of water in the blowdown level sensor reservoir. After initial start-up the tubes 26040 remain full of source water.

Referring now to FIG. 54, there are several factors that may affect the performance of the apparatus described. One of these factors is pressure difference across the regenerative blower. FIG. 54 is a chart illustrating the relationship between the amount energy required to produce one liter of product water and the change in pressure across the regenerative blower. Ideally, one would want to operate the blower, such that, the most product water is produce using the least amount electricity. From this graph, operating the blower with a pressure differential between 1.5 psi and 2 psi produces a liter of product water using the least amount of energy. Operating the blower at pressures above or below this range increases the amount of energy that is needed to produce one liter of water.

7.9 Method of Control

The pressure difference across the compressor directly determines the amount of product water that the apparatus may generate. To ensure a particular amount of product water output from the apparatus, one may adjust the pressure difference across the compressor. Increasing the speed of the compressor will typically result in an increase in pressure differential across the two sides of the evaporator/condenser. Increasing the pressure differential increases the rate at which source water is evaporated into clean product water.

One of the limiting factors in controlling the water vapor distillation apparatus 100 is the amount of blowdown water that is required to operate the machine. Without sufficient blowdown water, particulate separated from the source water will remain in the apparatus. This build-up of particulate will adversely affect the operation and efficiency of the apparatus.

To ensure that particulate is removed from the apparatus, there must be a sufficient amount of blowdown water present to carry the particulate out of the apparatus. To determine how much blowdown water is required to operate the apparatus in a particular environment, one must know the quality of the water entering the apparatus (source water). If the source water has a high concentration of particulate then more blowdown water will be needed to absorb and remove the particulate from the apparatus. Conversely, if the source water has a low concentration of particulate then less blowdown water will be required. Thus, incoming source water may pass through a conductivity sensor, such as, but not limited to, coupled to a purification controller input/output pin. Based on the sensor output, the purification controller 165 may send control signals to actuators responsible for adjusting flow rate. Control signals, status signals, and actuator positioning, may be among a number of variables logged into the purification controller memory during such an event.

In some embodiments, the blowdown flow rate may be continuously monitored as a means of determining the performance level of the purification system 100. The purification controller 165 in some embodiments, may execute a set of instructions based on analysis of the blowdown flow rate variables and send control signals to various components on the dispensing and purification portions 139, 140 (respectively).

Preferably, the purification controller 165 may reside near the top of the purification portion 140, such that wiring to the purification system 100 is minimized, and may be readily accessible by way of a hinged door. This configuration also minimizes the chance of water touching the electronics in the event of a possible mishap. In this configuration, the purification controller 165 may be attached, in an inverted fashion, to the underside of the uppermost portion of the external vending apparatus housing. This way, when the door is closed, the purification controller 165 is hidden from view and also protected from the elements; when the door is open the purification controller 165 is reverted to an upright position. In other various embodiments, a purification controller may reside anywhere within the vending apparatus, such as, among the dispensing components, or in a drawer configuration similar to the aforementioned carbon filters.

To control and observe the amount of product and blowdown water generated by the apparatus a couple of different control methods may be implemented. These schemes may include but are not limited to measuring the level of product and blowdown water within reservoirs located in the apparatus, measuring the flow rate of the product and blowdown water created by the apparatus, measuring the quality of the incoming source water and measuring the output quality of the product water.

The level sensor assembly of the exemplary embodiment may measure both the level of water and the flow rate of water. The water level may be measured by the movement of the level sensor assembly. As the water fills the reservoir, the water produces a change in position of the level sensor assembly.

One may determine the flow rate of water by knowing the change in position of the level sensor assembly, the area of the reservoir and the time associated with the change in water level. Using a float sensor to determine flow is advantageous because there is no pressure drop resulting from the use of a float sensor. The flow rate may indicate the performance of the apparatus and whether that performance is consistent with normal operation of the apparatus. This information allows the operator to determine whether the apparatus is functionally properly. For example, if the operator determines the flow rate is below normal operating conditions, then the operator may check the strainer within the inlet piping for impurities or the tubes of the evaporator/condenser for scaling. Similarly, the operator may use the flow rate to make adjustments to the apparatus. These adjustments may include changing the amount of blowdown and product water created. Although a flow rate may indicate performance of the apparatus, this measurement is not required.

The water quality of either the inlet source water or the outlet product water may be used to control the operation of the water vapor distillation apparatus. This control method determines the operation of the machine based on the quality of the water. In one embodiment the conductivity of the product water is monitored. When the conductivity exceeds a specified limit than the sensor sends a signal to shut down the apparatus. In some embodiments the sensors may be, but are not limited to a conductivity sensor. In another embodiment, may include monitoring the conductivity of the blowdown water. When the conductivity of the blowdown water exceeds a specified limit then the sensor sends a signal to increase the amount of source water entering the apparatus. The increase in source water will reduce the conductivity of the blowdown water. In another embodiment, the conductivity of the source water may be monitored. When the conductivity exceeds a specified limit than the sensor sends a signal to adjust the flow rate of the source water. The higher the source water conductivity may result in higher flow rates for the source and blowdown water.

In operation the water machine may perform conductivity testing of the source water and/or the product water to determine the quality of the water entering and exiting the system. This testing may be accomplished using conductivity sensors installed within the inlet and outlet piping of the system. Water having a high conductivity indicates that the water has greater amount of impurities. Conversely, water having a lower amount of conductivity indicates that water has a lower level of impurities. This type of testing is generic and provides only a general indication of the purity/quality of the water being analyzed.

7.10 Systems for Distilling Water

Also disclosed herein is where the apparatus for distilling water described previously may be implemented into a distribution system as described in U.S. Patent Application Pub. No. US 2007/0112530 A1 published on May 17, 2007 entitled “Systems and Methods for Distributed Utilities,” the contents of which are hereby incorporated by reference herein. Furthermore, a monitoring and/or communications system may also be included within the distribution system as described in U.S. Patent Application Pub. No. US 2007/0112530 A1 published on May 17, 2007 entitled “Systems and Methods for Distributed Utilities,” the contents of which are hereby incorporated by reference herein.

7.11 Alternate Embodiments

Although the exemplary embodiment of the still/water vapor distillation apparatus has been described, alternate embodiments of still, including alternate embodiments of particular elements of the still (i.e., heat exchanger, evaporator condenser, compressor, etc) are contemplated. Thus, in some alternate embodiments, one of more of the elements are replaced with alternate embodiment elements described herein. In some embodiments, the entire still is replaced by another embodiment, the system as described in one embodiment utilizes the exemplary embodiment as the still while in other embodiments, the system utilizes another embodiment.

8. Power Supply 8.1 Stirling Cycle Engine

The various embodiments of the water vapor distillation apparatus described above may, in some embodiment, may be powered by a Stirling cycle machine (also may be referred to as a Stirling engine). In the exemplary embodiment, the Stirling cycle machine is a Stirling engine described in pending U.S. Patent Application Pub. No. US 2008/0314356 published Dec. 25, 2008 entitled “Stirling Cycle Machine,” the contents of which are hereby incorporated by reference herein. However, in other embodiments, the Stirling cycle machine may be any of the Stirling cycle machines described in the following references, all of which are incorporated by reference in their entirely: U.S. Pat. Nos. 6,381,958; 6,247,310; 6,536,207; 6,705,081; 7,111,460; and 6,694,731.

Stirling cycle machines, including engines and refrigerators, have a long technological heritage, described in detail in Walker, Stirling Engines, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. Additional background regarding aspects of Stirling cycle machines and improvements thereto is discussed in Hargreaves, The Phillips Stirling Engine (Elsevier, Amsterdam, 1991), which is herein incorporated by reference.

The principle of operation of a Stirling cycle machine is readily described with reference to FIGS. 58A-58E, wherein identical numerals are used to identify the same or similar parts. Many mechanical layouts of Stirling cycle machines are known in the art, and the particular Stirling cycle machine designated generally by numeral 5110 is shown merely for illustrative purposes. In FIGS. 58A to 58D, piston 5112 and a displacer 5114 move in phased reciprocating motion within the cylinders 5116 which, in some embodiments of the Stirling cycle machine, may be a single cylinder, but in other embodiments, may include greater than a single cylinder. A working fluid contained within cylinders 5116 is constrained by seals from escaping around piston 5112 and displacer 5114. The working fluid is chosen for its thermodynamic properties, as discussed in the description below, and is typically helium at a pressure of several atmospheres, however, any gas, including any inert gas, may be used, including, but not limited to, hydrogen, argon, neon, nitrogen, air and any mixtures thereof. The position of the displacer 5114 governs whether the working fluid is in contact with the hot interface 5118 or the cold interface 5120, corresponding, respectively, to the interfaces at which heat is supplied to and extracted from the working fluid. The supply and extraction of heat is discussed in further detail below. The volume of working fluid governed by the position of the piston 5112 is referred to as the compression space 5122.

Figure 58A:
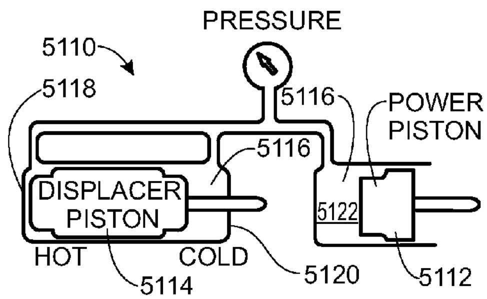
Figure 58B:
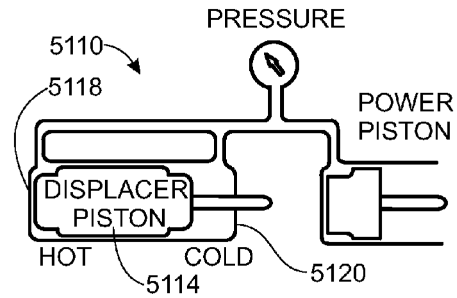
Figure 58C:
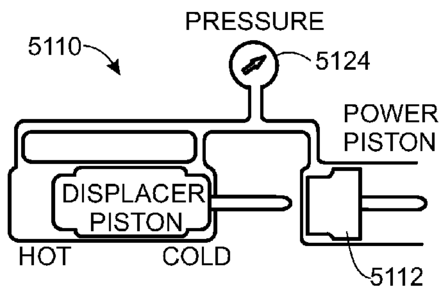

During the first phase of the Stirling cycle, the starting condition of which is depicted in FIG. 58A, the piston 5112 compresses the fluid in the compression space 5122. The compression occurs at a substantially constant temperature because heat is extracted from the fluid to the ambient environment. The condition of the Stirling cycle machine 5110 after compression is depicted in FIG. 58B. During the second phase of the cycle, the displacer 5114 moves in the direction of the cold interface 5120, with the working fluid displaced from the region of the cold interface 5120 to the region of the hot interface 5118. This phase may be referred to as the transfer phase. At the end of the transfer phase, the fluid is at a higher pressure since the working fluid has been heated at constant volume. The increased pressure is depicted symbolically in FIG. 58C by the reading of the pressure gauge 5124.

Figure 58D:
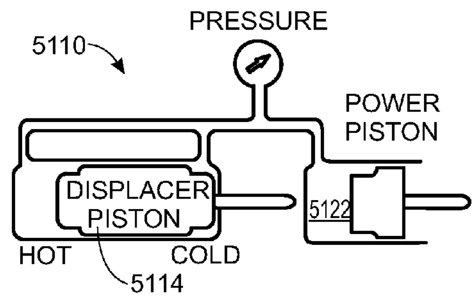
Figure 58E:
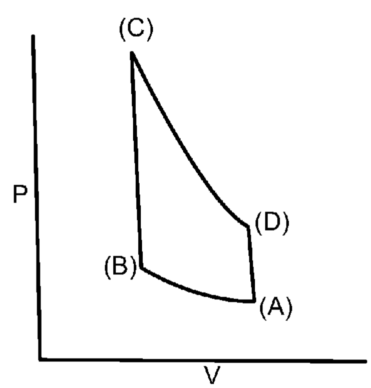

During the third phase (the expansion stroke) of the Stirling cycle machine, the volume of the compression space 5122 increases as heat is drawn in from outside the Stirling cycle machine 5110, thereby converting heat to work. In practice, heat is provided to the fluid by means of a heater head (not shown) which is discussed in greater detail in the description below. At the end of the expansion phase, the compression space 5122 is full of cold fluid, as depicted in FIG. 58D. During the fourth phase of the Stirling cycle machine 5110, fluid is transferred from the region of the hot interface 5118 to the region of the cold interface 5120 by motion of the displacer 5114 in the opposing sense. At the end of this second transfer phase, the fluid fills the compression space 5122 and cold interface 5120, as depicted in FIG. 58A, and is ready for a repetition of the compression phase. The Stirling cycle is depicted in a P-V (pressure-volume) diagram as shown in FIG. 58E.

Additionally, on passing from the region of the hot interface 5118 to the region of the cold interface 5120, in some embodiments, the fluid may pass through a regenerator (shown as 5408 in FIG. 61). A regenerator is a matrix of material having a large ratio of surface area to volume which serves to absorb heat from the fluid when it enters from the region of the hot interface 5118 and to heat the fluid when it passes from the region of the cold interface 5120.

Stirling cycle machines have not generally been used in practical applications due to several daunting challenges to their development. These involve practical considerations such as efficiency and lifetime. Accordingly, there is a need for more Stirling cycle machines with minimal side loads on pistons, increased efficiency and lifetime.

The principle of operation of a Stirling cycle machine or Stirling engine is further discussed in detail in U.S. Pat. No. 6,381,958, issued May 7, 2002, to Kamen et al., which is herein incorporated by reference in its entirety.

8.2 Rocking Beam Drive

Referring now to FIGS. 58A-61, embodiments of a Stirling cycle machine, according to one embodiment, are shown in cross-section. The engine embodiment is designated generally by numeral 5300. While the Stirling cycle machine will be described generally with reference to the Stirling engine 5300 embodiments shown in FIGS. 58A-61, it is to be understood that many types of machines and engines, including but not limited to refrigerators and compressors may similarly benefit from various embodiments and improvements which are described herein, including but not limited to, external combustion engines and internal combustion engines.

FIG. 60 depicts a cross-section of an embodiment of a rocking beam drive mechanism 5200 (the term "rocking beam drive" is used synonymously with the term "rocking beam drive mechanism") for an engine, such as a Stirling engine, having linearly reciprocating pistons 5202 and 5204 housed within cylinders 5206 and 5208, respectively. The cylinders include linear bearings 5220. Rocking beam drive 5200 converts linear motions of pistons 5202 and 5204 into the rotary motion of a crankshaft 5214. Rocking beam drive 5200 has a rocking beam 5216, rocker pivot 5218, a first coupling assembly 5210, and a second coupling assembly 5212. Pistons 5202 and 5204 are coupled to rocking beam drive 5200, respectively, via first coupling assembly 5210 and second coupling assembly 5212. The rocking beam drive is coupled to crankshaft 5214 via a connecting rod 5222.

In some embodiments, the rocking beam and a first portion of the coupling assembly may be located in a crankcase, while the cylinders, pistons and a second portion of the coupling assembly is located in a workspace.

In FIG. 61 a crankcase 5400 most of the rocking beam drive 5200 is positioned below the cylinder housing 5402. Crankcase 5400 is a space for operation of the rocking beam drive 5200 having a crankshaft 5214, rocking beam 5216, linear bearings 5220, a connecting rod 5222, and coupling assemblies 5210 and 5212. Crankcase 5400 intersects cylinders 5206 and 5208 transverse to the plane of the axes of pistons 5202 and 5204. Pistons 5202 and 5204 reciprocate in respective cylinders 5206 and 5208, as also shown in FIG. 59. Cylinders 5206 and 5208 extend above crankshaft housing 5400. Crankshaft 5214 is mounted in crankcase 5400 below cylinders 5206 and 5208.

FIG. 59 shows one embodiment of rocking beam drive 5200. Coupling assemblies 5210 and 5212 extend from pistons 5202 and 5204, respectively, to connect pistons 5202 and 5204 to rocking beam 5216. Coupling assembly 5212 for piston 5204, in some embodiments, may comprise a piston rod 5224 and a link rod 5226. Coupling assembly 5210 for piston 5202, in some embodiments, may comprise a piston rod 5228 and a link rod 5230. Piston 5204 operates in the cylinder 5208 vertically and is connected by the coupling assembly 5212 to the end pivot 5232 of the rocking beam 5216. The cylinder 5208 provides guidance for the longitudinal motion of piston 5204. The piston rod 5224 of the coupling assembly 5212 attached to the lower portion of piston 5204 is driven axially by its link rod 5226 in a substantially linear reciprocating path along the axis of the cylinder 5208. The distal end of piston rod 5224 and the proximate end of link rod 5226, in some embodiments, may be jointly hinged via a coupling means 5234. The coupling means 5234, may be any coupling means known in the art, including but not limited to, a flexible joint, roller bearing element, hinge, journal bearing joint (shown as 5600 in FIG. 63), and flexure (shown as 5700 in FIGS. 64A and 64B). The distal end of the link rod 5226 may be coupled to one end pivot 5232 of rocking beam 5216, which is positioned vertically and perpendicularly under the proximate end of the link rod 5226. A stationary linear bearing 5220 may be positioned along coupling assembly 5212 to further ensure substantially linear longitudinal motion of the piston rod 5224 and thus ensuring substantially linear longitudinal motion of the piston 5204. In an exemplary embodiment, link rod 5226 does not pass through linear bearing 5220. This ensures, among other things, that piston rod 5224 retains a substantially linear and longitudinal motion.

In the exemplary embodiment, the link rods may be made from aluminum, and the piston rods and connecting rod are made from D2 Tool Steel. Alternatively, the link rods, piston rods, connecting rods, and rocking beam may be made from 4340 steel. Other materials may be used for the components of the rocking beam drive, including, but not limited to, titanium, aluminum, steel or cast iron. In some embodiments, the fatigue strength of the material being used is above the actual load experienced by the components during operation.

Still referring to FIGS. 59-61, piston 5202 operates vertically in the cylinder 5206 and is connected by the coupling assembly 5210 to the end pivot 5236 of the rocking beam 5216. The cylinder 5206 serves, amongst other functions, to provide guidance for longitudinal motion of piston 5202. The piston rod 5228 of the coupling assembly 5210 is attached to the lower portion of piston 5202 and is driven axially by its link rod 5230 in a substantially linear reciprocating path along the axis of the cylinder 5206. The distal end of the piston rod 5228 and the proximate end of the link rod 5230, in some embodiments, is jointly hinged via a coupling means 5238. The coupling means 5238, in various embodiments may include, but are not limited to, a flexure (shown as 5700 in FIGS. 64A and 64B, roller bearing element, hinge, journal bearing (shown as 5600 in FIG. 63), or coupling means as known in the art. The distal end of the link rod 5230, in some embodiments, may be coupled to one end pivot 5236 of rocking beam 5216, which is positioned vertically and perpendicularly under the proximate end of link rod 5230. A stationary linear bearing 5220 may be positioned along coupling assembly 5210 to further ensure linear longitudinal motion of the piston rod 5228 and thus ensuring linear longitudinal motion of the piston 5202. In an exemplary embodiment, link rod 5230 does not pass through linear bearing 5220 to ensure that piston rod 5228 retains a substantially linear and longitudinal motion.

Figure 62A:
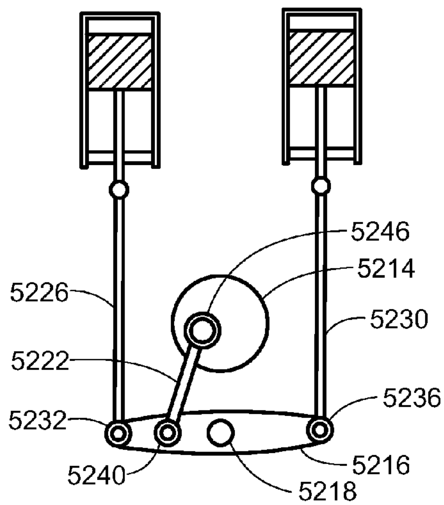
Figure 62B:
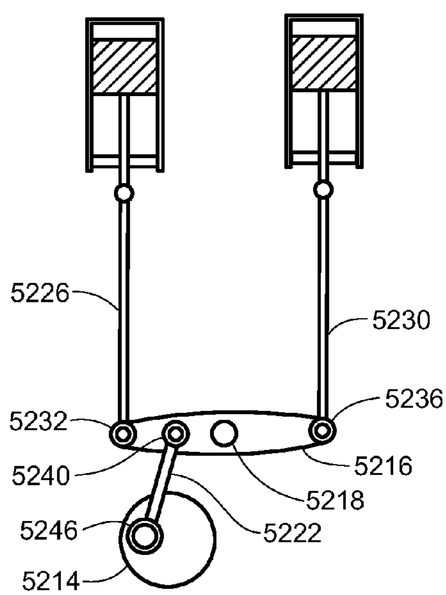

The coupling assemblies 5210 and 5212 change the alternating longitudinal motion of respective pistons 5202 and 5204 to oscillatory motion of the rocking beam 5216. The delivered oscillatory motion is changed to the rotational motion of the crankshaft 5214 by the connecting rod 5222, wherein one end of the connecting rod 5222 is rotatably coupled to a connecting pivot 5240 positioned between an end pivot 5232 and a rocker pivot 5218 in the rocking beam 5216, and another end of the connecting rod 5222 is rotatably coupled to crankpin 5246. The rocker pivot 5218 may be positioned substantially at the midpoint between the end pivots 5232 and 5236 and oscillatorily support the rocking beam 5216 as a fulcrum, thus guiding the respective piston rods 5224 and 5228 to make sufficient linear motion. In the exemplary embodiment, the crankshaft 5214 is located above the rocking beam 5216, but in other embodiments, the crankshaft 5214 may be positioned below the rocking beam 5216 (as shown in FIGS. 62B and 62D) or in some embodiments, the crankshaft 5214 is positioned to the side of the rocking beam 5216, such that it still has a parallel axis to the rocking beam 5216.

Still referring to FIGS. 59-61, the rocking beam oscillates about the rocker pivot 5218, the end pivots 5232 and 5236 follow an arc path. Since the distal ends of the link rods 5226 and 5230 are connected to the rocking beam 5216 at pivots 5232 and 5236, the distal ends of the link rods 5226 and 5230 also follow this arc path, resulting in an angular deviation 5242 and 5244 from the longitudinal axis of motion of their respective pistons 5202 and 5204. The coupling means 5234 and 5238 are configured such that any angular deviation 5244 and 5242 from the link rods 5226 and 5230 experienced by the piston rods 5224 and 5228 is minimized. Essentially, the angular deviation 5244 and 5242 is absorbed by the coupling means 5234 and 5238 so that the piston rods 5224 and 5228 maintain substantially linear longitudinal motion to reduce side loads on the pistons 5204 and 5202. A stationary linear bearing 5220 may also be placed inside the cylinder 5208 or 5206, or along coupling assemblies 5212 or 5210, to further absorb any angular deviation 5244 or 5242 thus keeping the piston push rod 5224 or 5228 and the piston 5204 or 5202 in linear motion along the longitudinal axis of the piston 5204 or 5202.

Therefore, in view of reciprocating motion of pistons 5202 and 5204, it is necessary to keep the motion of pistons 5202 and 5204 as close to linear as possible because the deviation 5242 and 5244 from longitudinal axis of reciprocating motion of pistons 5202 and 5204 causes noise, reduction of efficiency, increase of friction to the wall of cylinder, increase of side-load, and low durability of the parts. The alignment of the cylinders 5206 and 5208 and the arrangement of crankshaft 5214, piston rods 5224 and 5228, link rods 5226 and 5230, and connecting rod 5222, hence, may influence on, amongst other things, the efficiency and/or the volume of the device. For the purpose of increasing the linearity of the piston motion as mentioned, the pistons (shown as 5202 and 5204 in FIGS. 59-61) are preferably as close to the side of the respective cylinders 5206 and 5208 as possible.

In another embodiment reducing angular deviation of link rods, link rods 5226 and 5230 substantially linearly reciprocate along longitudinal axis of motion of respective pistons 5204 and 5202 to decrease the angular deviation and thus to decrease the side load applied to each piston 5204 and 5202. The angular deviation defines the deviation of the link rod 5226 or 5230 from the longitudinal axis of the piston 5204 or 5202. Numerals 5244 and 5242 designate the angular deviation of the link rods 5226 and 5230, as shown in FIG. 59. Therefore, the position of coupling assembly 5212 influences the angular displacement of the link rod 5226, based on the length of the distance between the end pivot 5232 and the rocker pivot 5218 of the rocking beam 5216. Thus, the position of the coupling assemblies may be such that the angular displacement of the link rod 5226 is reduced. For the link rod 5230, the length of the coupling assembly 5210 also may be determined and placed to reduce the angular displacement of the link rod 5230, based on the length of the distance between the end pivot 5236 and the rocker pivot 5218 of the rocking beam 5216. Therefore, the length of the link rods 5226 and 5230, the length of coupling assemblies 5212 and 5210, and the length of the rocking beam 5216 are significant parameters that greatly influence and/or determine the angular deviation of the link rods 5226 and 5230 as shown in FIG. 59.

The exemplary embodiment has a straight rocking beam 5216 having the end points 5232 and 5236, the rocker pivot 5218, and the connecting pivot 5240 along the same axis. However, in other embodiments, the rocking beam 5216 may be bent, such that pistons may be placed at angles to each other, as shown in FIGS. 62C and 62D.

Referring now to FIGS. 59-61 and FIGS. 64A-64B, in some embodiments of the coupling assembly, the coupling assemblies 5212 and 5210, may include a flexible link rod that is axially stiff but flexible in the rocking beam 5216 plane of motion between link rods 5226 and 5230, and pistons 5204 and 5202, respectively. In this embodiment, at least one portion, the flexure (shown as 5700 in FIGS. 64A and 64B), of link rods 5226 and 5230 is elastic. The flexture 5700 acts as a coupling means between the piston rod and the link rod. The flexure 5700 may absorb the crank-induced side loads of the pistons more effectively, thus allowing its respective piston to maintain linear longitudinal movement inside the piston's cylinder. This flexure 5700 allows small rotations in the plane of the rocking beam 5216 between the link rods 5226 and 5230 and pistons 5204 or 5202, respectively. Although depicted in this embodiment as flat, which increases the elasticity of the link rods 5226 and 5230, the flexure 5700, in some embodiments, is not flat. The flexure 5700 also may be constructed near to the lower portion of the pistons or near to the distal end of the link rods 5226 and 5230. The flexure 5700, in one embodiment, may be made of #D2 Tool Steel Hardened to 58-62 RC. In some embodiments, there may be more than one flexure (not shown) on the link rod 5226 or 5230 to increase the elasticity of the link rods.

Figure 62C:
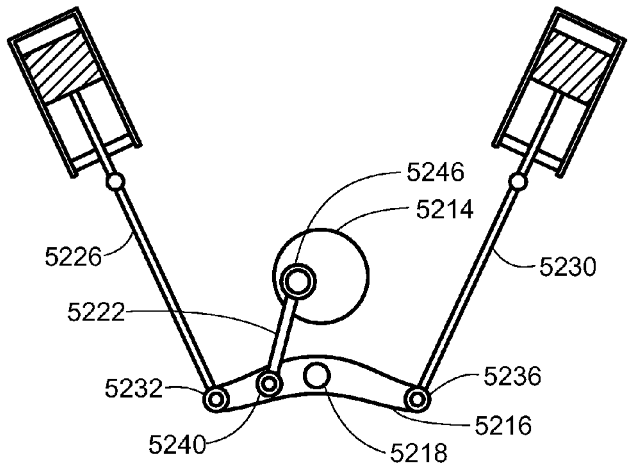
Figure 62D:
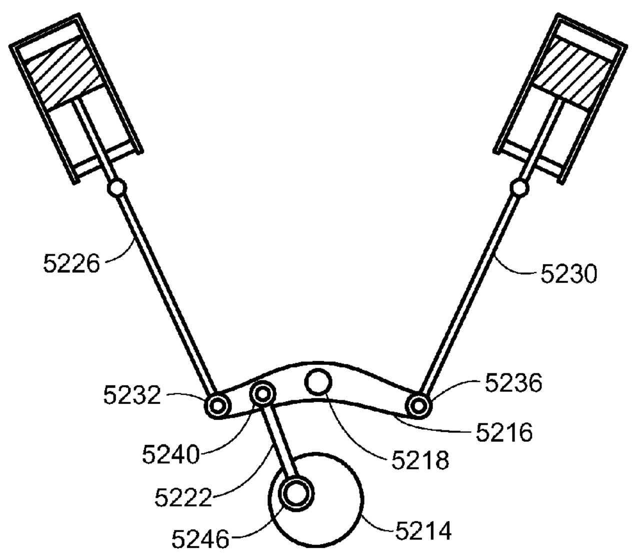

In alternate embodiment, the axes of the pistons in each cylinder housing may extend in different directions, as depicted in FIGS. 62C and 62D. In the exemplary embodiment, the axes of the pistons in each cylinder housing are substantially parallel and preferably substantially vertical, as depicted in FIGS. 59-61, and FIGS. 62A and 62B. FIGS. 62A-62D include various embodiments of the rocking beam drive mechanism including like numbers as those shown and described with respect to FIGS. 32-34. It will be understood by those skilled in that art that changing the relative position of the connecting pivot 5240 along the rocking beam 5216 will change the stroke of the pistons.

Accordingly, a change in the parameters of the relative position of the connecting pivot 5240 in the rocking beam 5216 and the length of the piston rods 5224 and 5228, link rods 5230 and 5226, rocking beam 5216, and the position of rocker pivot 5218 will change the angular deviation of the link rods 5226 and 5230, the phasing of the pistons 5204 and 5202, and the size of the device 5300 in a variety of manner. Therefore, in various embodiments, a wide range of piston phase angles and variable sizes of the engine may be chosen based on the modification of one or more of these parameters. In practice, the link rods 5224 and 5228 of the exemplary embodiment have substantially lateral movement within from −0.5 degree to +0.5 degree from the longitudinal axis of the pistons 5204 and 5202. In various other embodiments, depending on the length of the link rod, the angle may vary anywhere from approaching 0 degrees to 0.75 degrees. However, in other embodiments, the angle may be higher including anywhere from approaching 0 to the approximately 20 degrees. As the link rod length increases, however, the crankcase/overall engine height increases as well as the weight of the engine.

One feature of the exemplary embodiment is that each piston has its link rod extending substantially to the attached piston rod so that it is formed as a coupling assembly. In one embodiment, the coupling assembly 5212 for the piston 5204 includes a piston rod 5224, a link rod 5226, and a coupling means 5234 as shown in FIG. 59. More specifically, one proximal end of piston rod 5224 is attached to the lower portion of piston 5204 and the distal end piston rod 5224 is connected to the proximate end of the link rod 5226 by the coupling means 5234. The distal end of the link rod 5226 extends vertically to the end pivot 5232 of the rocking beam 5216. As described above, the coupling means 5234 may be, but is not limited to, a joint, hinge, coupling, or flexure or other means known in the art. In this embodiment, the ratio of the piston rod 5224 and the link rod 5226 may determine the angular deviation of the link rod 5226 as mentioned above.

In one embodiment of the machine, an engine, such as a Stirling engine, employs more than one rocking beam drive on a crankshaft. Referring now to FIG. 65, an unwrapped "four cylinder" rocking beam drive mechanism 5800 is shown. In this embodiment, the rocking beam drive mechanism has four pistons 5802, 5804, 5806, and 5808 coupled to two rocking beam drives 5810 and 5812. In the exemplary embodiment, rocking beam drive mechanism 5800 is used in a Stirling engine comprising at least four pistons 5802, 5804, 5806, and 5808, positioned in a quadrilateral arrangement coupled to a pair of rocking beam drives 5810 and 5812, wherein each rocking'beam drive is connected to crankshaft 5814. However, in other embodiments, the Stirling cycle engine includes anywhere from 1-4 pistons, and in still other embodiments, the Stirling cycle engine includes more than 4 pistons. In some embodiments, rocking beam drives 5810 and 5812 are substantially similar to the rocking beam drives described above with respect to FIGS. 59-61 (shown as 5210 and 5212 in FIGS. 59-61). Although in this embodiment, the pistons are shown outside the cylinders, in practice, the pistons would be inside cylinders.

Still referring to FIG. 65, in some embodiments, the rocking beam drive mechanism 5800 has a single crankshaft 5814 having a pair of longitudinally spaced, radially and oppositely directed crank pins 5816 and 5818 adapted for being journalled in a housing, and a pair of rocking beam drives 5810 and 5812. Each rocking beam 5820 and 5822 is pivotally connected to rocker pivots 5824 and 5826, respectively, and to crankpins 5816 and 5818, respectively. In the exemplary embodiment, rocking beams 5820 and 5822 are coupled to a rocking beam shaft 5828.

In some embodiments, a motor/generator may be connected to the crankshaft in a working relationship. The motor may be located, in one embodiment, between the rocking beam drives. In another embodiment, the motor may be positioned outboard. The term "motor/generator" is used to mean either a motor or a generator.

FIG. 66 shows one embodiment of crankshaft 5814. Positioned on the crankshaft is a motor/generator 5900, such as a Permanent Magnetic ("PM") generator. Motor/generator 5900 may be positioned between, or inboard of the rocking beam drives (not shown, shown in FIG. 65 as 5810 and 5812), or may be positioned outside, or outboard of, rocking beam drives 5810 and 5812 at an end of crankshaft 5814, as depicted by numeral 51000 in FIG. 71A.

When motor/generator 5900 is positioned between the rocking beam drives (not shown, shown in FIG. 65 as 5810 and 5812), the length of motor/generator 5900 is limited to the distance between the rocking beam drives. The diameter squared of motor/generator 5900 is limited by the distance between the crankshaft 5814 and the rocking beam shaft 5828. Because the capacity of motor/generator 5900 is proportional to its diameter squared and length, these dimension limitations result in a limited-capacity "pancake" motor/generator 5900 having relatively short length, and a relatively large diameter squared. The use of a "pancake" motor/generator 5900 may reduce the overall dimension of the engine, however, the dimension limitations imposed by the inboard configuration result in a motor/generator having limited capacity.

Placing motor/generator 5900 between the rocking beam drives exposes motor/generator 5900 to heat generated by the mechanical friction of the rocking beam drives. The inboard location of motor/generator 5900 makes it more difficult to cool motor/generator 5900, thereby increasing the effects of heat produced by motor/generator 5900 as well as heat absorbed by motor/generator 5900 from the rocking beam drives. This may lead to overheating, and ultimately failure of motor/generator 5900.

Referring to both FIGS. 65 and 66, the inboard positioning of motor/generator 5900 may also lead to an unequilateral configuration of pistons 5802, 5804, 5806, and 5808, since pistons 5802, 5804, 5806, and 5808 are coupled to rocking beam drives 5810 and 5812, respectively, and any increase in distance would also result in an increase in distance between pistons 5802, 5804, and pistons 5806 and 5808. An unequilateral arrangement of pistons may lead to inefficiencies in burner and heater head thermodynamic, which, in turn, may lead to a decrease in overall engine efficiency. Additionally, an unequilateral arrangement of pistons may lead to larger heater head and combustion chamber dimensions.

The exemplary embodiment of the motor/generator arrangement is shown in FIG. 71A. As shown in FIG. 71A, the motor/generator 51000 is positioned outboard from rocking beam drives 51010 and 51012 (shown as 5810 and 5812 in FIG. 65) and at an end of crankshaft 51006. The outboard position allows for a motor/generator 51000 with a larger length and diameter squared than the "pancake" motor/generator described above (shown as 5900 in FIG. 66). As previously stated, the capacity of motor/generator 51000 is proportional to its length and diameter squared, and since outboard motor/generator 51000 may have a larger length and diameter squared, the outboard motor/generator 51000 configuration shown in FIG. 71A may allow for the use of a higher capacity motor/generator in conjunction with engine.

By placing motor/generator 51000 outboard of drives 51010 and 51012 as shown in the embodiment in FIG. 71A, motor/generator 51000 is not exposed to heat generated by the mechanical friction of drives 51010 and 51012. Also, the outboard position of motor/generator 1000 makes it easier to cool the motor/generator, thereby allowing for more mechanical engine cycles per a given amount of time, which in turn allows for higher overall engine performance.

Also, as motor/generator 51000 is positioned outside and not positioned between drives 51010 and 51012, rocking beam drives 51010 and 51012 may be placed closer together thereby allowing the pistons which are coupled to drives 51010 and 51012 to be placed in an equilateral arrangement. In some embodiments, depending on the burner type used, particularly in the case of a single burner embodiment, equilateral arrangement of pistons allows for higher efficiencies in burner and heater head thermodynamic operation, which in turn allows higher overall engine performance. Equilateral arrangement of pistons also advantageously allows for smaller heater head and combustion chamber dimensions.

Referring again to FIGS. 65 and 66, crankshaft 5814 may have concentric ends 5902 and 5904, which in one embodiment are crank journals, and in various other embodiments, may be, but are not limited to, bearings. Each concentric end 5902, 5904 has a crankpin 5816, 5818, respectively, which may be offset from a crankshaft center axis. At least one counterweight 5906 may be placed at either end of crankshaft 5814 (shown as 51006 in FIG. 71A), to counterbalance any instability the crankshaft 5814 may experience. This crankshaft configuration in combination with the rocking beam drive described above allows the pistons (shown as 5802, 5804, 5806, and 5808 in FIG. 65) to do work with one rotation of the crankshaft 5814. This characteristic will be further explained below. In other embodiments, a flywheel (not shown) may be placed on crankshaft 5814 (shown as 51006 in FIG. 71A) to decrease fluctuations of angular velocity for a more constant speed.

Still referring to FIGS. 65 and 66, in some embodiments, a cooler (not shown) may be also be positioned along the crankshaft 5814 (shown as 51006 in FIG. 71A) and rocking beam drives 5810 and 5812 (shown as 51010 and 51012 in FIG. 71A) to cool the crankshaft 5814 and rocking beam drives 5810 and 5812. In some embodiments, the cooler may be used to cool the working gas in a cold chamber of a cylinder and may also be configured to cool the rocking beam drive. Various embodiments of the cooler are discussed in detail below.

FIGS. 71A-71G depicts some embodiments of various parts of the machine. As shown in this embodiment, crankshaft 51006 is coupled to motor/generator 51000 via a motor/generator coupling assembly. Since motor/generator 51000 is mounted to crankcase 51008, pressurization of crankcase with a charge fluid may result in crankcase deformation, which in turn may lead to misalignments between motor/generator 51000 and crankshaft 51006 and cause crankshaft 51006 to deflect. Because rocking beam drives 51010 and 51012 are coupled to crankshaft 51006, deflection of crankshaft 51006 may lead to failure of rocking beam drives 51010 and 51012. Thus, in one embodiment of the machine, a motor/generator coupling assembly is used to couple the motor/generator 51000 to crankshaft 51006. The motor/generator coupling assembly accommodates differences in alignment between motor/generator 51000 and crankshaft 51006 which may contribute to failure of rocking beam drives 51010 and 51012 during operation.

Still referring to FIGS. 71A-71G, in one embodiment, the motor/generator coupling assembly is a spline assembly that includes spline shaft 51004, sleeve rotor 51002 of motor/generator 51000, and crankshaft 51006. Spline shaft 51004 couples one end of crankshaft 51006 to sleeve rotor 51002. Sleeve rotor 51002 is attached to motor/generator 51000 by mechanical means, such as press fitting, welding, threading, or the like. In one embodiment, spline shaft 51004 includes a plurality of splines on both ends of the shaft. In other embodiments, spline shaft 51004 includes a middle splineless portion 51014, which has a diameter smaller than the outer diameter or inner diameter of splined portions 51016 and 51018. In still other embodiments, one end portion of the spline shaft 51016 has splines that extend for a longer distance along the shaft than a second end portion 51018 that also includes splines thereon.

In some embodiments, sleeve rotor 51002 includes an opening 51020 that extends along a longitudinal axis of sleeve rotor 51002. The opening 51020 is capable of receiving spline shaft 51004. In some embodiments, opening 51020 includes a plurality of inner splines 51022 capable of engaging the splines on one end of spline shaft 51004. The outer diameter 51028 of inner splines 51022 may be larger than the outer diameter 51030 of the splines on spline shaft 51004, such that the fit between inner splines 51022 and the splines on spline shaft 51004 is loose (as shown in FIG. 71E). A loose fit between inner splines 51022 and the splines on spline shaft 51004 contributes to maintain spline engagement between spline shaft 51004 and rotor sleeve 51002 during deflection of spline shaft 51004, which may be caused by crankcase pressurization. In other embodiments, longer splined portion 51016 of spline shaft 51004 may engage inner splines 51022 of rotor 51002.

Still referring to FIGS. 71A-71G, in some embodiments, crankshaft 51006 has an opening 51024 on an end thereof, which is capable of receiving one end of spline shaft 51004. Opening 51024 preferably includes a plurality of inner splines 51026 that engage the splines on spline shaft 51004. The outer diameter 51032 of inner splines 51026 may be larger than the outer diameter 51034 of the splines on spline shaft 51004, such that the fit between inner splines 51026 and the splines on spline shaft 51004 is loose (as shown in FIG. 71F). As previously discussed, a loose fit between inner splines 51026 and the splines on spline shaft 51004 contributes to maintain spline engagement between spline shaft 51004 and crankshaft 51006 during deflection of spline shaft 51004, which may be caused by crankcase pressurization. The loose fit between the inner splines 51026 and 51022 on the crankshaft 51006 and the sleeve rotor 51002 and the splines on the spline shaft 51004 may contribute to maintain deflection of spline shaft 51004. This may allow misalignments between crankshaft 51006 and sleeve rotor 51002. In some embodiments, shorter splined portion 51018 of spline shaft 51004 may engage opening 51024 of crankshaft 51006 thus preventing these potential misalignments.

In some embodiments, opening 51020 of sleeve rotor 51002 includes a plurality of inner splines that extend the length of opening 51020. This arrangement contributes to spline shaft 51004 being properly inserted into opening 51020 during assembly. This contributes to proper alignment between the splines on spline shaft 51004 and the inner splines on sleeve rotor 51002 being maintained.

Referring now to FIG. 61, one embodiment of the engine is shown. Here the pistons 5202 and 5204 of engine 5300 operate between a hot chamber 5404 and a cold chamber 5406 of cylinders 5206 and 5208 respectively. Between the two chambers there may be a regenerator 5408. The regenerator 5408 may have variable density, variable area, and, in some embodiments, is made of wire. The varying density and area of the regenerator may be adjusted such that the working gas has substantially uniform flow across the regenerator 5408. Various embodiments of the regenerator 5408 are discussed in detail below, and in U.S. Pat. No. 6,591,609, issued Jul. 17, 2003, to Kamen et al., and No. 6,862,883, issued Mar. 8, 2005, to Kamen et al., which are herein incorporated by reference in their entireties. When the working gas passes through the hot chamber 5404, a heater head 5410 may heat the gas causing the gas to expand and push pistons 5202 and 5204 towards the cold chamber 5406, where the gas compresses. As the gas compresses in the cold chamber 5406, pistons 5202 and 5204 may be guided back to the hot chamber to undergo the Stirling cycle again. The heater head 5410 may be a pin head, a fin head, a folded fin head, heater tubes as shown in FIG. 61, or any other heater head embodiment known, including, but not limited to, those described below. Various embodiments of heater head 5410 are discussed in detail below, and in U.S. Pat. No. 6,381,958, issued May 7, 2002, to Kamen et al., No. 6,543,215, issued Apr. 8, 2003, to Langenfeld et al., No. 6,966,182, issued Nov. 22, 2005, to Kamen et al, and No. 7,308,787, issued Dec. 18, 2007, to LaRocque et al., which are herein incorporated by reference in their entireties.

In some embodiments, a cooler 5412 may be positioned alongside cylinders 5206 and 5208 to further cool the gas passing through to the cold chamber 5406. Various embodiments of cooler 5412 are discussed in detail in the proceeding sections, and in U.S. Pat. No. 7,325,399, issued Feb. 5, 2008, to Strimling et al, which is herein incorporated by reference in its entirety.

In some embodiments, at least one piston seal 5414 may be positioned on pistons 5202 and 5204 to seal the hot section 5404 off from the cold section 5406. Additionally, at least one piston guide ring 5416 may be positioned on pistons 5202 and 5204 to help guide the pistons' motion in their respective cylinders. Various embodiments of piston seal 5414 and guide ring 5416 are described in detail below, and in U.S. Patent Publication No. 2003/0024387, published Feb. 6, 2003 (now abandoned), which is herein incorporated by reference in its entirety.

In some embodiments, at least one piston rod seal 5418 may be placed against piston rods 5224 and 5228 to prevent working gas from escaping into the crankcase 5400, or alternatively into airlock space 5420. The piston rod seal 5418 may be an elastomer seal, or a spring-loaded seal. Various embodiments of the piston rod seal 5418 are discussed in detail below.

In some embodiments, the airlock space may be eliminated, in the rolling diaphragm and/or bellows embodiments described in more detail below. In those cases, the piston rod seals 5224 and 5228 seal the working space from the crankcase.

In some embodiments, at least one rolling diaphragm/bellows 5422 may be located along piston rods 5224 and 5228 to prevent airlock gas from escaping into the crankcase 5400. Various embodiments of rolling diaphragm 5422 are discussed in more detail below.

Although FIG. 61 shows a cross section of engine 5300 depicting only two pistons and one rocking beam drive, it is to be understood that the principles of operation described herein may apply to a four cylinder, double rocking beam drive engine, as designated generally by numeral 5800 in FIG. 65.

8.3 Piston Operation

Referring now to FIGS. 65 and 72, FIG. 72 shows the operation of pistons 5802, 5804, 5806, and 5808 during one revolution of crankshaft 5814. With a ¼ revolution of crankshaft 5814, piston 5802 is at the top of its cylinder, otherwise known as top dead center, piston 5806 is in upward midstroke, piston 5804 is at the bottom of its cylinder, otherwise known as bottom dead center, and piston 5808 is in downward midstroke. With a ½ revolution of crankshaft 5814, piston 5802 is in downward midstroke, piston 5806 is at top dead center, piston 5804 is in upward midstroke, and piston 5808 is at bottom dead center. With ¾ revolution of crankshaft 5814, piston 5802 is at bottom dead center, piston 5806 is in downward midstroke, piston 5804 is at top dead center, and piston 5808 is in upward midstroke. Finally, with a full revolution of crankshaft 5814, piston 5802 is in upward midstroke, piston 5806 is at bottom dead center, piston 5804 is in downward midstroke, and piston 5808 is at top dead center. During each ¼ revolution, there is a 90 degree phase difference between pistons 5802 and 5806, a 180 degree phase difference between pistons 5802 and 5804, and a 270 degree phase difference between pistons 5802 and 5808. FIG. 73A illustrates the relationship of the pistons being approximately 90 degrees out of phase with the preceding and succeeding piston. Additionally, FIG. 72 shows the exemplary embodiment machine means of transferring work. Thus, work is transferred from piston 5802 to piston 5806 to piston 5804 to piston 5808 so that with a full revolution of crankshaft 5814, all pistons have exerted work by moving from the top to the bottom of their respective cylinders.

Referring now to FIG. 72, together with FIGS. 73A-73C, illustrate the 90 degree phase difference between the pistons in the exemplary embodiment. Referring now to FIG. 73A, although the cylinders are shown in a linear path, this is for illustration purposes only. In the exemplary embodiment of a four cylinder Stirling cycle machine, the flow path of the working gas contained within the cylinder working space follows a figure eight pattern. Thus, the working spaces of cylinders 51200, 51202, 51204, and 51206 are connected in a figure eight pattern, for example, from cylinder 51200 to cylinder 51202 to cylinder 51204 to cylinder 51208, the fluid flow pattern follows a figure eight. Still referring to FIG. 73A, an unwrapped view of cylinders 51200, 51202, 51204, and 51206, taken along the line B-B (shown in FIG. 73C) is illustrated. The 90 degree phase difference between pistons as described above allows for the working gas in the warm section 51212 of cylinder 51204 to be delivered to the cold section 51222 of cylinder 51206. As piston 5802 and 5808 are 90 degrees out of phase, the working gas in the warm section 51214 of cylinder 51206 is delivered to the cold section 51216 of cylinder 51200. As piston 5802 and piston 5806 are also 90 degrees out of phase, the working gas in the warm section 51208 of cylinder 51200 is delivered to the cold section 51218 of cylinder 51202. And as piston 5804 and piston 5806 are also 90 degrees out of phase, so the working gas in the warm section 51210 of cylinder 51202 is delivered to the cold section 51220 of cylinder 51204. Once the working gas of a warm section of a first cylinder enters the cold section of a second cylinder, the working gas begins to compress, and the piston within the second cylinder, in its down stroke, thereafter forces the compressed working gas back through a regenerator 51224 and heater head 51226 (shown in FIG. 73B), and back into the warm section of the first cylinder. Once inside the warm section of the first cylinder, the gas expands and drives the piston within that cylinder downward, thus causing the working gas within the cold section of that first cylinder to be driven through the preceding regenerator and heater head, and into the cylinder. This cyclic transmigration characteristic of working gas between cylinders 51200, 51202, 51204, and 51206 is possible because pistons 5802, 5804, 5806, and 5808 are connected, via drives 5810 and 5812, to a common crankshaft 5814 (shown in FIG. 72), in such a way that the cyclical movement of each piston is approximately 90 degrees in advance of the movement of the proceeding piston, as depicted in FIG. 73A.

8.4 Rolling Diaphragm, Metal Bellows, Airlock, and Pressure Regulator

In some embodiments of the Stirling cycle machine, lubricating fluid is used. To prevent the lubricating fluid from escaping the crankcase, a seal is used.

Referring now to FIGS. 74A-76G, some embodiments of the Stirling cycle machine include a fluid lubricated rocking beam drive that utilizes a rolling diaphragm 51300 positioned along the piston rod 51302 to prevent lubricating fluid from escaping the crankcase, not shown, but the components that are housed in the crankcase are represented as 51304, and entering areas of the engine that may be damaged by the lubricating fluid. It is beneficial to contain the lubricating fluid for if lubricating fluid enters the working space, not shown, but the components that are housed in the working space are represented as 51306, it would contaminate the working fluid, come into contact with the regenerator 51308, and may clog the regenerator 51308. The rolling diaphragm 51300 may be made of an elastomer material, such as rubber or rubber reinforced with woven fabric or non-woven fabric to provide rigidity. The rolling diaphragm 51300 may alternatively be made of other materials, such as fluorosilicone or nitrile with woven fabric or non-woven fabric. The rolling diaphragm 51300 may also be made of carbon nanotubes or chopped fabric, which is non-woven fabric with fibers of polyester or KEVLAR®, for example, dispersed in an elastomer. In the some embodiments, the rolling diaphragm 51300 is supported by the top seal piston 51328 and the bottom seal piston 51310. In other embodiments, the rolling diaphragm 51300 as shown in FIG. 113 is supported via notches in the top seal piston 51328.

In some embodiments, a pressure differential is placed across the rolling diaphragm 51300 such that the pressure above the seal 51300 is different from the pressure in the crankcase 51304. This pressure differential inflates seal 51300 and allows seal 51300 to act as a dynamic seal as the pressure differential ensures that rolling diaphragm maintains its form throughout operation. FIG. 74A, and FIGS. 74C-74H, illustrate how the pressure differential affects the rolling diaphragm. The pressure differential causes the rolling diaphragm 51300 to conform to the shape of the bottom seal piston 51310 as it moves with the piston rod 51302, and prevents separation of the seal 51300 from a surface of the piston 51310 during operation. Such separation may cause seal failure. The pressure differential causes the rolling diaphragm 51300 to maintain constant contact with the bottom seal piston 51310 as it moves with the piston rod 51302. This occurs because one side of the seal 51300 will always have pressure exerted on it thereby inflating the seal 51300 to conform to the surface of the bottom seal piston 51310. In some embodiments, the top seal piston 51328 'rolls over' the corners of the rolling diaphragm 51300 that are in contact with the bottom seal piston 51310, so as to further maintain the seal 51300 in contact with the bottom seal piston 51310. In the exemplary embodiment, the pressure differential is in the range of 10 to 15 PSI. The smaller pressure in the pressure differential is preferably in crankcase 51304, so that the rolling diaphragm 51300 may be inflated into the crankcase 51304. However, in other embodiments, the pressure differential may have a greater or smaller range of value.

The pressure differential may be created by various methods including, but not limited to, the use of the following: a pressurized lubrication system, a pneumatic pump, sensors, an electric pump, by oscillating the rocking beam to create a pressure rise in the crankcase 51304, by creating an electrostatic charge on the rolling diaphragm 51300, or other similar methods. In some embodiments, the pressure differential is created by pressurizing the crankcase 51304 to a pressure that is below the mean pressure of the working space 51306. In some embodiments the crankcase 51304 is pressurized to a pressure in the range of 10 to 15 PSI below the mean pressure of the working space 51306, however, in various other embodiments, the pressure differential may be smaller or greater. Further detail regarding the rolling diaphragm is included below.

Referring now to FIGS. 74C, 74G, and 74H, however, another embodiment of the Stirling machine is shown, wherein airlock space 51312 is located between working space 51306 and crankcase 51304. Airlock space 51312 maintains a constant volume and pressure necessary to create the pressure differential necessary for the function of rolling diaphragm 51300 as described above. In one embodiment, airlock 51312 is not absolutely sealed off from working space 51306, so the pressure of airlock 51312 is equal to the mean pressure of working space 51306. Thus, in some embodiments, the lack of an effective seal between the working space and the crankcase contributes to the need for an airlock space. Thus, the airlock space, in some embodiments, may be eliminated by a more efficient and effective seal.

During operation, the working space 51306 mean pressure may vary so as to cause airlock 51312 mean pressure to vary as well. One reason the pressure may tend to vary is that during operation the working space may get hotter, which in turn may increase the pressure in the working space, and consequently in the airlock as well since the airlock and working space are in fluid communication. In such a case, the pressure differential between airlock 51312 and crankcase 51304 will also vary, thereby causing unnecessary stresses in rolling diaphragms 51300 that may lead to seal failure. Therefore, some embodiments of the machine, the mean pressure within airlock 51312 is regulated so as to maintain a constant desired pressure differential between airlock 51312 and crankcase 51304, and ensuring that rolling diaphragms 51300 stay inflated and maintains their form. In some embodiments, a pressure transducer is used to monitor and manage the pressure differential between the airlock and the crankcase, and regulate the pressure accordingly so as to maintain a constant pressure differential between the airlock and the crankcase. Various embodiments of the pressure regulator that may be used are described in further detail below, and in U.S. Pat. No. 7,310,945, issued Dec. 25, 2007, to Gurski el al., which is herein incorporated by reference in its entirety.

A constant pressure differential between the airlock 51312 and crankcase 51304 may be achieved by adding or removing working fluid from airlock 51312 via a pump or a release valve. Alternatively, a constant pressure differential between airlock 51312 and crankcase 51304 may be achieved by adding or removing working fluid from crankcase 51304 via a pump or a release valve. The pump and release valve may be controlled by the pressure regulator. Working fluid may be added to airlock 51312 (or crankcase 51304) from a separate source, such as a working fluid container, or may be transferred over from crankcase 51304. Should working fluid be transferred from crankcase 51304 to airlock 51312, it may be desirable to filter the working fluid before passing it into airlock 51312 so as to prevent any lubricant from passing from crankcase 51304 into airlock 51312, and ultimately into working space 51306, as this may result in engine failure.

In some embodiments of the machine, crankcase 51304 may be charged with a fluid having different thermal properties than the working fluid. For example, where the working gas is helium or hydrogen, the crankcase may be charged with argon. Thus, the crankcase is pressurized. In some embodiments, helium is used, but in other embodiments, any inert gas, as described herein, may be used. Thus, the crankcase is a wet pressurized crankcase in the exemplary embodiment. In other embodiments where a lubricating fluid is not used, the crankcase is not wet.

In the exemplary embodiments, rolling diaphragms 51300 do not allow gas or liquid to pass through them, which allows working space 51306 to remain dry and crankcase 51304 to be wet sumped with a lubricating fluid. Allowing a wet sump crankcase 51304 increases the efficiency and life of the engine as there is less friction in rocking beam drives 51316. In some embodiments, the use of roller bearings or ball bearings in drives 51316 may also be eliminated with the use of lubricating fluid and rolling diaphragms 51300. This may further reduce engine noise and increase engine life and efficiency.

Figure 75A:
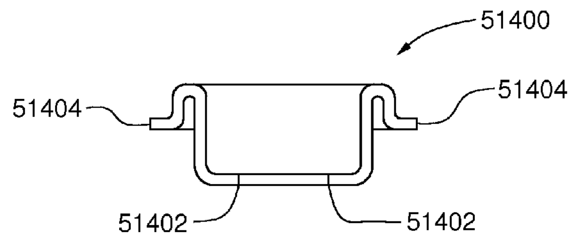

FIGS. 75A-75E show cross sections of various embodiments of the rolling diaphragm (shown as 51400, 51410, 51412, 51422 and 51424) configured to be mounted between top seal piston and bottom seal piston (shown as 51328 and 51310 in FIGS. 75A and 75H), and between a top mounting surface and a bottom mounting surface (shown as 51320 and 51318 in FIG. 75A). In some embodiments, the top mounting surface may be the surface of an airlock or working space, and the bottom mounting surface may be the surface of a crankcase.

Figure 75B:
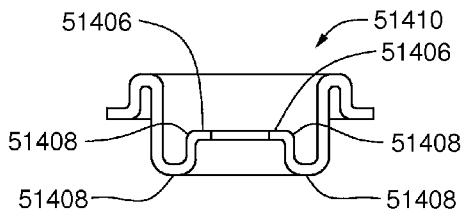
Figure 75C:
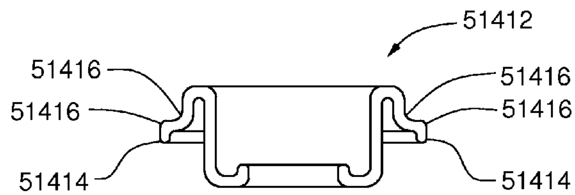

FIG. 75A shows one embodiment of the rolling diaphragm 51400, where the rolling diaphragm 51400 includes a flat inner end 51402 that may be positioned between a top seal piston and a bottom seal piston, so as to form a seal between the top seal piston and the bottom seal piston. The rolling diaphragm 51400 also includes a flat outer end 51404 that may be positioned between a top mounting surface and a bottom mounting surface, so as to form a seal between the top mounting surface and the bottom mounting surface. FIG. 75B shows another embodiment of the rolling diaphragm, wherein rolling diaphragm 51410 may include a plurality of bends 51408 leading up to flat inner end 51406 to provide for additional support and sealing contact between the top seal piston and the bottom seal piston. FIG. 75C shows another embodiment of the rolling diaphragm, wherein rolling diaphragm 51412 includes a plurality of bends 51416 leading up to flat outer end 51414 to provide for additional support and sealing contact between the top mounting surface and the bottom mounting surface.

Figure 75D:
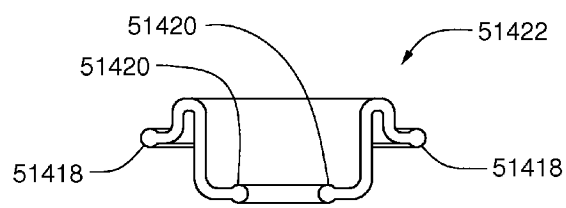
Figure 75E:
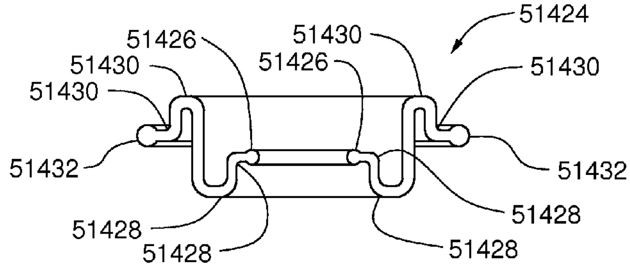

FIG. 75D shows another embodiment of the rolling diaphragm where rolling diaphragm 51422 includes a bead along an inner end 51420 thereof, so as to form an 'o-ring' type seal between a top seal piston and a bottom seal piston, and a bead along an outer end 51418 thereof, so as to form an 'o-ring' type seal between a bottom mounting surface and a top mounting surface. FIG. 75E shows another embodiment of the rolling diaphragm, wherein rolling diaphragm 51424 includes a plurality of bends 51428 leading up to beaded inner end 51426 to provide for additional support and sealing contact between the top seal piston and the bottom seal piston. Rolling diaphragm 51424 may also include a plurality of bends 51430 leading up to beaded outer end 51432 to provide for additional support and sealing contact between the top seal piston and the bottom seal piston.

Although FIGS. 75A through 75E depict various embodiments of the rolling diaphragm, it is to be understood that rolling diaphragms may be held in place by any other mechanical means known in the art.

Referring now to FIG. 76A, a cross section shows one embodiment of the rolling diaphragm embodiment. A metal bellows 51500 is positioned along a piston rod 51502 to seal off a crankcase (shown as 51304 in FIG. 74G) from a working space or airlock (shown as 51306 and 51312 in FIG. 74G). Metal bellows 51500 may be attached to a top seal piston 51504 and a stationary mounting surface 51506. Alternatively, metal bellows 51500 may be attached to a bottom seal piston (not shown), and a top stationary mounting surface. In one embodiment the bottom stationary mounting surface may be a crankcase surface or an inner airlock or working space surface and the top stationary mounting surface may be an inner crankcase surface, or an outer airlock or working space surface. Metal bellows 51500 may be attached by welding, brazing, or any mechanical means known in the art.

FIGS. 76B-76G depicts a perspective cross sectional view of various embodiments of the metal bellows, wherein the metal bellows is a welded metal bellows 51508. In some embodiments of the metal bellows, the metal bellows is preferably a micro-welded metal bellows. In some embodiments, the welded metal bellows 51508 includes a plurality of diaphragms 51510, which are welded to each other at either an inner end 51512 or an outer end 51514, as shown in FIGS. 76C and 76D. In some embodiments, diaphragms 51510 may be crescent shaped 51516, flat 51518, rippled 51520, or any other shape known in the art. Additionally, the metal bellows may alternatively be formed mechanically by means such as die forming, hydroforming, explosive hydroforming, hydramolding, or any other means known in the art.

The metal bellows may be made of any type of metal, including but not limited to, steel, stainless steel, stainless steel 374, AM-350 stainless steel, Inconel, Hastelloy, Haynes, titanium, or any other high-strength, corrosion-resistant material.

In one embodiment, the metal bellows used are those available from Senior Aerospace Metal Bellows Division, Sharon, Mass., or American BOA, Inc., Cumming, Ga.

8.5 Rolling Diaphragm and/or Bellows Embodiments

Various embodiments of the rolling diaphragm and/or bellows, which function to seal, are described above. Further embodiments will be apparent to those of skill in the art based on the description above and the additional description below relating, to the parameters of the rolling diaphragm and/or bellows.

In some embodiments, the pressure atop the rolling diaphragm or bellows, in the airlock space or airlock area (both terms are used interchangeably), is the mean-working-gas pressure for the machine, which, in some embodiments is an engine, while the pressure below the rolling diaphragm and/or bellows, in the crankcase area, is ambient/atmospheric pressure. In these embodiments, the rolling diaphragm and/or bellows is required to operate with as much as 3000 psi across it (and in some embodiments, up to 1500 psi or higher). In this case, the rolling diaphragm and/or bellows seal forms the working gas (helium, hydrogen, or otherwise) containment barrier for the machine (engine in the exemplary embodiment). Also, in these embodiments, the need for a heavy, pressure-rated, structural vessel to contain the bottom end of the engine is eliminated, since it is now required to simply contain lubricating fluid (oil is used as a lubricating fluid in the exemplary embodiment) and air at ambient pressure, like a conventional internal combustion ("IC") engine.

The capability to use a rolling diaphragm and/or bellows seal with such an extreme pressure across it depends on the interaction of several parameters. Referring now to FIG. 515H, an illustration of the actual load on the rolling diaphragm or bellows material is shown. As shown, the load is a function of the pressure differential and the annular gap area for the installed rolling diaphragm or bellows seal.

Region 1 represents the portions of the rolling diaphragm and/or bellows that are in contact with the walls formed by the piston and cylinder. The load is essentially a tensile load in the axial direction, due to the pressure differential across the rolling diaphragm and/or bellows. This tensile load due to the pressure across the rolling diaphragm and/or bellows may be expressed as:

$$L_t = P_d * A_a$$

Where
$L_t$=Tensile Load and
$P_d$=Pressure Differential
$A_a$=Annular Area
and $$A_a = p/4*(D^2 - d^2)$$

Where
D=Cylinder Bore and
d=Piston Diameter

The tensile component of stress in the bellows material may be approximated as:

$$S_t=L_t/(p*(D+d)*t_h)$$

Which reduces to:

$$S_t=P_d/4*(D-d)/tb$$

Later, we will show the relationship of radius of convolution, $R_c$ to Cylinder bore (D) and Piston Diameter (d) to be defined as:

$$R_c=(D-d)/4$$

So, this formula for St reduces to its final form:

$$S_t=P_d*R_c/t_b$$

Where $t_b$=thickness of bellows material

Still referring to FIG. 76H, Region 2 represents the convolution. As the rolling diaphragm and/or bellows material turns the corner, in the convolution, the hoop stress imposed on the rolling diaphragm and/or bellows material may be calculated. For the section of the bellows forming the convolution, the hoop component of stress may be closely approximated as:

$$S_b=P_d \cdot R_c/t_b$$

The annular gap that the rolling diaphragm and/or bellows rolls within is generally referred to as the convolution area. The rolling diaphragm and/or bellows fatigue life is generally limited by the combined stress from both the tensile (and hoop) load, due to pressure differential, as well as the fatigue due to the bending as the fabric rolls through the convolution. The radius that the fabric takes on during this 'rolling' is defined here as the radius of convolution, Rc.

$$R_c=(D-d)/4$$

The bending stress, Sb, in the rolling diaphragm and/or bellows material as it rolls through the radius of convolution, Rc, is a function of that radius, as well as the thickness of the materials in bending. For a fiber-reinforced material, the stress in the fibers themselves (during the prescribed deflection in the exemplary embodiments) is reduced as the fiber diameter decreases. The lower resultant stress for the same level of bending allows for an increased fatigue life limit. As the fiber diameter is further reduced, flexibility to decrease the radius of convolution Rc is achieved, while keeping the bending stress in the fiber under its endurance limit. At the same time, as Rc decreases, the tensile load on the fabric is reduced since there is less unsupported area in the annulus between the piston and cylinder. The smaller the fiber diameter, the smaller the minimum Rc, the smaller the annular area, which results in a higher allowable pressure differential.

For bending around a prescribed radius, the bending moment is approximated by:

$$M=E*I/R$$

Where:

M=Bending Moment

E=Elastic Modulus

I=Moment of Inertia

R=Radius of Bend

Classical bending stress, $S_b$, is calculated as:

$$S_b=M*Y/I$$

Where:

Y=Distance above neutral axis of bending

Substituting yields:

$$S_b=(E*I/R)*Y/I$$

$$S_b=E*Y/R$$

Assuming bending is about a central neutral axis:

$$Y_{max}=t_b/2$$

$$S_b=E*t_b/(2*R)$$

In some embodiments, rolling diaphragm and/or bellows designs for high cycle life are based on geometry where the betiding stress imposed is kept about one order of magnitude less than the pressure-based loading (hoop and axial stresses). Based on the equation: Sb=E*tb/(2*R), it is clear that minimizing tb in direct proportion to Rc should not increase the bending stress. The minimum thickness for the exemplary embodiments of the rolling diaphragm and/or bellows material or membrane is directly related to the minimum fiber diameter that is used in the reinforcement of the elastomer. The smaller the fibers used, the smaller resultant Rc for a given stress level.

Another limiting component of load on the rolling diaphragm and/or bellows is the hoop stress in the convolution (which is theoretically the same in magnitude as the axial load while supported by the piston or cylinder). The governing equation for that load is as follows:

$$Sh=Pd*Rc/tb$$

Thus, if Rc is decreased in direct proportion to tb, then there is no increase of stress on the membrane in this region. However, if this ratio is reduced in a manner that decreases Rc to a greater ratio than tb then parameters must be balanced. Thus, decreasing tb with respect to Rc requires the rolling diaphragm and/or bellows to carry a heavier stress due to pressure, but makes for a reduced stress level due to bending. The pressure-based load is essentially constant, so this may be favorable—since the bending load is cyclic, therefore it is the bending load component that ultimately limits fatigue life.

For bending stress reduction, tb ideally should be at a minimum, and Rc ideally should be at a maximum. E ideally is also at a minimum. For hoop stress reduction, Rc ideally is small, and tb ideally is large.

Thus, the critical parameters for the rolling diaphragm and/or bellows membrane material are:

E, Elastic Modulus of the membrane material;

tb, membrane thickness (and/or fiber diameter);

Sut, Ultimate tensile strength of the rolling diaphragm and/or bellows; and

Slcf, The limiting fatigue strength of the rolling diaphragm and/or bellows.

Thus, from E, tb and Sut, the minimum acceptable Rc may be calculated. Next, using Rc, Slcf, and tb, the maximum Pd may be calculates. Rc may be adjusted to shift the bias of load (stress) components between the steady state pressure stress and the cyclic bending stress. Thus, the ideal rolling diaphragm and/or bellows material is extremely thin, extremely strong in tension, and very limber in flexion.

Thus, in some embodiments, the rolling diaphragm and/or bellows material (sometimes referred to as a "membrane"), is made from carbon fiber nanotubes. However, additional small fiber materials may also be used, including, but not limited to nanotube fibers that have been braided, nanotube untwisted yarn fibers, or any other conventional materials, including but not limited to KEVLAR, glass, polyester, synthetic fibers and any other material or fiber having a desirable diameter and/or other desired parameters as described in detail above.

8.6 Piston Seals and Piston Rod Seals

Referring now to FIG. 74G, an embodiment of the machine is shown wherein an engine 51326, such as a Stirling cycle engine, includes at least one piston rod seal 51314, a piston seal 51324, and a piston guide ring 51322, (shown as 51616 in FIG. 77). Various embodiments of the piston seal 51324 and the piston guide ring 51322 are further discussed below, and in U.S. Patent Application Pub. No. US 2003/0024387 A1 to Langenfeld et al., Feb. 6, 2003 (now abandoned), which, as mentioned before, is incorporated by reference.

FIG. 77 shows a partial cross section of the piston 51600, driven along the central axis 51602 of cylinder, or the cylinder 51604. The piston seal (shown as 51324 in FIG. 74G) may include a seal ring 51606, which provides a seal against the contact surface 51608 of the cylinder 51604. The contact surface 51608 is typically a hardened metal (preferably 58-62 RC) with a surface finish of 12 RMS or smoother. The contact surface 51608 may be metal which has been case hardened, such as 8260 hardened steel, which may be easily case hardened and may be ground and/or honed to achieve a desired finish. The piston seal may also include a backing ring 51610, which is sprung to provide a thrust force against the seal ring 51606 thereby providing sufficient contact pressure to ensure sealing around the entire outward surface of the seal ring 51606. The seal ring 51606 and the backing ring 51610 may together be referred to as a piston seal composite ring. In some embodiments, the at least one piston seal may seal off a warm portion of cylinder 51604 from a cold portion of cylinder 51604.

Referring now to FIG. 78, some embodiments include a piston rod seal (shown as 51314 in FIG. 74G) mounted in the piston rod cylinder wall 51700, which, in some embodiments, may include a seal ring 51706, which provides a seal against the contact surface 51708 of the piston rod 51604 (shown as 51302 in FIG. 74G). The contact surface 51708 in some embodiments is a hardened metal (preferably 58-62 RC) with a surface finish of 12 RMS or smoother. The contact surface 51708 may be metal which has been case hardened, such as 58260 hardened steel, which may be easily case hardened and may be ground and/or honed to achieve a desired finish. The piston seal may also include a backing ring 51710, which is sprung to provide a radial or hoop force against the seal ring 51706 thereby providing sufficient contact hoop stress to ensure sealing around the entire inward surface of seal ring 51706. The seal ring 51706 and the backing ring 51710 may together be referred to as a piston rod seal composite ring.

In some embodiments, the seal ring and the backing ring may be positioned on a piston rod, with the backing exerting an outward pressure on the seal ring, and the seal ring may come into contact with a piston rod cylinder wall 51702. These embodiments require a larger piston rod cylinder length than the previous embodiment. This is because the contact surface on the piston rod cylinder wall 51702 will be longer than in the previous embodiment, where the contact surface 51708 lies, on the piston rod itself. In yet another embodiment, piston rod seals may be any functional seal known in the art including, but not limited to, an o-ring, a graphite clearance seal, graphite piston in a glass cylinder, or any air pot, or a spring energized lip seal. In some embodiments, anything having a close clearance may be used, in other embodiments, anything having interference, for example, a seal, is used. In the exemplary embodiment, a spring energized lip seal is used. Any spring energized lip seal may be used, including those made by BAL SEAL Engineering, Inc., Foothill Ranch, Calif. In some embodiments, the seal used is a BAL SEAL Part Number X558604.

The material of the seal rings 51606 and 51706 is chosen by considering a balance between the coefficient of friction of the seal rings 51606 and 51706 against the contact surfaces 51608 and 51708, respectively, and the wear on the seal rings 51606 and 51706 it engenders. In applications in which piston lubrication is not possible, such as at the high operating temperatures of a Stirling cycle engine, the use of engineering plastic rings is used. The embodiments of the composition include a nylon matrix loaded with a lubricating and wear-resistant material. Examples of such lubricating materials include PTFE/silicone, PTFE, graphite, etc. Examples of wear-resistant materials include glass fibers and carbon fibers. Examples of such engineering plastics are manufactured by LNP Engineering Plastics, Inc. of Exton, Pa. Backing rings 51610 and 51710 is preferably metal.

The fit between the seal rings 51606 and 51706 and the seal ring grooves 51612 and 51712, respectively, is preferably a clearance fit (about 0.002"), while the fit of the backing rings 51610 and 51710 is preferably a looser fit, of the order of about 0.005" in some embodiments. The seal rings 51606 and 51706 provide a pressure seal against the contact surfaces 51608 and 51708, respectively, and also one of the surfaces 51614 and 51714 of the seal ring grooves 51612 and 51712, respectively, depending on the direction of the pressure difference across the rings 51606 and 51706 and the direction of the piston 51600 or the piston rod 51704 travel.

FIGS. 79A and 79B show that if the backing ring 51820 is essentially circularly symmetrical, but for the gap 51800, it will assume, upon compression, an oval shape as shown by the dashed backing ring 51802. The result may be an uneven radial or hoop force (depicted by arrows 51804) exerted on the seal ring (not shown, shown as 51606 and 51706 in FIGS. 77 and 78), and thus an uneven pressure of the seal rings against the contact surfaces (not shown, shown as 51608 and 51708 in FIGS. 77 and 78) respectively, causing uneven wear of the seal rings and in some cases, failure of the seals.

A solution to the problem of uneven radial or hoop force exerted by the piston seal backing ring 51820, in accordance with an embodiment, is a backing ring 51822 having a cross-section varying with circumferential displacement from the gap 51800, as shown in FIGS. 79C and 79D. A tapering of the width of the backing ring 51822 is shown from the position denoted by numeral 51806 to the position denoted by numeral 51808. Also shown in FIGS. 79C and 79D is a lap joint 51810 providing for circumferential closure of the seal ring 51606. As some seals will wear significantly over their lifetime, the backing ring 51822 should provide an even pressure (depicted by numeral 51904 in FIG. 80B) of a range of movement. The tapered backing ring 51822 shown in FIGS. 79C and 79D may provide this advantage.

FIGS. 80A and 80B illustrate another solution to the problem of uneven radial or hoop force of the piston seal ring against the piston cylinder, in accordance with some embodiments. As shown in FIG. 80B, backing ring 51910 is fashioned in an oval shape, so that upon compression within the cylinder, the ring assumes the circular shape shown by dashed backing ring 51902. A constant contact pressure between the seal ring and the cylinder contact surface may thus be provided by an even radial force 51904 of backing ring 51902, as shown in FIG. 80B.

A solution to the problem of uneven radial or hoop force exerted by the piston rod seal backing ring, in accordance with some embodiments, is a backing ring 51824 having a cross-section varying with circumferential displacement from gap 51812, as shown in FIGS. 79E and 79F. A tapering of the width of backing ring 51824 is shown from the position denoted by numeral 51814 to the position denoted by numeral 51816. Also shown in FIGS. 79E and 79F is a lap joint 51818 providing for circumferential closure of seal ring 51706. As some seals will wear significantly over their lifetime, backing ring 51824 should provide an even pressure (depicted by numeral 52004 in FIG. 81B) of a range of movement. The tapered backing ring 51824 shown in FIGS. 79E and 79F may provide this advantage.

FIGS. 81A and 81B illustrate another solution to the problem of uneven radial or hoop force of the piston rod seal ring against the piston rod contact surface, in accordance with some embodiments. As shown in FIG. 81A, backing ring (shown by dashed backing ring 52000) is fashioned as an oval shape, so that upon expansion within the cylinder, the ring assumes the circular shape shown by backing ring 52002. A constant contact pressure between the seal ring 51706 and the cylinder contact surface may thus be provided by an even radial thrust force 52004 of backing ring 52002, as shown in FIG. 81B.

Referring again to FIG. 77, at least one guide ring 51616 may also be provided, in accordance with some embodiments, for bearing any side load on piston 51600 as it moves up and down the cylinder 51604. Guide ring 51616 is also preferably fabricated from an engineering plastic material loaded with a lubricating material. A perspective view of guide ring 51616 is shown in FIG. 85. An overlapping joint 52100 is shown and may be diagonal to the central axis of guide ring 51616.

8.7 Lubricating Fluid Pump and Lubricating Fluid Passageways

Referring now to FIG. 83, a representative illustration of one embodiment of the engine 52200 for the machine is shown having a rocking beam drive 52202 and lubricating fluid 52204. In some embodiments, the lubricating fluid is oil. The lubricating fluid is used to lubricate engine parts in the crankcase 52206, such as hydrodynamic pressure fed lubricated bearings. Lubricating the moving parts of the engine 52200 serves to further reduce friction between engine parts and further increase engine efficiency and engine life. In some embodiments, lubricating fluid may be placed at the bottom of the engine, also known as an oil sump, and distributed throughout the crankcase. The lubricating fluid may be distributed to the different parts of the engine 52200 by way of a lubricating fluid pump, wherein the lubricating fluid pump may collect lubricating fluid from the sump via a filtered inlet. In the exemplary embodiment, the lubricating fluid is oil and thus, the lubricating fluid pump is herein referred to as an oil pump. However, the term "oil pump" is used only to describe the exemplary embodiment and other embodiments where oil is used as a lubricating fluid, and the term shall not be construed to limit the lubricating fluid or the lubricating fluid pump.

Referring now to FIGS. 84A and 84B, one embodiment of the engine is shown, wherein lubricating fluid is distributed to different parts of the engine 52200 that are located in the crankcase 52206 by a mechanical oil pump 52208. The oil pump 52208 may include a drive gear 52210 and an idle gear 52212. In some embodiments, the mechanical oil pump 52208 may be driven by a pump drive assembly. The pump drive assembly may include a drive shaft 52214 coupled to a drive gear 52210, wherein the drive shaft 52214 includes an intermediate gear 52216 thereon. The intermediate gear 52216 is preferably driven by a crankshaft gear 52220, wherein the crankshaft gear 52220 is coupled to the primary crankshaft 52218 of the engine 52200, as shown in FIG. 85. In this configuration, the crankshaft 52218 indirectly drives the mechanical oil pump 52208 via the crankshaft gear 52220, which drives the intermediate gear 52216 on the drive shaft 52214, which, in turn, drives the drive gear 52210 of the oil pump 52208.

The crankshaft gear 52220 may be positioned between the crankpins 52222 and 52224 of crankshaft 52218 in some embodiments, as shown in FIG. 85. In other embodiments, the crankshaft gear 52220 may be placed at an end of the crankshaft 52218, as shown in FIGS. 86A-86C.

For ease of manufacturing, the crankshaft 52218 may be composed of a plurality of pieces. In these embodiments, the crankshaft gear 52220 may be to be inserted between the crankshaft pieces during assembly of the crankshaft.

The drive shaft 52214, in some embodiments, may be positioned perpendicularly to the crankshaft 52218, as shown in FIGS. 84A and 84B. However, in some embodiments, the drive shaft 52214 may be positioned parallel to the crankshaft 52218, as shown in FIGS. 86B and 86C.

In some embodiments, the crankshaft gear 52234 and the intermediate gear 52232 may be sprockets, wherein the crankshaft gear 52234 and the intermediate gear 52232 are coupled by a chain 52226, as shown in FIG. 86C. In such an embodiments, the chain 52226 is used to drive a chain drive pump (shown as 52600 in FIGS. 87A through 87C).

In some embodiments, the gear ratio between the crankshaft 52218 and the drive shaft 52214 remains constant throughout operation. In such an embodiment, it is important to have an appropriate gear ratio between the crankshaft and the drive shaft, such that the gear ratio balances the pump speed and the speed of the engine. This achieves a specified flow of lubricant required by a particular engine RPM (revolutions per minute) operating range.

In some embodiments, lubricating fluid is distributed to different parts of an engine by an electric pump. The electric pump eliminates the need for a pump drive assembly, which is otherwise required by a mechanical oil pump.

Referring back to FIGS. 84A and 84B, the oil pump 52208 may include an inlet 52228 to collect lubricating fluid from the sump and an outlet 52230 to deliver lubricating fluid to the various parts of the engine. In some embodiments, the rotation of the drive gear 52212 and the idle gear 52210 cause the lubricating fluid from the sump to be drawn into the oil pump through the inlet 52228 and forced out of the pump through the outlet 52230. The inlet 52228 preferably includes a filter to remove particulates that may be found in the lubricating fluid prior to its being drawn into the oil pump. In some embodiments, the inlet 52228 may be connected to the sump via a tube, pipe, or hose. In some embodiments, the inlet 52228 may be in direct fluid communication with the sump.

In some embodiments, the oil pump outlet 52230 is connected to a series of passageways in the various engine parts, through which the lubricating fluid is delivered to the various engine parts. The outlet 52230 may be integrated with the passageways so as to be in direct communication with the passageways, or may be connected to the passageways via a hose or tube, or a plurality of hoses or tubes. The series of passageways are preferably an interconnected network of passageways, so that the outlet 52230 may be connected to a single passageway inlet and still be able to deliver lubricating fluid to the engine's lubricated parts.\

FIGS. 88A-88D show one embodiments, wherein the oil pump outlet (shown as 52230 in FIG. 84B) is connected to a passageway 52700 in the rocker shaft 52702 of the rocking beam drive 52704. The rocker shaft passageway 52700 delivers lubricating fluid to the rocker pivot bearings 52706, and is connected to and delivers lubricating fluid to the rocking beam passageways (not shown). The rocking beam passageways deliver lubricating fluid to the connecting wrist pin bearings 52708, the link rod bearings 52710, and the link rod passageways 52712. The link rod passageways 52712 deliver lubricating fluid to the piston rod coupling bearing 52714. The connecting rod passageway (not shown) of the connecting rod 52720 delivers lubricating fluid to a first crank pin

52722 and the crankshaft passageway 52724 of the crankshaft 52726. The crankshaft passageway 52724 delivers lubricating fluid to the crankshaft journal bearings 52728, the second crank pin bearing 52730, and the spline shaft passageway 52732. The spline shaft passageway 52732 delivers lubricating fluid to the spline shaft spline joints 52734 and 52736. The oil pump outlet (not shown, shown in FIG. 84B as 52230) in some embodiments is connected to the main feed 52740. In some embodiments, an oil pump outlet may also be connected to and provide lubricating fluid to the coupling joint linear bearings 52738. In some embodiments, an oil pump outlet may be connected to the linear bearings 52738 via a tube or hose, or plurality of tubes or hoses. Alternatively, the link rod passageways 52712 may deliver lubricating fluid to the linear bearings 52738.

Thus, the main feed 52740 delivers lubricating fluid to the journal bearings surfaces 52728. From the journal bearing surfaces 52728, the lubricating fluid is delivered to the crankshaft main passage. The crankshaft main passage delivers lubricating fluid to both the spline shaft passageway 52732 and the connecting rod bearing on the crank pin 52724.

Lubricating fluid is delivered back to the sump, preferably by flowing out of the aforementioned bearings and into the sump. In the sump, the lubricating fluid will be collected by the oil pump and redistributed throughout the engine.

8.8 Distribution

As described above, various embodiments of the system, methods and apparatus may advantageously provide a low-cost, easily maintained, highly efficient, portable, and failsafe system that may provide a reliable source of drinking water for use in all environments regardless of initial water quality. The system is intended to produce a continuous stream of potable or purified water, for drinking or medical applications, for example, on a personal or limited community scale using a portable power source and moderate power budget. As an example, in some embodiments, the water vapor distillation apparatus and/or water vending apparatus may be utilized to produce at least approximately 10 gallons of water per hour on a power budget of approximately 500 watts. This may be achieved through a very efficient heat transfer process and a number of sub-system design optimizations.

The various embodiments of the water vapor distillation apparatus and water vending apparatus may be powered by a battery, electricity source or by a generator, as described herein. The battery may be a stand alone battery or could be connected to a motor transport apparatus, such as a scooter, any other motor vehicle, which some cases may be a hybrid motor vehicle or a battery powered vehicle.

In one embodiment, the system may be used in the developing world or in a remote village or remote living quarters. The system is especially advantageous in communities with any one or more of the following, for example (but not by limitation): unsafe water of any kind at any time, little to no water technical expertise for installation, unreliable access to replacement supplies, limited access to maintenance and difficult operating environment.

The system acts to purify any input source and transform the input source to high-quality output, i.e., cleaner water. In some applications the water vapor distillation apparatus may be in a community that does not have any municipal infrastructure to provide source water. Thus, in these situations an embodiment of the water vapor distillation apparatus may be capable of accepting source water having varying qualities of purity.

The system is also easy to install and operate. The water vapor distillation apparatus is designed to be an autonomous system. This apparatus may operate independently without having to be monitored by operators. This is important because, in many of the locations where the water vapor distillation apparatus may be installed and or utilized, mechanics may be rare or unreliable.

The system has minimal maintenance requirement. In the exemplary embodiments, the system does not require any consumables and/or disposables, thus, the system itself may be utilized for a period of time absent replacing any elements or parts. This is important because in many applications the water vapor distillation apparatus may be located in a community that lacks people having technical expertise to maintain mechanical devices such as the water vapor distillation apparatus. The system is also inexpensive, making it an option for any community.

In addition, the water vapor distillation apparatus may be used in any community where clean drinking water is not readily or sufficiently available. For example, communities that have both a utility to provide electricity to operate the water vapor distillation device and municipal water to supply the apparatus.

Thus, the water vapor distillation apparatus may be used in communities that may have a utility grid for supply electricity but no clean drinking water. Conversely, the community may have municipal water that is not safe and no utility grid to supply electricity. In these applications, the water vapor distillation apparatus may be powered using devices including, but not limited to a Stirling engine, an internal combustion engine, a generator, batteries or solar panels. Sources of water may include but are not limited to local streams, rivers, lakes, ponds, or wells, as well as, the ocean.

In communities that have no infrastructure the challenge is to locate a water source and be able to supply power to operate the water vapor distillation apparatus. As previously discussed, the water vapor distillation apparatus may be power using several types of devices.

In this type of situation one likely place to install a water vapor distillation apparatus may be in the community clinic or health centers. These places typically have some form of power source and are accessible to the most members of the community.

Again, as described herein, sources of electricity may include a Stirling engine. This type of engine is well suited for application in the water machine because the engine provides a sufficient amount of electrical power to operate the machine without significantly affecting the size of the machine.

The water vapor distillation apparatus may supply approximately between 50 and 250 people per day with water. In the exemplary embodiment, the output is 30 liters per hour. This production rate is suitable for a small village or community's needs. The energy needs include approximately 900 Watts. Thus, the energy requirements are minimal to power the water vapor distillation apparatus. This low power requirement is suitable to a small/remote village or community. Also, in some embodiments, a standard outlet is suitable as the electrical source. The weight of the water vapor distillation apparatus is approximately 90 Kg, in the exemplary embodiment, and the size (H×D×W)−160 cm×50 cm×50 cm.

Knowledge of operating temperatures, TDS, and fluid flows provides information to allow production of potable water under a wide range of ambient temperatures, pressures, and dissolved solid content of the source water. One particular embodiment may utilize a control method whereby such measurements (T, P, TDS, flow rates, etc) are used in conjunction with a simple algorithm and look-up table allowing an operator or computer controller to set operating parameters for optimum performance under existing ambient conditions.

In some embodiments, the apparatus may be incorporated as part of a system for distributing water. Within this system may include a monitoring system. This monitoring system may include, but is not limited to having an input sensor for measuring one or more characteristics of the input to the generation device and an output sensor for measuring consumption or other characteristic of output from the generation device. The monitoring system may have a controller for concatenating measured input and consumption of output on the basis of the input and output sensors.

Where the generation device of a particular utility of a network is a water vapor distillation apparatus, the input sensor may be a flow rate monitor. Moreover, the output sensor may be a water quality sensor including one or more of torpidity, conductivity, and temperature sensors.

The monitoring system may also have a telemetry module for communicating measured input and output parameters to a remote site, either directly or via an intermediary device such as a satellite, and, moreover, the system may include a remote actuator for varying operating parameters of the generator based on remotely received instructions. The monitoring system may also have a self-locating device, such as a GPS receiver, having an output indicative of the location of the monitoring system. In that case, characteristics of the measured input and output may depend upon the location of the monitoring system.

The monitoring system described above may be included within a distributed network of utilities providing sources of purified water. The distributed network has devices for generating water using input sensors for measuring inputs to respective generators; output sensor for measuring consumption of output from respective generators, and a telemetry transmitter for transmitting input and output parameters of a specified generator. Finally, the distributed network may have a remote procesor for receiving input and output parameters from a plurality of utility generators.

Referring now to FIG. 55, this figure depicts monitoring generation device 4202. Generation device 4202 may be a water vapor distillation apparatus as disclosed herein. Generation device 4202 may typically be characterized by a set of parameters that describe its current operating status and conditions. Such parameters may include, without limitation, its temperature, its input or output flux, etc., and may be subject to monitoring by means of sensors, as described in detail below.

Still referring to FIG. 55, source water enters the generation device 4202 at inlet 4204 and leaves the generation device at outlet 4206. The amount of source water 4208 entering generation device 4202 and the amount of purified water 4210 leaving generation device 4202 may be monitored through the use of one or more of a variety of sensors commonly used to determine flow rate, such as sensors for determining them temperature and pressure or a rotometer, located at inlet sensor module 4212 and/or at outlet sensor module 4214, either on a per event or cumulative basis. Additionally, the proper functioning of the generation device 4202 may be determined by measuring the turpidity, conductivity, and/or temperature at the outlet sensor module 4214 and/or the inlet sensor module 4212. Other parameters, such as system usage time or power consumption, either per event or cumulatively, may also be determined. A sensor may be coupled to an alarm or shut off switch that may be triggered when the sensor detects a value outside a pre-programmed range.

When the location of the system is known, either through direct input of the system location or by the use of a GPS location detector, additional water quality tests may be run based on location, including checks for known local water contaminates, utilizing a variety of detectors, such as antibody chip detectors or cell-based detectors. The water quality sensors may detect an amount of contaminates in water. The sensors may be programmed to sound an alarm if the water quality value rises above a pre-programmed water quality value. The water quality value is the measured amount of contaminates in the water. Alternatively, a shut off switch may turn off the generation device if the water quality value rises about a pre-programmed water quality value.

Further, scale build-up in the generation device 4202, if any, may be determined by a variety of methods, including monitoring the heat transfer properties of the system or measuring the flow impedance. A variety of other sensors may be used to monitor a variety of other system parameters.

Still referring to FIG. 55, the sensors described above may be used to monitor and/or record the various parameters described above onboard the generation device 4202, or in an alternative embodiment the generation device 4202 may be equipped with a communication system 4214, such as a cellular communication system. The communication system 4214 could be an internal system used solely for communication between the generation device 4202 and the monitoring station 4216. Alternatively, the communication system 4214 could be a cellular communication system that includes a cellular telephone for general communication through a cellular satellite system 4218. The communication system 4214 may also employ wireless technology such as the Bluetooth open specification. The communication system 4214 may additionally include a GPS (Global Positioning System) locator.

Still referring to FIG. 55, the communication system 4214 enables a variety of improvements to the generation device 4202, by enabling communication with a monitoring station 4216. For example, the monitoring station 4216 may monitor the location of the generation device 4202 to ensure that use in an intended location by an intended user. Additionally, the monitoring station 4216 may monitor the amount of water and/or electricity produced, which may allow the calculation of usage charges. Additionally, the determination of the amount of water and/or electricity produced during a certain period or the cumulative hours of usage during a certain period, allows for the calculation of a preventative maintenance schedule. If it is determined that a maintenance call is required, either by the calculation of usage or by the output of any of the sensors used to determine water quality, the monitoring station 4216 may arrange for a maintenance visit. In the case that a GPS (Global Positioning System) locator is in use, monitoring station 4216 may determine the precise location of the generation device 4202 to better facilitate a maintenance visit. The monitoring station 4216 may also determine which water quality or other tests are most appropriate for the present location of the generation device 4202. The communication system 4214 may also be used to turn the generation device 4202 on or off, to pre-heat the device prior to use, or to deactivate the system in the event the system is relocated without advance warning, such as in the event of theft.

Now referring to FIG. 56, the use of the monitoring and communication system described above facilitates the use of a variety of utility distribution systems. An organization 43, such as a Government agency, non-governmental agency (NGO), or privately funded relief organization, a corporation, or a combination of these, could provide distributed utilities, such as safe drinking water or electricity, to a geographical or political area, such as an entire country. The organization 43 may then establish local distributors 44A, 44B, and 44C. These local distributors could preferably be a monitoring station 4216 (See FIG. 55) previously described. In one possible arrangement, organization 43 could provide some number of generation devices 4202 (See FIG. 55) to the local distributor 44, etc. In another possible arrangement, the organization 43 could sell, loan, or make other financial arrangements for the distribution of the generation devices 4202 (See FIG. 55). The local distributor 44, etc. could then either give these generation devices to operators 45, etc., or provide the generation devices 4202 (See FIG. 55) to the operators though some type of financial arrangement, such as a sale or micro-loan.

Still referring to FIG. 56, the operator 45 could then provide distributed utilities to a village center, school, hospital, or other group at or near the point of water access. In one exemplary embodiment, when the generation device 4202 (See FIG. 55) is provided to the operator 45 by means of a micro-loan, the operator 45 could charge the end users on a per-unit bases, such as per watt hour in the case of electricity or per liter in the case of purified water. Either the local distributor 44 or the organization 43 may monitor usage and other parameters using one of the communication systems described above. The distributor 44 or the organization 43 could then recoup some of the cost of the generation device 45 (See FIG. 55) or effect repayment of the micro-loan by charging the operator 4312 for some portion of the per-unit charges, such as 50%. The communication systems described additionally may be used to deactivate the generation device 4202 (See FIG. 55) if the generation device is relocated outside of a pre-set area or if payments are not made in a timely manner. This type of a distribution system may allow the distribution of needed utilities across a significant area quickly, while then allowing for at least the partial recoupment of funds, which, for example, could then be used to develop a similar system in another area.

Now referring to FIG. 57, this figure illustrates a conceptual flow diagram of one possible way to incorporate another embodiment of the water vapor distillation apparatus into a system. In an embodiment of this type, fluid flows through the system from an intake 4404 into an exchanger 4406 wherein exchanger 4406 receives heat from at least one of a plurality of sources including a condenser 4402, a head 4408, and exhaust (not shown) from a power source such as an internal or external combustion engine. Fluid continues flowing past heat exchanger 4406 into a sump 4410 and into a core 4412 in thermal contact with condenser 4402. In the core 4412, the fluid is partially vaporized. From core 4412, the vapor path proceeds into head 4408 in communication with a compressor 4414, and from there into condenser 4402. After the vapor has condensed, fluid proceeds from condenser 4402 through heat exchanger 4406, and finally into an exhaust region 4416 and then out as final distilled product.

Referring to FIGS. 57 and 57A, a power source 4418 may be used to power the overall system. Power source 4418 may be coupled to a motor (not shown) that is used to drive compressor 4414, particularly when compressor 4414 is a steam pump, such as a liquid ring pump or a regenerative blower. The power source 4418 may also be used to provide electrical energy to the other elements of the apparatus shown in FIG. 57. Power source 4418 may be, for example, an electrical outlet, a standard internal combustion (IC) generator or an external combustion generator. In one exemplary embodiment, the power source is a Stirling cycle engine. An IC generator and an external combustion generator advantageously produce both power and thermal energy as shown in FIG. 57A, where engine 4420 produces both mechanical and thermal energy. Engine 4420 may be either an internal combustion engine or an external combustion engine. A generator 4422, such as a permanent magnet brushless motor, is coupled to a crankshaft of the engine 4420 and converts the mechanical energy produced by the engine 4420 to electrical energy, such as power 4424. Engine 4420 also produces exhaust gases 4426 and heat 4428. The thermal energy produced by the engine 4420 in the form of exhaust gas 4426 and heat 4428 may be advantageously used to provide heat to the system.

Referring to FIG. 57, heat from a power source 4418 may be recaptured by channeling the exhaust into the insulated cavity that surrounds the apparatus, which may lie between external housing and the individual apparatus components. In one embodiment, exhaust may blow across a finned heat exchanger that heats source fluid prior to entering the evaporator/condenser 4402. In other embodiments, the source fluid flows past a tube-in-tube heat exchanger as described above with reference to the exemplary embodiment.

Referring now to FIG. 89A, one embodiment of the system is shown. The system includes two basic functional components that may be combined within a single integral unit or may be capable of separate operation and coupled as described herein for the purpose of local water purification. FIG. 89A depicts an of the system in which a power unit 528010 is coupled electrically, via cable 528014, to provide electrical power to a water vapor distillation apparatus 528012, with exhaust gas from the power unit 528010 coupled to convey heat to the water distillation unit 528012 via an exhaust duct 528016.

In the exemplary embodiment, the power unit 528010 is a Stirling cycle engine. The Stirling cycle engine may be any of the embodiments described herein. Thermal cycle engines are limited, by second law of thermodynamics, to a fractional efficiency, i.e., a Carnot efficiency of (TH−TC)/TH, where TH and TC are the temperatures of the available heat source and ambient thermal background, respectively. During the compression phase of a heat engine cycle, heat must be exhausted from the system in a manner not entirely reversible, thus there will always be a surfeit of exhaust heat. More significantly, moreover, not all the heat provided during the expansion phase of the heat engine cycle is coupled into the working fluid. Here, too, exhaust heat is generated that may be used advantageously for other purposes. The total heat thermodynamically available (i.e., in gas hotter than the ambient environment) in the burner exhaust is typically on the order of 10% of the total input power. For a power unit delivering on the order of a kilowatt of electrical power, as much as 700 W of heat may be available in an exhaust stream of gas at temperatures in the vicinity of 200° C. In accordance with embodiments of the present apparatus, system and methods, the exhaust heat, as well as the electrical power generated by an engine-powered generator, are used in the purification of water for human consumption, thereby advantageously providing an integrated system to which only raw water and a fuel need be provided.

Moreover, external combustion engines, such as Stirling cycle engines, are capable of providing high thermal efficiency and low emission of pollutants, when such methods are employed as efficient pumping of oxidant (typically, air, and, referred to herein and in any appended claims, without limitation, as “air”) through the burner to provide combustion, and the recovery of hot exhaust leaving the heater head. In many applications, air is pre-heated, prior to combustion, nearly to the temperature of the heater head, so as to achieve the stated objectives of thermal efficiency. However, the high temperature of preheated air, desirable for achieving high thermal efficiency, complicates achieving low-emission goals by making it difficult to premix the fuel and air and by requiring large amounts of excess air in order to limit the flame temperature. Technology directed toward overcoming these difficulties in order to achieve efficient and low-emission operation of thermal engines is described, for example, in U.S. Pat. No. 6,062,023 (Kerwin, et al.) issued May 16, 2000, and incorporated herein by reference.

External combustion engines are, additionally, conducive to the use of a wide variety of fuels, including those most available under particular local circumstances; however the teachings of the present description are not limited to such engines, and internal combustion engines are also within the scope of the current disclosure. Internal combustion engines, however, impose difficulties due to the typically polluted nature of the exhausted gases, and external combustion engines are preferably employed.

Still referring to FIG. 89A, an embodiment of a power unit 528010 is shown schematically in FIG. 89B. Power unit 528010 includes an external combustion engine 528101 coupled to a generator 528102. In an exemplary embodiment, the external combustion engine 528101 is a Stirling cycle engine. The outputs, of the Stirling cycle engine 528101 during operation include both mechanical energy and residual heat energy. Heat produced in the combustion of a fuel in a burner 528104 is applied as an input to the Stirling cycle engine 528101, and partially converted to mechanical energy. The unconverted heat or thermal energy accounts for approximately 65 to 85% of the energy released in the burner 528104. The ranges given herein are approximations and the ranges may vary depending on the embodiment of water vapor distillation apparatus used in the system and the embodiment of the Stirling engine (or other generator) used in the system.

This heat is available to provide heating to the local environment around the power unit 528110 in two forms: a smaller flow of exhaust gas from the burner 528104 and a much larger flow of heat rejected at the cooler 528103 of the Stirling engine. Power unit 528110 may also be referred to as an auxiliary power unit (APU). The exhaust gases are relatively hot, typically 100 to 300° C., and represent 10 to 20% of the thermal energy produced by the Stirling engine 528101. The cooler rejects 80 to 90% of the thermal energy at 10 to 20° C. above the ambient temperature. The heat is rejected to either a flow of water or, more typically, to the air via a radiator 528107. Stirling cycle engine 528101 is preferably of a size such that power unit 528010 is transportable.

As shown in FIG. 89B, Stirling engine 528101 is powered directly by a heat source such as burner 528104. Burner 528104 combusts a fuel to produce hot exhaust gases which are used to drive the Stirling engine 528101. A burner control unit 528109 is coupled to the burner 528104 and a fuel canister 528110. Burner control unit 528109 delivers a fuel from the fuel canister 528110 to the burner 528104. The burner controller 528109 also delivers a measured amount of air to the burner 528104 to advantageously ensure substantially complete combustion. The fuel combusted by burner 528104 is preferably a clean burning and commercially available fuel such as propane. A clean burning fuel is a fuel that does not contain large amounts of contaminants, the most important being sulfur. Natural gas, ethane, propane, butane, ethanol, methanol and liquefied petroleum gas ("LPG") are all clean burning fuels when the contaminants are limited to a few percent. One example of a commercially available propane fuel is HD-5, an industry grade defined by the Society of Automotive Engineers and available from Bernzomatic. In accordance with an embodiment of the system, and as discussed in more detail below, the Stirling engine 528101 and burner 528104 provide substantially complete combustion in order to provide high thermal efficiency as well as low emissions. The characteristics of high efficiency and low emissions may advantageously allow use of power unit 528010 indoors.

Generator 528102 is coupled to a crankshaft (not shown) of Stirling engine 528101. It should be understood to one of ordinary skill in the art that the term generator encompasses the class of electric machines such as generators wherein mechanical energy is converted to electrical energy or motors wherein electrical energy is converted to mechanical energy. The generator 528102 is preferably a permanent magnet brushless motor. A rechargeable battery 528113 provides starting power for the power unit 528010 as well as direct current ("DC") power to a DC power output 528112. In a further embodiment, APU 528010 also advantageously provides alternating current ("AC") power to an AC power output 528114. An inverter 528116 is coupled to the battery 528113 in order to convert the DC power produced by battery 528113 to AC power. In the embodiment shown in FIG. 89B, the battery 528113, inverter 528116 and AC power output 528114 are disposed within an enclosure 528120.

Utilization of the exhaust gas generated in the operation of power unit 528010 is now described with reference to the schematic depiction of an embodiment of the system shown in FIG. 89B. Burner exhaust is directed through a heat conduit 528016 into enclosure 528504 of the water vapor distillation apparatus unit designated generally by numeral 528012. Heat conduit 528016 is preferably a hose that may be plastic or corrugated metal surrounded by insulation, however all means of conveying exhaust heat from power unit 528010 to water purification unit 528012 are within the scope of the system. The exhaust gas, designated by arrow 528502, blows across a heat exchanger 528506 (in the exemplary embodiment, a hose-in-hose heat exchanger is used, in other embodiments, a finned heat exchanger is used), thereby heating the source water stream 528508 as it travels to the water vapor distillation (which is also referred to herein as a "still") evaporator 528510. The hot gas 528512 that fills the volume surrounded by insulated enclosure 528504 essentially removes all thermal loss from the still system since the gas temperature within the insulated cavity is hotter than surface 528514 of the still itself. Thus, there is substantially no heat flow from the still to the ambient environment, and losses on the order of 75 W for a still of 10 gallon/hour capacity are thereby recovered. A microswitch 528518 senses the connection of hose 528016 coupling hot exhaust to purification unit 528012 so that operation of the unit may account for the influx of hot gas.

In accordance with alternate embodiments adding heat to exhaust stream 528502 is within the scope of the system, whether through addition of a post-burner (not shown) or using electrical power for ohmic heating.

During initial startup of the system, power unit 528010 is activated, providing both electrical power and hot exhaust. Warm-up of the still 528012 is significantly accelerated since the heat exchanger 528506 is initially below the dew point of the moisture content of the exhaust, since the exhaust contains water as a primary combustion product. The heat of vaporization of this water content is available to heat source water as the water condenses on the fins of the heat exchanger. The heat of vaporization supplements heating of the heat exchanger by convection of hot gas within the still cavity. For example, in the fin heat exchanger embodiment, heating of the fins by convection continues even after the fins reach the dew point of the exhaust.

In accordance with other embodiments of the system, power unit 528010 and still 528012 may be further integrated by streaming water from the still through the power unit for cooling purposes. The use of source water for cooling presents problems due to the untreated nature of the water. Whereas using the product water requires an added complexity of the system to allow for cooling of the power unit before the still has warmed up to full operating conditions.

Referring again to FIG. 57, other embodiments may include the use of additives in solid form, wherein such additives could be embedded in a time-release matrix inserted into the flow-through channel of intake 4404. In one particular embodiment, replacement additive would need to be inserted periodically by the user. In yet another embodiment, a powder form of an additive could be added in a batch system wherein the powder is added, for example in tablet form, to an external reservoir containing water to be purified wherein the additive is uniformly mixed, similar to the batch system for adding liquid additives described above.

Still referring to FIG. 57, pre-treatment of the source water may occur prior to or within intake 4404. Pre-treatment operations may include, but is not limited to gross-filtering; treatment with chemical additives such as polyphosphates, polyacetates, organic acids, or polyaspartates; and electrochemical treatment such as an oscillating magnetic field or an electrical current; degassing; and UV treatment. Additives may be added in liquid form to the incoming liquid stream using a continuous pumping mechanism such as a roller pump or pulsatile pump, including a standard diaphragm pump or piezoelectric diaphragm pump. Alternatively, the additives may be added by a semi-continuous mechanism using, for example, a syringe pump, which would require a re-load cycle, or a batch pumping system, wherein a small volume of the additive would be pumped into a holding volume or reservoir external to the system that uniformly mixes the additive with the liquid before the liquid flows into the system. It is also envisioned that the user could simply drop a prescribed volume of the additive into, for example, a bucket containing the liquid to be purified. Liquid additive may be loaded as either a lifetime quantity (i.e., no consumables for the life of the machine), or as a disposable amount requiring re-loading after consumption.

Still referring to FIG. 57, similarly post-treatment of the product water may occur preferably within an external output region (not shown). Post-treatment operations may include, but is not limit to taste additives such as sugar-based additives for sweetening, acids for tartness, and minerals. Other additives, including nutrients, vitamins, stabilized proteins such as creatinine, and fats, and sugars may also be added. Such additives may be added either in liquid or solid form, whether as a time-release tablet through which the output liquid flows or a powder added to an external reservoir such as through a batch system. Alternatively, the additive may be added to the output liquid via an internal coating of a separate collection reservoir or container, for example, by leaching or dissolution on contact. In such embodiments, the ability to detect purified liquid with and without the additive may be preferred. Detection systems in accordance with various embodiments include pH analysis, conductivity and hardness analysis, or other standard electrical-based assays. Such detection systems allow for replacement of additives, as needed, by triggering a signal mechanism when the additive level/quantity is below a pre-set level, or is undetectable.

In another embodiment, liquid characteristics, such as for example water hardness, is monitored in the output and may be coupled with an indicator mechanism which signals that it is preferable to add appropriate additives.

In yet another embodiment, ozone is systemically generated using, for example, electric current or discharge methods, and added to the output product for improved taste. Alternatively, air may be pumped through a HEPA filter bubbling through the product water to improve palatability of the water.

Similarly, it is envisioned that other embodiments may include means for detecting nucleic acids, antigens and bioorganisms such as bacteria. Examples of such detection means include nanoscale chemistry and biochemistry microarrays known in the field and currently commercially available. Such arrays may also be used to monitor the presence and/or absence of nutrients and other additives in the purified product, as discussed above.

9. Remote Monitoring of Entire System

In various embodiments it may be possible to remotely monitor and control the vending apparatus. It may be possible to remotely monitor the power source, which, in some embodiments, may be a Stirling cycle generator, and the vending device. In some embodiments, the remote monitoring system may track vending information such as, but not limited to, a usage profile, the amount of water dispensed daily, the nutraceuticals and/or flavorings and/or other additives dispensed; if the water runs out or if it remains full at the end of the day, information about system errors or out of specification performance of the system, etc. This information may be used to remotely change the production rate of the vending apparatus and/or the supply of nutraceuticals and/or flavoring and/or other additives, as to accommodate the water usage in the area. In some embodiments, if the vending apparatus uses an alternate power source as a primary power source and has a Stirling cycle generator as an alternate source, if the primary power source terminates, the monitoring system may send a signal to remotely begin the Stirling generator to continue to produce water through the vending machine. Alternately, if the Stirling cycle generator is the primary power source and the user has not paid for use of the vending apparatus for an extended time, a signal may be sent to turn off the Stirling cycle generator and end production of water until the user pays for the service.

Using the remote monitoring system, blowdown flow rate, water consumption, production and efficiency may be monitored as well. In some embodiments, after monitoring the blowdown and production conductivities, the data may show the blowdown is larger than necessary and may decrease the amount of blowdown from the device therefore decreasing the amount of source water used through this remote monitoring system. The system may also monitor the information about forming the vessels if the embodiment implementing the bottle forming process along with the remote monitoring of the system.

When a vending apparatus includes additives and mixing chambers, the additives may need to be monitored to inform users if the additives need replacement. This remote monitoring system may monitor additive levels and inform users prior to complete depletion of the additive that the additive needs replacement.

The remote monitoring may send signals on general health of the apparatus, such as the temperature of the purification system, the pressure used in purification, the power used in the device, quality of product water, flow rate, etc.

10. Remote Monitoring System

The various embodiments of the water vapor distillation apparatus described above may, in some embodiment, contain a monitoring system for distributed utilities (also may be referred to as a remote monitoring system). In the exemplary embodiment, the remote monitoring system is a monitoring system described in pending U.S. Patent Application Pub. No. US 2007/0112530 published May 17, 2007 entitled "Systems and Methods for Distributed Utilities," the contents of which are hereby incorporated by reference herein.

10.1 Monitoring

Figure 29:
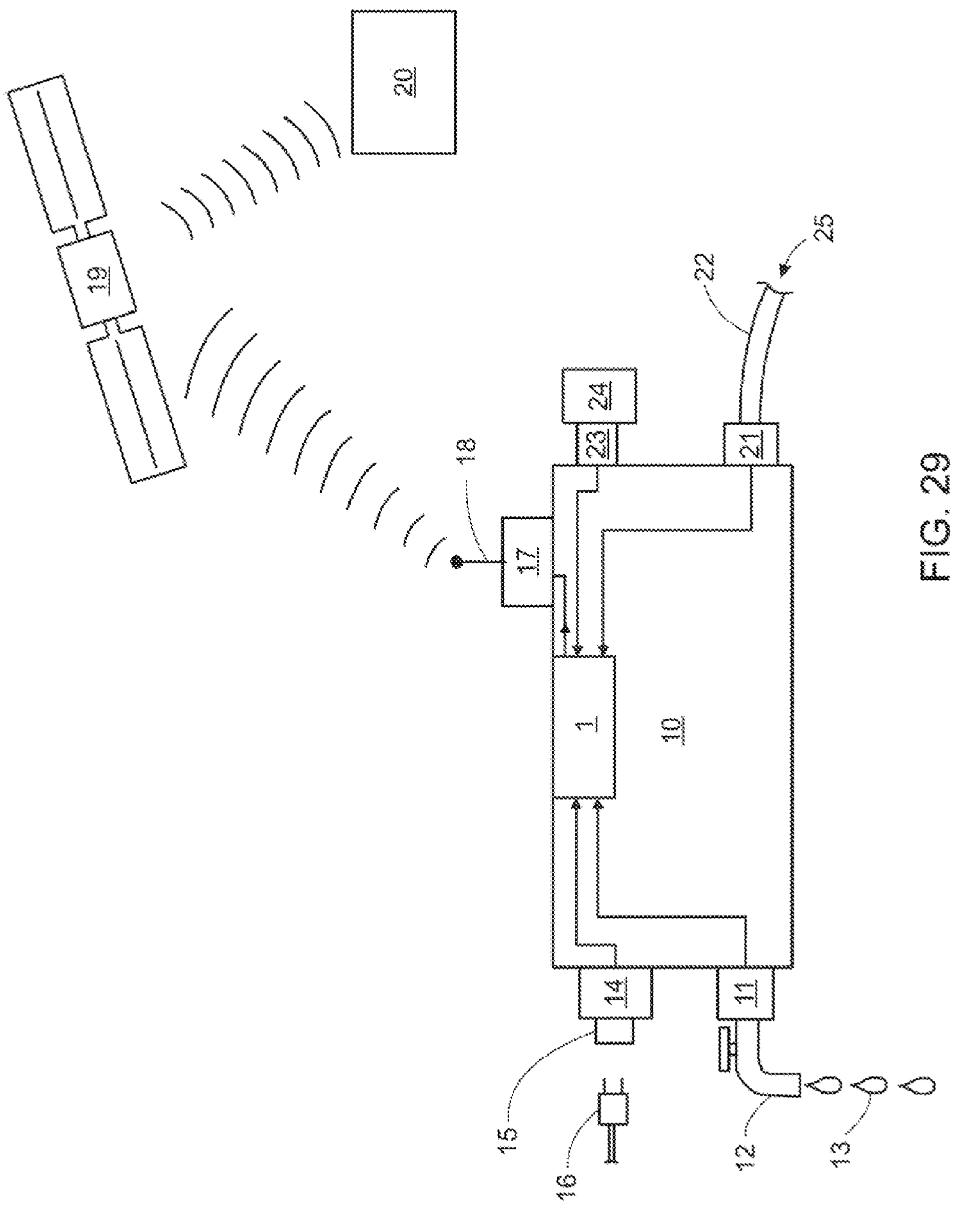
FIG. 29 is a depiction of a monitoring system for distributed utilities in accordance with some embodiments.

Referring first to FIG. 29, preferred embodiments provide for monitoring generation device 10. Generation device 10 may be any distributed utility generation device, such as a water purification system, an electrical generator, or other utility generation device, or a combination of these. Generation device 10 may typically be characterized by a set of parameters that describe its current operating status and conditions. Such parameters may include, without limitation, its temperature, its input or output flux, etc., and may be subject to monitoring by means of sensors, as described in detail below.

In the case in which generation device 10 is a water purification device, source water enters the generation device 10 at inlet 22 and leaves the generation device at outlet 12. The amount of source water 25 entering generation device 10 and the amount of purified water 13 leaving generation device 10 may be monitored through the use of one or more of a variety of sensors commonly used to determine flow rate, such as sensors for determining them temperature and pressure or a rotometer, located at inlet sensor module 21 and/or at outlet sensor module 11, either on a per event or cumulative basis. Additionally, the proper functioning of the generation device 10 may be determined by measuring the turpidity, conductivity, and/or temperature at the outlet sensor module 11 and/or the inlet sensor module 21. Other parameters, such as system usage time or power consumption, either per event or cumulatively, may also be determined. A sensor may be coupled to an alarm or shut off switch that may be triggered when the sensor detects a value outside a pre-programmed range.

When the location of the system is known, either through direct input of the system location or by the use of a GPS location detector, additional water quality tests may be run based on location, including checks for known local water contaminates, utilizing a variety of detectors, such as antibody chip detectors or cell-based detectors. The water quality sensors may detect an amount of contaminates in water. The sensors may be programmed to sound an alarm if the water quality value rises above a pre-programmed water quality value. The water quality value is the measured amount of contaminates in the water. Alternatively, a shut off switch may turn off the generation device if the water quality value rises about a pre-programmed water quality value.

Further, scale build-up in the generation device 10, if any, may be determined by a variety of methods, including monitoring the heat transfer properties of the system or measuring the flow impedance. A variety of other sensors may be used to monitor a variety of other system parameters.

In the case in which generation device 10 is an electrical generator, either alone or in combination with a water purification device or other device, fuel enters the generation device from a tank, pipe, or other means through fuel inlet 24. The amount of fuel consumed by generation device 10 may be determined through the use of a fuel sensor 23, such as a flow sensor. Electricity generated, or in the case of a combined electrical generator and water purification device, excess electricity generated may be accessed through electricity outlet 15. The amount of electricity used, either per event of cumulatively, may be determined by outlet sensor module 14. A variety of other sensors may be used to monitor a variety of other system parameters.

In either of the cases described above, input sensor modules 21 and 23 as well as output sensor modules 11 and 14 may be coupled to a controller 1, electrically or otherwise, in order to process, concatenate, store, or communicate the output values of the respective sensor modules as now described in the following section.

10.2 Communications

The sensors described above may be used to monitor and/or record the various parameters described above onboard the generation device 10, or in an alternative embodiment, the generation device 10 may be equipped with a communication system 17, such as a cellular communication system. The communication system 17 could be an internal system used solely for communication between the generation device 10 and the monitoring station 20. Alternatively, the communication system 17 could be a cellular communication system that includes a cellular telephone for general communication through a cellular satellite system 19. The communication system 17 may also employ wireless technology such as the Bluetooth® open specification. The communication system 17 may additionally include a GPS (Global Positioning System) locator.

Communication system 17 enables a variety of improvements to the generation device 10, by enabling communication with a monitoring station 20. For example, the monitoring station 20 may monitor the location of the generation device 10 to ensure that use in an intended location by an intended user. Additionally, the monitoring station 20 may monitor the amount of water and/or electricity produced, which may allow the calculation of usage charges. Additionally, the determination of the amount of water and/or electricity produced during a certain period or the cumulative hours of usage during a certain period, allows for the calculation of a preventative maintenance schedule. If it is determined that a maintenance call is required, either by the calculation of usage or by the output of any of the sensors used to determine water quality, the monitoring station 20 may arrange for a maintenance visit. In the case that a GPS (Global Positioning System) locator is in use, monitoring station 20 may determine the precise location of the generation device 10 to better facilitate a maintenance visit. The monitoring station 20 may also determine which water quality or other tests are most appropriate for the present location of the generation device 10. The communication system 17 may also be used to turn the generation device 10 on or off, to pre-heat the device prior to use, or to deactivate the system in the event the system is relocated without advance warning, such as in the event of theft.

This information may be advantageously monitored through the use of a web-based utility monitoring system, such as those produced by Teletrol Systems, Inc. of Manchester, N.H.

10.3 Distribution

Figure 30:
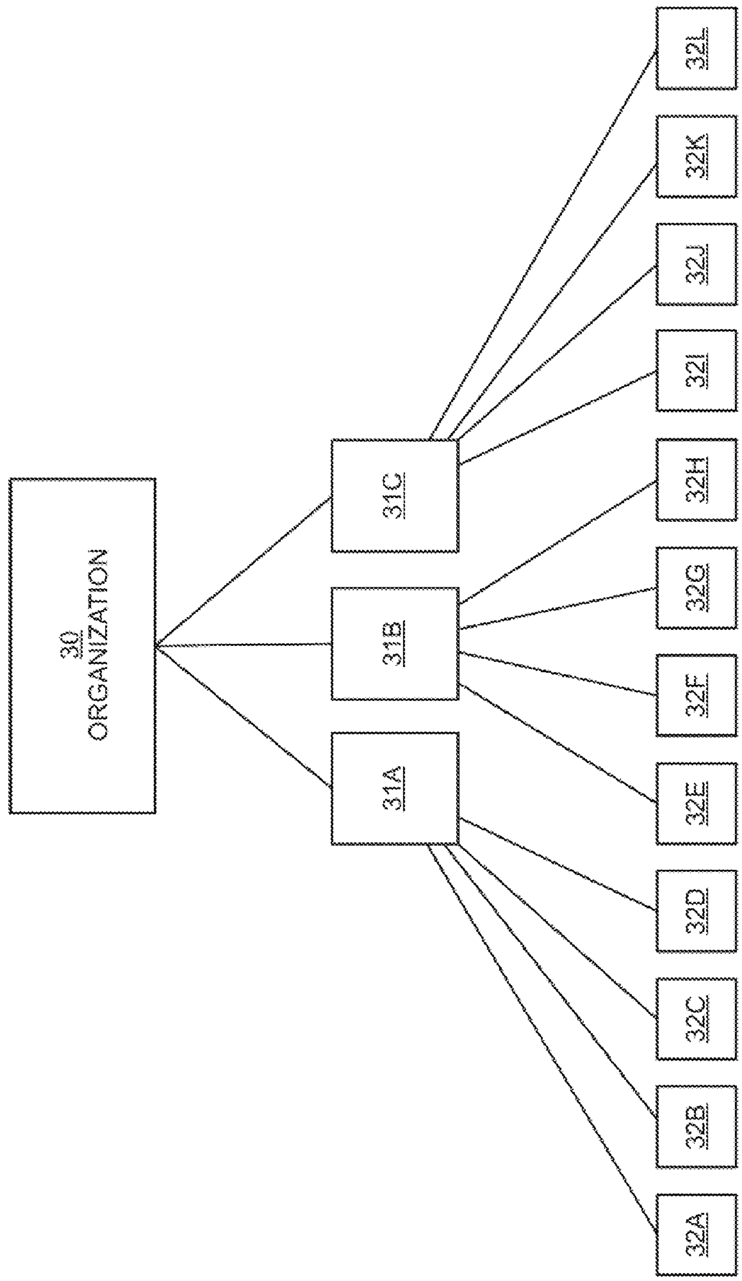
FIG. 30 is a depiction of a distribution system for utilities in accordance with some embodiments.

The use of the monitoring and communication system described above facilitates the use of a variety of utility distribution systems. For example, with reference to FIG. 30, an organization 30, such as a Government agency, non-governmental agency (NGO), or privately funded relief organization, a corporation, or a combination of these, could provide distributed utilities, such as safe drinking water or electricity, to a geographical or political area, such as an entire country. The organization 30 may then establish local distributors 31A, 31B, and 31C. These local distributors could preferably be a monitoring station 20 described above. In one possible arrangement, organization 30 could provide some number of generation devices 10 to the local distributor 31A, etc. In another possible arrangement, the organization 30 could sell, loan, or make other financial arrangements for the distribution of the generation devices 10. The local distributor 31A, etc. could then either give these generation devices to operators 32A, 32B, etc., or provide the generation devices 10 to the operators though some type of financial arrangement, such as a sale or micro-loan.

The operator 32 could then provide distributed utilities to a village center, school, hospital, or other group at or near the point of water access. In one preferred embodiment, when the generation device 10 is provided to the operator 32 by means of a micro-loan, the operator 32 could charge the end users on a per-unit basis, such as per watt hour in the case of electricity or per liter in the case of purified water. Either the local distributor 31 or the organization 30 may monitor usage and other parameters using one of the communication systems described above. The distributor 31 or the organization 30 could then recoup some of the cost of the generation device 10 or effect repayment of the micro-loan by charging the operator 32 for some portion of the per-unit charges, such as 30%. The communication systems described additionally may be used to deactivate the generation device 10 if the generation device is relocated outside of a pre-set area or if payments are not made in a timely manner. This type of a distribution system may allow the distribution of needed utilities across a significant area quickly, while then allowing for at least the partial recoupment of funds, which, for example, could then be used to develop a similar system in another area.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A water vending system comprising:
a water vapor distillation apparatus comprising:
a source water input;
an evaporator condenser apparatus comprising:
a substantially cylindrical housing; and
a plurality of tubes in the housing,
whereby the source water input is fluidly connected to the evaporator condenser and the evaporator condenser transforms source water into steam and transforms compressed steam into product water;
a heat exchanger fluidly connected to the source water input and a product water output, the heat exchanger comprising:
an outer tube; and
at least one inner tube; and
a regenerative blower fluidly connected to the evaporator condenser,
whereby the regenerative blower compresses steam, and whereby the compressed steam flows to the evaporative condenser where compressed steam is transformed into product water; and
a dispensing device, wherein the dispensing device is in fluid communication with the fluid vapor distillation apparatus and whereby product water from the fluid vapor distillation apparatus is dispensed by the dispensing device.

2. The water vending system of claim 1 further comprising a programmable logic controller.

3. The water vending system of claim 2 further comprising a primary tank and a secondary tank.

4. The water vending system of claim 3 further comprising a fill pump wherein the fill pump pumps water from the primary tank to the secondary tank.

5. The water vending system of claim 4 further comprising a diffuser in the secondary tank.

6. The water vending system of claim 4 further comprising at least one sensor.

7. The water vending system of claim 6 further comprising a minimum volume sensor in the primary tank whereby the minimum volume sensor determines whether the primary tank is holding a minimum volume to fill the secondary tank.

8. The water vending system of claim 6 further comprising a maximum volume sensor in the primary tank whereby the maximum volume sensor determines whether the primary tank is full.

9. The water vending system of claim 3 further comprising an air flow conduit between the primary tank and the secondary tank.

10. The water vending system of claim 3 further comprising an ultraviolet sterilizer coupled to a fluid path between the primary tank and the secondary tank.

11. The water vending system of claim 3 further comprising a nozzle assembly downstream from the secondary tank.

12. The water vending system of claim 11 further comprising an ultraviolet sterilizer coupled to a fluid path between the secondary tank and the nozzle assembly.

13. A water vending system comprising:
a water vapor distillation apparatus comprising:
a source water input;
an evaporator condenser apparatus comprising:
a substantially cylindrical housing; and
a plurality of tubes in the housing,
whereby the source water input is fluidly connected to the evaporator condenser and the evaporator condenser transforms source water into steam and transforms compressed steam into product water;
a heat exchanger fluidly connected to the source water input and a product water output, the heat exchanger comprising:
an outer tube; and
at least one inner tube; and
a regenerative blower fluidly connected to the evaporator condenser,
whereby the regenerative blower compresses steam, and whereby the compressed steam flows to the evaporative condenser where compressed steam is transformed into product water;
a dispensing device, wherein the dispensing device is in fluid communication with the water vapor distillation apparatus and whereby product water from the water vapor distillation apparatus is dispensed by the dispensing device;
a programmable logic controller for controlling the dispensing device and the water vapor distillation apparatus;
a multi-purpose interface comprising at least one conductivity sensor; and
a proximity sensor, the proximity sensor sends a signal to the programmable logic controller to dispense water.

14. A water vending system comprising:
a water vapor distillation apparatus;
a dispensing device, wherein the dispensing device is in fluid communication with the fluid vapor distillation apparatus and whereby product water from the fluid vapor distillation apparatus is dispensed by the dispensing device;
a programmable logic controller;
a primary tank;
a secondary tank; and an air flow conduit between the primary tank and the secondary tank.

15. The water vending system of claim 14 further comprising a fill pump wherein the fill pump pumps water from the primary tank to the secondary tank.

16. The water vending system of claim 15 further comprising a diffuser in the secondary tank.

17. The water vending system of claim 15 further comprising at least one sensor.

18. The water vending system of claim 17 further comprising a minimum volume sensor in the primary tank whereby the minimum volume sensor determines whether the primary tank is holding a minimum volume to fill the secondary tank.

19. The water vending system of claim 17 further comprising a maximum volume sensor in the primary tank whereby the maximum volume sensor determines whether the primary tank is full.

20. The water vending system of claim 14 further comprising an ultraviolet sterilizer coupled to a fluid path between the primary tank and the secondary tank.

21. The water vending system of claim 14 further comprising a nozzle assembly downstream from the secondary tank.

22. The water vending system of claim 21 further comprising an ultraviolet sterilizer coupled to a fluid path between the secondary tank and the nozzle assembly.

* * * * *